(12) United States Patent
Klarfeld et al.

(10) Patent No.: US 8,302,127 B2
(45) Date of Patent: Oct. 30, 2012

(54) SYSTEM AND METHOD FOR PERSONALIZED TV

(75) Inventors: Kenneth A. Klarfeld, Eugene, OR (US); Richard Humpleman, Fremont, CA (US); Isaac (Ariel) Bentolila, San Francisco, CA (US); Yiming Zhou, Union City, CA (US)

(73) Assignee: Thomson Licensing, Boulogne-Billancourt (FR)

( * ) Notice: Subject to any disclaimer, the term of this patent is extended or adjusted under 35 U.S.C. 154(b) by 941 days.

(21) Appl. No.: 09/963,335

(22) Filed: Sep. 24, 2001

(65) Prior Publication Data

US 2003/0067554 A1    Apr. 10, 2003

Related U.S. Application Data

(63) Continuation-in-part of application No. 09/893,192, filed on Jun. 27, 2001.

(60) Provisional application No. 60/247,352, filed on Nov. 10, 2000, provisional application No. 60/235,234, filed on Sep. 25, 2000.

(51) Int. Cl.
*H04N 5/445* (2011.01)
*H04N 7/16* (2011.01)
*H01H 9/30* (2006.01)
*H04N 7/173* (2011.01)

(52) U.S. Cl. .......................... 725/46; 725/45; 705/14.66

(58) Field of Classification Search .................... 725/46, 725/45, 9, 35; 705/14.66
See application file for complete search history.

(56) References Cited

U.S. PATENT DOCUMENTS

| 5,128,752 | A | 7/1992 | Von Kohorn |
| 5,223,924 | A | 6/1993 | Strubbe |
| 5,262,875 | A | 11/1993 | Mincer et al. |
| 5,287,181 | A | 2/1994 | Holman |
| 5,324,338 | A | 6/1994 | Holmstrom |
| 5,355,161 | A | 10/1994 | Bird et al. |
| 5,371,551 | A | 12/1994 | Logan et al. |
| 5,410,344 | A * | 4/1995 | Graves et al. ........... 725/46 |

(Continued)

FOREIGN PATENT DOCUMENTS

EP    0705036    4/1996

(Continued)

OTHER PUBLICATIONS

Ravikant, N. et al., API Requirements for the Advanced Set-Top Box, Sep. 2, 1997, 14 pages.

(Continued)

*Primary Examiner* — Pankaj Kumar
*Assistant Examiner* — Reuben Brown
(74) *Attorney, Agent, or Firm* — Robert D. Shedd; Vincent E. Duffy; Joel M. Fogelson

(57) ABSTRACT

A Personal TV System receives a plurality of video segments constituting a TV program and information describing each segment, and controls the display of the segments to a viewer in accordance with preferences of the viewer and with the description of each segment. Segments may be omitted or replaced with substitute segments. The viewer may review his preferences and edit or replace them. In a multi-viewer household, the system may prompt a viewer to confirm her preferences. A TV program may contain interactive segments, and when the viewer chooses to interact with a particular segment, the system automatically stores all subsequently received segments for later viewing while the viewer interacts with the selected segment. The system may present TV program choices to the viewer selected and arranged in accordance with her preferences.

23 Claims, 39 Drawing Sheets

U.S. PATENT DOCUMENTS

| | | | |
|---|---|---|---|
| 5,446,919 | A | 8/1995 | Wilkins |
| 5,463,565 | A | 10/1995 | Cookson et al. |
| 5,483,278 | A | 1/1996 | Strubbe et al. |
| 5,523,794 | A | 6/1996 | Mankovitz et al. |
| 5,537,157 | A | 7/1996 | Washino et al. |
| 5,559,549 | A | 9/1996 | Hendricks |
| 5,565,909 | A | 10/1996 | Thibadeau |
| 5,585,865 | A | 12/1996 | Amano |
| 5,600,364 | A | 2/1997 | Hendricks et al. |
| 5,635,989 | A | 6/1997 | Rothmuller |
| 5,636,346 | A | 6/1997 | Saxe |
| 5,652,613 | A | 7/1997 | Lazarus et al. |
| 5,664,046 | A | 9/1997 | Abecassis |
| 5,671,411 | A * | 9/1997 | Watts et al. ............ 725/43 |
| 5,699,473 | A | 12/1997 | Kim |
| 5,701,383 | A | 12/1997 | Russo et al. |
| 5,717,923 | A | 2/1998 | Dedrick |
| 5,724,091 | A | 3/1998 | Freeman et al. |
| 5,724,521 | A | 3/1998 | Dedrick |
| 5,754,651 | A | 5/1998 | Blatter et al. |
| 5,758,257 | A * | 5/1998 | Herz et al. ............ 725/116 |
| 5,758,259 | A * | 5/1998 | Lawler ............ 725/45 |
| 5,761,371 | A | 6/1998 | Ohno |
| 5,768,785 | A | 6/1998 | Pessin |
| 5,774,170 | A | 6/1998 | Hite |
| 5,778,135 | A | 7/1998 | Ottesen et al. |
| 5,781,228 | A | 7/1998 | Sposato |
| 5,790,935 | A | 8/1998 | Payton |
| 5,794,210 | A | 8/1998 | Goldhaber et al. |
| 5,798,785 | A | 8/1998 | Hendricks et al. |
| 5,801,747 | A * | 9/1998 | Bedard ............ 725/46 |
| 5,809,471 | A | 9/1998 | Brodsky |
| 5,818,441 | A | 10/1998 | Throckmorton et al. |
| 5,835,087 | A | 11/1998 | Herz et al. |
| 5,848,396 | A | 12/1998 | Gerace |
| 5,867,226 | A | 2/1999 | Wehmeyer et al. |
| 5,898,456 | A | 4/1999 | Wahl |
| 5,907,350 | A | 5/1999 | Nemirofsky |
| 5,945,988 | A * | 8/1999 | Williams et al. ............ 715/747 |
| 5,953,073 | A | 9/1999 | Kozina et al. |
| 5,977,964 | A | 11/1999 | Williams et al. |
| 5,990,927 | A | 11/1999 | Hendricks et al. |
| 6,002,393 | A | 12/1999 | Hite |
| 6,005,561 | A | 12/1999 | Hawkins et al. |
| 6,005,597 | A | 12/1999 | Barrett et al. |
| 6,018,612 | A | 1/2000 | Thomason et al. |
| 6,029,045 | A | 2/2000 | Picco et al. |
| 6,029,195 | A | 2/2000 | Herz |
| 6,038,612 | A | 3/2000 | Liow |
| 6,057,872 | A | 5/2000 | Candelore |
| 6,088,722 | A | 7/2000 | Herz et al. |
| 6,091,883 | A | 7/2000 | Artigalas et al. |
| 6,101,529 | A | 8/2000 | Chrabaszcz |
| 6,105,862 | A | 8/2000 | Pailles et al. |
| 6,134,532 | A | 10/2000 | Lazarus et al. |
| 6,141,010 | A | 10/2000 | Hoyle |
| 6,157,772 | A | 12/2000 | Kim |
| 6,160,570 | A | 12/2000 | Sitnik |
| 6,169,842 | B1 | 1/2001 | Pijnenburg et al. |
| 6,177,931 | B1 | 1/2001 | Alexander et al. |
| 6,185,360 | B1 | 2/2001 | Inoue et al. |
| 6,209,131 | B1 | 3/2001 | Kim et al. |
| 6,233,389 | B1 | 5/2001 | Barton |
| 6,236,395 | B1 | 5/2001 | Sezan et al. |
| 6,237,145 | B1 | 5/2001 | Narasimhan et al. |
| 6,260,194 | B1 | 7/2001 | Shiels et al. |
| 6,304,714 | B1 | 10/2001 | Krause et al. |
| 6,317,881 | B1 * | 11/2001 | Shah-Nazaroff et al. ....... 725/24 |
| 6,324,334 | B1 | 11/2001 | Morioka et al. |
| 6,324,338 | B1 | 11/2001 | Wood |
| 6,396,500 | B1 | 5/2002 | Qureshi et al. |
| 6,457,010 | B1 | 9/2002 | Eldering et al. |
| 6,463,585 | B1 | 10/2002 | Hendricks et al. |
| 6,466,241 | B1 | 10/2002 | Schindler |
| 6,480,667 | B1 | 11/2002 | O'Connor |
| 6,493,688 | B1 * | 12/2002 | Das et al. ............ 706/20 |
| 6,507,950 | B1 | 1/2003 | Tsukidate et al. |
| 6,530,082 | B1 | 3/2003 | Del Sesto et al. |
| 6,536,041 | B1 | 3/2003 | Knudson et al. |
| 6,553,178 | B2 | 4/2003 | Abecassis |
| 6,560,578 | B2 | 5/2003 | Eldering |
| 6,563,547 | B1 * | 5/2003 | Smith ............ 348/565 |
| 6,583,825 | B1 | 6/2003 | Yuen et al. |
| 6,587,561 | B1 | 7/2003 | Sered et al. |
| 6,599,473 | B1 | 7/2003 | Egger et al. |
| 6,601,237 | B1 | 7/2003 | Ten Kate et al. |
| 6,614,987 | B1 | 9/2003 | Ismail et al. |
| 6,637,029 | B1 * | 10/2003 | Maissel et al. ............ 725/46 |
| 6,675,384 | B1 | 1/2004 | Block et al. |
| 6,684,240 | B1 | 1/2004 | Goddard |
| 6,698,020 | B1 | 2/2004 | Zigmond et al. |
| 6,704,930 | B1 | 3/2004 | Eldering et al. |
| 6,704,931 | B1 * | 3/2004 | Schaffer et al. ............ 725/46 |
| 6,738,978 | B1 | 5/2004 | Hendricks et al. |
| 6,799,326 | B2 | 9/2004 | Boylan et al. |
| 6,898,762 | B2 * | 5/2005 | Ellis et al. ............ 715/716 |
| 6,915,271 | B1 | 7/2005 | Meyer et al. |
| 6,918,131 | B1 | 7/2005 | Rautila et al. |
| 6,928,653 | B1 | 8/2005 | Ellis et al. |
| 6,950,623 | B2 | 9/2005 | Brown et al. |
| 6,981,040 | B1 | 12/2005 | Konig et al. |
| 6,990,677 | B1 | 1/2006 | Pietraszak et al. |
| 6,993,782 | B1 | 1/2006 | Newberry et al. |
| 7,003,792 | B1 | 2/2006 | Yuen |
| 7,013,286 | B1 | 3/2006 | Aggarwal et al. |
| 7,013,478 | B1 | 3/2006 | Hendricks et al. |
| 7,035,528 | B1 | 4/2006 | Britton |
| 7,039,928 | B2 | 5/2006 | Kamada et al. |
| 7,051,351 | B2 | 5/2006 | Goldman et al. |
| 7,051,352 | B1 | 5/2006 | Schaffer |
| 7,054,900 | B1 | 5/2006 | Goldston |
| 7,086,076 | B1 | 8/2006 | Park |
| 7,096,486 | B1 | 8/2006 | Ukai et al. |
| 7,103,575 | B1 | 9/2006 | Linehan |
| 7,144,627 | B2 | 12/2006 | Halas et al. |
| 7,146,626 | B1 | 12/2006 | Arsenault et al. |
| 7,152,236 | B1 * | 12/2006 | Wugofski et al. ............ 725/40 |
| 7,185,355 | B1 * | 2/2007 | Ellis et al. ............ 725/46 |
| 7,194,753 | B1 | 3/2007 | Fries et al. |
| 7,313,803 | B1 * | 12/2007 | Lynch ............ 725/25 |
| 7,370,342 | B2 | 5/2008 | Ismail et al. |
| 7,395,514 | B2 * | 7/2008 | Stern ............ 715/854 |
| 2001/0014870 | A1 | 8/2001 | Saito et al. |
| 2001/0049826 | A1 | 12/2001 | Wilf |
| 2002/0023263 | A1 | 2/2002 | Ahn et al. |
| 2002/0057893 | A1 | 5/2002 | Wood et al. |
| 2002/0073426 | A1 | 6/2002 | Bhatt |
| 2002/0104087 | A1 * | 8/2002 | Schaffer et al. ............ 725/46 |
| 2002/0118954 | A1 | 8/2002 | Barton et al. |
| 2002/0120627 | A1 | 8/2002 | Mankoff |
| 2002/0131768 | A1 | 9/2002 | Gammenthaler |
| 2002/0178440 | A1 * | 11/2002 | Agnihotri et al. ............ 725/10 |
| 2002/0186296 | A1 | 12/2002 | Gogoi et al. |
| 2002/0199193 | A1 | 12/2002 | Gogoi et al. |
| 2002/0199194 | A1 | 12/2002 | Ali |
| 2003/0005432 | A1 | 1/2003 | Ellis et al. |
| 2003/0023973 | A1 | 1/2003 | Monson et al. |
| 2003/0040962 | A1 | 2/2003 | Lewis |
| 2003/0056216 | A1 | 3/2003 | Wugofski et al. |
| 2003/0067554 | A1 | 4/2003 | Klarfeld et al. |
| 2003/0093792 | A1 | 5/2003 | Labeeb et al. |
| 2003/0101451 | A1 | 5/2003 | Bentolila et al. |
| 2003/0118323 | A1 | 6/2003 | Ismail et al. |
| 2003/0145323 | A1 | 7/2003 | Hendricks et al. |
| 2003/0158818 | A1 | 8/2003 | George et al. |
| 2004/0111742 | A1 | 6/2004 | Hendricks et al. |
| 2004/0117831 | A1 | 6/2004 | Ellis et al. |
| 2004/0128241 | A1 | 7/2004 | Akama |
| 2005/0047752 | A1 | 3/2005 | Wood et al. |
| 2005/0144641 | A1 | 6/2005 | Lewis |
| 2005/0193410 | A1 | 9/2005 | Eldering |
| 2005/0235318 | A1 | 10/2005 | Grauch et al. |
| 2006/0206912 | A1 | 9/2006 | Klarfeld et al. |
| 2006/0212904 | A1 | 9/2006 | Klarfeld et al. |
| 2008/0040749 | A1 | 2/2008 | Hoffberg et al. |
| 2008/0120186 | A1 | 5/2008 | Jokinen et al. |

FOREIGN PATENT DOCUMENTS

| | | |
|---|---|---|
| EP | 0774866 | 5/1997 |
| EP | 0823815 | 2/1998 |
| EP | 0838951 | 4/1998 |
| EP | 0851681 | 7/1998 |
| EP | 0854645 | 7/1998 |
| EP | 0909095 | 4/1999 |
| EP | 1045582 | 4/2000 |
| JP | 09128276 | 5/1997 |
| WO | 9222983 | 12/1992 |
| WO | 9413107 | 6/1994 |
| WO | 9501057 | 1/1995 |
| WO | 9609721 | 3/1996 |
| WO | 9631980 | 10/1996 |
| WO | 97/41673 | 11/1997 |
| WO | 9748230 | 12/1997 |
| WO | 9828906 | 7/1998 |
| WO | 99/01984 | 1/1999 |
| WO | 99/55066 | 10/1999 |
| WO | 00/02380 | 1/2000 |
| WO | 00/04708 | 1/2000 |
| WO | 00/11869 | 3/2000 |
| WO | 00/33160 | 6/2000 |

OTHER PUBLICATIONS

IBM, The challenges of convergence for Set-Top Box manufacturers, Nov. 19, 1997, 14 pages.
IBM, Set-Top Box Solutions: Helping Customers Meet the Challenges of Convergence, Mar. 1997, 2 pages.
IBM, Set-Top Box Peripheral Chip, Mar. 1997, 3 pages.
IBM, Set-Top Reference Design Kit, Mar. 1997, 3 pages.
IBM, Set-Top Box solutions, Mar. 1997, 5 pages.
OpenTv, Inc., OpenTV Operating Environment, Feb. 1998, 9 pages.
OpenTV, Inc., Application Development for OpenTV, Feb. 1998, 11 pages.
Metabyte Networks, Inc., Metabyte Personalizes Microsoft TV, Jun. 14, 1999, 1 page.
Oracle Corporation, Oracle Lite: The Client Database for Java, Jun. 5, 1998, 2 pages.
OpenCable, Reference Material, Oct. 21, 1997, 1 page.
StarSight Telecast, Inc., StarSight: The Interactive On-screen TV Program Guide Service with One-button VCR Programming, Jun. 9, 1998, 3 pages.
StarSight Telecast, Inc., StarSight: An Introduction, Jun. 9, 1998, 1 page.
TVData, Services for On-Screen Guides, Jun. 9, 1998, 1 page.
TVData, The Largest Databases of Television Information in the World, Jun. 9, 1998, 1 page.
U.S. Office Action for U.S. Appl. No. 10/156,173 mailed on Aug. 8, 2007.
U.S. Office Action for U.S. Appl. No. 10/156,173 mailed on Mar. 5, 2008.
U.S. Office Action for U.S. Appl. No. 10/156,173 mailed on Jul. 24, 2008.
U.S. Office Action for U.S. Appl. No. 10/156,173 mailed on Oct. 2, 2008.
U.S. Office Action for U.S. Appl. No. 10/156,173 mailed on Jan. 5, 2009.
U.S. Office Action for U.S. Appl. No. 11/370,156 mailed on Oct. 9, 2007.
U.S. Office Action for U.S. Appl. No. 11/370,156 mailed on Feb. 22, 2008.
U.S. Office Action for U.S. Appl. No. 11/370,156 mailed on May 15, 2008.
U.S. Office Action for U.S. Appl. No. 11/370,156 mailed on Aug. 7, 2008.
U.S. Office Action for U.S. Appl. No. 11/370,156 mailed on Jan. 28, 2009.
U.S. Office Action for U.S. Appl. No. 11/370,081 mailed on Oct. 5, 2007.
U.S. Office Action for U.S. Appl. No. 11/370,081 mailed on Apr. 8, 2008.
U.S. Office Action for U.S. Appl. No. 11/370,081 mailed on Oct. 16, 2008.
API Requirements for the Advanced Set-Top Box, by Open-Cable, Jun. 5, 1998. U.S.
The Challenges of Convergence for Set-Top Box Manufacturers; IBM Microelectronics, Jun. 5, 1998. U.S.
White Paper, Set-Top Box Solutions: Helping Customers Meet the Challenge of Convergence; IBM Microelectronics, Jun. 5, 1998. U.S.
Set-Top Box Peripheral Chip; IBM Microelectronics, Jun. 5, 1998. U.S.
Set-Top Box Reference Design Kit; IBM Microelectronics, Jun. 5, 1998. U.S.
Set-Top Box Solutions; IBM Microelectronics, Jun. 5, 1998. U.S.
OpenTV Operating Environment, Technical White Paper, OpenTV, Inc., Jun. 8, 1998. U.S.
Application Development for OpenTV, Technical White Paper, OpenTV, Inc., Jun. 8, 1998. U.S.
Kageyama et al., "A Free Time_Shift DVD Video Recorder"; Aug. 1997, IEEE pp. 463-473. Japan.
Office Action Issued in Japanese Patent Application No. 002179/2002, Jan. 15, 2008 (English Translation enclosed).
Matsuyama, et al., "Distributed Digital-Ticket Management for Rights Trading System" Proceedings of the 1st ACM Conference on Electronic Commerce EC '99. Japan.
Lawrence R. Rabiner, "A tutorial on Hidden Markov Models and Selected Applications in Speech Recognition", IEEE Feb. 1989, pp. 257-286. U.S.
Canadian Examiner's Report for Canadian Patent Application No. 2,335,025 mailed on May 3, 2006, pp. 1-7.
International Search Report for PCT/US99/12194 dated Sep. 15, 1999, pp. 1-2.
Partial European Search Report for EPO Application No. 03 00 9135 dated Feb. 20, 2004, 1 pp. 1.
European Search Report for EPO Application No. 03 00 9135 dated Dec. 1, 2005, pp. 1.
U.S. Non-Final Office Action for U.S. Appl. No. 10/156,173 mailed Sep. 28, 2009.
U.S. Final Office Action for U.S. Appl. No. 10/156,173 mailed May 27, 2009.
U.S. Non-Final Office Action for U.S. Appl. No. 11/370,156 mailed Nov. 16, 2009.
U.S. Final Office Action for U.S. Appl. No. 11/370,156 mailed May 29, 2009.
U.S. Non-Final Office Action for U.S. Appl. No. 11/370,081 mailed Apr. 30, 2009.

\* cited by examiner

EXAMPLES OF PROGRAM INFORMATION

```
TITLE=SEINFELD
PROGRAM TYPE=SITCOM
CATEGORY=COMEDY
ACTORS=(ACTOR1, ACTOR2)
```
EXAMPLE 1
124

```
TITLE=US DEBT REPORT
PROGRAM TYPE=NEWS ARTICLE
CATEGORY=US GOVT. FINANCIAL
PEOPLE MENTIONED=(BILL CLINTON,
                  ALAN GREENSPAN)
```
EXAMPLE 2
125

FIG. 3

EXAMPLES FOR TRAITS

```
MOVIE
ADVENTURE
SPORTS
MAD ABOUT YOU
DYNAMIC TRAIT 1
DYNAMIC TRAIT 2
NBC NEWS
FRIDAY MOVIE
PREMIER MAD ABOUT YOU
```
126

EXAMPLES FOR LIKING FOR VIEWER N

```
MOVIE=14
ADVENTURE=3
SPORTS=0.3
MAD ABOUT YOU=5
DYNAMIC TRAIT 1=3
DYNAMIC TRAIT 2=5
NBC NEWS=13
FRIDAY MOVIE=18
PREMIER MAD ABOUT YOU-15
```
127

FIG. 4

SOME SAMPLE VALUES FOR FIELDS IN TRAIT RECORD

TRAIT TYPE
STATIC
DYNAMIC
ASSOCIATION
GENERATED

TRAIT DESCRIPTION
(NBC, "NEWS").
SUBSTRING("CIA")IN DESC.
TITLE

DISTRIBUTION
NORMAL
EXPONENTIAL
DEFINED TYPE 1
DEFINED TYPE 2

DISTRIBUTION PARAMETERS
MEAN=13, DEVIATION=2

FIG. 11

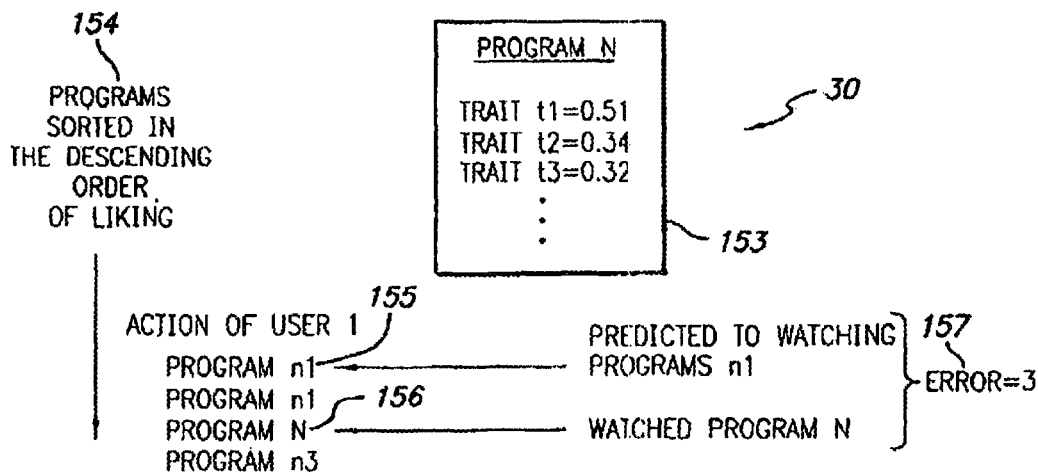
FIG. 9A COMPUTING TRAITNESS OF A TRAIT IN A PROGRAM
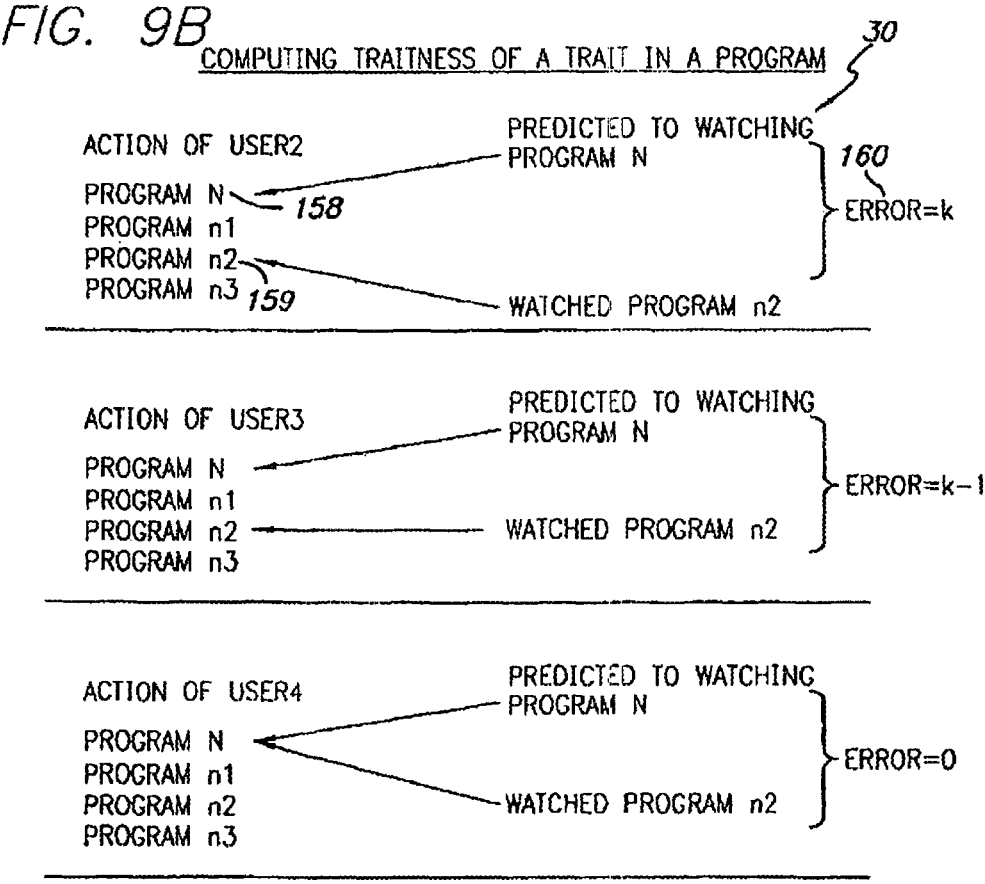
FIG. 9B COMPUTING TRAITNESS OF A TRAIT IN A PROGRAM

EXAMPLE FOR BROADCASTING TRAITNESS AS A PART OF EPG DATA

PROGRAM INFO

SEINFELD,
NBC,
COMEDY=0.07
SITCOM,
DYNAMIC TRAIT 1=0.1
⋮

ACTOR=SEINFELD

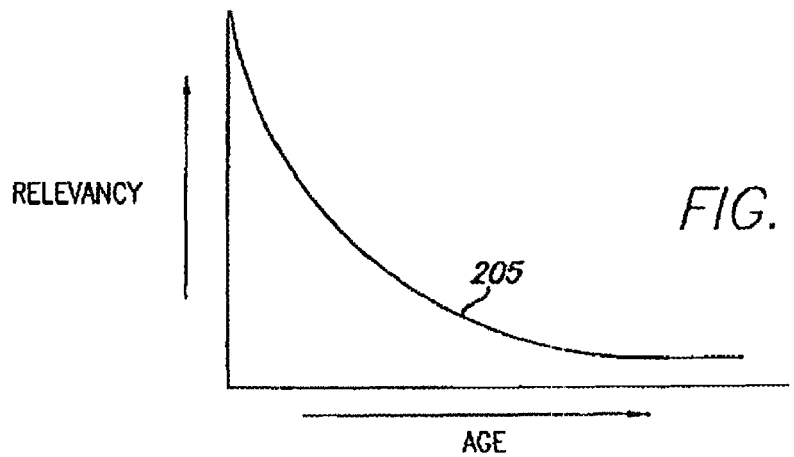
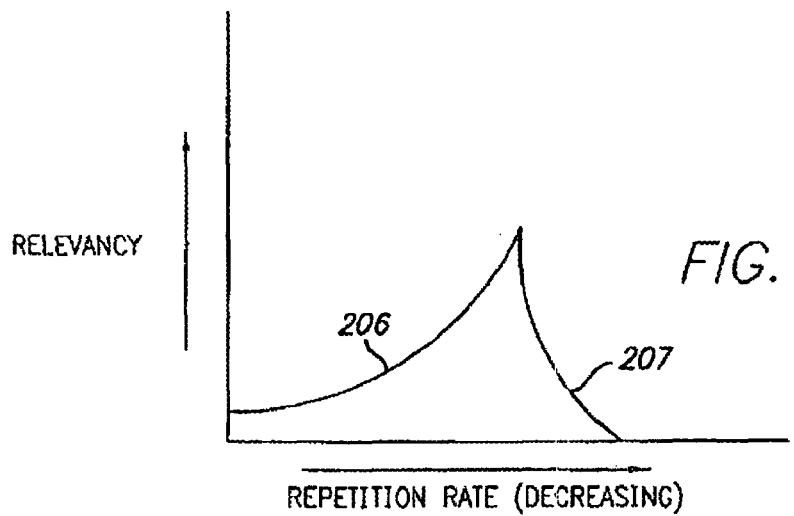
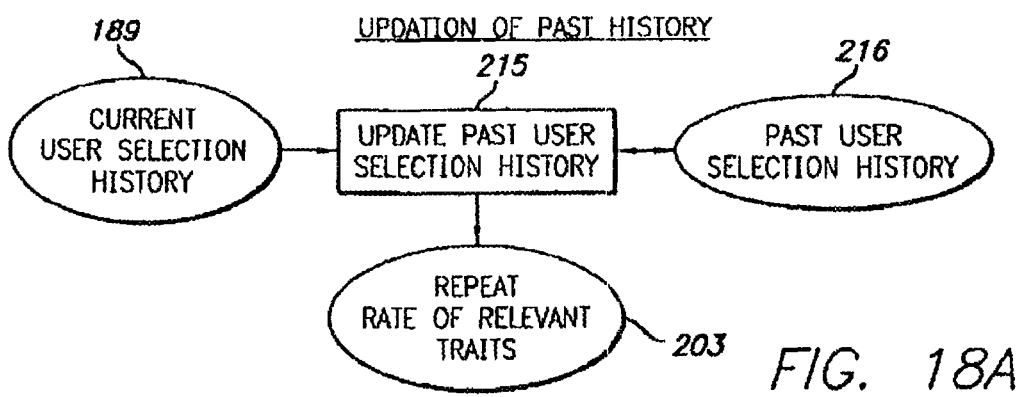

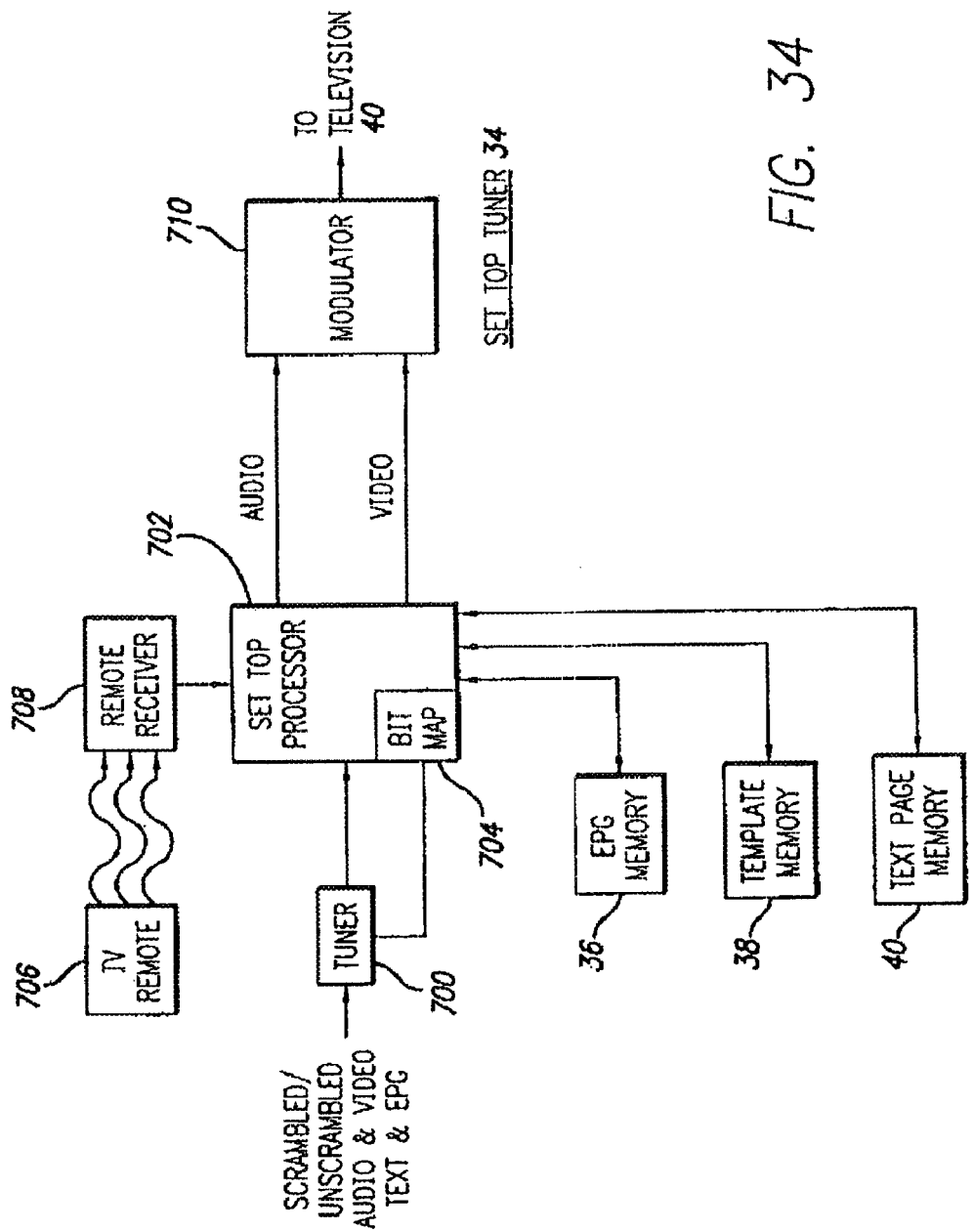

| MbTV On-Air Channel Menu | | |
|---|---|---|
| Record | ◁▷ | None |
| MbTV Rating | ◁▷ | ☺ |

*Fig. 41*

| MbTV Theme Menu | | |
|---|---|---|
| Channel | | |
| Program Type | ◁▷ | Any |
| Program Category | ◁▷ | Any |
| Country | ◁▷ | Any |
| MPAA Rating | ◁▷ | Any |

*Fig. 42*

| MbTV Login Menu |
|---|
| Bob |
| Susan |
| Exit |

*Fig. 43*

| MbTV LogOut Menu |
|---|
| Logout |
| Bob<br>Susan |

*Fig. 44*

| MbTV Password Menu | |
|---|---|
| Password | ****** |

*Fig. 45*

| MbTV Configuration Menu |
|---|
| Storage Budget |
| Storage Filter |
| Users |
| Settings |

*Fig. 46*

| MbTV Storage Menu | | |
|---|---|---|
| General Storage | ⊏═══╬▷ | 80 |
| Bob | ⊏╬═══▷ | 10 |
| Susan | ⊏╬═══▷ | 10 |

*Fig. 47*

| MbTV Filter Configuration |
|---|
| Channel |
| Program Type |
| Program Category |
| Country |
| MPAA Rating |

*Fig. 48*

| Country Filters |
|---|
| CTRY1 |
| Add new Filter |
|  |

*Fig. 52*

| MPAA Rating Filters |
|---|
| MPAA1 |
| Add new Filter |
|  |

*Fig. 53*

| MbTV Storage Menu | |
|---|---|
| String | MPAA1 |
| Max Allocation | ▭▭▭ |
| Desired Allocation | ▭▭▭ |
| Delete Filter | |

*Fig. 54*

| Add New Filters | |
|---|---|
| String | PBS |
| Max Allocation | ▭▭▭ |
| Desired Allocation | ▭▭▭ |

*Fig. 55*

| MbTV User Menu (Clear to delete user) |
|---|
| Bob |
| Susan |
| Add New User |
| |

*Fig. 56*

| MbTV Profile Configuration Menu | |
|---|---|
| High Profile | ◁▷ No |
| Activate Profile | ◁▷ Yes |
| Freeze Profile | ◁▷ No |
| Viewer Name | Bob |
| Shortcut (up to 3 digits) | 1 |
| Password | 123 |
| Supervised Profile | |
| Learning Parameters | |

*Fig. 57*

| MbTV Password Menu | |
|---|---|
| Password | * * * * * * |

*Fig. 58*

SYSTEM AND METHOD FOR PERSONALIZED TV

RELATED APPLICATIONS

This application is a continuation-in-part of patent application Ser. No. 09/893,192 filed on Jun. 27, 2001, and further claims the priority of provisional patent application Ser. Nos. 60/247,352 filed Nov. 10, 2000 and 60/235,234 filed Sep. 25, 2000.

BACKGROUND OF THE INVENTION

Currently, recording of television programs by individuals for viewing at a later time, is generally performed using commercially available Video Cassette Recorders (VCRs). Typically, a VCR may be either manually placed into a record mode or may be programmed to record a selected program at a later time. To program the VCR, the user either enters a date, time and channel of the program desired to be recorded, or enters an identification code of the desired program.

Viewers of television programming increasingly have more choices as to which programs to view. For example, cable television provides a dramatic increase in the number of channels available to a viewer in comparison to the channels available by way of a conventional television antenna. Digital satellite systems provide even more viewing choices. Digital broadcast of programs over cable television systems is expected to further increase the number of channels available to viewers.

One effect of the increase in the number of viewing choices is increased difficulty in deciding which programs to watch. People, particularly those with busy schedules, may not have the time to select and view programs to determine which programs they may or may not like. Programs that may otherwise be desirable to a viewer may never be watched if the program is broadcast at a time that is inconvenient for the viewer. Users may select certain programs for viewing to determine if they like the program. However, with several hundred program selections each week, this task can take a considerable amount of time and is likely to cause certain desirable programs to be overlooked.

There are companies who sample television-viewing habits of the population by monitoring the programs watched by a very small set of TV viewers. These companies collect other demographic information also about the people they monitor for the generation of the sample. These samples give valuable information about the television viewing habits of the population covered by the sample. By analyzing these samples periodically a general mathematical model can be formed which explains the behavioral patterns of the population in television viewing. Each individual viewer would have a very personal liking for television programs which may vary considerably from a model derived from the sample behaviors of general population. At the same time a mathematical model derived by monitoring the behavior of a single user may be inaccurate because of the limited amount of information which can be gathered by watching only a single user for a short period of time. Sending the entire sample of behavioral pattern of the sample population to every viewer device to aid computation of the mathematical model is counter-productive because of the high cost of bandwidth required to transmit this information to each device and the processing power and memory requirement for the viewer device to process this information. Sending personal viewing habits of every user to a server to compute the mathematical model for the individual user would raise privacy concerns for the viewer and also requires a return channel from the viewer device to the server.

With a mechanism to automatically determine personal preferences of a viewer accurately, a very personal TV viewing environment can be presented to the viewer. In case of households with multiple members, by correctly identifying individual members and their preferences, an apparatus can provide an entertainment experience which is most pleasurable to the individual viewer.

Methods have been developed for providing text data to viewers. A closed captioned encoding technique transmits text data in synchronization with its associated video data by inserting the closed captioned text data into a vertical blanking interval of the video signal. However, the closed captioned text data must be inserted into the vertical blanking interval of the video signal by the producer of the video programming. As a result, the vertical blanking interval of the video signal cannot be used by the head end operator to insert other text data such as sports, weather, stock market, news, advertising and other data.

Electronic program guides (hereafter "EPG") provides viewers with on-screen listings of upcoming television programs on cable television channels. The EPG is provided by an EPG data service. EPG data is converted into a video signal at the cable head. The EPG data is converted into a video signal at the cable head and transmitted to the viewer's television by a dedicated cable television channel. After tuning to the dedicated cable television channel, the viewer then wait for the programming for the desired time period is displayed. Often, when EPG data is used, the cable head end operator must dedicate a separate cable television channel to the EPG data and create video signals from the EPG data that are provided by the EPG service providers.

The introduction of digital cable promises to further expand the range of TV services well beyond current offerings. Interactive TV (IT) is expected to offer a hybrid incorporating the ease-of-use of conventional television combined with the interactivity and added functionality of the Internet. In addition to purchasing viewing content, viewers will likely be able to purchase goods and services, and offer feedback regarding various topics including viewing content (e.g. rate a movie or show), items offered for purchase, political candidates engaged in a debate, contestants in a talent show, etc. Conventional content such as educational programs and advertisements may also benefit from IT. For instance, advertisements may provide viewers different choices, such as model type or color, among which the viewers would be prompted to make a particular selection. Depending upon the viewers selection, the advertisement could run along different paths, showing different scenes and presenting additional choices. Further, the viewer may also be able to request additional information, and may be presented with special offers and/or coupons, or be alerted to special sales going on at near-by dealers and distributors.

It is therefore likely that IT will impact the delivery of content to the viewer such that conventional scheduling will no longer be appropriate. For instance, in conventional television systems, content is broadcast in a linear manner, interspersed with advertisements at regularly scheduled intervals. However, within an IT system, a viewer may or may not choose to interact with a certain program or advertisement, or may interact only to a certain level, thus actively changing the length of the video segment (be it program or advertisement) being viewed. This will in turn impact the delivery of subsequent advertisements and programs, and the IT system should be able to adjust delivery accordingly.

If the IT system cannot delay or advance the delivery of content so as to accommodate the viewers interaction with certain viewing segments, viewers may be reluctant or unwilling to use such interactive features. For instance, if interacting with an advertisement would force the viewer to miss the first minute or two of the program she is currently watching, it is very unlikely that the viewer would choose to interact at all. Similarly, if interaction with one advertisement would partially or completely bypass the presentation of the following advertisement being broadcast, the advertiser paying for the broadcast of the second, obscured advertisement would be negatively impacted and billing the advertiser would have to be somehow adjusted.

Thus, a potential problem with IT can be summarized as consisting of lost content, whereby interaction with a video segment may cause the viewer to bypass, or miss, viewing one or more other video segments.

A possible solution to the problem is to disallow the switch to the interactive environment unless the viewer first engages a Pause function. Such a Pause function may be provided by a Personal Video Recorder (PVR) integrated with the IT system. An essential feature of PVRs is high capacity program storage, such as may be provided by a hard drive or other equivalent, high-capacity information storage system or device. Typically, PVRs continuously record all programs being watched, and thus allow the programs to be paused while the viewer needs to pay attention to other tasks and then replayed and viewed later via the storage.

Thus, engaging the Pause function causes further program video information being delivered to the TV set to be cached and the viewed programming frozen. The viewer could then launch the interactive environment for use. Once the viewer has finished interacting with the particular interactive video segment, she may close the interactive environment and toggle the PVR Pause to continue watching the TV programming from where she left off. However, this solution involves many control functions that must be engaged by the viewer, and can thus be inconvenient to the viewer.

SUMMARY OF THE INVENTION

In one aspect, the present invention provides a method for displaying a TV program to a viewer comprising allowing the viewer to select one of a plurality of available TV programs for viewing; receiving a plurality of video segments constituting the selected TV program; receiving information describing each received video segment; and controlling the display of one or more of the received video segments in accordance with the segment information and with previously determined viewing preferences of the viewer.

In another aspect, the invention provides a method for displaying an interactive TV program to a viewer comprising receiving a plurality of video segments comprising the TV program; displaying the received video segments sequentially; allowing the viewer to select a received video segment to interact therewith; and storing subsequently received video segments while the viewer is interacting with the selected video segment.

In still another aspect, the invention provides a method for delivering customized video programming to each of a plurality of individual viewers comprising processing information indicative of preferences of each of the plurality of viewers to develop a viewer characteristics information profile for each of the viewers; analyzing viewing selections made by an individual viewer; selecting the viewer profile most indicative of the viewing selections; and prompting the individual viewer to confirm that the selected profile corresponds to the individual viewer.

In a further aspect, the invention provides a method for displaying a TV program to a viewer comprising processing information indicative of preferences of the viewer to develop a viewer characteristics information profile for the viewer; presenting the viewer with a list of TV programs available for viewing, the programs selected in accordance with the viewer profile; receiving input from the viewer requesting different selections; and presenting the viewer with a list of alternative TV programs available for viewing, the alternative programs selected in accordance with an alternative profile.

In a still further aspect, the invention provides a method for presenting available TV programs to a viewer comprising processing information indicative of preferences of the viewer to develop a viewer characteristics information profile for the viewer; selecting a predetermined number of TV programs from a plurality of TV programs available for viewing, the programs selected in accordance with the viewer profile; and presenting the viewer with a list of the selected programs, the list arranged in accordance with the viewer profile.

BRIEF DESCRIPTION OF THE DRAWINGS

FIG. 3 shows two examples for program information;

FIG. 4 shows examples for traits and liking values;

FIGS. 9a-c illustrate a process of determining traitness of a trait in a program;

FIG. 11 lists sample values for different fields described in FIG. 10;

FIG. 17(b) is a graph representative of relevancy over age;

FIG. 17(c) is a graph representative of repetition rate over relevancy;

FIG. 18(a) is a block diagram showing inputs and output for a process of updating of past selection history;

FIG. 34 illustrates one embodiment of a set top box for use in receiving text data and EPG data;

FIGS. 37-58 represents exemplary embodiments of user interfaces.

DETAILED DESCRIPTION OF THE INVENTION

Figure 1:
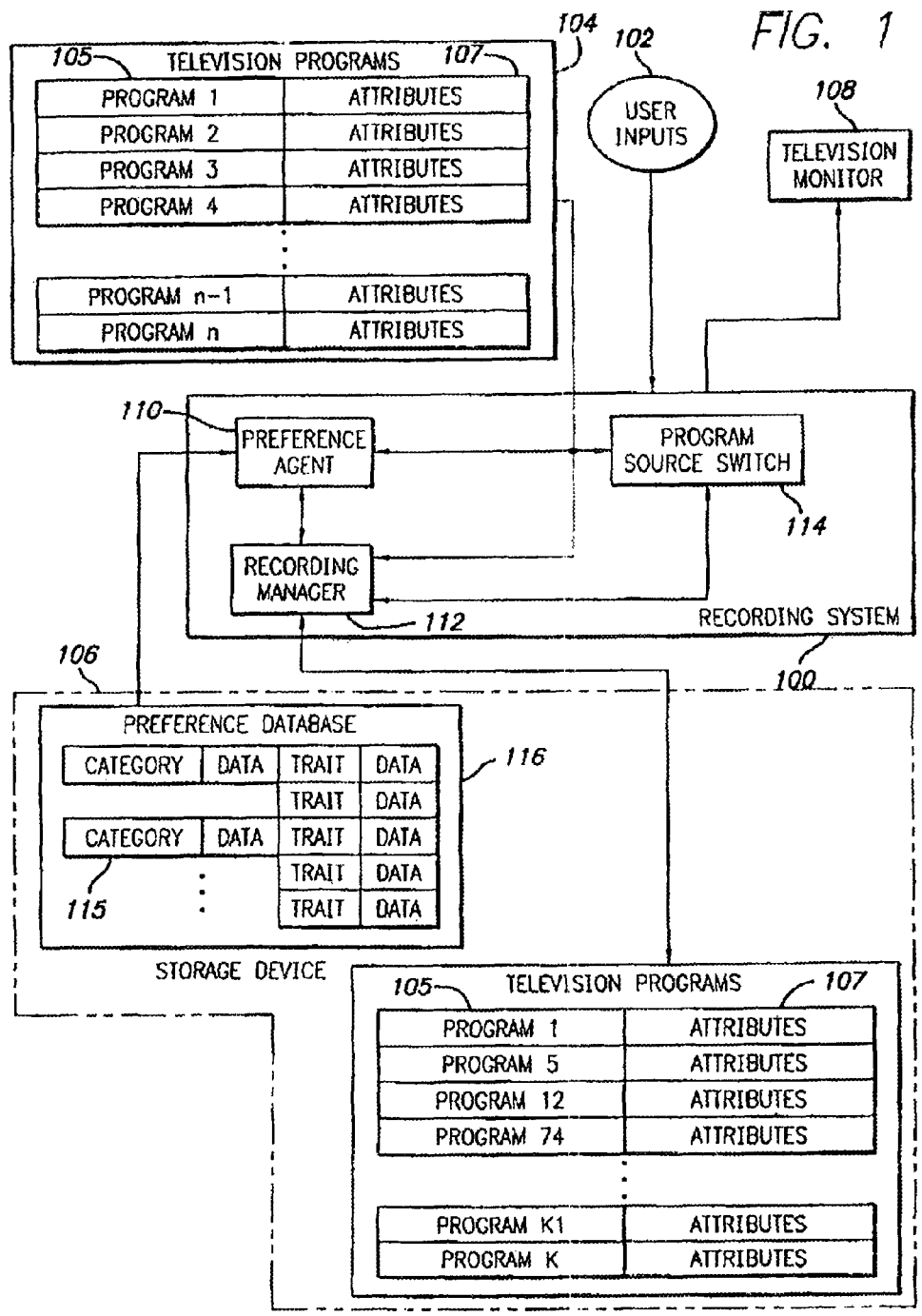
FIG. 1 is a high-level block diagram of a Program selection device employing the principles of the present invention.

Referring to FIG. 1, television control system 100 operates in accordance with the principles of the present invention to cause recordation of television programs in response to user inputs 102 and television signals 104. Television control system 100 transmits signals to television monitor 108 for viewing by the user. Preferably, in digital embodiments, programs that are recorded by system 100 are presented to the user in the form of additional channels. Thus, the user can rapidly determine, by changing channels, the stored programs that are available for viewing. The user can also change channels between stored programs or between stored programs and currently broadcast programs. If the user changes channels from a recorded program to another program, playback of the recorded program is preferably paused. Alternatively, whether the playback of the recorded program is paused or continued, is a user selectable option. As described further herein, the user may specify programs for recordation by specification of a particular program, or by specification of particular attributes of the program such as comedy/drama, actor(s). When manually specifying programs for recordation, the user may specify that the program is to be recorded once or repeatedly, such as weekly, when broadcast.

Signals 104 include a first component 105 which contains the information necessary to display video and audio components of a television program on television monitor 108. Signals 104 preferably also include a second component 107 termed herein "attribute information." An example of such attribute information 107 is the information available by way of the DVB-SI and ATSC-SI formats and various proprietary formats such as StarSight EPG Data and TVData available from StarSight Telecast, Inc., Fremont, Calif., and TVData, Glen Falls, N.Y., respectively.

Attribute information 107 for any particular program varies depending on the program type, but typically includes a plurality of categories such as start time for the program, duration of the program, the title of the program and other, attributes (categories) of the program, together with an associated value corresponding to each of the categories.

Recording manager 112 operates to cause recordation and storage of television programs 105 and attribute information 107 in accordance with information generated by preference agent 110 and stored in preference database 116. Recording manager 112 also responds to user requests to record particular programs and to user requests to record programs having specified category-value pairs.

The signals transmitted to the monitor 108 preferably take a conventional analog form. Alternatively the signals transmitted to the monitor 108 maybe digitally encoded. The exact form of the signals transmitted to the monitor is not critical and may take a form as required by a particular monitor. The television signals 104 received by the television control system 100 may take one of a variety of signal formats including analog encoded signals that are encoded in accordance with the well known NTSC or PAL standards. Alternatively, the signals 104 may be digitally encoded in a manner as transmitted by commercially available digital satellite systems (DSS) or in accordance with the MPEG-2 (Motion Picture Expert Group-2) standard. In any given embodiment of television control system 100 the signal 104 may take a variety of the aforementioned forms. For example, television control system 100 may be coupled to receive inputs from a digital satellite system, the inputs being digitally encoded. The television control system 100 may also be coupled to receive inputs from a Community Antenna Television System (CATV) in which the signals are either encoded in analog or digital form. The television control system 100 may also be coupled to receive analog or digital signals from a conventional home antenna.

The attribute information 107 may be transmitted to the television control system 100 contemporaneously with the television program 105 in a variety of ways including industry standards, such as DVB-SI (Digital Video Broadcasting-Service Information) as defined by the European Telecommunication Standards Institute (ETS), or the ATSC digital television standard as defined by the Advanced Television System Committee (ATSC). By way of example, in the DVB-SI protocol, programming for the next six hours is transmitted every eight seconds for each channel. As a further example, program information for the next seven days is available from the interactive on-screen TV program guide available from StarSight Telecast, Inc. Programming information further into the future, such as for the next seven days, may also be obtained in other ways. For example, by receiving the information in a time-multiplexed manner over a particular channel. Such information can easily be transmitted when the user is performing an action that does not require a moving video image on the screen, such as when the user has a control menu displayed on the screen.

Alternatively, television control system 100 can download the attribute information 107 separately from the television program 105 by way of a separate communication session via a modem or the Vertical Blanking Intervals (VBI) contained in television signals. Such separate communication sessions include data download mechanisms supported by the MPEG-2, DVB-SI and DSS protocols.

The attribute information 107 can take a form under the DVB-SI protocol as shown below:
event_id,
start_time.
duration,
DESCRIPTOR1,
DESCRIPTOR2,
. . .
DESCRIPTORn.

The event-id field Is a unique alpha-numeric code assigned to a program. DESCRIPTORS can be "Short Event Descriptors," "Extended Event Descriptors" or "Content Descriptors" which include the following information:

```
Short Event Descriptor:
{
    event_name-length
    event_name,
    event_description-length
    event_description
}
Extended-even
{
    ITEM1
    ITEM2
    ...
    ...
    ITEMn.
}
content descriptor:
{
    CONTENT1,
    CONTENT2,
    ...
    ...
    CONTENTn.
}
```

ITEMs include the following information:

```
{
    item_description_length,
    item_description,
    item_value length,
    item_value
}
```

An example of item descriptions can be "Director" and item value can be "Martin Scorsese". CONTENT includes the following information:

```
{
    DVB-SI defined theme,
    DVB-SI defined sub-theme, programmer defined theme,
    programmer defined subtheme,
}
```

An example of theme and subtheme are MOVIE and COMEDY, respectively. The programmer defined theme and subtheme are values that may be provided by the EPG Data provider.

Figure 2:
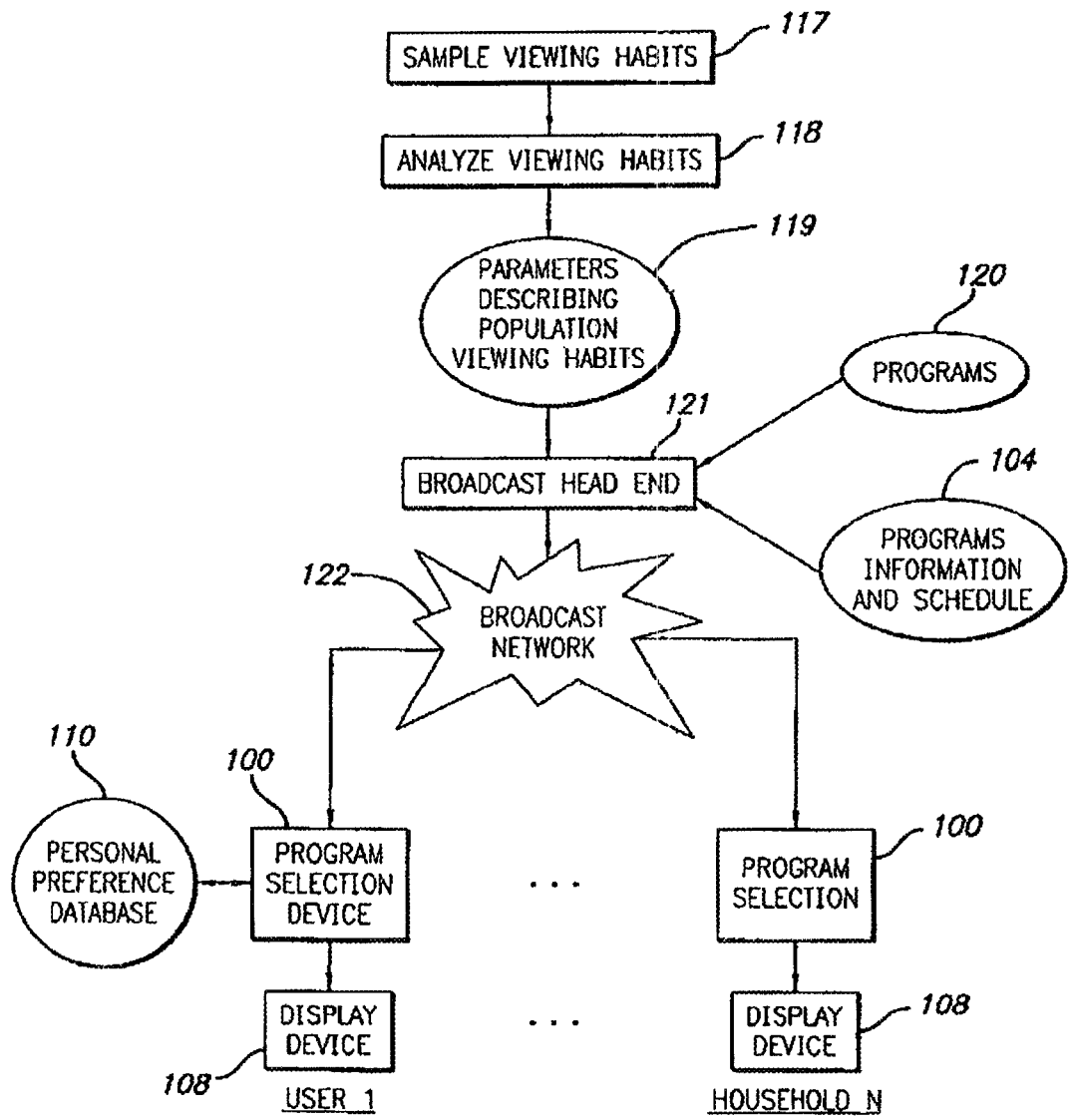
FIG. 2 is a high-level block diagram of a system employing the principles of the present invention.

Referring now to FIG. 2. preference determination is used to predict a user's preferences in the choice of TV programs. This prediction is based on, (i) analysis of the individual users viewing habits, (ii) analysis of the viewing habits of a representative sample of users and (iii) EPG data for the television programs available during the period of the collected sample.

One method for creating a preference determination is through the use of a Bayesian network that is used to predict user behavior, and hence a preference agent, is a knowledge based approach. In this method a knowledge engineer interviews an expert about the Field of expertise of the expert. The expert and the knowledge engineer determine the distinction of the worlds that are important for decision making in the field of the expert. The knowledge engineer and the expert next determine the dependencies among the variables and the probability distributions that quantify the strengths of the dependencies.

A second method is Bayesian network is a data based approach. In this second method the knowledge engineer and the expert first determine the variables of the domain. Data is then accumulated for those variables, and an algorithm applied that creates a belief network for those variable data accumulated for those variables, and an algorithm is applied that creates a the belief network to predict user behaviors from this data. The accumulated data comes from real world instances of the domain. This second approach exists for domains containing only discrete variables.

Bayesian methods can be performed by utilizing an algorithm known as the "EM" algorithm, which, as recognized by those skilled in the art, calculates the maximum a posteriori values ("MAP values") for the parameters of the model to predict user behavior. The EM algorithm is described in Dempster. Maximum Likelihood From Incomplete Data Via The EM Algorithm, Journal of the Royal Statistical Society B, Volume 39 (1977), incorporated herein by reference.

After calculating the probability for each variable, each variable within the belief network is then scored for goodness in predicting the preferences of the user by rendering a subscore. As recognized by those skilled in the art, the subscores are generated by using the marginal likelihood of the expected data at the maximum a posteriori values.

One skilled in the art will recognize that any standard model to predict user behavior inference algorithm can be used to perform this step, such as the one described in Jensen, Lauritzen and Olesen, Bayesian Updating in Recursive Graphical Models by Local Computations, Technical Report R-89-15, Institute of Electronic Systems, Aalborg University, Denmark, incorporated herein by reference.

Television viewing habits of the population are sampled to generate representative samples of viewer behaviors, 117. This task is typically performed by companies such as Nielsen Media Research, who collects user behavioral samples to conduct market research. The results of the sampling is stored in a viewer behavior database. The format of the viewer behavior database is proprietary to the company conducting the sampling. Viewer behavior database contains demographic information about the people in households participating in the sampling. This information includes but is not limited to race, age, annual income and gender. Viewer behavior database also contains information about all the television programs each viewer watched during the period of sampling.

Program Information and the schedule of television programs is available in the EPG database, 104. Program Information for a television program contains information about various attributes of the program which includes but not limited to the title, program type and program category of the television program, arid also the actors acting in the television program.

FIG. 3 lists two examples of program information, example 1, 124, describes the program information for a audio visual television program, and example 2, 125 describes program information for a graphical text based television program.

Viewer behavioral database is analyzed 118 to identify traits of TV programs and determine how such identified traits influence viewing habits in the representative sample of users. These traits and their influence amongst the viewing population are then used in aiding the process of predicting an individual user's choice in TV programs. FIG. 4, 126, lists some examples of such traits. Some of these traits are derived from program information, 104. Some of these traits are derived by looking for users liking for association of multiple traits or association of traits with other viewing parameters which includes but is not limited to time, day of the week, holiday, working day and weather season. Some of these traits are derived by data analysis of Viewer behavioral database. Any given program would exhibit varying degrees of the above identified traits. This is expressed as the trait-ness of the trait in the program, e.g. trait-ness of comedy in Seinfeld may be 1.2 and trait-ness of comedy in Mad About You may be 0.79. The trait-ness of a trait in a program is computed as a part of the data analysis, 118.

The present invention also provides for a methodology for determining viewer preferences. In one embodiment, an individual viewer picks one show to watch out of the collection of available program by evaluating a stochastic liking function for each program and choosing the program with the highest score. The liking function is modeled as an aggregate of liking for a specific trait and the degree to which that trait is exhibited by that program. The liking function can be computed as:

$$1(p) = \Sigma(tn) * tn$$

Where
 1(p) represents the liking for program p
 $\Sigma(tn)$ represents the liking for a specific trait tn
 tn represents the degree to which the Trait tn is exhibited by p.

When a viewer watches television, it is assumed that the viewer chooses a program for which the value of 1(p) is the highest. For any given viewer, the better the values of $\Sigma(tn)$ represent its actual liking, the more the accuracy in determining its preference for TV programs. Thus for any given user if all the relevant traits are known along with the exact liking of each of those traits, the above Liking Function would always accurately predict the liking of any given program.

However, identification of all the relevant traits and the determination of the exact liking of each viewer is a non trivial task and arrived at iteratively by a process of regression analysis.

While a majority of the traits relevant to a specific user may be derived directly from the EPG information itself, some of the traits are discovered by analyzing the user's viewing habits over time. Traits that are suitable for discovery by a process of regression analysis are generally hidden or associated traits.

Hidden traits are those which influence a user's viewing habits but which can not be derived from the EPG information. For example, sitcoms featuring a specific ethnic background would resonate more with viewers of that ethnic background. Another example of the effect of a hidden trait could be the strong liking of the sitcom "Frasier" amongst the set of users who have a strong liking for the sitcom "Cheers." Assuming that the names of actors performing in a sitcom are not be available in the EPG data, this affinity towards both the sitcoms by the same set of people may be explained by the presence of some trait commonly exhibited by both the sitcoms, namely the presence of one of the central characters in both the sitcoms. Such hidden preference criteria would have to be captured by adding the hidden traits in the computation of the Liking Function.

Associated traits—Traits which have a different influence on a user's viewing habits when combined with other traits. For example a user would have a certain liking for any given Seinfeld episode, and a certain liking for any premiere sitcom being aired for the first time. However, its liking for a premiere episode of Seinfeld may be sufficiently large enough to require an additional trait, "new Seinfeld", to fully explain its liking for a premiere episode of Seinfeld.

The liking of each trait for a given user has to be similarly refined from initial approximations by regression analysis. Examples of traits and the associated liking for a sample user include but are not limited to those listed in FIG. 4. The trait "NBC <=> NEWS" is an example of an associated trait where the traits being associated are "Channel NBC" & "Program Type News." Users liking for NEWS programs may be 1 & the preference for the "NBC Channel" may be 2 whereas its preference for NEWS on NBC may be 13, i.e., this user does not always watch news programs or programs in general on the NBC channel, however he has a strong preference for NEWS programs on the NBC channel. If only its liking for the "Channel NBC" & "Program Type News" are considered, its preference for "News on NBC" would be unexplainable.

This procedure to identify traits is first carried out using the viewing habits of the representative sample along with the determination of the distribution of likings of each trait within the representative sample.

Some of the outputs of the analysis 102, of the viewing habits of a representative sample are a set of preference determination parameters viz. (i) the traits which are exhibited by recurring program and the degree to which such a trait is exhibited, and (ii) a distribution list of the likings amongst the viewing population of each of the above trait.

Figure 5A:
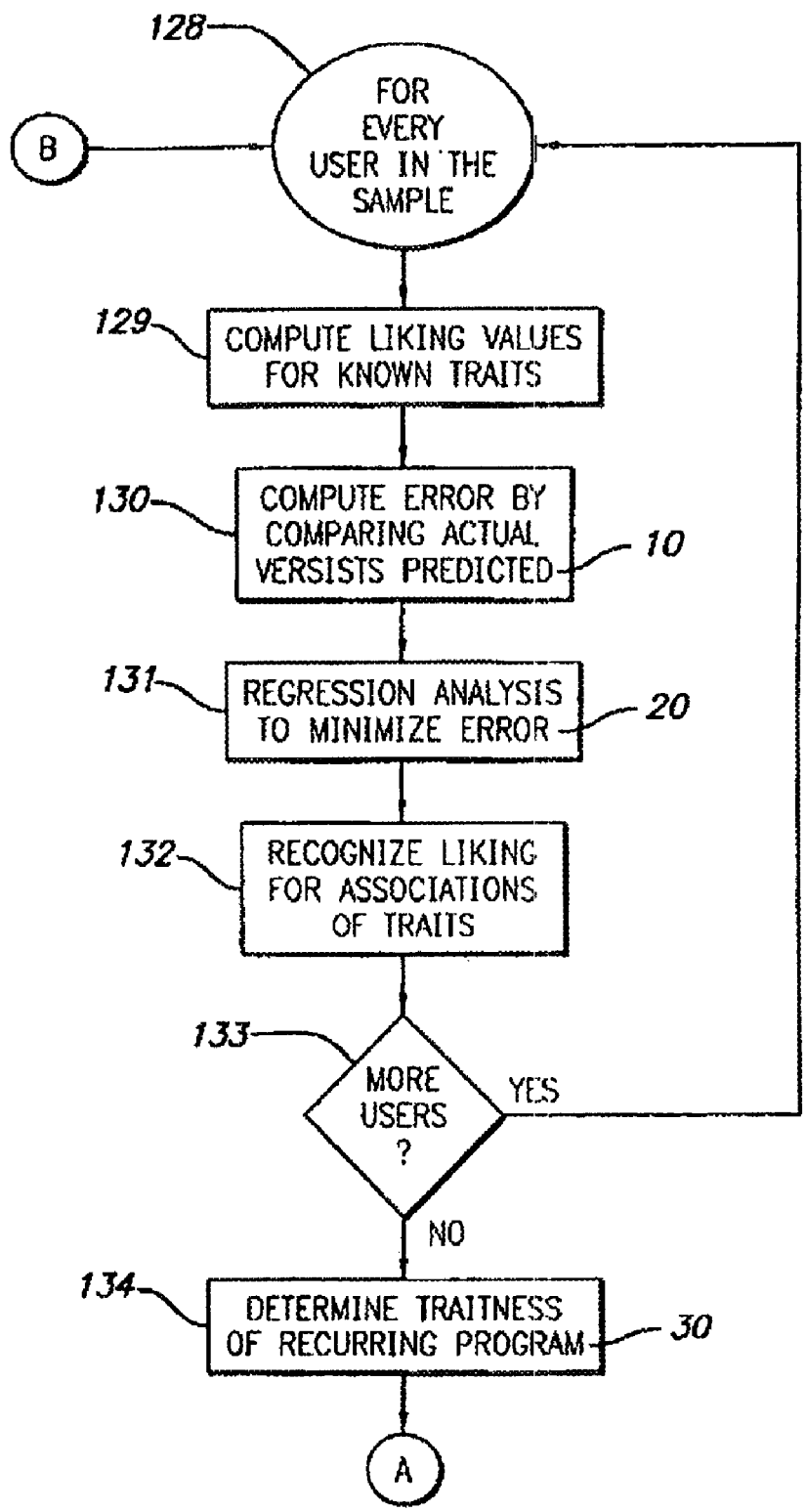
FIGS. 5a-b illustrate data analysis performed on a representative sample.
Figure 5B:
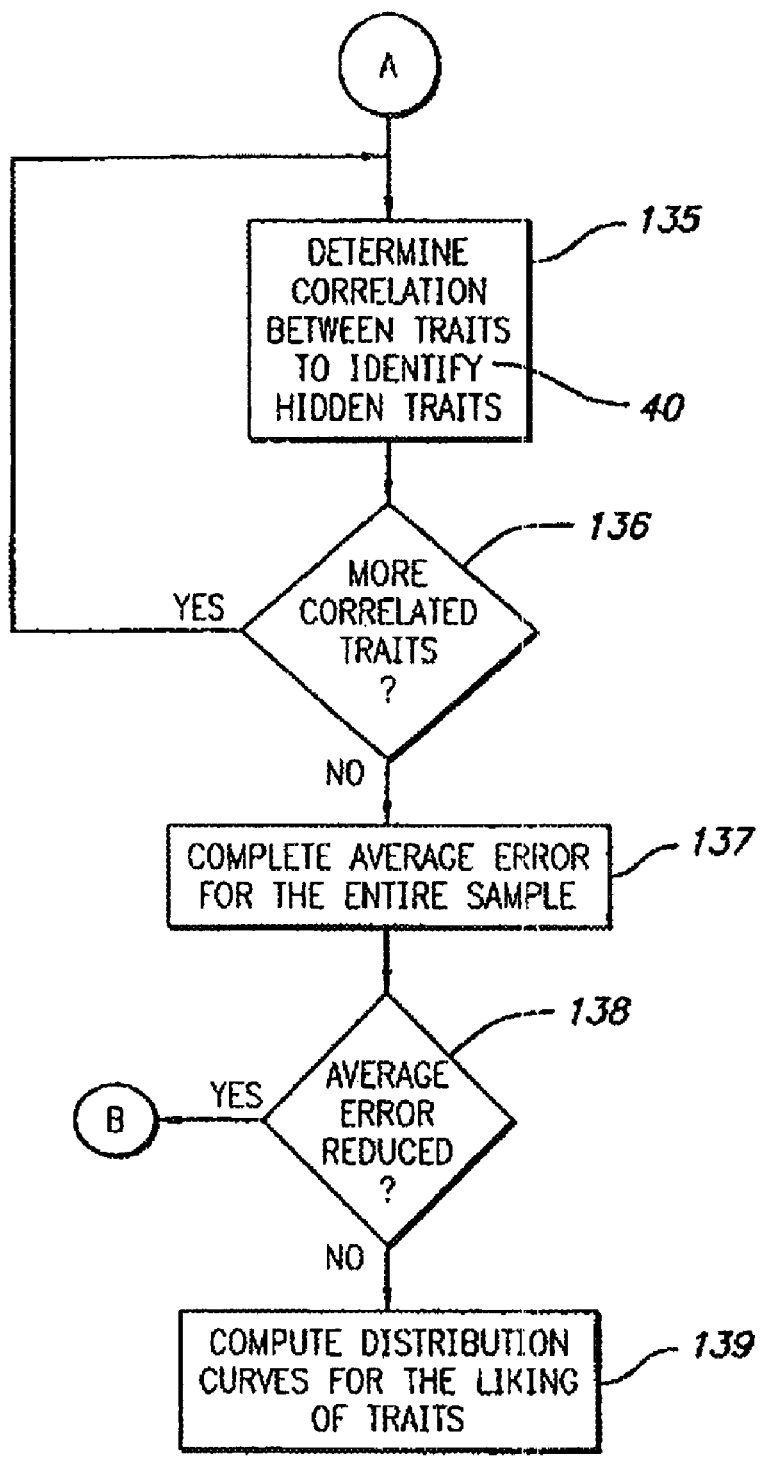

One methodology to derive these parameters is outlined in FIGS. 5(*a*) and 5(*b*). Different phases of the flow chart are explained further in the following sections. An initial set of liking values are computed for each user, 129. This initial liking value may be arrived at in various ways. One of the ways could be to base it on the amount of time for which a given trait was watched as opposed to the amount of time it was available during the user's viewing period.

Figure 6:
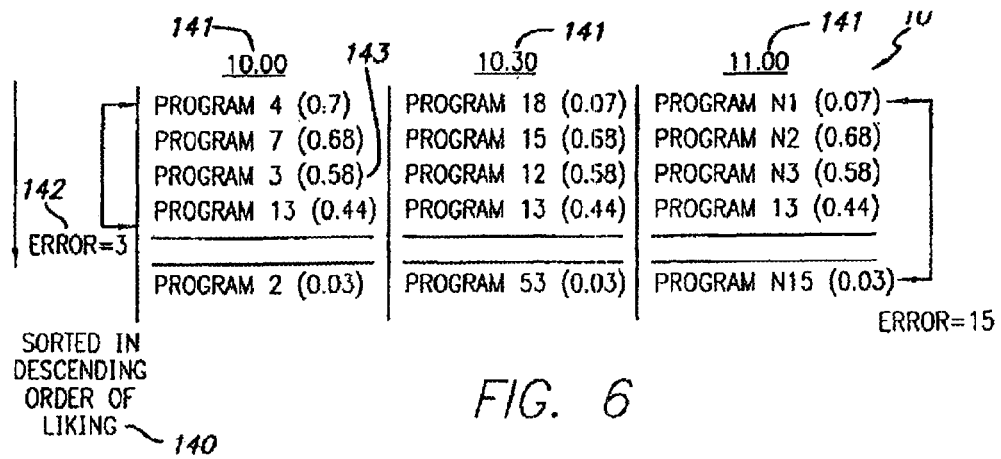
FIG. 6 illustrate a process of computing the error in prediction of user choices.

Using these initial liking values for the traits the Liking Function 1(p) is computed for all the programs that were available during the times the user watched a given program. These programs are then arranged in descending order, 140, of liking value for a time period during which the viewer watched a program, 141. The actual program the user watched at a given time is highlighted, 143. If all the highlighted programs in FIG. 6 had the highest score, the Liking Function correctly identified the user's preference. If the program watched by the user ranks below some other competing program available at that time the liking values used do not correctly reflect the user preference. By way of example, but not by way of limitation, if there are N programs ranked above the program actually watched, the error in the Liking Function for this program may be called N, 142. Such values of N are determined for each program watched by the user by comparing it with the Liking Function of the other competing programs. In the example illustrated in FIG. 6 values of N are computed for the times when the user watched TV between the hours of 10:00-10:30, 10:30-11:00, 11:00-11:30. Using regression analysis, the liking values of each of the traits are adjusted incrementally to reduce the average value of N. The set of liking values which yield the lowest value of the average of N are considered the best set of liking values for that user.

Figure 7:
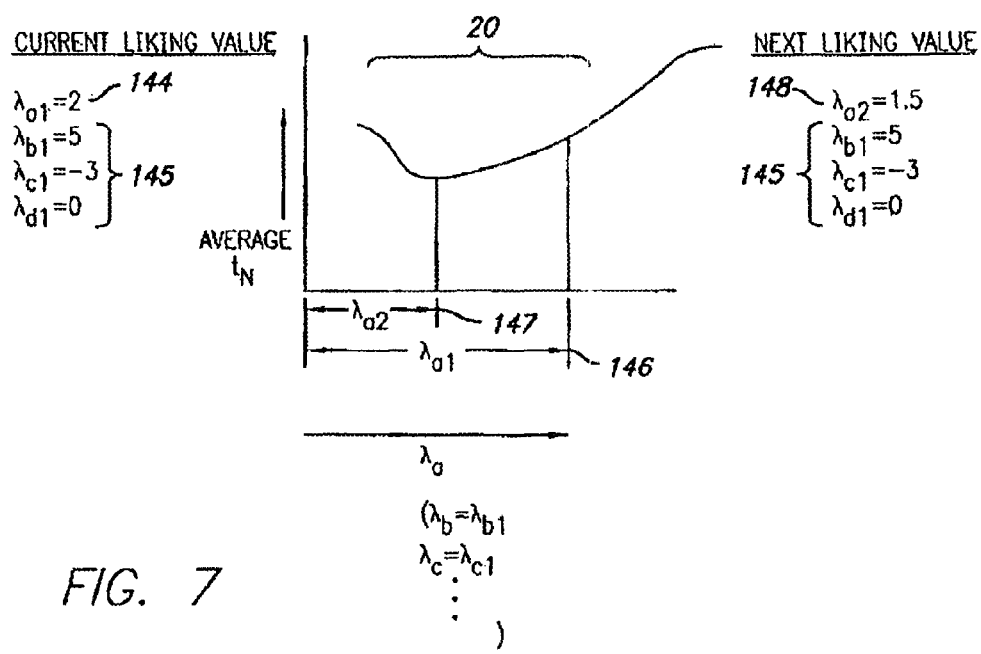
FIG. 7 illustrate a step in the process of regression analysis.

One methodology of the regression process is illustrated in FIG. 7. At the beginning of the process liking values for traits a, b, c, are Σa1, Σb1, Σc1, . . . (144, 145). Σa1 represents the liking of trait "a," Σb1 represents the liking of trait "b" and so on. The Liking Function of all the relevant programs are computed using this initial set of liking values. The liking value Σa1 of the first trait "a" is changed incrementally to determine the average value of N. The value Σa2, 147, which yields the lowest average value of N, is taken as the new liking value for the trait "a." This new value liking value Σa2, 148, now replaces the old value and is now used to determine the remaining Σ values. The above set of liking values computed would predict the users preferences with a high degree of accuracy if set of the traits considered in the Liking Function includes all the traits that are relevant to a user. The average value of N not converging (to 0 or some other acceptable value) would indicate that not all traits that are relevant to the user have been considered in the computation of the Liking Function. Introduction of additional traits, either associated or hidden, is used to improve the determination of the user's preference.

A determination of associated traits is achieved by a variety of different methods. One method is through the application of heuristic rules of thumb where the associative value of a number of traits is not reflected in the program information obtained from an EPG but is relevant to human viewing habits. For example, a user who has a liking for Seinfeld would most probably have a much higher preference for a premiere or new episode of Seinfeld. Such heuristic rules of thumb regarding the associative value of a number of traits may be passed to each set top box via the Head End. Another method of determining associated traits is with an algorithmic search which looks for common traits in programs and introduces new associated traits to try to improve the Liking Function for a user.

Figure 8:
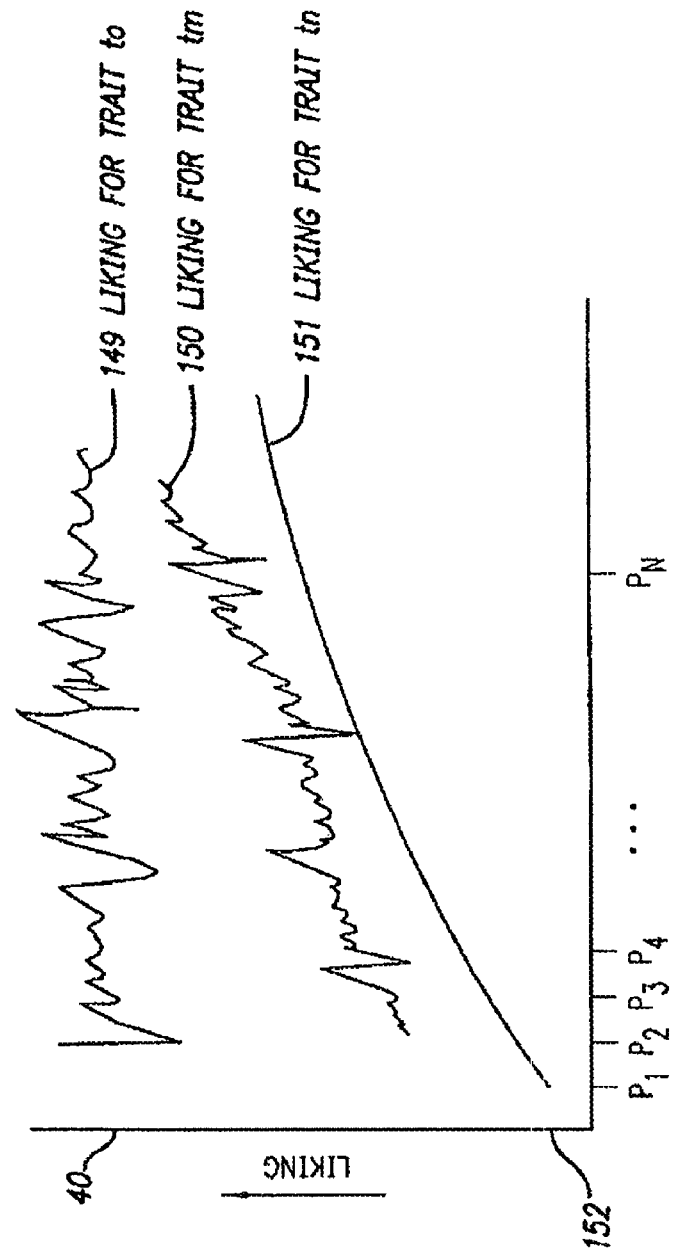
FIG. 8 shows the relationship between two correlated traits.

Determination of hidden traits in different programs can be achieved in a number of ways. One of these methods is illustrated in FIG. 8. The possibility of the presence of a hidden traits exists whenever there exists a strong co-relation between any two traits present in different programs. The y-axis represents an increasing liking value for higher values of y. Every point on the x-axis in FIG. 8 represents a user arranged such that the liking value of the trait "tn" increases with higher values of x. If for the same values on the x-axis the liking values of a strongly co-related trait "tm" are also plotted, it will exhibit a relation to the liking graph of the trait "tn". The co-relation between any two traits may be explained by he presence of a common hidden trait. Thus traits "tm" and "tn" may be expressed mathematically as $$tm = tx + tm'$$

$$tn = Ctx + tn'$$

where C is some constant indicating the amount of co-relation between traits "tm" & "tn".

Hidden traits can also identified by applying rules of thumb or some other appropriate manner.

While all programs of a specific genre exhibit some common traits, the degree to which these traits are exhibited vary from program to program. This degree of traitness for recurring programs can be quantified such that it best explains the viewing choice of watching or not watching that program in the representative sample. For example consider a user who has a certain liking Σ for comedy. The users' decision to watch a comedy program would be influenced by whether the amount of comediness exhibited by that program crosses some threshold of comediness that is determined by its liking for comedy.

Figure 9C:
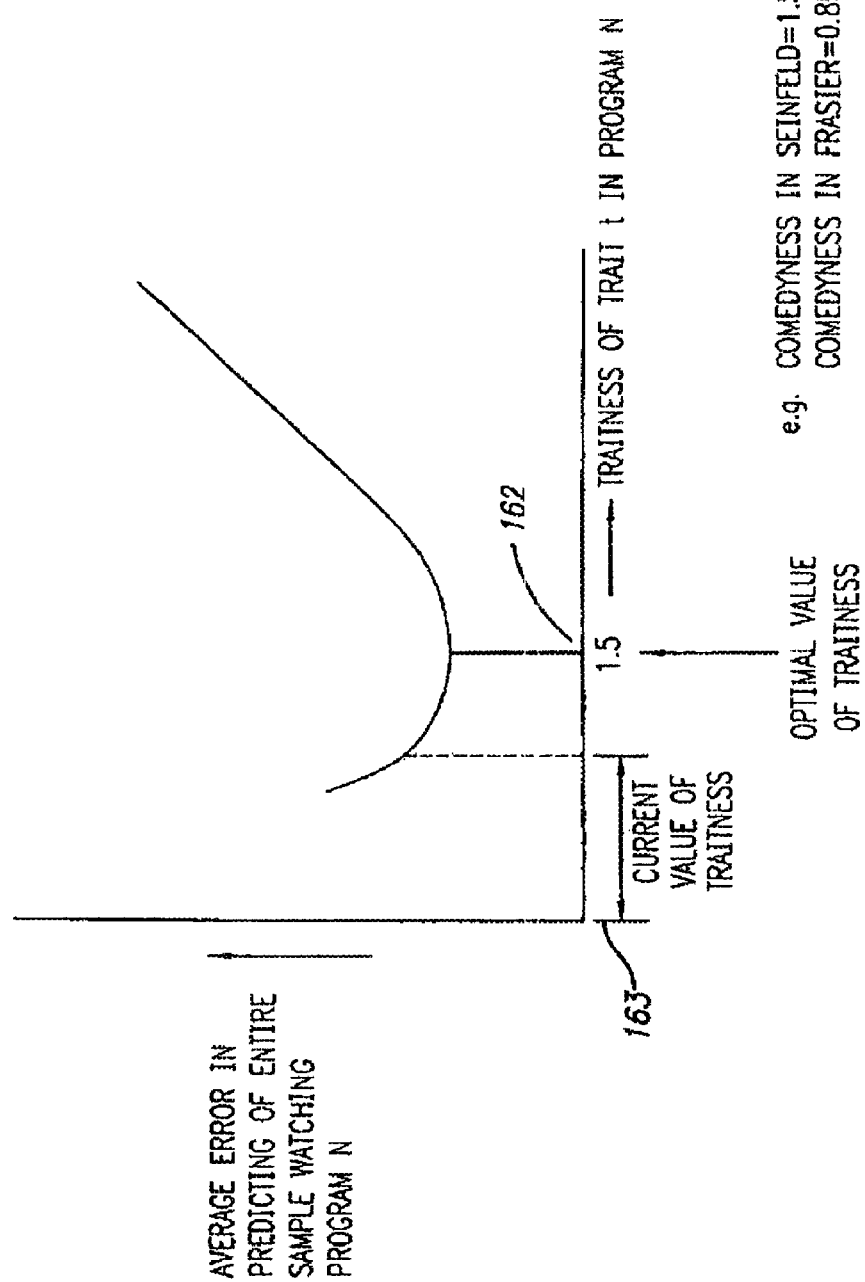

One method to determine the traitness of a trait T in a given program N is illustrated in FIGS. 9(a)-(c). The highlighted program represents the programs actually watched 156 by a user. All available programs are arranged in decreasing order of rank 154 as computed by the Liking Function. In the case of User 1 155 the Program N 156 which was watched by him appears third in rank whereas the Liking Function should have actually ranked Program N at the top. In this case the margin of error 157 in the traitness of trait T is 3. In the case of User 4 the program N watched by the user was ranked the highest. The margin of error in the traitness of trait T is 0. In the case of user 2 where he did not watch Program N, it was ranked the highest. The margin of error in this case can be considered to be a constant K. A suggested value of K may be the number of programs available to the user at that time. Similarly for user 3, the margin of error may be considered K−1. Such margins of error are computed for all users who watched the Program N and the average margin of error is computed.

Using regression analysis, the traitness value of the trait T is adjusted incrementally to reduce the average value of the margin of error. The value of traitness which yields the lowest value of the average of the margin of errors is considered the best value of the traitness of the trait T exhibited by the program N.

Traitness values may also be assigned by rules of thumb or some other appropriate manner.

Figure 10:
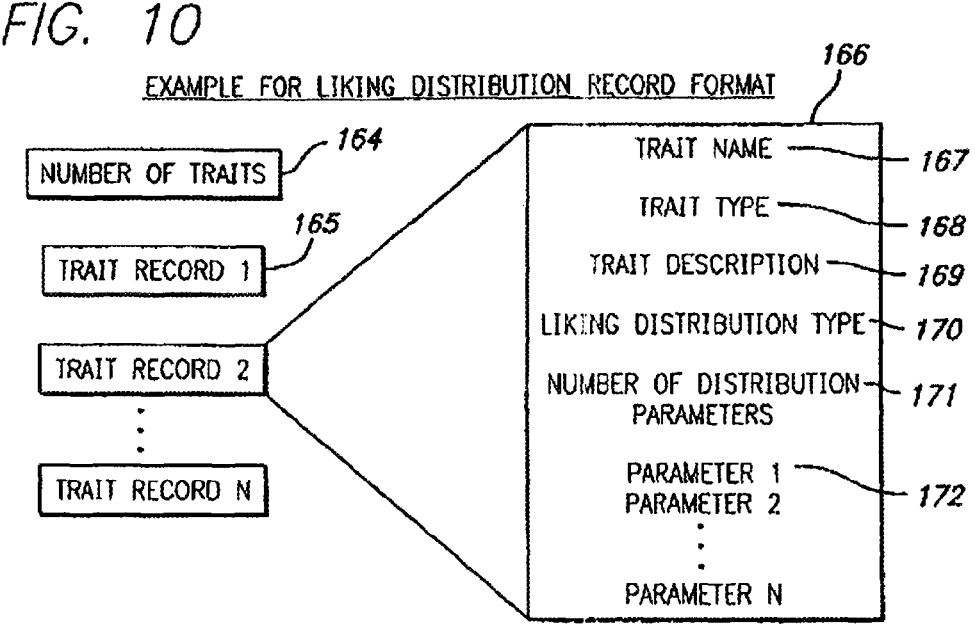
FIG. 10 is a block diagram showing an example of a liking distribution record format.

One of the outputs of analyzing the viewing habits of a representative sample is a distribution list of the likings amongst the viewing population of each trait. This information is presented schematically in the FIG. 10 and is made available to every individual user Set Top Box along with the broadcast TV programs and program information. "Number of traits", 164, represents the total number of traits that have been identified after analyzing the viewing habits of the representative sample. The distribution of liking of each trait is provided in a "Trait Record", 165. Information included in a trait record include the name of the trait, 167, the type of the trait, 168, (whether hidden, associate, etc), the liking distribution of the trait 170, and the distribution parameters, 172, of the trait. Examples of various possible values in a trait record are provided in FIG. 11.

Figure 12:
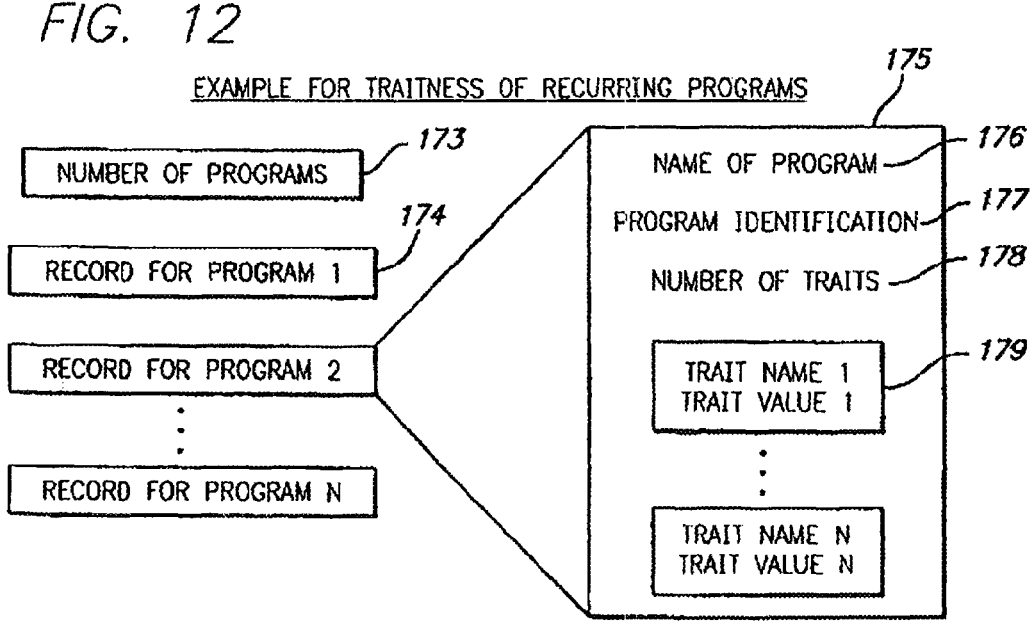
FIG. 12 is a block diagram showing an example of a traitness record format.
Figures 13, 14:
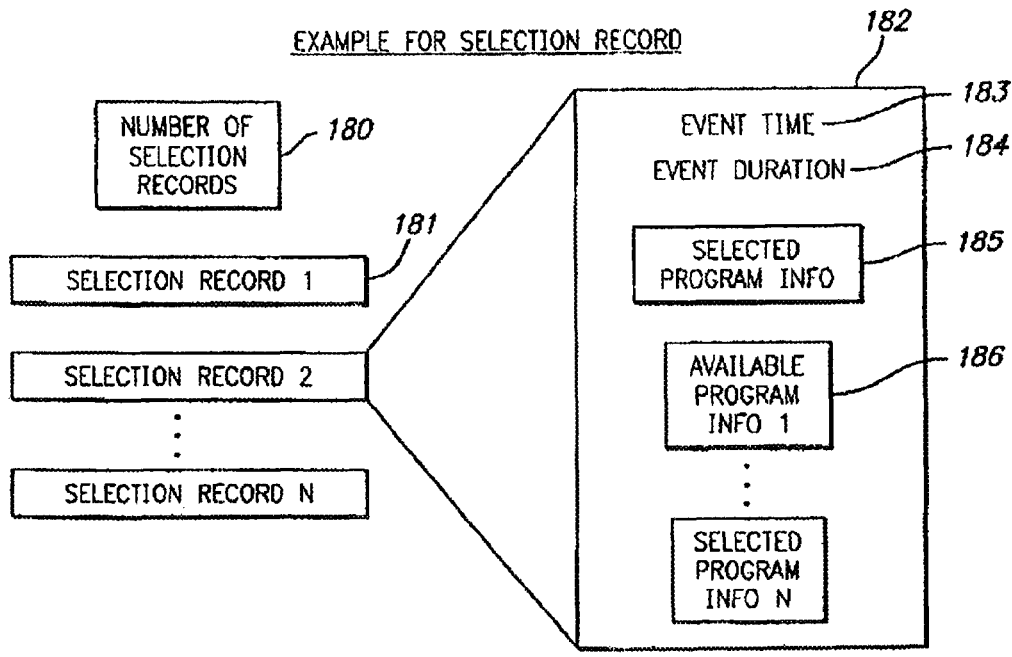
FIG. 13 shows an example for broadcasting traitness as part of EPG data.
FIG. 14 shows an example of an user selection record format.

FIG. 12 illustrates one schematic representation of traits present in recurring programs. This information is passed along with the above liking distribution of traits. The "Number of programs" 173 represents the number of programs for which trait information is sent. Relevant traits and the degree to which they are exhibited are included in the "Program Record" 174. The "Program Identification" 177 information is used to identify the TV program to which this record pertains. An example of a Program record for a Seinfeld Episode is given in FIG. 13. As given in the example certain traits such as "Program Name—Seinfeld", "Channel—NBC", "Program Type—Sitcom" can be derived directly from the EPG and are called static traits. Additional traits such as "comedy" which store the degree of comediness associated with a Seinfeld Program may also be passed as a part of the EPG data.

Referring again to FIG. 2, the program content and the program information (in the form of an EPG) are transmitted from a Broadcast Head End along with preference determination parameters, 119. Examples of preference determination parameters include but are not limited to (i) the traits which are exhibited by each program and the degree to which such a trait is exhibited and (ii) a distribution list of the liking values amongst the viewing population of each trait.

This information is received in each household by a program selection device 100, that include a preference Determination Module, a personal preference database, 116, a storage device and a display device 108. The personal preference database 116, is used to store the results of the analysis of the individual user's viewing habits. The storage device stores programs as per the user's specific requests or programs recommended by the preference determination module.

Figure 15:
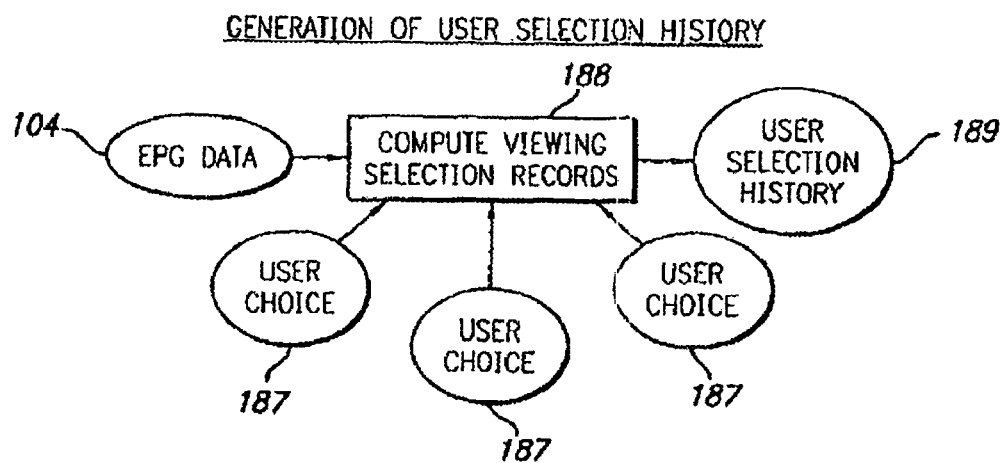
FIG. 15 is a block diagram showing inputs and output for the generation of user selection history.

Program Selection Device 100 monitors each user's viewing actions and selection of TV programs being watched. This is stored in a storage device or in memory in the form of selection history data 189 (see FIG. 15). The schematic representation of selection history data is given in FIG. 14. The "Number of selection records", 180 represents the number of user selection choices stored in the selection history data. Each selection record 181, contains the information on the actual programs watched 185 along with information on the competing programs available at that time 186. Storing program information is required as the EPG may not be able to provide information on past programs. Information on these program may be obtained directly from the EPG data when the information is obtained while the program is still current. The time 183 and duration 182 for which a program was watched also form a part of the selection record. As illustrated in FIG. 15, a uses selection history 189 is derived from each choice 187 made by the user along with program information from the EPG 104.

Figure 16:
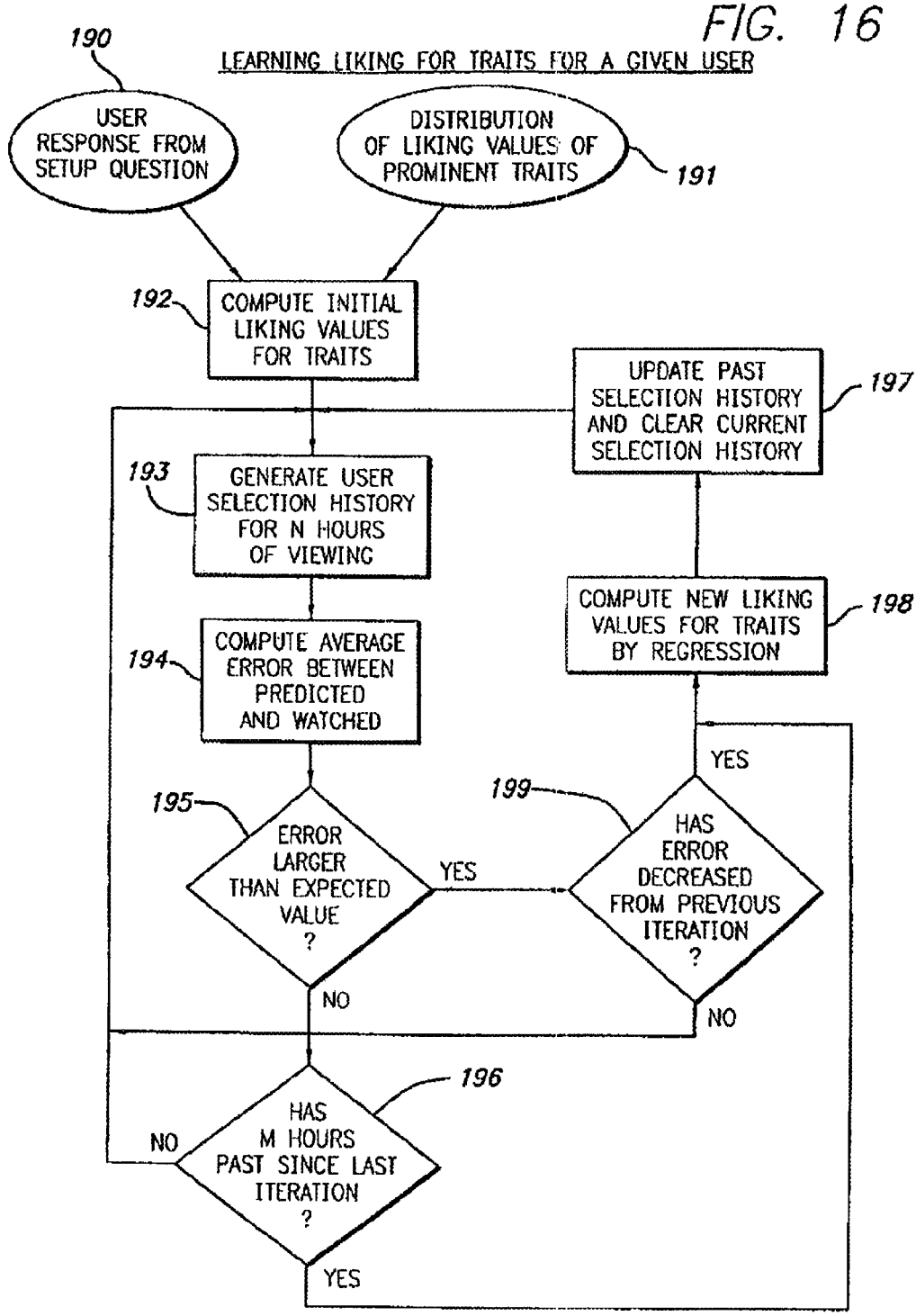
FIG. 16 is a flowchart illustrating a process of learning liking values performed on a program selection device.

One process of learning the user preferences of a specific individual is illustrated in FIG. 16. The liking distribution in the representative sample for traits identified by data analysis, 118, are used by the Liking Function to minimize the effect of error introduced because of lack of sufficient sampling in the computation of the liking of the identified traits by an individual. An individual user's response to setup question 190 may also be factored in determining initial values of liking for that individual 192.

A user selection history 189 is maintained for a fixed number of hours. The number of hours for which the user selection history is maintained can be preferably changed to have an increased rate of learning during initial days of a new user using the device. Average Error is computed N 194, in a similar manner as for users; in the representative sample, as previously described in FIG. 6. If the average error is greater than a tolerable limit 195, new liking values are computed 198. Entries in the user selection history are moved to the Past selection history. If the Average error remains under a tolerable limit the liking values are computed only after a predefined number of hours 196.

Another embodiment of the selection record stores a program ID instead of the entire program information. In this embodiment, the actual program information is broadcast at predetermined times from the Head End where each program is identified by the same program ID stored in the selection record. In this embodiment, the computing 198 of liking values for traits are performed only at this predetermined time.

Figure 17A:
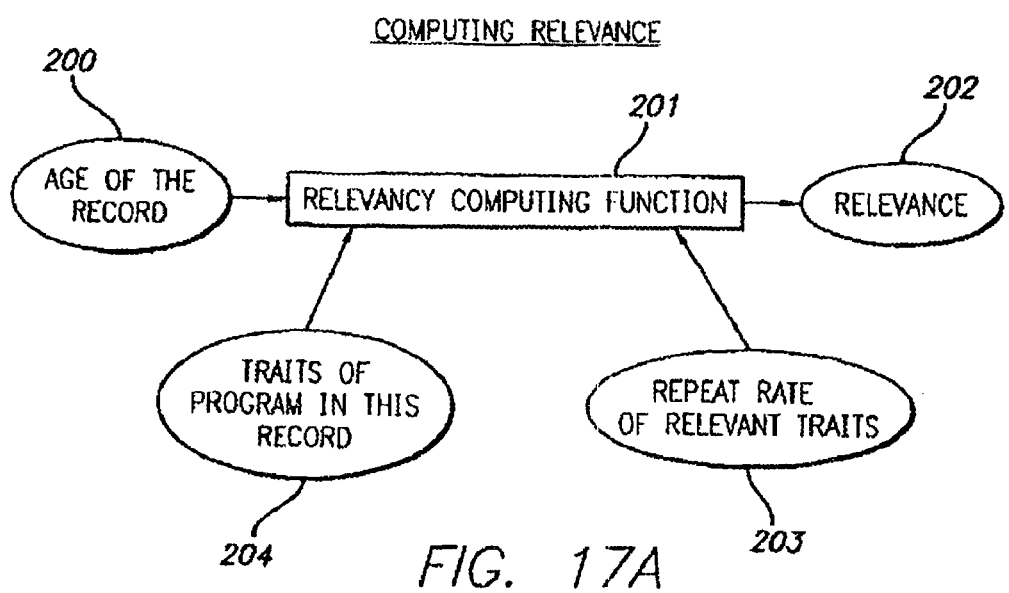
FIG. 17(a) is a block diagram showing inputs and output for computation of a relevancy value for a selection history record.

Referring now to FIG. 17(a), after each computation of liking values, entries in the user selection history is moved to the Past selection history. Selection history is partitioned as user selection history 189 and Past selection history 216 to optimally store the section history records. Selection history contains information about all selections made by the user between two computations of Liking values. Past selection history maintains the most relevant information about the most relevant selections made by the user in past. The number of records in the Past selection history can be advantageously conFIG.d to suite the memory available for storage of such records. Relevancy in this context is the importance of the record in computing the liking values and is dependent on many parameter including but not limited to the age of the record 200, the repetition rate 203 of traits contained in programs 204 in the selection record. The relationship between relevancy and age 205 of the record is shown in FIG. 17(b). The most relevant records are the most recent records. The relationship between relevancy and the repetition rate of traits contained in programs in the section record is shown in FIG. 17(c). As the repetition rate decreases, the relevancy increase 206, till certain limit after which the relevancy decreases 207. A good example to illustrate the reasoning behind this relationship would be relevancy of keeping records on user selection when Seinfeld a weekly program is available and the relevancy of keeping records on user selection when Olympics a 4 yearly program is available. While it is important to keep records about Seinfeld to compute likings of various traits contained in Seinfeld, it is pointless to keep records about viewer's liking for the last Olympics. Consider a user who does not have a liking for movies except on Fridays. To accurately determine the user likings of trait of "Friday nightness" of a movie, the selection records pertaining to its viewing actions on a Friday have to be maintained for at least a number of weeks. However if the repetitive nature is too far apart in time, the relevancy decreases sharply. The "Relevancy versus Repetitive Rate of a Trait" graph in FIG. 17(b) measures increasing values of relevancy for higher values on the y-axis. The x-axis measure decreasing rates of repetitiveness of a trait in a program. As shown in FIG. 17(a), beyond a certain threshold of repetitive rate, the relevance decreases sharply.

Figure 18B:
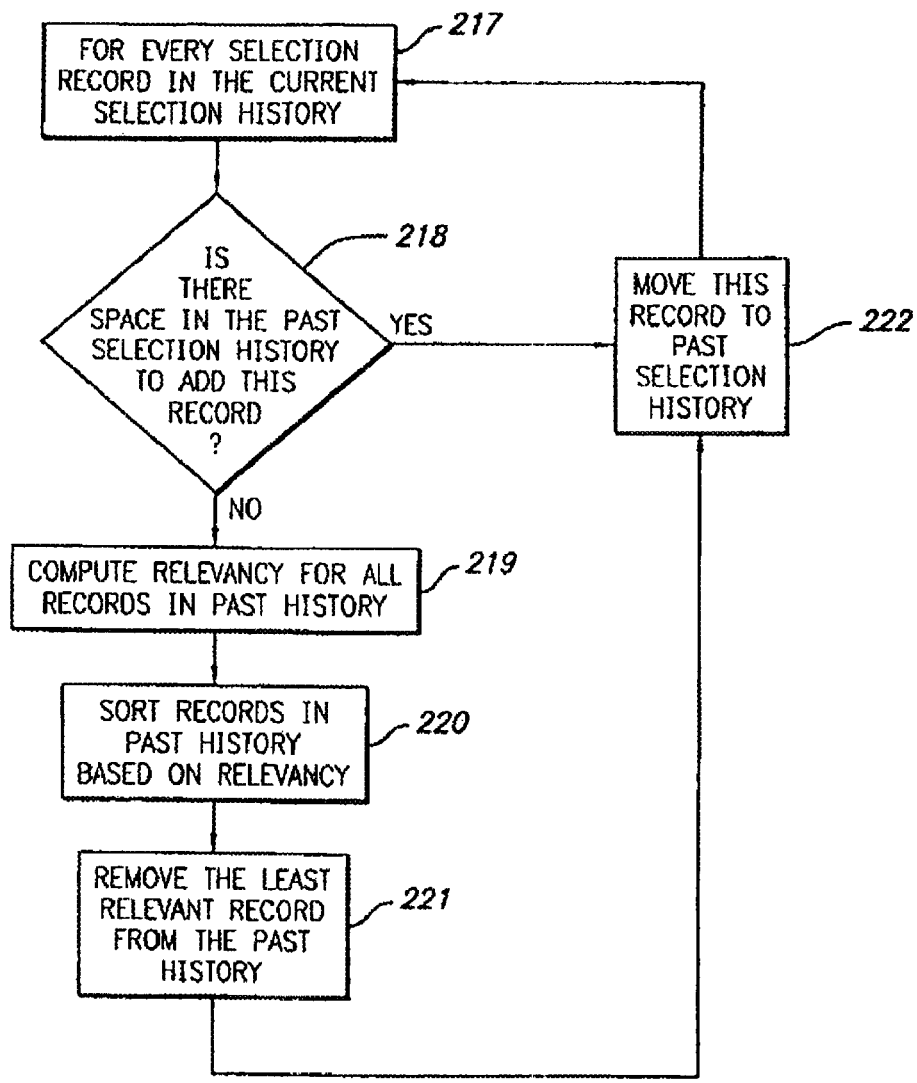
FIG. 18(b) is a flowchart illustrating a process of updating past selection history.

The process of updating of past history is shown in FIGS. 18(a) and 18(b). The processing is done for every record in the user selection history. If there is enough memory to store the new record in the past selection history 218, the record is removed from the user selection history and added to the past selection history 222. If there is not enough space in the past selection history 218, the records in the past selection history are sorted based on relevancy 220, and: he least relevant record is deleted 221 to make space to add the new entry 222.

In another embodiment of the present invention, the number of available programs 186 stored in the past selection history can be limited to an optimal number to make best use of the memory available (see FIG. 18). In this embodiment only the programs with higher values of liking, representing the traits which have significant liking values, are stored in past selection history record.

Figure 19:
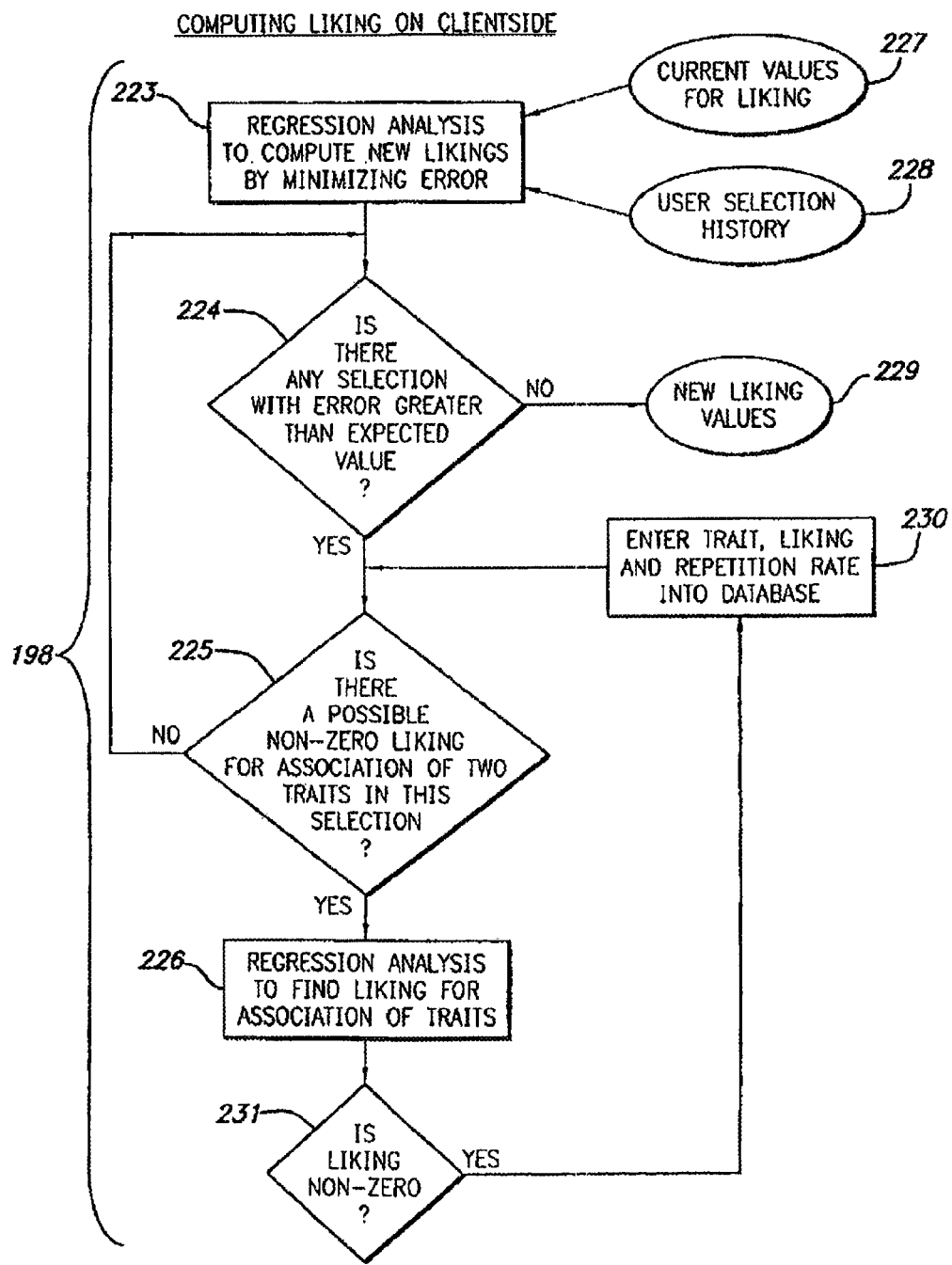
FIG. 19 is a flowchart illustrating a process of computing liking values performed on a program selection device.

Computing of Liking values for different traits performed by the Program selection device 100 is shown in FIG. 19. This process is performed 198 during the learning process as explained by FIG. 16. Regression analysis is performed to minimize error in prediction of viewer behavior stored in user selection history and past selection history by using current liking values as the starting point. The regression analysis process 223 is the same as the one performed in representative sample 131. If there are any selection record for which the error is more than a predefined threshold 224, the selection record is examined for the presence of possible associated traits 225. The rules which defines the presence of possible associated traits may be rules of thumb. Possible association of traits can also be discovered by looking up the list of associated traits which were discovered from the representative sample. Liking for possible associated traits are computed by regression analysis 226. If the computed liking is a significant value 231, the liking for trait is entered 230 into the preference database 116. Other parameters like the repetition rate for the trait also is entered into the database 230. The repetition rate is computed by looking at the repetition rate of the trait in user history and past history. If there are no previous selection record with this trait, then the repetition rate is assumed as a predefined value. As new selection records are created, the repetition rate is updated. At the end of the process (illustrated in FIG. 19) of computing the liking values, a weighted average of the current liking values and the old liking values is computed. This forms the new set of liking values. Learning rate can be increased or decreased by changing the weight of the current liking values.

Figure 20:
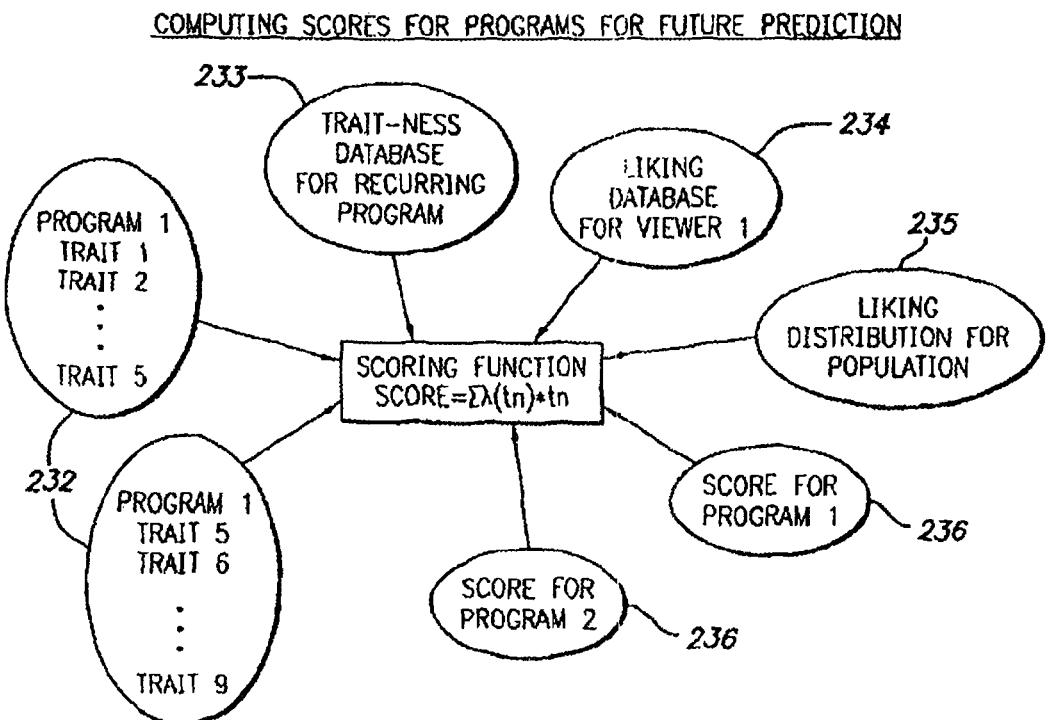
FIG. 20 is a block diagram showing inputs and output for a process for computing liking for programs.

A flow chart of computing scores for programs for future prediction is illustrated in FIG. 20. As described earlier Liking 236 for a program 232 is computed by evaluating the function $1(p)=\Sigma\Sigma$ (tn)*tn. $\lambda$(tn) is computed as a weighted average of liking for the trait tn for the user 234 and the liking for the trait tn for the general population 235.

In another embodiment of the present invention which is suited to function on program selection devices operating on households with multiple users, the viewer is asked to input the number of viewers in a household during the initial setup process. Each viewer can answer a set of setup questions which would capture their liking for representative traits. An initial set of possible liking values are created for each viewer. Learning process updates each viewer's preference database separately after identifying each viewer session correctly. Viewer identification is done either by explicit input from the viewer identifying the viewer or automatically by identifying the viewer by monitoring the television viewing behavior of the viewer. To identify a viewer automatically, the error value between predicted and actual is computed for all viewers. The viewer with liking value which yields the least error value is chosen as the possible viewer. The certainty of this decision is expressed as a probability which is computed as a function of the differences between error values for different viewers in this household.

The objective of the present invention is to determine demographic characteristics of a user by analyzing the users viewing habits in juxtaposition with viewing habits of a representative sample of users whose demographic characteristics are known. These demographic characteristics of a user collectively constitute a demographic profile. Upon successful creation of an accurate demographic profile for a user, the present invention can receive a collection of possible ads and show individual users only those which are targeted to a matching profile.

Some example of demographic characteristics include, but are not limited to, a users gender, race, age and income. The output of the analysis of viewing habits of the representative sample provides a basis for determining demographic characteristics of the individual user.

Figure 21A:
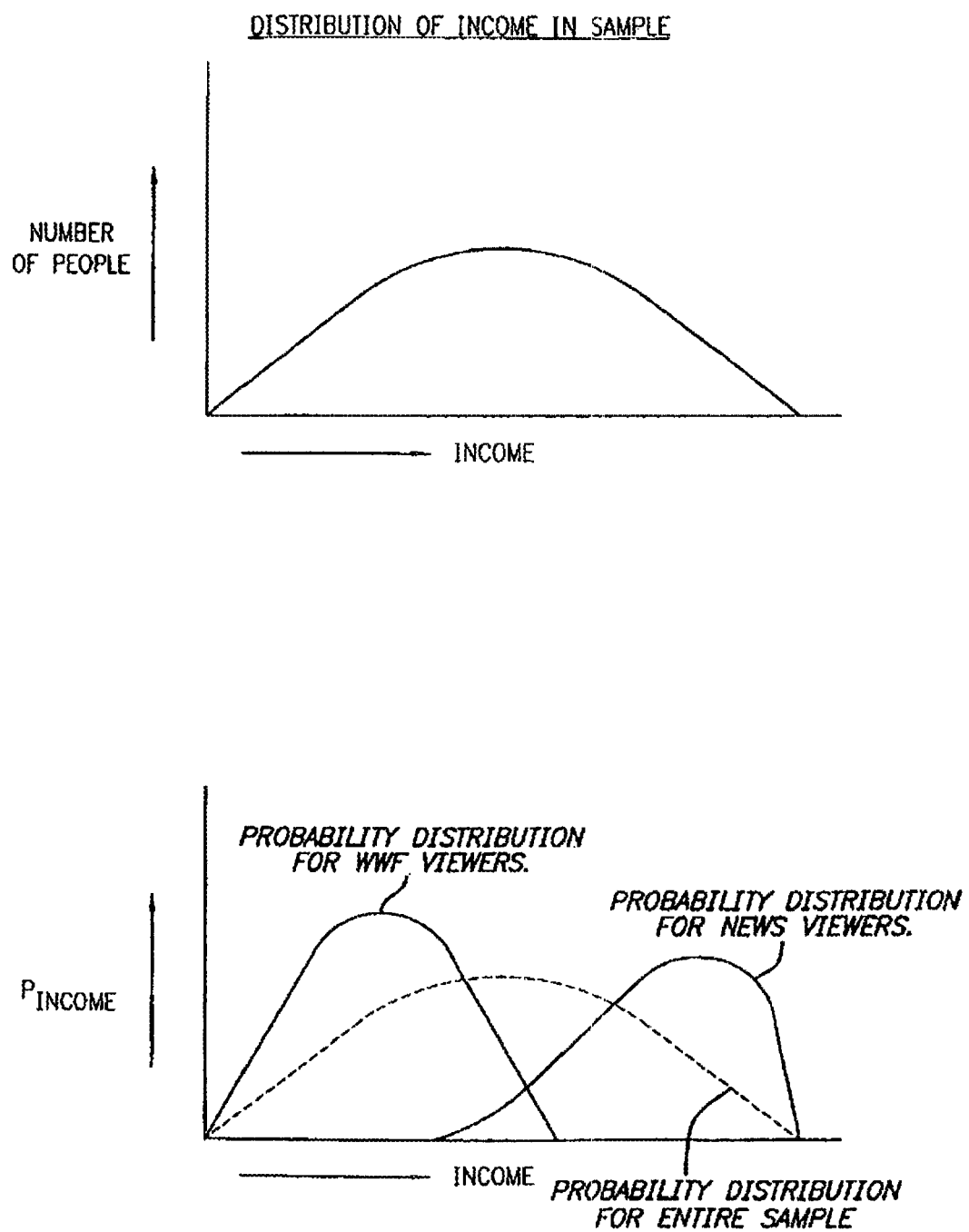
FIG. 21a illustrates a distribution of income for different programs.

The TV programs chosen in the analysis of viewing habits, of the representative sample, plays an important role in determination of a demographic characteristic. Different TV programs might be required to determine demographic characteristics. Typically TV programs where a majority of its viewing audience share a common demographic characteristic, in a proportion which is different from what is observed in the general population, are best suited in the discovery demographic characteristics. For example to determine the "income" demographic characteristic consider graph (i) in FIG. 21a. The x-axis represents the annual salary in increasing order of x. For any point in the x-axis, the y-axis represents the probability of finding an annual salary of x in the representative sample (which is the same in the general population). Now consider graph (ii), where the dotted curve plots the same income distribution represented in the graph (i), the first solid curve (the leftmost curve) shows the income probability distribution of the viewing audience for program P1 in the representative sample and the second solid curve represents the income probability distribution of the viewing audience for program P2 in the representative sample. Analysis of the viewing habits of an individual user for the above programs P1 & P2 could be used to determine his most probable annual income. Using Bayesian inference this probability may be expressed by the following mathematical formula $$P(Ixy|Wp1)=P(Wp1|Ixy)P(Ixy)/P(Wp1)$$

where
- Ixy represents an annual income range of x-y
- Wp1 represents watching program p1
- P(Ixy|Wp1) represents probability of income of Ixy given the fact that program p1 was watched
- P(Wp1|Ixy) represents probability of watching program p1 given the fact that the annual income is Ixy
- P(Ixy) represents probability of income of Ixy in the representative sample
- P(Wp1) represents probability of watching program p1 in the representative sample Thus for a user who watches program p1, the probability of his income being within a certain range can be determined.

Figure 21B:
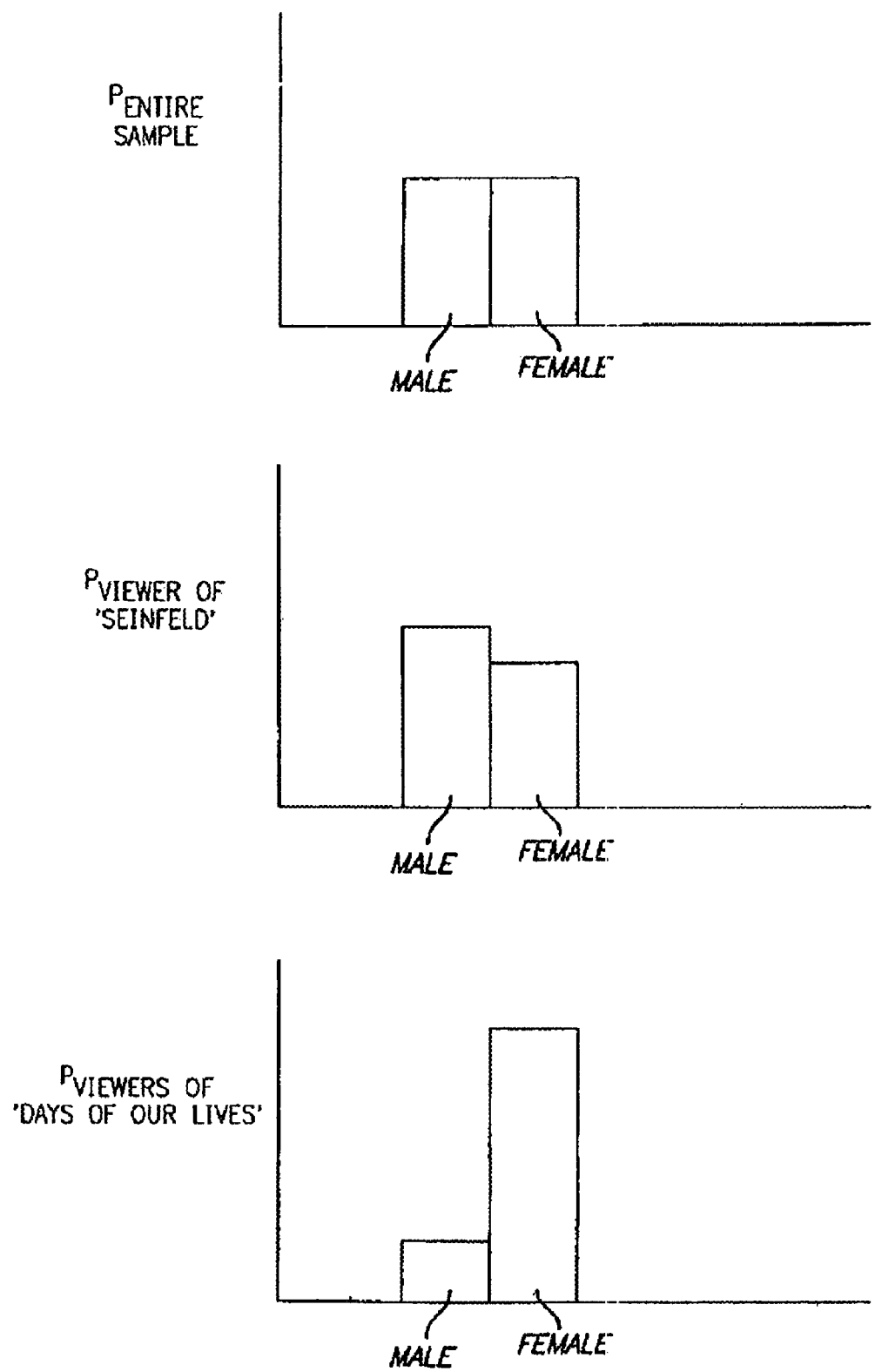
FIG. 21b illustrates a distribution of gender for different programs.

Programs whose viewing audience display a demographic characteristic in the same proportion as is observed in the representative sample (which is the same in the general population) do not contribute significantly in determining demographic characteristics. Consider the graphs in FIG. 21b. Graph (i) shows a bar graph which represents the probability of a person in the representative sample being male or female. The graph (ii) shows the probability of person being male or female within the viewing audience of program P3 which is very similar to what is observed in the general population. If Bayesian inference is used to determine the gender of a person who has watched program P3, the probability of the person being a male or a female would be the very close to the probability of person being a male or a female in the general population (which is already a known value). Nothing significant is gained by analyzing the viewing habits of the individual for the program P3. On the basis of the graph (iii) on the other hand, analyzing viewing habits for program P4 would yield additional certainty in determining the gender of a person than what is already known about the gender distribution in the general population.

The determination of which programs yield high probability values in determining a demographic characteristic of a user may be done by applying rules of thumb through an algorithm which chooses the program on the basis of how much a demographic trait in it viewing audience differs from what is observed in the general population by some other means.

Depending on the program content and the demographic characteristics of its viewing audience, the same television program maybe used to determine one or more traits. It is also possible that a completely different set of programs are required to study different demographic characteristics.

While it is possible from Bayesian inference to ascribe a certain preference for a specific show based on a users demographic characteristics, it may not be the only factor which explains the users choice of a particular show. For example, consider the graph (ii) in FIG. 21a. It might be possible for a user, U1, having income less than ×1 having a strong preference for program P2 for unknown reasons. So just using Bayesian inference to arrive at U1's most probable annual income based on his viewing habits of only a single program P2 would not yield the most meaningful result. To strengthen the belief of a Bayesian inference, the users viewing habits have to be analyzed for a set of programs where the viewing audience of each program from that set displays a similar demographic characteristics. The programs of the set are so chosen that degree of co-relation of traits exhibited by the programs in the set are minimal. Each program that the user views from this set of programs adds towards strengthening the belief of the Bayesian probability of the user possessing that demographic characteristic.

To explain the need for minimal co-relation consider the previous example. If another program P3 which is very similar to P2 in content and has the same demographic traits in its viewing audience as P2 is available to user U1, he would have a similar liking for P2 as P3. In this scenario strengthening the belief of the Bayesian probability by the user U1 watching program P3 is not a positive contribution. However if program P3 were very different in contents and the traits that it exhibits, the probability of U1 choosing P3 is greatly diminished and keeps the belief in the Bayesian probability from erroneously rising. In this situation the probability of a user who actually possessed the demographic characteristic of watching both programs P2 &: P3 would be quite high and the strengthening of the belief would be a positive contribution.

Thus a Belief Function for the Bayesian probability for a demographic characteristic dc1 may be computed in many ways which includes but is not limited to $$BF(dc1)=MAX(bp(w1),bp(w2)\ldots,bp(wm))*cr1+MAX(bp(wk),bp(wk+1)\ldots,bp(wk+m))*cr2+\ldots+MAX(bp(wn),bp(wn+1)\ldots,bp(wn+m))*cm$$

where
bp(wn) is the Bayesian probability of a user having that demographic characteristic given the fact that he watched program wn
(w1, w2, ... wm), (wk, wk+1, ..., wk+m), (wn, wn+1, ..., wn+m)
are sets of programs where any member of a set has a high degree of co-relation with another member of the same set, but a very low degree of co-relation with a member of another set.
MAX(bp(wn), bp(wn+1) ..., bp(wn+m)) represents the maximum
Bayesian probability value of all possible values within that set
cr1 represents a co-relation co-efficient of the set (w1, w2,... wm), c2 represents co-relation co-efficient of the set (wk, wk+1, ..., wk+m) and so on. Elements of the same set have the co-relation co-efficient.

Figure 23A:
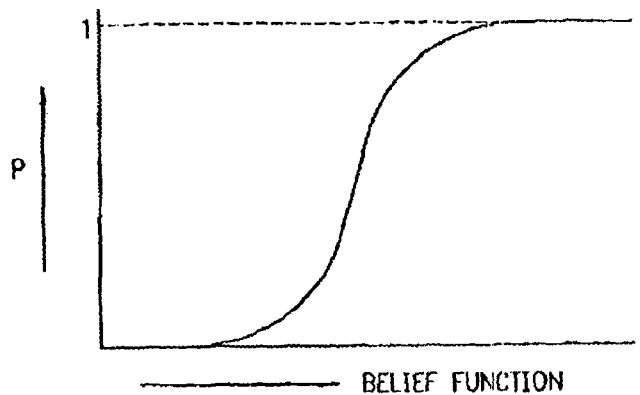
FIG. 23a is a graph illustrating a relationship between a Belief function and probability for a user belonging to a particular demographic trait value.

The Belief Function for any demographic characteristic is illustrated by the S curve in FIG. 23a. The x-axis represents increasing values of the Belief Function for a demographic characteristic for increasing values of x. The y-axis represents increasing values of the probability of a user displaying that demographic characteristic for increasing values of y. As shown in FIG., the probability does not increasing any further for higher value of the Belief Function.

Figure 23B:
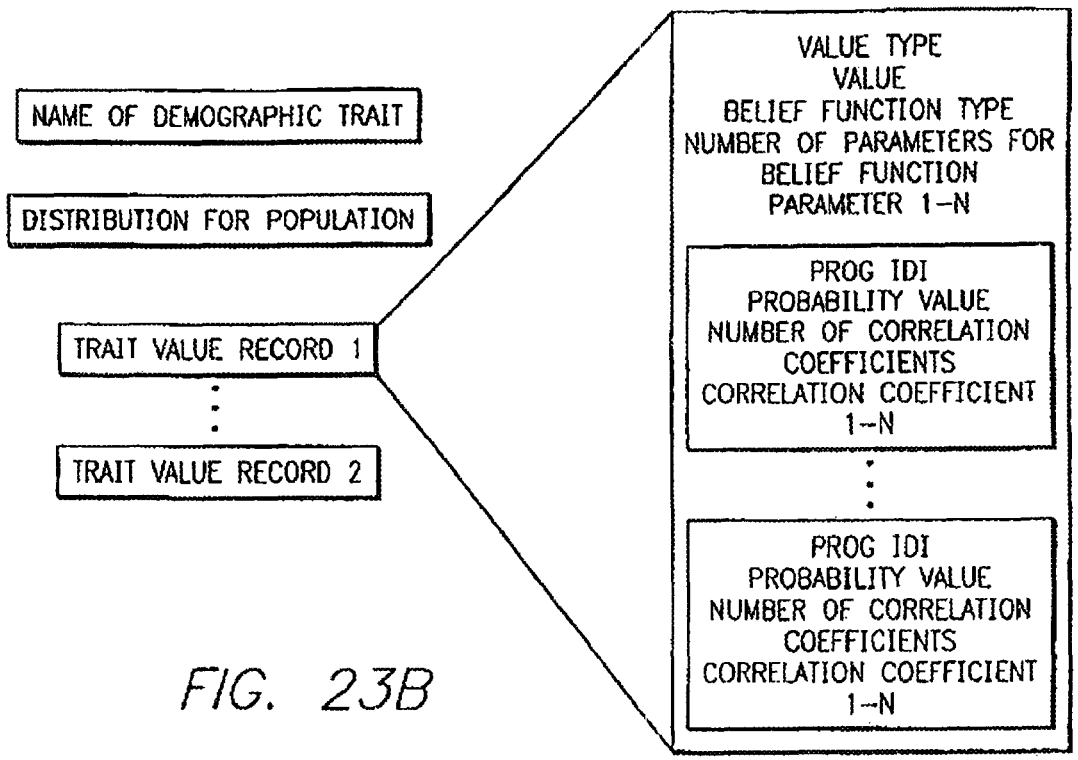
FIG. 23b is a flow chart of a demographic trait record format.

Some of the output of the analysis of viewing habits of the representative sample are schematically illustrated in FIG. 23b:

Display of advertisements by a program selection devices done when a users computed demographic profile matches the target profile of the advertisements. Some of the elements contained in an advertisement is the advertisement contents (maybe video clip, audio clip, Graphical or textual information) and the meta data which includes information on the demographic profile for which this advertisement is targeted.

Figure 23C:
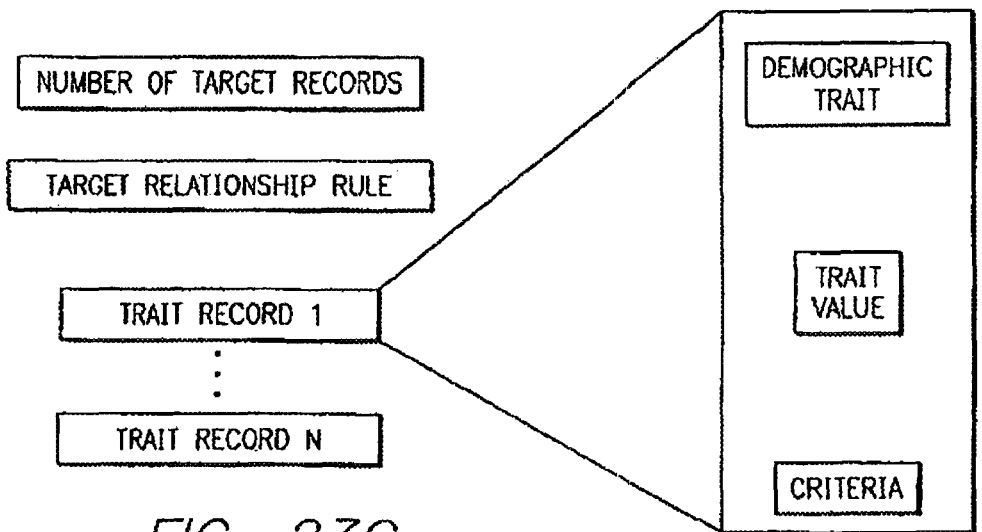
FIG. 23c is a flow chart of an advertisement targeting record format.

The meta Data contained in an advertisement is represented schematically in the FIG. 23c.

Here "Number of Target Records" refers to the number of "Target Records" included in this "Target Ad Meta Data". Each "Target Record" refers to a demographic characteristic that this advertisement is targeted to. The 'Target relationship rule" is used to determine the relationship rule. For example if the advertisement is targeted towards user who satisfies any one of the following criteria
income level is between Ix & Iy
ethnic background is eb1
The "Target relationship rule" would be used to specify the above relationship.

Figure 22:
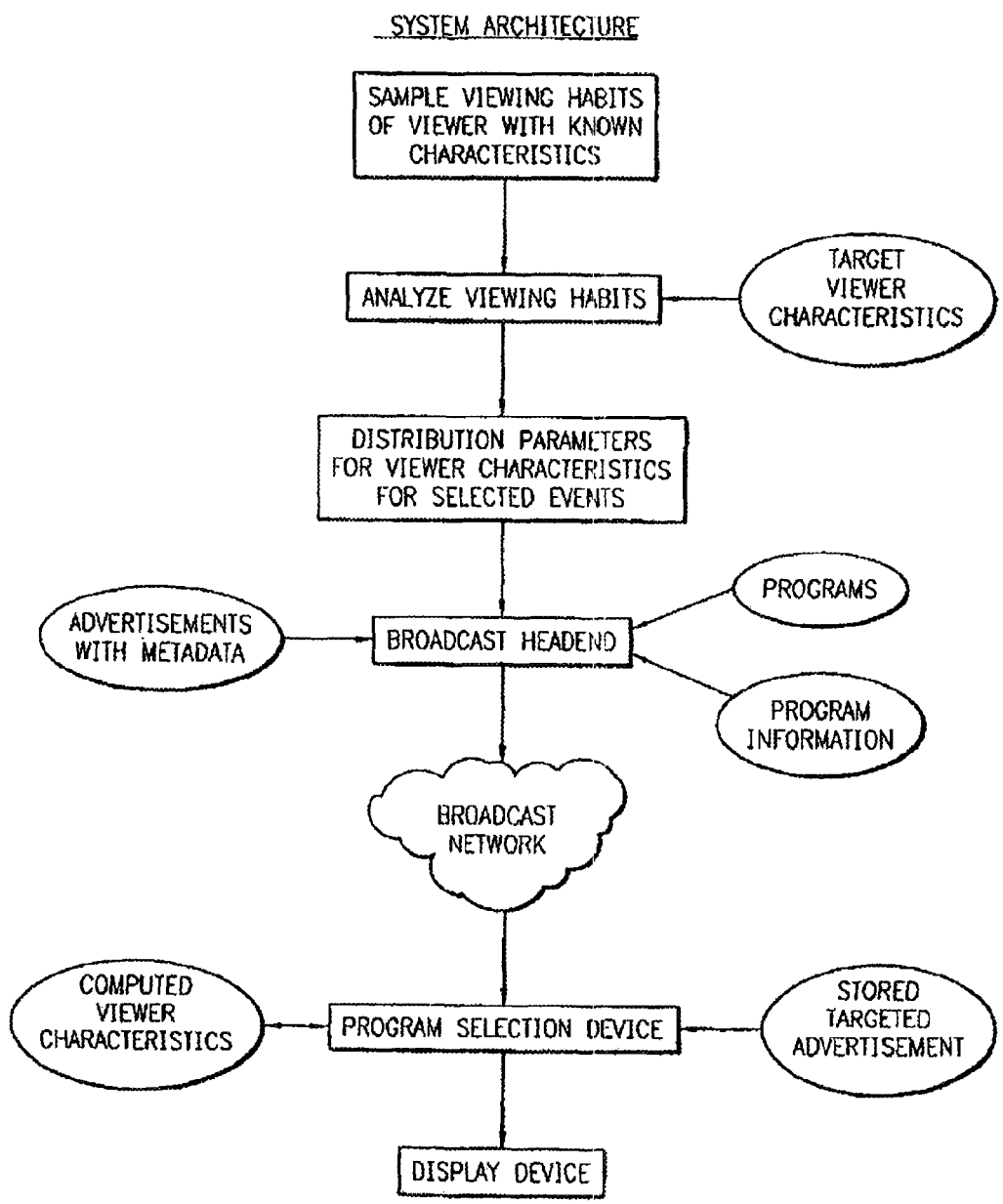
FIG. 22 is a system architecture for providing targeted advertising.

The "Demographic Trait Data" determined by analysis of viewing habits of a representative sample with known demographic characteristics and the "Target Ad Meta Data" are broadcast to a Program Selection Device from a Broadcast Head-end along with program content and EPG data. This is illustrated in FIG. 22. This is received by each user at each Program Selection Device to determine the user demographic profile. Broadcast of the "Demographic Trait Data" and "Target Ad Meta Data" along with the advertisement content may be done on a periodic basis, or may be made always available on the broadcast networks or through some other communication mechanisms on an as-needed basis.

At the Program Selection Device the "Demographic Trait Data" and "Target Ad Meta Data" are collected and stored in a storage device such as, but not limited to, a hard disk, flash ROM or main memory. Collection of this data may be done at fixed time periods or whenever suitable depending on the embodiment chosen. For each trait record in the "Demographic Trait Data", the Program Selection Device goes through past Selection History. Each program on the "Trait Value Record" that is available in the past Selection History is used in the computation of the Belief Function. The Belief Function Distribution graph in the "Trait Value Record" is then used to determine the probability of the user having that demographic characteristic. If an earlier probability for this demographic characteristic is available a weighted average of the old probability and the newly determined probability is taken and stored.

Each targeted advertisement where the "Probability satisfaction criteria" of the "Target Record" is met by user's demographic profile is chosen for display at the appropriate time.

Referring again to FIG. 1, television control system 100 is preferably implemented by way of a general purpose digital computer and associated hardware that executes stored programs to implement the functions shown within block 100. The exact hardware and software platforms on which the television control system 100 is implemented is not important and may take a variety of forms. For example, television control system 100 may be implemented in a set-top box such as may typically used by individuals in the home to receive CATV signals. Another implementation of television control system 100 is in the form of a personal computer conFIG.d with the requisite hardware and software to receive and display television signals. An example of a set-top box that maybe programmed in accordance with the principles described herein is described in the following documents by IBM Microelectronics: "Set-Top Box Solutions", Product #

G522-0300-00 (Nov. 19, 1997); "Set-Top Box Reference Design Kit", GK10-3098-00 (Apr. 15, 1998); "Set-Top Box Peripheral Chip", GK10-3098-00, (Apr. 15, 1998); "Set-Top Box Solutions: Helping Customers Meet the Challenges of Convergence", G522-0300-00 (Nov. 19, 1997); and "The challenges of convergence for Set-Top Box manufacturers", G599-0302-00 (Nov. 19, 1997). An example of an Application Programming Interface (API) available for set-top boxes which can serve as a platform for the embodiments described herein is described in "API Requirements for the Advanced Set-Top Box" published by OpenCable (Oct. 21, 1997). An example of an operating system incorporating functionality to support the embodiments described herein is available from OpenTV, Inc. and is described in the following Technical White Paper publications by OpenTV, Inc.: "OpenTV™ Operating Environment" and "Application Development for OpenTV™." An advantage of such an operating system is the support provided in the form of function calls to obtain attribute information 107 from the signals 104. Alternatively, a general purpose operating system such as the Windows NT operating system from Microsoft Corporation may be used in conjunction with additional software that provides the functions required to extract the necessary information from attribute information 107 and to perform other manipulation of the received signals 104 and the stored information 105.

Storage devices 106 may include a variety of different types of storage devices. For example preference database 116 may be stored in a non-volatile, random-access semiconductor memory. Television programs 105 and attribute information 107 may be stored on storage devices having greater capacity such as a conventional magnetic, hard disk drive. In general, storage devices 106 are understood to encompass a variety of storage devices. The exact form of the storage devices 106 is not critical so long as the storage devices have the capacity and speed to store the necessary information. Storage devices 106 may also comprise a conventional video cassette recorder (VCR) which operates under control of system 100 to store television programs 105 and attribute information 107 on conventional magnetic tape.

For the purposes of the present description, the television control system 100 is presumed to be integrated into, or coupled to, a system including a tuner and other functions necessary to receive television signals and to extract the attribute information 107 from the television signal and to perform other functions typically associated with the receipt and viewing of television signals. In certain embodiments, television control system 100 may operate in conjunction with a database agent that facilitates interaction with preference database 116 by causing storage and retrieval of information to or from the database in an optimal manner. The preference database 116 may be implemented by a commercially available database product such as the Oracle Light database product available from Oracle Corporation which also incorporates the functionality to implement the data base agent described above.

Figure 24:
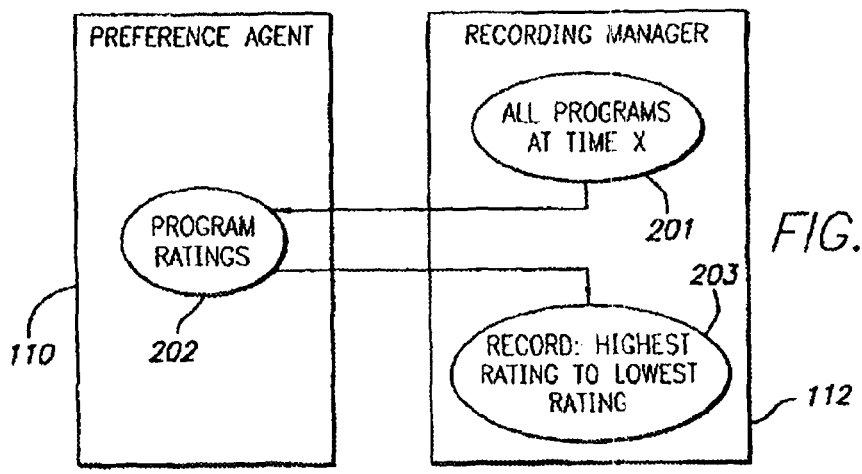
FIG. 24 is block diagram illustrating operation of functions performed by the system of FIG. 1.

Recording manager 112 causes recording of programs 105 by periodically initiating a sequence of steps shown in FIG. 24. At 201, recording manager 112 sends a request to preference agent 110 for ratings of all programs at a particular time (X), or alternatively, for ratings of all programs within a particular time period (X). By way of example, the steps shown in FIG. 2 may be performed every six hours. In certain embodiments, the frequency with which the steps in FIG. 24 are performed may be changeable by the user. Preference agent 110 responds at step 202 by providing ratings, from preference database 116, for each program received from recording manager 112. Recording manager 112 then causes recordation of the programs at time X, or within time period X in accordance with the ratings received from preference agent 110. Specifically, programs having the highest rating are given highest preference for recordation and programs having the lowest rating are given lowest preference to recordation. The recordation is subject to storage capacity constraints. For example, if the highest rated program is one-hour long, and only thirty minutes of recording space is available on storage devices 106, then the one-hour program is skipped and the highest rated thirty-minute program is recorded.

Highest priority for recording of programs is given to programs specifically requested by the user. For example, if the user identifies a particular program for recording, such as by specifying the date, time and channel, or by specifying an identification code for the program, recordation of that program is given priority over programs rated by the preference agent. Next highest priority is given to programs matching particular category-value pairs specified by the user. For example, if the user does not identify a particular program, but specifies that one-hour long documentaries pertaining to travel should be recorded, then recordation of programs matching such category-value pairs is given priority over programs rated by the preference agent 110. In alternative embodiments, relative priority between user-specified programs, user-specified category-value pairs and programs rated by the preference agent 110 is changeable by the user.

Figure 25:
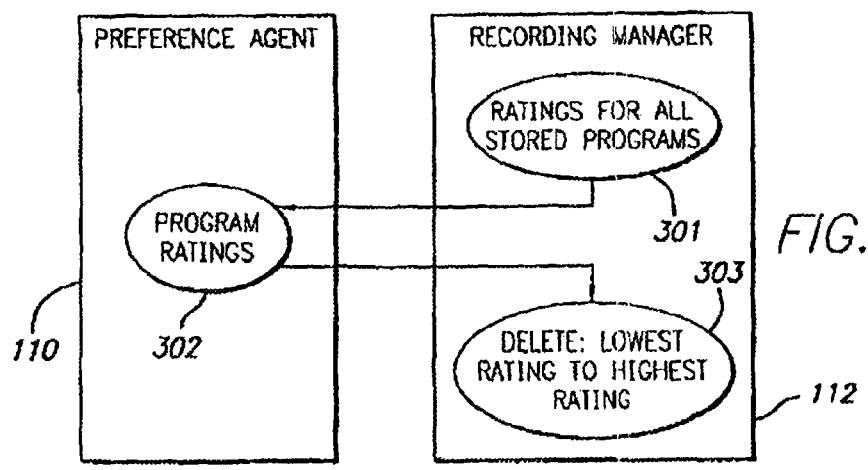
FIG. 25 is another block diagram illustrating operation of functions performed by the system of FIG. 1.

Recording manager 112 manages storage capacity on storage devices 106 by causing deletion of television programs 105 in accordance with ratings of such programs generated by preference agent 110. This is performed in a manner similar to that explained above for determining which programs to record. FIG. 25, which shows the steps taken by recording manager 112 to determine which programs to delete, is similar to FIG. 24. At step 301, recording manager 301 requests ratings from preference agent 110 of all programs stored on storage devices 106. At step 302, preference agent 110 responds by providing the requested deletion ratings. At step 303, recording manager 112 responds by causing deletion, when needed, of programs in accordance with the deletion ratings received from the preference agent 110. Specifically, when additional space on storage devices 106 is required to record one or more additional programs, recording manager 112 causes deletion, or overwriting of programs having the lowest rating first. Thus, stored television programs which are determined by preference agent 110 to be least preferable, in relation to other stored television programs, are deleted or replaced first, and those determined to be most preferable are deleted or replaced last. Deletion of programs occurs only when required. Advantageously, this results in storage device 106 typically being filled to maximum capacity, thus providing the user with as wide a variety of programs as possible. The user can specify programs that are to remain on the storage device 106. Such programs are not deleted by the recording system 100 in the steps shown in FIG. 25. In addition, the user can specify programs that are to be deleted, and therefore override the steps shown in FIG. 25.

In certain embodiments, the preference database is used by system 100 to alter the manner in which information about currently broadcast programs is presented to the user. For example, in such embodiments, the preference database is used to rearrange the order in which currently broadcast programs are presented to cause programs having attribute information 107 rated highest by preference database 116 to be presented first. Alternatively, the preference database 116 can be used to organize information regarding the currently broadcast programs according to the liking of various traits stored in the preference database.

Figure 26A:
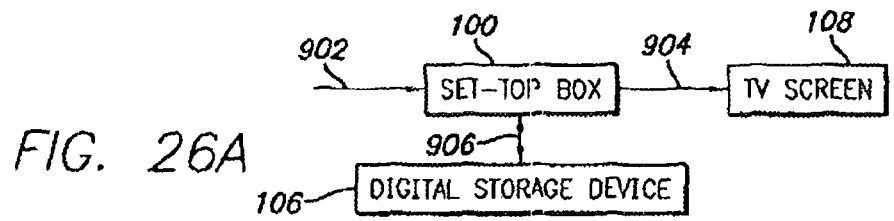
FIGS. 26(a)-(b) illustrate alternative hardware configurations in systems embodying the principles of the present invention.
Figure 26B:
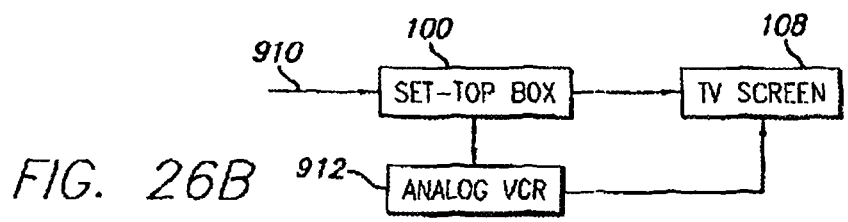

FIGS. 26a and 26b illustrate alternative hardware configurations for systems employing the principles of the present invention. FIG. 26a illustrates a hardware configuration that supports storage and retrieval of digitally encoded audio and video. Interface 902 is a standard digital cable or digital satellite input interface. Interface 906, which is the hardware interface to storage devices 106 preferably takes the form of an IDE or SCSI interface, or the proposed IEEE-1394 interface. Interface 906 is an NTSC or PAL encoded video interface. If the television signal 104 takes the form of an analog signal, as in the case of most current television broadcast signals, and CATV signals, then the signal 104 must be digitized and generally compressed (for example, by the MPEG-II standard) before storage on a digital storage medium such as shown in FIG. 26a.

FIG. 26b illustrates an embodiment using an analog storage device 106 such as a conventional VCR. If the television signal 104 is analog then the interface 910 takes the form of a conventional NTSC or PAL interface. If the television signal 104 is digital then the interface 910 takes a form as interface 902 shown in FIG. 26a and a digital-to-analog converter is required to convert the received signal to analog form before storage on storage device 106.

Figure 27:
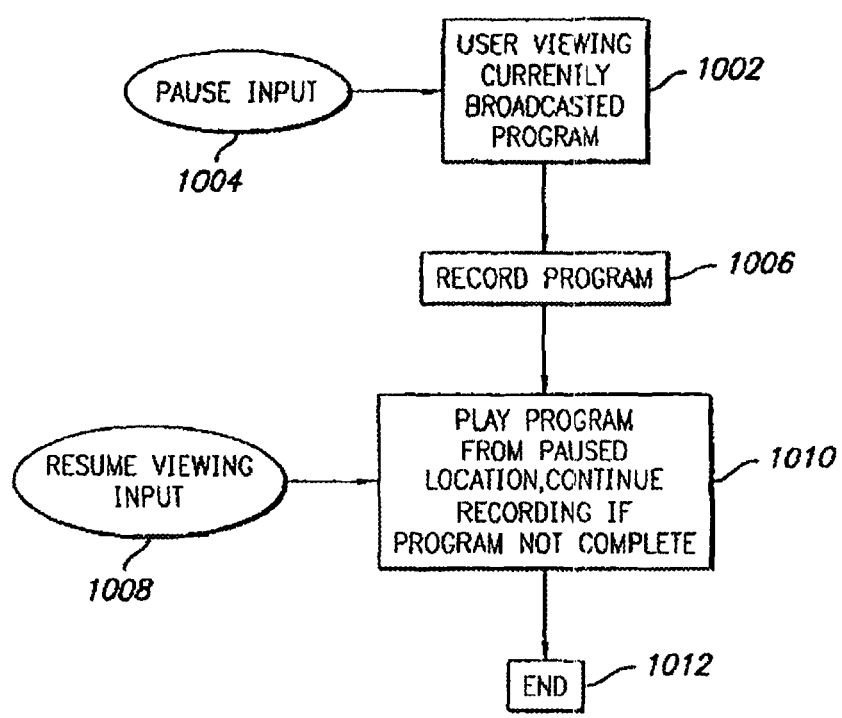
FIG. 27 is a flowchart illustrating additional aspects of operation of the system of FIG. 1.

FIG. 27 illustrates operation of an automatic pause-record feature of preferred embodiments. If a user is watching a currently broadcast program and wishes to stop or temporarily pause viewing of the program, the recording system 100 advantageously allows the program to be recorded so the user can resume viewing the program at a subsequent time. As shown in FIG. 27, at 1002, the user is viewing a currently broadcast program. Generation of a pause input at 1004 by the user, such as by pressing of an appropriate button on a remote control coupled to the recording system 100, causes the system 100 to cause at 1006, recordation of the program being viewed by the user. The user is then free to watch another program or stop watching the television 108 altogether. At a subsequent point in time, if a resume viewing input is received, such as by pressing of an appropriate button on the aforementioned remote control, then at 1010, the recording system 100 causes the program recorded at step 1006 to be retrieved and shown on the television 108 from the point the recordation was initiated at step 1006. If the program is still being broadcast when step 1010 is initiated, then recordation of the program continues by the system 100. The user thus can easily interrupt viewing of a currently broadcast program and resume subsequent viewing.

Preferably the recording system 100 supports a variety of functions such as fast-forward, rewind and visual scan of stored programs, and other functions supported by the storage medium 106. For example, if the storage medium 106 takes the form of a VCR then the program viewing and manipulation functions will be limited to the standard VCR functions of fast-forward, rewind, forward or reverse visual scan. If the storage device 106 takes the form of a digital storage medium then more advanced program search and retrieval functions can be supported.

It will be appreciated that the functions performed by the preference agent 110 and the recording manager 112 are illustrative of a particular embodiment. However, the division of tasks between the two modules 110 and 112 may be changed. In addition, the data formats 115, 116, 105 and 107 may also take a variety of forms.

Figure 28:
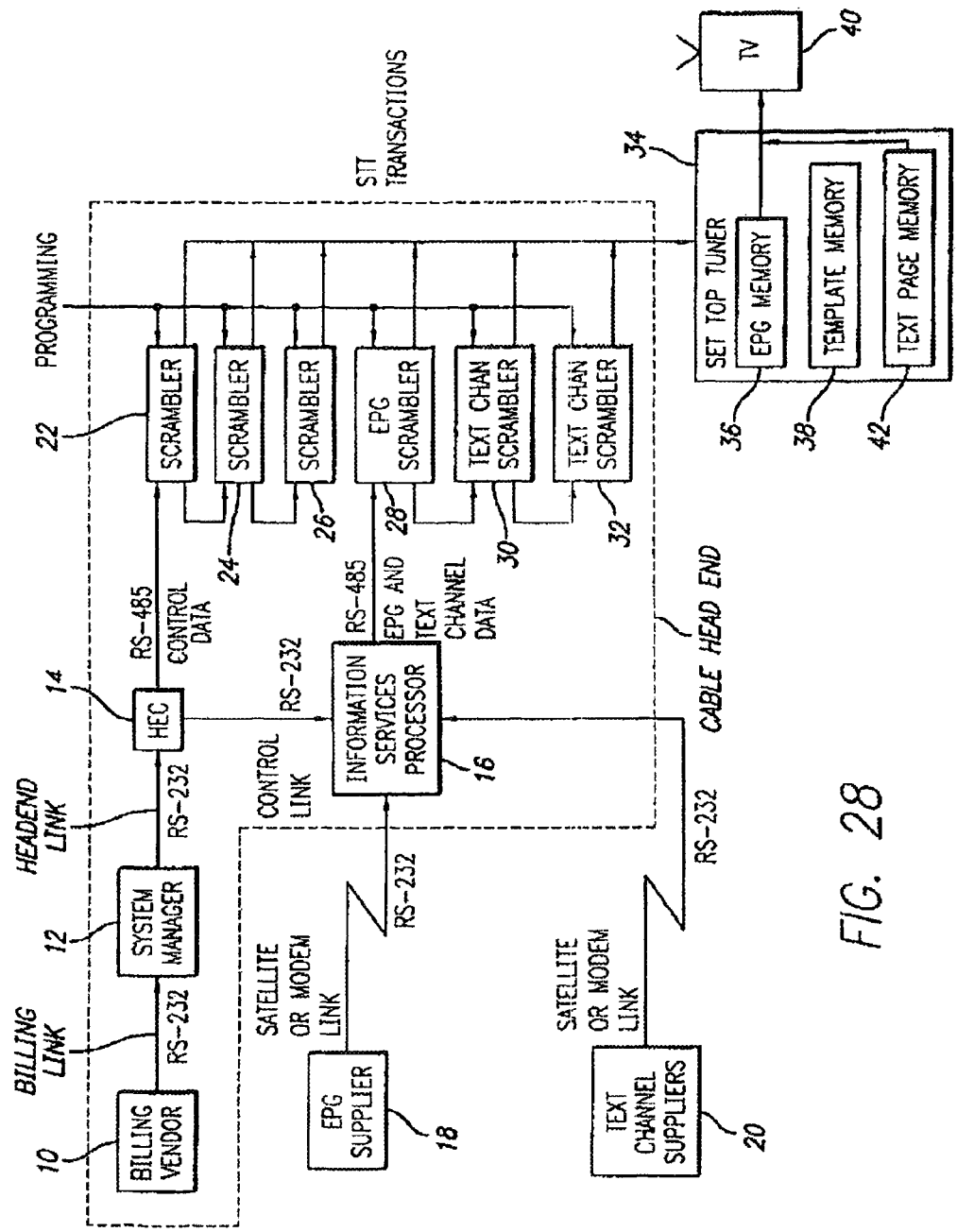
FIG. 28 is a block diagram of one embodiment of a system for providing EPG data and text data to a viewer.

FIG. 28 illustrates an EPG and text information service in accordance with one embodiment of the present invention. As shown, a local cable television company's billing vendor 10 communicates via a billing link to an RS-232 port of a system manager 12 located at a cable head end. Billing vendor 10 includes a subscriber database and generates a monthly bill for the subscribers in the system based on the level of service and any pay-per-view purchases. System manager 12 can be a personal computer or other processing device which receives viewer authorization transactions from billing vendor 10 and generates transactions for delivery to the distribution apparatus or the subscribers. Such transactions include text channel definition transactions which instruct the subscriber's set top box which group of channels it is entitled to receive, which frequency to tune for a particular text data channel, whether to mute the audio for that text channel, the pagination delay between pages, and the like.

System manager 12 also communicates via a head end link to an RS-232 port of a head end controller (HEC) 14 which controls the transmission of television programming to the subscribers. As will be described in more detail with respect to FIG. 29, HEC 14 communicates via a control link to an RS-232 port of an information services processor (or data controller) 16 which manages the flow of EPG and text data in accordance with the invention. As shown by dotted line in FIG. 28, information services processor (ISP) 16 is preferably located at the cable head end with system manager 12, HEC 14 and the signal scramblers. However, those skilled in the art will appreciate that all of the head end equipment need not be located at one site.

EPG data is supplied from one or more local or remote EPG suppliers 18 via a satellite link, modem link or other communication link to an RS-232 port of ISP 16. Similarly, text data from one or more text channel suppliers 20 is provided via a satellite link, modem link, or other communication link to another RS-232 port of ISP 16. In preferred embodiments, ISP 16 has a plurality of identical RS-232 ports for accepting data from a plurality of EPG suppliers 18 and text channel suppliers 20.

Also, as shown, one of these RS-232 ports can be used for a control link to HEC 14 as well. ISP 16 manages EPG and text source databases in response to control signals from HEC 14 in order to provide EPG data and/or text channel data to selected viewers.

HEC 14 also provides control data directly to the viewer's set top box via an RS-485 output port. Preferably, the control data from HEC 14 can include text channel definition transactions as well as EPG definition transactions for instructing the set top box at which frequency to tune for the EPG data and the like. The control data may also include software for downloading into the viewer's set top box for reprogramming the viewer's set top box as necessary. The control data from HEC 14 can be inserted into the vertical blanking interval of the selected cable television signal by daisy-chained scramblers 22, 24 and 26 using known in-band techniques, although the control data from HEC 14 may also be modulated on an out-of-band carrier or an in-band audio carrier for transmission as. Preferably, scramblers 22-26 are daisy-chained so that the scramblers may be addressed individually or globally.

Similarly, EPG data and text channel data from ISP 16 are provided to the viewer's television set top box via an RS-485 output port of ISP 16. EPG data and text channel data are similarly inserted into the vertical blanking intervals of selected cable television signals by EPG scrambler 28 and text channel scramblers 30 and 32, respectively. Scramblers 22-32 may insert the control data, EPG data, and text channel data into other portions of the video signals such as the horizontal blanking intervals or else replace the video entirely. Typically, the number of scramblers depends on the number of premium channels for which scrambling is used. Preferably, EPG scrambler 28 and text channel scramblers 30 and 32 are identical to control data scramblers 22-26 and are similarly daisy-chained for individual or global addressing. As shown in FIG. 28, scramblers 28-32 receive a single serial data channel which carries the combined EPG data and text data and display control transactions, as described in more detail with respect to FIG. 29) for all data streams in use. Each scrambler is also equipped with memory for storing a predetermined amount of this data in an internal memory so as to minimize the number of database accesses. Preferably, scramblers 28-32 have internal memory sufficient to store a significant number of transactions. For example, scrambler 30 may have enough internal memory to score a day's sports scores for display on a sports text channel. The data received and stored in scramblers 28-32 is preferably in RS-485 format, and the protocol in a preferred embodiment is SDLC. All data transactions to scramblers 28-32 are sent on individual data streams specifying the target scrambler (station addresses in SDLC protocol), and the control data is sent on a global data stream which is filtered in the scramblers 28-32 based on the address of the scrambler so that the data streams can be conFIG.d by a transaction from ISP 16. The individual EPG data and text data streams are preferably generic in the scramblers so that they can be allocated as desired. Preferably, scramblers 28-32 have baud rates of at least 9600.

Preferably, the subscriber's set top box is a set top box 34 which comprises an EPG memory 36 for storing the EPG data from ISP 16. For example, EPG memory 36 may store one or two weeks of EPG data for selective access by the viewer via a menu of the set top box 34. This menu preferably allows the viewer to scroll through the EPG data stored in EPG memory 36 using the key pads of the viewer's television remote control device. Set top box 34 may also comprise a nonvolatile template memory 38 for storing the template in which the EPG data is to be inserted for display to the viewer on the viewer's television 40. In this manner, a video signal containing the template display data need not be continuously retransmitted to the set top box 34, thereby saving more bandwidth. Instead, the EPG data only needs to be updated every 30 minutes or when there is a program change. Of course, different set top boxes 34 may have varied amounts of memory and processing capabilities for such purposes in accordance with the acceptable memory costs during manufacture of the set top box 34.

As shown in FIG. 28, set top box 34 may also comprise a text data memory 42 for storing a page of text data for presentation to the screen. Thus, while one page of text data is displayed to the subscriber, the next page of text data may be loaded into the text data memory 42.

ISP 16 manages the flow of text data and EPG data from the data service provider to the viewer's set top box 34. ISP 16 manages this data by accepting data only from one or more authorized text data and/or EPG data sources, processing the text data and EPG data in its internal database manager, and formatting the processed data into a common data transaction format for output to the scramblers for transmission to the set top box 34. Provision of EPG data and text data to the subscribers is controlled by the head end controller 14 via the control link.

One example of a suitable ISP 16 is an IBM PS model 7546 personal computer with a plurality of RS-232 serial input ports for EPG data and/or text data inputs and at least one RS-485 HDLC serial link at its output of the type used by HEC 14. As shown in FIG. 28, the control link can be a single RS-232 serial port. The hardware and software components of ISP 16 are then conFIG.d as illustrated in FIG. 29.

Figure 29:
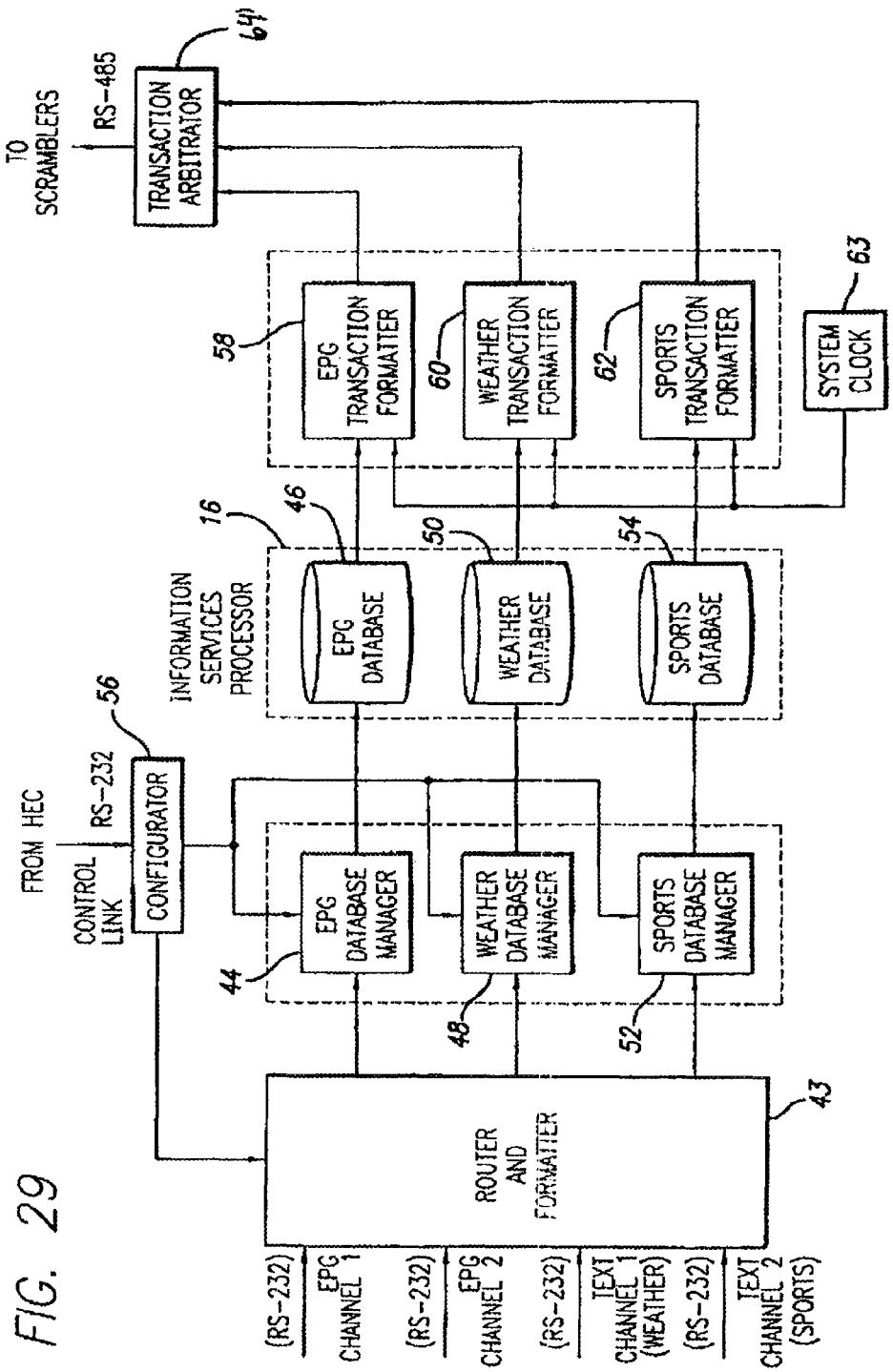
FIG. 29 is a block diagram that illustrates one embodiment of an EPG data controller.

One embodiment of ISP 16 is illustrated in FIG. 29 as a plurality of RS-232 ports which provide a common interface for the EPG data and text channel data asynchronously provided by the EPG supplier(s) 18 and text channel suppliers 20. The EPG data and text channel data is transmitted to ISP 16 via a satellite link (when the interface is operated in simplex mode) or by modem (when the interface is operated in half duplex mode). Preferably, the data is transmitted at a baud rate of at least 1200.

ISP 16 functions as a "gate keeper" which only allows access by authorized data sources. Accordingly, when ISP 16 receives a message from an EPG supplier 18 or a text channel supplier_0, it first checks the data for authorization. If that supplier is not authorized, the data is ignored. When the supplier is authorized to access ISP 16, ISP 16 performs the requested action and returns a command response message. If the communications link is simplex, the response is ignored. In this manner, access to ISP 16 can be limited by authorization codes, but as will be described below, access is also limited by whether the data provider provides EPG data or text data in the transmission protocol expected by ISP 16.

Messages sent between an EPG supplier 18 or a text channel supplier 20 and ISP 16 can be formatted to include a start of text byte, a data block of ASCII characters, checksum bytes and an ASCII carriage return. This format is used in commands sent to ISP 16 from the data suppliers as well as in responses sent to the data suppliers. The checksum can be a two byte CRC of all bytes in the message field beginning with the first character following the start of text character up to but not including the checksum field. The checksum is transmitted in the message as the hexadecimal ASCII representation (four bytes) of the CRC computation. The data blocks can be conFIG.d differently depending upon whether the input data is EPG data or text data.

EPG data from the EPG supplier 18 can be formatted in accordance with an EPG command set including, for example, a Define Program Command which is used to identify all data relating to a single program, a Define Category Command which is used to establish a category for identifying different types of programs, and a Delete Category Command which is used to delete an unused category to make room in the database of ISP 16 for new programming categories. The EPG data may be formatted on a per program basis by these commands.

Delimiter characters can be used for variable length fields such as the title and program description blocks to identify the length of the field. For example, a NUL (0 hexadecimal) means the field is null, SOH (I hexadecimal) means the field is valid, and ETX (31 hexadecimal) means the end of the current record.

Once data transmitted with a Define Program Command is stored in an EPG database of ISP 16, the EPG data is formatted into transactions for transmission to the set top box 34. This command may also be used to update a program definition since it will overwrite a corresponding entry in the EPG database of ISP 16.

ISP 16 may respond to such commands from the EPG supplier 18 by sending an appropriate response such as: no error (normal response), service provider not found (not authorized), type of service not found (not authorized), category ID riot found, unrecognized command, checksum error, insufficient disk space, and the like. Other EPG commands and command responses may be provided as desired.

The text channel data can originate from many different text channel suppliers 20 and arrive at the ISP 16 through different communications links such as satellite, dial up modem, direct connect modem or with a direct connect to the system manager 12.

ISP 16 can include a plurality of databases and database managers. As shown in FIG. 29, there may be two types of databases maintained in ISP 16—one type for EPG data and one for text channel data. The EPG database is designed to collect data from each EPG supplier and to sort each EPG program record by channel and time of day. A separate database is created for each text channel for collecting text data from the associated text channel supplier 20 and formatting the received text data for transmission on individual text channels using the techniques to be described below. Each database that is created is identified by the service provider and type of service codes listed in the Define Program Command for use in the control link commands provided to ISP 16 from HEC 14.

As shown in FIG. 29, a received command is checked for its command code, the service provider, type of service and authorization code, as appropriate, by router and formatter 43. If the command is from an unauthorized data source, the subsequent data is ignored. However, if the received data is from an authorized supplier, router and formatter 43 routes the data to the appropriate database within ISP 16. For example, if EPG data is received, it is routed via EPG database manager 44 to EPG database 46.

In one embodiment, EPG database manager 44 sorts the received EPG data by channel and time of day and stores the received EPG data in the appropriate location in EPG database 46 for later recall. EPG database manager 44 may also perform garbage collection on the EPG database 46 as records are deleted. EPG database manager 44 may also call a data compression software routine such as the Huffman Compression Algorithm which, as known to those skilled in the art, maps more frequently used characters to fewer bits than the usual eight bits used in normal ASCII, while giving the less frequently used characters more bits. The number of bits used for a character is based on its probability of appearing in the data stream. Huffman encoding is described in detail in an article entitled "Lossless Data Compression", Byte, March, 1991, pp. 309-314, incorporated herein by reference. Such a routine is desired to maximize storage efficiency at EPG database 46. Similarly, each text database manager can store the text information in the associated text database and performs data compression.

Router and formatter 43 and database managers 44, 48 and 52 are all controlled by configurator 56, which is, in turn, responsive to control data from HEC 14. Configurator 56 responds to control commands from HEC 14 to provide updated authorization information to router and formatter 43 for comparison with the incoming data and for adding/subtracting database managers and databases and the like as EPG suppliers 18 and text channel suppliers 20 are added and subtracted from the system.

Access to ISP 16 is can be carefully controlled through the use of authorization codes. In addition, ISP 16 can maintain control over the information services provided to the viewer by storing the EPG data and text data in a particular format in the appropriate database within ISP 16.

Figure 30:
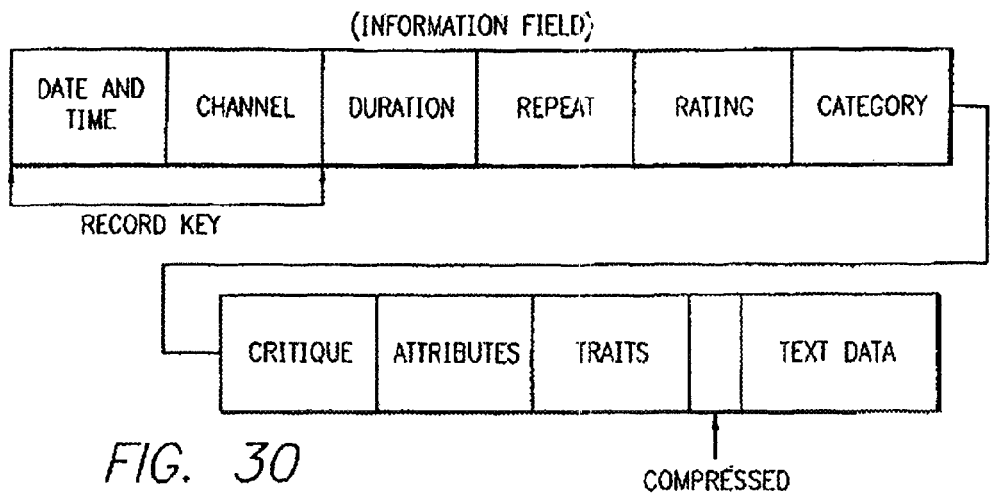
FIG. 30 illustrates one embodiment of an information field of the EPG data read from the EPG database of FIG. 29.

Referring now to FIG. 30, the EPG database key can be a combination of the date and time field and the channel number from the EPG data. Following these fields are the duration field, the repeat field, the program rating field, the program category field, the critique field, the attributes flag field, the program traits flag field, the text data compressed flag and lastly the text data. The text data field may further consist of several optional subfields with a delimiter between each field.

EPG database manager 44 can access the EPG database 46 through shared library routines such as add a record, delete a record, read a record, and the like. As the EPG database 46 is used. it can be fragmented as records are added and deleted, and as a result, EPG database manager 44 may further include garbage collection routines for periodically performing the garbage collection function on the EPG database 46. The text databases are similarly conFIG.d except that garbage collection is not necessary.

In one embodiment, EPG transaction formatter 58 reads the database records of EPG database 46 and formats them to program-based transactions having a predetermined number of bytes which are transmitted to the EPG scrambler 28 for insertion into the vertical blanking interval of a video signal and transmission to the set top box 34. These transactions are then sent via a transaction arbitrator 64 to the EPG scrambler 28 shown in FIG. 28 for insertion into the appropriate video channel.

The transactions from transaction arbitrator 64 can be output to a single RS-485 output port of ISP 16 which is connected to multiple scramblers of the type used to scramble premium cable channels. The transactions are segmented into EPG data and text data streams for transmission to the EPG scrambler 28 (if the transaction includes EPG data) or to the text channel scramblers 30 and 32 (if the transaction includes text data).

Figure 31:
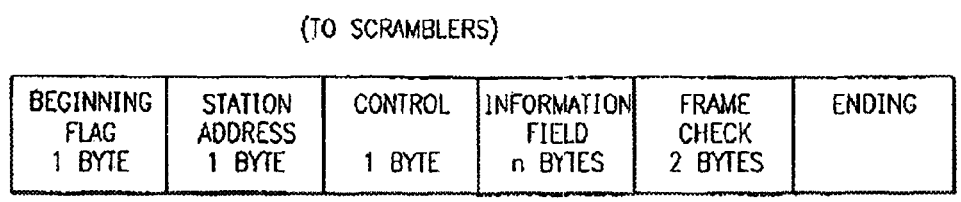
FIG. 31 illustrates a data format of data read from the database for insertion into an assigned cable television channel.

In one embodiment, the EPG transactions generated by EPG a transaction formatter 58 are formatted into SDLC frames as noted above. A sample SDLC format for the EPG transaction data is shown in FIG. 31. In FIG. 31, the beginning flag delineates the beginning of the SDLC frame, the station address delineates the scrambler to be addressed, the control byte is a command code that defines what is to be processed, the information field contains the EPG data formatted as in FIG. 30, the frame check contains the CRC for all data between the beginning and ending flags, and the ending flag delineates the end of the SDLC frame. A transmission from EPG transaction formatter 58 will address a specific data stream and a response from the EPG scrambler 28 will identify its data stream in the station address location. As noted above, such transmissions may or may not require a response from the EPG scrambler 28.

The EPG transactions typically include an Add EPG Block command including a byte specifying that the following data is from the EPG data stream, a control code byte specifying, for example, whether a reply from the scrambler is expected, two bytes setting forth the EPG data block number, a flag setting forth whether the EPG data is Short Term or Long Term data, the number of transactions which make up the EPG data block, and the actual transactions. EPG transaction formatter 58 may also generate a Delete EPG Block command which specifies that the data is to be deleted from the EPG data stream, the control code byte, and the EPG block number to be deleted.

Figure 32:
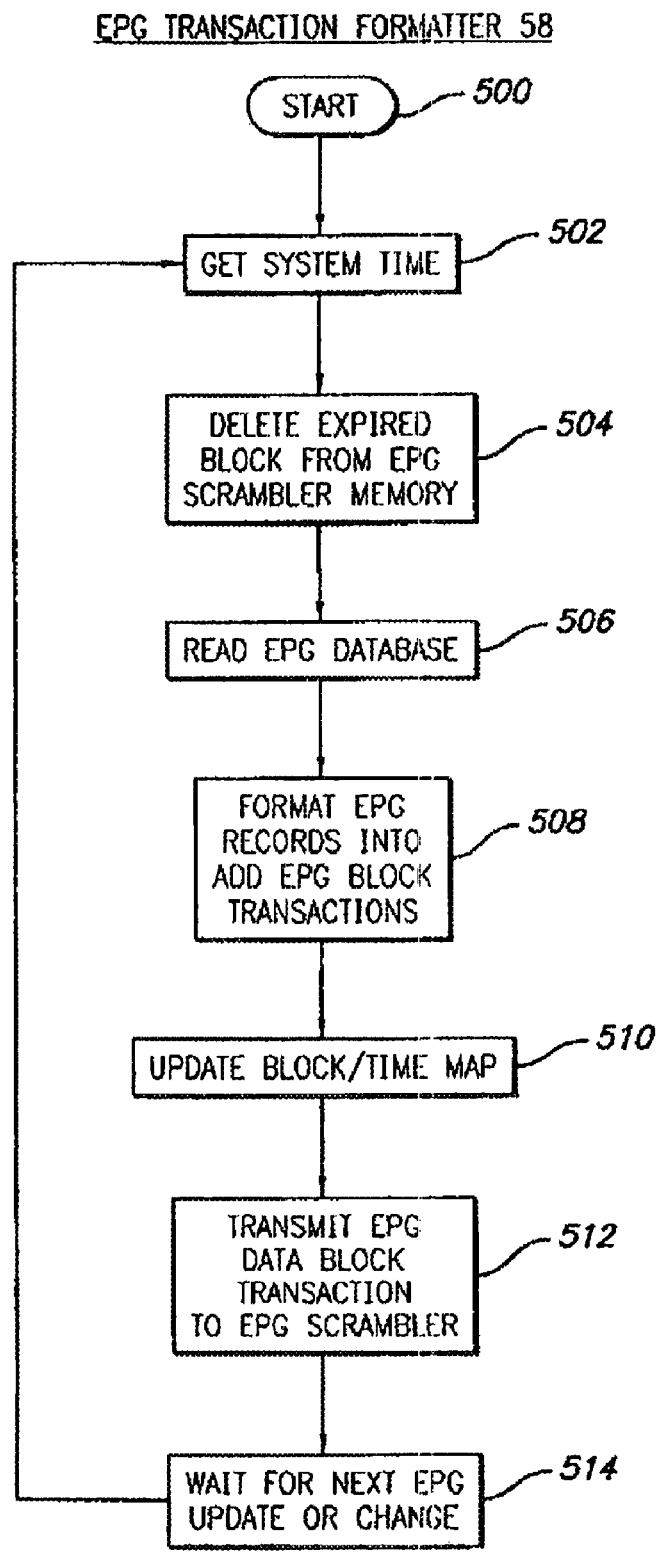
FIG. 32 is a flow chart illustrating the operation of the EPG transaction formatter of FIG. 29.

FIG. 32 illustrates a flow chart for one embodiment of software that can be used and embodied in EPG transaction formatter 58. As shown, the software starts at step 500 and gets the system time and date from the ISP system clock 63 at step 502. An expired EPG data block is then deleted from the memory of the EPG scrambler 28 at step 504. An expired EPG data block is defined as a data block representing a program which has been completely aired prior to the current system time or a program which was aired before the time window used for the EPG. At step 506, current EPG data blocks having a time and date within the EPG time window are read from the EPG database 46. The current EPG data blocks are then formatted into Add EPG Block commands and associated transactions at step 508. A block/time map of EPG transaction formatter 58 is then updated at step 510. The block/time map preferably stores the time that each EPG data block was sent to EPG scrambler 28. The transactions representing the EPG data are then transmitted the EPG scrambler 28 at step 512. EPG transaction formatter 58 then waits at step 514 for the next EPG update (which should occur when the system time enters a new half hour) or the next EPG change (which may occur at any time). Upon receipt of such an update or change, control returns to step 502. Text transaction formatters 60 and 62 similarly generate text transactions for the text data, which as noted above, is defined on a per screen (rather than per program) basis. Hence, an Add Text Screen command is similar to an Add EPG Block command except that the text channel number and screen number are provided in place of the EPG block number and Short Term/Long Term data bytes. The text transaction formatters 60 and 62 may also request the time from the scrambler so that proper pagination may be maintained.

Figure 33:
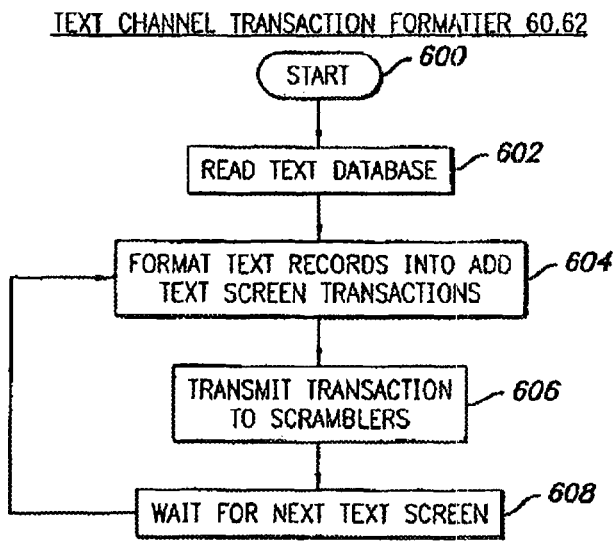
FIG. 33 is a flow chart illustrating one embodiment of the operation of the text transaction formatters of FIG. 29.

FIG. 33 illustrates a flow chart for one embodiment of software that can be used and embodied in text channel transaction formatters 60, 62. As shown, the software starts at step 600 and reads a text screen record from the text database 50 or 54 at step 602. At step 604, the text screen is formatted into Add Text Screen transactions for transmission to the text channel scramblers 30, 32 at step 606. Preferably, such transactions are formatted such that the display characters are sent as display commands rather than as separate characters for every display coordinate of the text display screen. Then, at step 608, text transaction formatter 60, 62 waits a period of time specified by system manager 12 (if auto-pagination is used) before the next text page is formatted and transmitted to the text channel scramblers 30, 32. At the end of this period of time, control returns to step 604 and the next text screen record in the text database 50, 54 is formatted for transmission to text scramblers 30, 32 for insertion in the vertical blanking interval of a particular video signal.

Text data can be passed to the screen by sending a separate character for each display location of a page. In other words, if a text screen comprises 16 lines and 4 characters per line, a text screen is represented by sending 384 (24X16) characters, one for each display location for that display screen. A blank space character is sent to indicate that no character is present in a particular text screen location.

In one embodiment, the text data is transmitted to the screen along with appropriate commands for controlling the display of the text data. For example, a first display command in a sequence identifies the following data as text data and instructs the set top box 34 to fill the television screen with a blue background or some other background or template over which the text will be displayed. The text data is then converted into a series of commands which together identify the separate screens of text. As noted above, the text data is grouped on a per screen basis, which allows the appropriate delay mechanism to be incorporated into the display commands to provide the necessary delay between the presentation of respective text screens.

For this purpose, transaction formatters; 60 and 62 can include software for scanning the text data for actual characters, skipping extra spaces in the text data, and grouping the actual text for transmission in transactions of a designated size which will fit in the vertical blanking interval of a field of a video signal. Since spaces are eliminated, the display commands include a coordinate specifying the row and column address of the first display character on the screen and a number of contiguous characters follow that character in the same transaction until the transaction is filled or a number of successive spaces are encountered.

Attribute information such as underline, blinking, or luminance inversion associated with the characters may also be transmitted using these display commands. These display commands are used to read the text data for a text screen from the appropriate database, and at the end of the text data for a text screen, a display command is transmitted to indicate that all data for that text screen has been transmitted. The transaction formatter 60, 62 also includes a wait loop or "timeout" command at the end of the transmission which builds in a delay (on the order of 7 seconds) which gives the viewer sufficient time to view a text screen before the text data for the next text screen is displayed, thereby providing auto-pagination of the text screen.

Auto-pagination permits the viewer to automatically advance from one text screen to the next without any intervention by the viewer. In accordance with the auto-pagination scheme of the invention, the cable operator can specify the time duration between screens and forward this information to the transaction formatters; 60, 62. Then, during operation. when the viewer selects a text channel, the current page of text data is displayed by extracting the selected text channel data from the vertical blanking interval of the video signal in which it is inserted and mapping that text data to a channel of the viewer's television which is designated for display of that text channel. The next screen of text data will be displayed after a predetermined delay which gives the viewer sufficient time to read the displayed text data for the current screen (approximately 7 seconds). This technique could replace the commonly used "barker" channel which uses a computer to generate text data which is then transmitted as a complete video channel over the cable television system.

Configurator 56 can respond to control commands from HEC 14 to provide updated authorization information to router and formatter 43 for comparison with the incoming data and to add/subtract database managers and databases and the like as EPG suppliers 18 and text channel suppliers 20 are added and subtracted 57 from the system. The control link between HEC 14 and configurator 56 can be used to report the status of the ISP 16 to system manager 12. Additionally, the control link may accept text data from system manager 12 for displaying system messages and the like.

In one embodiment, the interface between configurator 56 and HEC 14 is an RS-232 port with a data format fixed at, for example, 9600 baud. All control data is preferably transmitted as ASCII characters. Upon receipt of a message from HEC 14, configurator 56 checks the data, performs the requested action. and returns a command response message in a message format of the type described above for communications between router and formatter 43 and the EPG and text channel suppliers. Sample commands sent from HEC 14 to configurator 56 over the control link include a Set Date and Time command (for synchronization purposes), Request Configuration commands, Request Status commands, Get Category Record commands, Scrambler Control commands, and Database Control commands.

In one embodiment, during operation, ISP 16 monitors all input ports data from the EPG and text data service providers and builds a list of all available EPG and text data services. This list is sent to the system manager 12 using a Request Configuration command. This command specifies the available service providers, the type of service (EPG or text data) from each provider, the communications port associated with each service, the scrambler address or data stream (EPG or text data) for each service, the authorization code from the supplier for each service, the time and date of the last update from the service provider, the time and date of the last update to the scramblers, the time and date of the latest EPG data in the EPG database, and the like. Such information is provided to the system manager 12 for each service provider when this command is given.

The Request Status command can contain flags indicating whether there are errors present in the error log and if the category list has changed since the last Request Status command was received. Get Error Record and Get Category Record commands may then be used to extract the error and category information.

In one embodiment, configuration commands are separated into EPG and text service configuration commands. A ConFIG. EPG Service command specifies the service provider, the type of service, whether the service is to be enabled or disabled, the authorization code from the EPG supplier 18, the scrambler data stream for Short Term data, the scrambler data stream for Long Term data, the length of the Short Term data in hours (1-255), and the length of the Long Term data in hours (1-4096). The ConFIG. Text Service command specifies the service provider, the type of service (weather, sports, and the like), whether this service is to be enabled or disabled, the authorization code from the text channel supplier 20, the scrambler address or data stream for the text data, the channel number, and the pagination delay time in seconds) before the next page of text data is to replace the current page of text data on the screen for auto-pagination.

The scrambler control commands can include, for example, a Rebuild Scrambler Memory command which is used when a scrambler replaced and needs data to be reloaded in its memory and a Scrambler Configuration command for specifying the amount of scrambler memory in kbytes.

In one embodiment, the database control commands include, for example, a Clear Database command which is used to clear the database associated with a particular service and a Delete Database command which is used to delete the database associated with a particular service. Other database control commands such as a Download Category Map command may also be provided for establishing a list of the specified categories of program data in the EPG data.

FIG. 34 illustrates one embodiment of a set top box 34 that can be used with the present invention. As shown, set top box 34 includes EPG memory 36, template memory 38, text page memory 42, a set top box 700, and a set top processor 702 which reads commands from the vertical blanking interval of the incoming video signal and performs the appropriate action. For example, if the incoming command is a text channel definition or EPG definition command from HEC 14, the appropriate update of bit map 704 is performed. Similarly, if the incoming command is a display command including EPG data, that data is stored in EPG memory 36 and is displayed with the template stored in template memory 38 when the user makes a menu selection via television remote control unit 706 and remote receiver 708 requesting display of the EPG data. The template data may be sent as part of EPG display commands if no template memory is provided. On the other hand, if the incoming command is a display command including text data, a page of that data is stored in text page memory 42 for presentation to the display a page at a time. The text page memory can be automatically updated every few seconds by virtue of the delay built into the display commands from the text formatters 60, 62 if auto-pagination is enabled. Alternatively, the user can be allowed to manually access the text data in the memory. If manual access is provided, it is preferred that the text page memory hold at least the currently displayed text page, the previous text page and the subsequent text page in order to give the user the ability to scroll through the text data In either case, set top processor 702 preferably has the ability to request the next text page while the current page is being displayed so that the next text page is already loaded for display at the end of the screen delay time. The selected text, EPG or video signal is then modulated at modulator 710 for display on television screen 40 at the channel specified in bit map 704.

Bit map 704 of set top processor 702 of the set top box 34 maps the received text information to the designated cable channel for display by designating the frequency that must be tuned by box 700 to receive the desired text data. This information is received in the aforementioned text channel definition transactions from HEC 14. For example, the viewer may specify via television remote 706 that she wishes to view a sports text data channel which her program guide indicates to be available by tuning the set top box 34 to channel 181. Set top processor 702 then checks bit map 704 for channel 181 to determine that it must tune the frequency for channel 29 in order to extract the sports text data for the viewer's channel 181 from the vertical blanking interval of channel 29, set top processor 702 ten sets set top box 100 to tune channel 29 but the video signal for channel 29 is not displayed. Instead, the video screen is blanked by set top processor 702 and the text data extracted from the vertical blanking interval by set top processor 702 is displayed. Any necessary descrambling of the received video is performed by set top processor 702. The viewer thus perceives that many more "virtual" channels are available even though a separate video channel was not used to transmit the text data.

In one embodiment of the present invention, illustrated in FIG. 42, electronic content is tagged and aggregated at a server and becomes electronic content with targeted information. Suitable electronic content includes but is not limited to, advertising, news segments, video programs, audio programs, WEB pages, and the like. The electronic content with targeted information is send to a broadcast server and broadcast widely. Set top box 34 has created profiles representing different people in the household. Set top box 34 matches the tags in the broadcast stream with the profiles created and determines which of the tagged content should be downloaded. A subset of all of the content that is broadcast that are relevant to the personalities in the household are downloaded and displayed to the user.

For example, set top box 34 can be used to match the tags in the broadcast stream with a demographic profile of a viewer previously created and determine which of the tagged content should be downloaded. An individual viewer receives from set top box 34 only. Set top box 34 matches the tags in the broadcast stream with the demographic profile of the viewer created and determines which of the tagged content should be downloaded.

Some example of demographic characteristics include, but are not limited to, a user's gender, race, age and income. The output of the analysis of viewing habits of the representative sample provides a basis for determining demographic characteristics of the individual user.

As shown, set top box 34 reads commands of the incoming tagged and aggregated electronic content and performs the appropriate action. For example, if the incoming command is a text channel definition or EPG definition command from HEC 14, the appropriate update of bit map 704 is performed. Similarly, if the incoming command is a display command including EPG data, that data is stored in EPG memory 36 and is displayed with the template stored in template memory 38 when the user makes a menu selection via television remote control unit 706 and remote receiver 708 requesting display of the EPG data. The template data may be sent as part of EPG display commands if no template memory is provided. If the incoming command is a display command including text data, a page of that data is stored in text page memory 42 for presentation to the display a page at a time. The text page memory can be automatically updated every few seconds by virtue of the delay built into the display commands from the text formatters 60, 62 if auto-pagination is enabled. Alternatively, the user can be allowed to manually access the text data in the memory. If manual access is provided, it is preferred that the text page memory hold at least the currently displayed text page, the previous text page and the subsequent text page in order to give the user the ability to scroll through the text data. In either case, set top processor 702 preferably has the ability to request the next text page while the current page is being displayed so that the next text page is already loaded for display at the end of the screen delay time. The tagged and aggregated electronic content is then modulated at modulator 710 for display on television screen 40 at the channel specified in bit map 704.

Bit map 704 of set top box 34 maps the received tagged and aggregated electronic content to a designated cable channel for display. Set top processor 702 then checks bit map 704 for channel 18 1 to determine that it must tune the frequency for channel 29 in order to extract the. Any necessary descrambling of the received tagged and aggregated electronic content is performed by set top processor 702.

Multiple Viewer Profiles in a Multi-Viewer Household

The present invention also provides a mechanism to automatically create multiple profiles corresponding to multiple users with or without any information being explicitly providing by the users about themselves.

Figure 35:
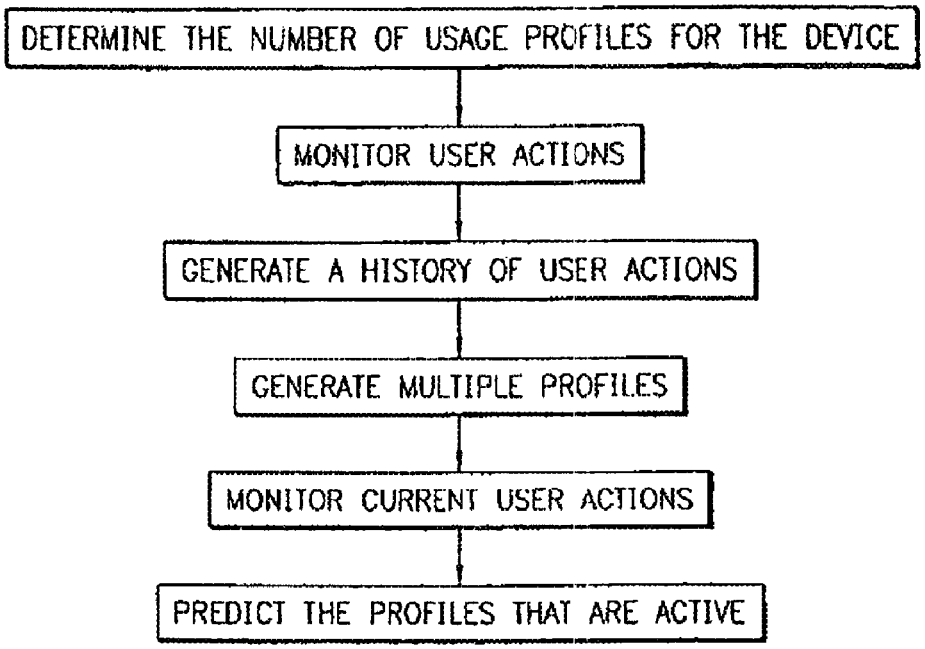
FIG. 35 depicts a functional block diagram of another preferred embodiment of a system employing the principles of the present invention.

FIG. 35 shows an embodiment of the invention that causes the automatic creation of multiple profiles and automatic identification of profiles when they are active on the device.

In one embodiment, number of profiles to be created is determined initially. Several methods may be used to determine the number of profiles. In one embodiment of the current invention the number of profiles is optimally determined by applying the Minimum Message Length (MML) criterion. The process of applying MML criterion for determining the optimal number of clusters in described in reference (ref . . . ). In one embodiment of the current invention, a user of the device explicitly specifies; the number of profiles to be created.

The system monitors user interactions with the device. The user interactions may include but are not limited to channel change requests, requests to view more information, configuration of device parameters, requests to performs recording or deletion of programs from a storage device. All actions due to user interactions are recorded in a history database that stores history of viewer actions. Data records in the history database describing viewer action can be of different formats. FIG. 37a shows one of the possible formats for the data record. Data records may contain information about the action, time at which the action occurred, and some parameters that further describes the action. In one embodiment of the invention, only actions matching certain criteria are recorded in the history database. For example, all user action about watching channels can be ignored if the duration of watching is less than a configurable threshold, or all user action about watching a particular channel like preview channel can be ignored. In the default usage of the device, the user will not be identifying himself or herself during each usage session. A usage session in this context can be the period during which there are user activities between two periods of inactivity, or the period during which the device is used between two periods during which the device is not in use. It will be left to the device to determine who the actual user is, in order to provide a very personalized environment to the user. In such a scenario the user action records will not contain any information about who the user is. In one embodiment of the current invention, the user can identify himself or herself explicitly for all or some of the usage sessions by using some mechanism provided by the system. These mechanisms may include pressing a sequence of keys, or choosing a user name from a menu and logging-in as that user. In this embodiment of the invention the user can identify himself or herself during certain sessions and may choose not to identify himself or herself during some other sessions. In the case where the user identifies himself or herself certain user action records can have the user name or some other identification data as a parameter which specifies that a user was togged-in for the session from which the user action record was generated.

Figure 36:
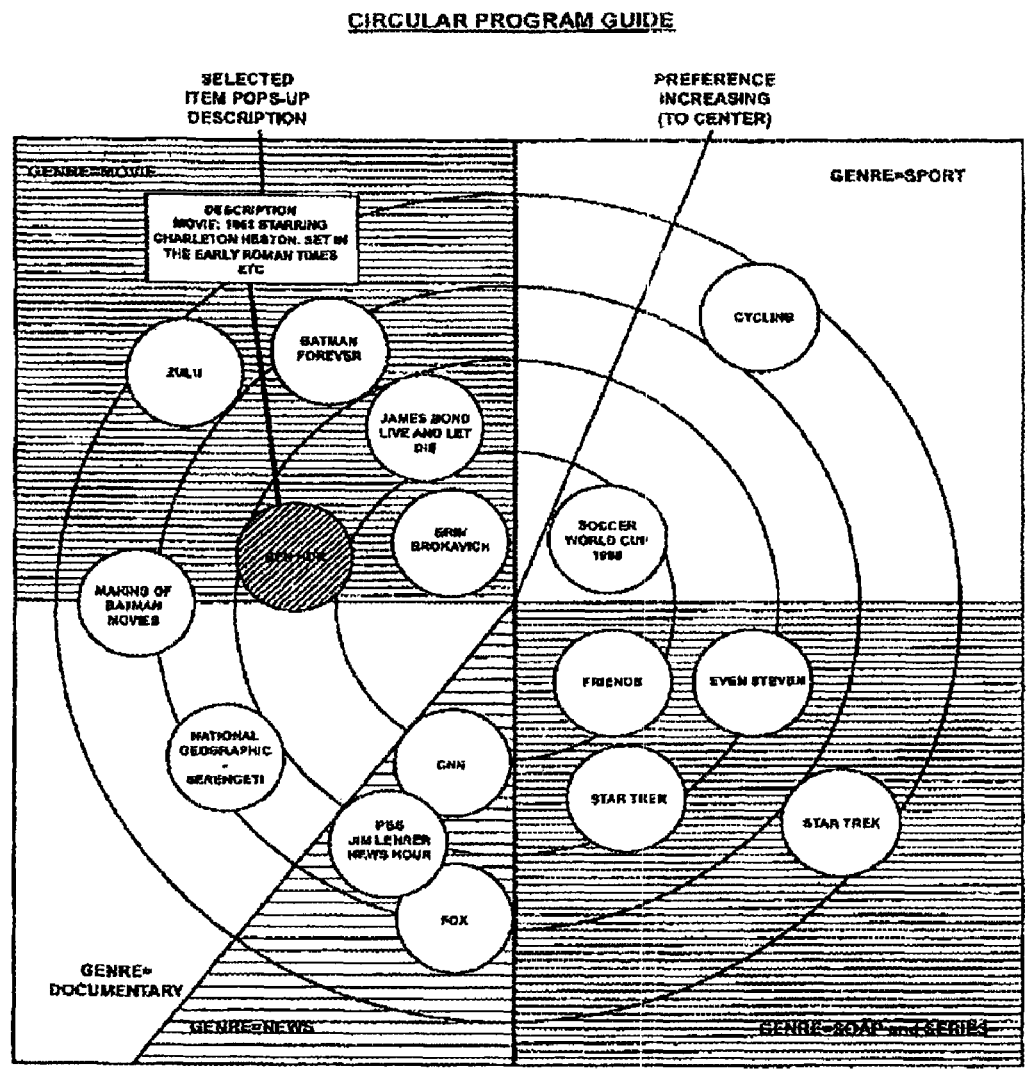
FIG. 36 is a circular program guide diagram according to an embodiment of the invention.

By analyzing the user action history database that was generated for a period of time, the current invention provides a mechanism to create multiple profiles automatically. Each of these profiles may correspond to the entire preference of a single user, a group of related preferences of a single user, a group of related preferences of a group of users or the entire set preferences of a group of users. The mechanism for creating multiple profiles is described in FIG. 36.

Figure 38:
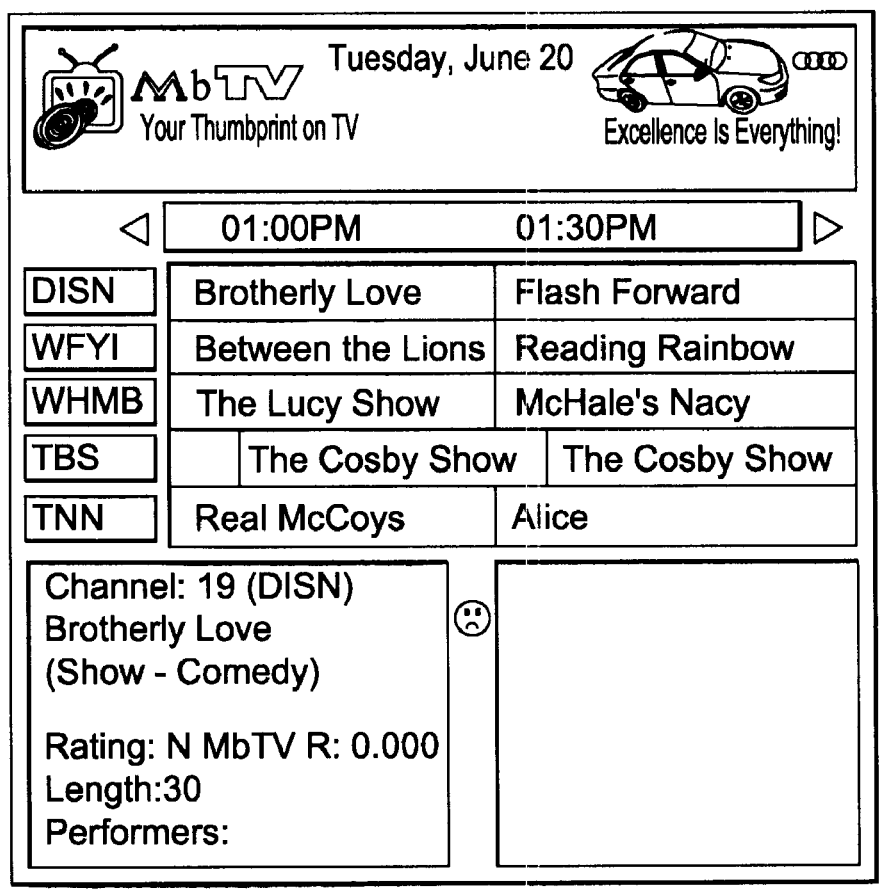
Figure 39:
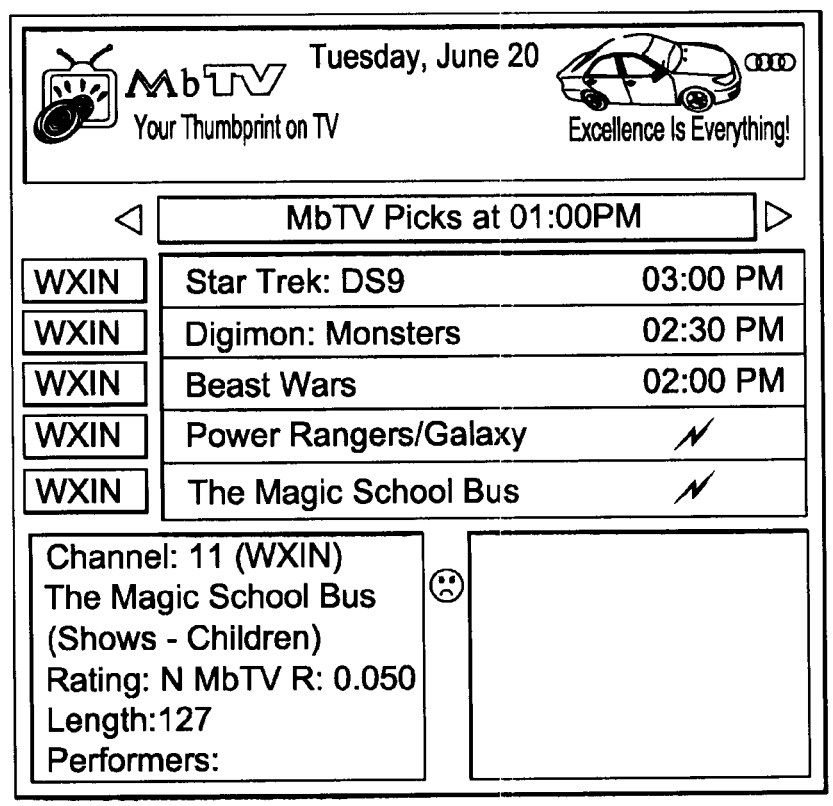

Sets of consecutive user action records are grouped together to form usage pattern records. Usage pattern records can be in the form of arrays of user action records. Only user actions that occur contiguously are grouped together in a single usage pattern record. The usage pattern records can be formed using many methods, some of which are:

1. Grouping together all user action records that are in a single usage session into a single usage pattern records. This is represented graphically in FIG. 38a.
2. Grouping together all user action records that are in a single usage session into a one or more usage pattern records where each usage pattern record has a predetermined number of user action records. This is represented graphically in FIG. 38b.
3. Grouping together a predetermined number of consecutive user action records in a usage session into one or more usage pattern records where each usage pattern record has a number of user action records which overlap with some of the user action records in an adjacent usage pattern record. This is represented graphically in FIG. 39.

Each usage pattern record is mapped to a point in an N-dimensional space, each axis of this N-dimensional space representing a parameter that is of significance in identifying multiple profiles. The N-dimensions for this space are called cluster-dimensions. The parameters for this N-dimensional space are chosen either manually by people skilled at identifying the most significant parameters in identifying multiple profiles, or automatically by identifying the aspects of profiles that differs significantly between profiles. In one embodiment of the current invention a set of these parameters are identified and conFIG.d as the apparatus is conFIG.d during initialization, and a new set is added periodically by looking at aspects which differ in the multiple profiles that are stored in a device. A wide variety of combinations of initial parameters may be used. In one embodiment these initial parameters are the channel names in a channel line up and viewing times. In the embodiment, these initial parameters are possible values of program description fields of television programs. In one embodiment the rate of channel change is also one of the parameters. The mapping of the usage pattern record to a point in the space defined by cluster-dimensions can be done by many methods. One method determines the quantity of a particular characteristic which is defined by a clustering parameter, exhibited in a usage pattern record, e.g. number of channel changes in a usage pattern, and uses this as the value of the axis for the corresponding dimension. One method determines the rate of consumption of a particular characteristics in a usage pattern record, e.g. rate of consumption for "NBC" in a usage pattern record is 0.5 which indicates that programs on "NBC" were watched 50% of times during the period of this usage pattern record.

All the points in the space defined by cluster dimension are clustered into a number of clusters using standard clustering algorithms. Any clustering algorithm can be used to perform the clustering. In one embodiment EM clustering is applied to group the points in the cluster-dimension space into a predetermined number of clusters. The number of profiles being created decides the number of clusters formed. Anyone skilled in the art of artificial intelligence and clustering, especially EM clustering, will be familiar with these clustering techniques. Each cluster formed as a resulting of the clustering represents a single profile. The clustering process also provides the mixture weights for each of the clusters as one of the outputs. The mixture weight for a cluster can be used to compute the percentage of time the profile was active, of the total amount of time for which the device was used.

In one embodiment of the present invention, the clustering is performed periodically using the user actions records accumulated in the history database. In one embodiment, user action records are periodically removed from the history database based on certain criteria such as the age of the record, size of the record, relevancy of the record etc.

Figure 40:
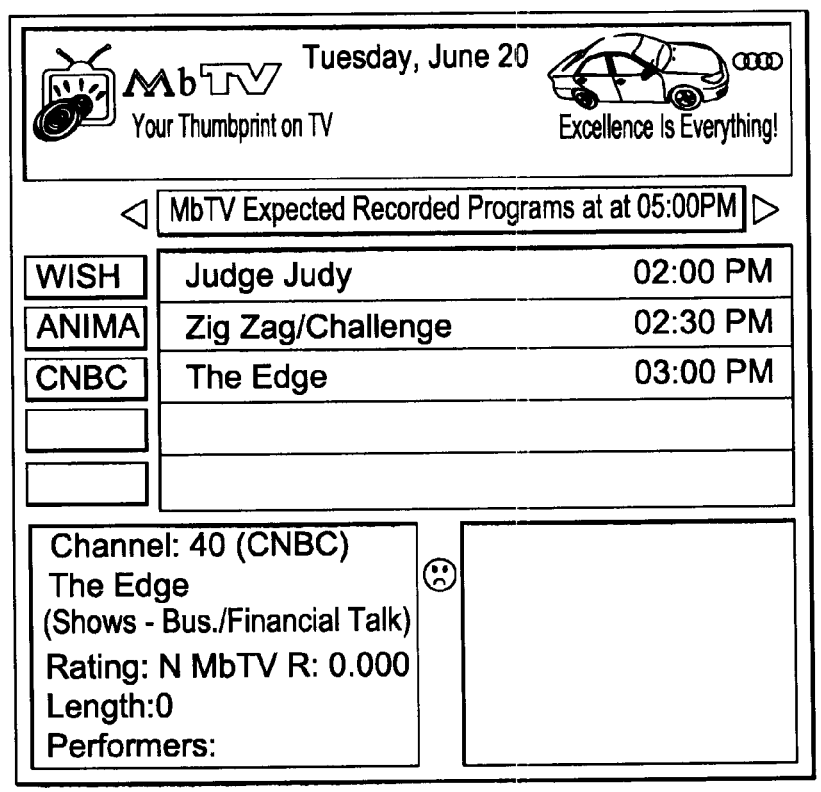

The current invention also provides a mechanism to predict profile that is active at any given time. FIG. 40 illustrates the method for identifying the profile currently active on the device. Current user actions are monitored and user action records are created. The most recent user action records are used to create a usage pattern record. The usage pattern record is mapped to a point in the cluster dimension. Using the Information about clusters representing multiple profiles, the, probability of each of the clusters being active given the usage pattern is computed. This is computed by using Bayesian Probability theory that can be used to compute the posterior probability using the prior probability and mixture weights. The probability of a cluster being active is computed using the probability of the usage-pattern record given the profile (P/usage_pattern profile), the probability of the profile being active and the probability of the usage record occurring. The mathematical representation for the Bayesian Probability theory in the current context is given below $$P(\text{profile/usage\_pattern}) = P(\text{usage\_pattern,profile}) * P(\text{profile}) / P(\text{usage\_pattern})$$

In this equation probability of usage pattern record occurring given profile (P(usage-pattern, profile)) can be computed by knowing the probability distributions governing the clusters. In one embodiment, the cluster probability distribution can be assumed to be the Gaussian probability distribution, so that the P(usage_pattern profile) can be computed using the cluster center and cluster variation. Cluster center and the cluster variation are the output generated by the clustering process performed for generating multiple profiles.

In one embodiment, switching the device on can be one of the user actions recorded and "time of usage" one of the clustering dimension. In this embodiment, as soon as a user switches the device on, the probability for any cluster being active can be determined, even with out any further user actions. As the user performs more user actions, the current usage pattern record is refined to include more user action records and the probability of profiles which may be active is refined with the addition of each new user action record. As more user action records are added to the current usage pattern, a set of the oldest user action records may be removed from the current usage pattern record. This process ensures that the effect of individual user actions in the identification of active profiles decreases as time passes.

In one embodiment of the current invention, the clusters generated by the clustering procedures are used to create multiple profiles using a method described in FIG. 41. In this embodiment, the clusters are used to compute the probability of each clusters being active during the period of each usage pattern record. User preferences for each profile are created using processes described previously using the user actions weighted by the probability of the corresponding cluster being active.

Targeted Advertisement Delivery

With reference now to FIG. 43, in a preferred embodiment of the present invention used to deliver advertising content to specifically targeted viewers based upon their individual viewer profile, the broadcast network amasses content from the many different content providers and combines it at a network broadcast head end 29 into a broadcast signal that is transmitted to, and received by, the television control system 2 of the present invention. The control system 2 sorts through the content received from the broadcast network based upon the profiles of the different viewers in the particular household, compiles lists of preferred programs available to each user, records and stores programs of interest, and makes the programs available for viewing when required. Equally important, the control system 2 receives and sorts through various advertising content and stores the content most relevant to the viewers in the house hold based upon their demographic profiles and the target audience of the advertising content.

With greater particularity, and as shown in FIG. 43, content providers include EPG suppliers 18, text channel suppliers 20, conventional programming suppliers 23, and alternative content suppliers 25. As described below, alternative content refers to highly targeted programming that may be delivered through the use of a control system 2 as described herein. Conventional programming encompasses all types of programming currently available and including, but not limited to, movies, news, sport events, educational programs, pay-per-view shows, and shopping channels. Advertising content suppliers 19 provide promotional material such as short video clips or graphical and text information to programming suppliers 23 for inclusion in their conventional programming content, in a manner familiar to TV viewers worldwide. However, in a novel method of delivering advertising content uniquely available through the use of the present invention, advertising content may be supplied to alternative content suppliers (see discussion below) and may also be profiled through a profiler 21 to develop meta data descriptive of each individual advertising message. As discussed elsewhere in the specification, the meta data refers to demographic characteristics that describe the viewers to whom each advertisement is specifically targeted.

The profiler 21 may be a software based system or may rely upon human intervention to watch and analyze each advertising message and develop meta data descriptive of the advertisement. Alternatively, the advertising content suppliers 19 may provide this information along with the advertisement. The meta data is developed based upon the parameters of interest to the clients for whom the ads are developed, and will typically include the age, gender, ethnic background, education, profession, and other demographic information related to the viewer. The meta data will thus describe the viewers to which each advertising message is targeted in terms of the viewers' demographic information as defined by the parameters mentioned previously. The meta data thus generated is then appended to each advertisement and the thus-tagged advertisements are provided to the broadcast network for inclusion in the broadcast signal.

The tagged advertisements will preferably be provided in a plurality of channels, wherein each channel may carry a specific type of advertisement in terms of the target audience. Thus, each channel may be defined according to one demographic parameter or an often recurring combination, e.g. a channel with ads for men, a channel with ads for women, a channel with ads for male sports fans, etc. Alternatively, each channel may carry a stream of all types of ads, wherein each type of ad is present in a ratio dependent upon the demographic parameters to which it is targeted. Thus, ads targeted to male sports fans on weekend afternoons will be more numerous than ads targeted to young children, because of the large number of sports events broadcast at such time and the high probability that young children will be playing outside rather than watching TV indoors at such times. Although providing tagged advertising content via a plurality of channels is not a requirement of the invention, it is believed that the sheer amount of advertising content available will require multiple channels as a practical matter. Furthermore, providing channels in a pre-sorted manner may reduce the amount and complexity of the sorting carried out by the control system 2 (as more fully described below).

Also as shown in FIG. 43, the signal broadcast by the network may further include information provided by the administrator of the service provided by the invention, e.g. Metabyte Inc., the assignee of this application. As described in more detail elsewhere in the application, this information may include updates of the software of the control system 2.

With continued reference to FIG. 43, the network broadcast signal is transmitted to, and received by, the control system 2. The broadcast signal may be analog or digitally encoded, and may be transmitted via cable, satellite, telephone line, or any other practicable manner. In view of the large number of channels typically available and the state of the art, practical considerations will most likely dictate that the network signal be broadcast in digital form, in which case both the network head end 29 and the control system 2 will need to incorporate ADC and DAC circuitry, in a manner very well known to those skilled in the art. Furthermore, it is understood that the control system 2 will need to incorporate channel tuning circuitry that, although not shown in the FIG., will be necessary to separate the numerous signals multiplexed in the broadcast signal and select any one of these signals (i.e. channels) as necessary.

Once received by the control system 2, the broadcast signal is supplied to various components of the system. The program switch 114 responds to the viewers input as provided via a remote control or similar unit to select the desired channel and direct the channel signal to the TV monitor 108. As described previously, the preference agent 110 monitors the viewing selection of the various viewers using the control system 2 and creates viewing profiles of each viewer that are stored in the preference database 116. Based upon these profiles, the preference agent 110 sorts through the incoming programming content as described in the EPG information to compile lists such as "Top 10" lists of viewing choices available at any given time to each viewer, and directs the recording manager 112 to record the top-ranked program being broadcast at any given time (including any programs selected by the viewers for recording) and store it in the stored programs memory device 35.

The preference agent further contains software that allows it to create a demographic profile for each viewer, based upon the viewing profile of the viewer and certain algorithms or associative rules. These algorithms may be adjusted over time as the model employed by the system administrator 27 is enhanced and its accuracy improves. To this end, the system update information channel included in the broadcast signal may include periodic software updates, including new preference database parameters that may need to be included at the request of the advertising suppliers 19. Thus, in one embodiment the control system 2 of the invention may be remotely upgraded to meet any new demands that may arise as advertising content providers become familiar with the system and the process of custom tailoring narrowly focused, targeted advertisements. The demographic profile created for each viewer is stored in the demographic database 31, which resides in the control system 2 and thus ensures the viewers privacy.

The preference agent 110 also sorts through the advertising content streaming in through multiple advertising channels contained within the broadcast signal and, based upon the demographic profiles of the viewers and the meta data contained in each advertisement to describe the target audience for the particular advertisement, stores and/or causes the display of particular advertisements. The control system 2 may utilize any of a variety of methods to manipulate the advertising content, as described below.

In one embodiment of the invention, the advertising channels each carry the same type of advertising. The preference agent determines which viewer is watching TV at any given time and stores in stored ads memory device 33 those tagged advertisements that are targeted to the particular viewer. At appropriate times during the program that is being watched by the viewer, such as during the commercial breaks typically inserted in most TV programs, the preference agent directs the program source switch 114 to access the stored ads and play a selected advertisement on the TV monitor 108. If the program being watched by the viewer contains information regarding the length of the commercial break, the preference agent may select stored ads of appropriate length to insert in the allotted time slot. The preference agent may further keep track of the ads that have been previously played to ensure that all stored ads are displayed equally. Alternatively, tagged ads may contain the desired number of times that the advertisement provider wants the ad to be aired during any given day, or perhaps the specific times at which the ad should be shown. Thus, after a number of ads having been stored, e.g. sufficient for a 24 hour period, the preference agent may review all of the stored ads meta data and develop a strategy for showing these ads to the viewer including when and how often.

Alternatively, the preference agent may cause a certain number of ads to be displayed and direct the recording manager 112 to record the selected program if the stored ads being displayed run longer than the allotted time slot for the commercial break. The control system 2 of the present invention can therefore manipulate the broadcast schedule of a program to a certain extent by modifying the amount of advertising content that the viewer is subjected to.

In another embodiment, the advertising channels may be operational for only a limited time during the day, typically at off-peak hours (e.g. 2 a.m.), during which all advertisements for the coming day may be downloaded and stored. Thus, an advertising channel may be turned on at a certain time and stream all advertisements to the control system during the space of an hour or two. Alternatively, a regular programming channel may suspend programming for an hour or two at a convenient time and supply the advertisements for the following day. In yet another alternative, a dedicated connection such as a phone line or an internet connection may be used for periodic downloads of advertisements.

In an alternative embodiment, multiple advertising channels carry a mixture of advertisements such that at any given time the preference agent has the option of selecting at least one advertisement targeted to the viewer from one of these channels. In this embodiment the control system need only to store one advertisement at any given time to ensure continuity between the program being watched and the advertisements. Thus, by way of example, the commercial break in the program may occur at a time that does not correspond to the beginning of an advertisement on any of the advertising channels. In this case, the advertisement stored by the control system is directed through the program source switch to the TV monitor while another targeted advertisement is concurrently stored for subsequent display. If the commercial break happens to coincide with the start of a targeted advertisement on any of the advertising channels, the preference agent can simply cause the program source switch to direct the particular channel to the TV monitor while another advertisement from another advertising channel is being stored.

In another embodiment, each regular programming channel can carry multiple, multiplexed versions of an advertisement. When a commercial break occurs, the preference agent selects the most appropriate version of the advertisement and directs it to the program source switch. This embodiment would require additional circuitry to de-multiplex the various versions of each add and apply the particular version selected by the preference agent to the program source switch.

The novel method of delivering targeted advertising that is provided by the invention is extremely advantageous to the advertising community. In one aspect, the invention allows greater freedom in producing advertisements because they no longer need to be appealing to as wide and varied an audience. Furthermore, because the alternative advertisements are delivered in real time, all viewers are reached by individualized advertisements at the same time, thus providing significant time savings in comparison with the prior art, wherein five different advertisements would require five different time slots during which to be broadcast. The cost savings thereby realized, especially during very popular events such as the Super Bowl, can be significant.

As mentioned above, preference agent 110 may sort through available channels to select the ten (or any other number) programs currently playing that most closely match the viewer's viewing profile. In addition, the preference agent may also build customized listings of future programs based upon the viewer's profile as well as any additional criteria specified by the user. In a preferred embodiment the user will have the ability to fully customize his viewing profile, including the values assigned to the different parameters that make up his or her viewing profile. In an alternative embodiment the user may even be allowed to specify what kind of advertising he prefers. Such a configuration would likely generate an alternative billing arrangement, whereby the user agrees to watch advertisements in exchange for the ability to specify the types of advertising he wishes to be subjected to and perhaps some sort of financial incentive.

Another novel possibility engendered by the present invention is the creation of a 'personal channel' that is always showing the most interesting program being broadcast at any given time and/or previously recorded and stored programs that were very close matches to the viewer's profile. Thus, turning on to the personal channel will always guarantee the viewer the most individualized, interesting viewing experience available based upon the programs broadcast during a certain preceding time period that the viewer may specify. The personal channel may thus show a collage of movies, news segments, sports events, and any other programming content that was broadcast during the preceding 24 hours and that matched the viewer's profile to within a specified degree.

An additional element of control system 2 that may be incorporated only in selected control systems is a privacy filter 37 that deletes any personal information from the demographic database and transmits this anonymous information to the system administrator 27 for purposes of maintaining and updating the model used to generate the demographic database. Such models of the control system will require a feedback line for transmitting the demographic information to the system administrator, and in a preferred embodiment is a telephone line or a dedicated internet line such as DSL, cable, etc. The system administrator may offer financial or other incentives to users to convince them to supply this type of information. By carefully selecting users across a wide demographic cross section, the system administrator can use the information thus gathered to enhance the model used to develop a viewer's demographic profile based upon his or her viewer profile by comparing these users' actual demographic data with the demographic profile developed by the preference agent.

Due to the narrowly focused nature of the advertising delivered by the invention, the targeted advertising developed for delivery by the control system of the invention may include novel elements such as coupons or highly targeted descriptions. Thus, targeted advertising developed for distribution via the present invention may include specific information, couched in specific language, that is intended to be especially appealing to the target audience.

The invention further allows the creation of highly targeted content other than advertisements that can be delivered only to a very specific audience. Thus, movies, shows, religious programs, video magazines, infomercials, etc., may be developed to reach a very specific audience without the restrictions typically imposed on the content developers when the program will reach, or at least be accessible to, a very wide audience. This embodiment will require that such specific content be supplied via dedicated channels that cannot be tuned to directly by a conventional TV tuner, and thus may only be accessed through the control system 2. Such highly targeted content may be provided by alternative content suppliers 25 or even be developed for alternative distribution by conventional programming suppliers 23. Thus, use of the present invention may create a new distribution medium that will allow the content providers to not only reach a very specific audience but also to remotely, automatically exclude certain segments of the audience from accessing this material. Such alternative content could be broadcast exclusively on a viewer's personal channel, as described previously.

The popularity and acceptance of the system of the present invention will depend largely upon the cost to the end users, i.e. the viewers. As such, in one preferred financial arrangement, the user pays a set price for the control system, i.e. the hardware, connects the control system to his TV and incoming cable or satellite dish line, and enjoys the personalized services provided by the control system at no further cost. The system administrator will provide tagged advertisements for broadcast by the broadcast network and charge a fee to the advertisement client. The actual advertisements may be provided by an advertising content supplier or the advertising client itself (e.g. a truck manufacturer), to which the system administrator tags the meta data. The fee may be based upon the total number of control systems installed and/or the target audience that the advertising client wishes to reach. Thus, if a client wishes to air advertisements that are tagged to reach a relatively wide audience of viewers who have purchased and presumably installed the control system of the invention, the fee charged will be proportionally higher than the fee charged for a more narrowly focused advertisement.

Preference Determination System

The following portion of the disclosure discusses one preferred embodiment of a system according to the present invention, referred to as the MbTV system, and provides practical working details regarding the hardware and software implementation of such a system.

Technology Overview

With reference to FIG. 44, MbTV is a set of software libraries that can be integrated with a resident host application, known as the Controlling Application (CApp) on a Set-Top Box (STB). The resident host application manages the overall control in the STB and interfaces with the MbTV libraries to invoke MbTV functionality. The core services provided by MbTV include automatic viewer preference determination and automatic content-based storage management. Depending on application requirements, MbTV customer libraries can be extended to include such capabilities as automatic recognition of multiple viewers on STBs, targeted advertisements, ad management, content aggregation and presentation, statistical audience measurement and targeted product catalogs. The exact configurations of services included are determined by the customer's implementation requirements.

Data or information that any MbTV services generate can remain at the STB, which does not require remote storage or a back channel mechanism to be functional. Privacy is inherently built into the MbTV architecture.

Some of the services MbTV technologies provide require operational server-side MbTV components. MbTV libraries also assume the availability of some basic services in the STBs. These services are typically available in some form in all STB configurations and include access to Electronic Program Guide (EPG) data mechanisms to control the TV tuner, a DVCR library, and User Interface (UI) management by the Controlling Application.

Technology Applications

Customers can use MbTV technology to build a variety of applications for a STB environment, depending upon consumers' requirements. For instance, a customer could design applications that personalize EPGs, personalize video recorders, and provide video on demand (VOD) systems.

System Architecture

The main control of the MbTV enabled system resides in a Controlling Application (CApp), which interfaces with various modules (including the MbTV modules) of the system to manage the aggregate functionality. The Controlling Application manages the control flow and the User Interface (UI) for the system, and calls the appropriate modules to execute user requests.

The two main components of the MbTV system, controlled by the CApp, are the Preference Determination Module, or PDM, and the Storage and DVCR Manager, or SDM. The Controlling Application notifies the PDM, also sometimes called the Preference Engine, of a viewer's TV viewing behaviors and choices. It invokes the various services the Preference Engine provides, such as generating ratings and personalizing theme searches. It assumes the availability of an external EPG library for its internal processing.

All viewer requests that require access to local storage, such as list creation, DVCR instruction, and filter management are routed through the SDM. The Storage Manager passes user requests to underlying modules for actual execution. All other functions of the system, such as a tuner control, conditional access, and UI management, are handled by the Controlling Application directly.

The actual implementation of this architecture may vary, depending on the customer's system configuration and application requirements. FIG. 44 is a graphical representation of the architecture of a system integrated with MbTV software modules.

System Configurations

The system of the present invention as embodied by the MbTV system described herein provides a scalable technology that customers can adapt to the resources are available in a specific configuration. The present specification includes examples of methods to tailor the MbTV technology to suit varying configurations. The services available to these various configurations are also discussed.

Systems Without Local Storage

MbTV technology can easily be adapted to systems with only local storage. Customers can tune MbTV to scale down its persistent memory requirements to fit low-end systems with small amounts of persistent storage (between 4 Kb and 16 Kb). Such configurations do not include the Storage Manager (SDM) or program recording services. While basic program rating functionality is unaffected in these configurations, some of the more sophisticated personalization services, such as targeted ads, would be suitably scaled down to meet memory requirements.

Personal Video Recorder Systems

Systems with DVR capabilities are the most typical configurations supporting MbTV functionality. On the customer side the system is integrated with the Preference Determination Module and the Storage Manager. All recording requests are forwarded to the DVR library (or DVCR) through the Storage Manager. The Storage Manager controls the storage, retrieval and deletion of all content on the local storage.

Video on Demand and ADSL-Based Server-Switch System

The head end, where the Preference Engine and the Storage Manager reside, controls these configurations, transporting viewer requests through a back channel to the head-end for processing. The system stores all recorded content at the head-end and presents it at the viewer's TV set upon request. Such systems support all MbTV functions with no loss in functionality.

Design Aspects

The MbTV technology disclosed herein is designed to function according to customer requirements, represented by consumer electronics environments. Ease of use and reliability were given high priority in designing MbTV software modules, and were thus developed to be independent of platforms and operating systems by employing modular architecture and well-documented APIs for all external interfaces.

Main Features

A list of the main features of the Preference Determination Module (PDM) and Storage and DVCR Manager (SDM) follows.

Preference Determination Module

Generates a personalized rating for programs

Generates a list of top MbTV rated programs for any requested time

Learns viewer's preferences automatically by monitoring TV watching behavior

Generates meaningful MbTV ratings as soon as the viewer STB activates the PDM

Learns up to 80% of viewer's preferences within a predetermined period of time, preferably three weeks of average viewing (assuming 7 hours/day of TV viewing)

Allows detailed level of customization for power viewers, such as deactivating viewing and modifying viewer profiles Allows a personalized theme search to generate programs matching specified criteria Customizes learning activities by deactivating learning according to specified criteria Modifies MbTV ratings on a per-program basis Provides a private interface to SDM to optimize storage management Allows individual customization in multi-viewer households Automatically optimizes the list of Top MbTV rated programs for the current set of viewers at the time of the request Detects whether the TV is in use.

For a more detailed list of PDM features see detailed discussion of the PDM elsewhere in the disclosure.

Storage and DVCR Manager

Automatically creates a list of desirable programs to be recorded

Automatically instructs the DVCR to record and delete appropriate programs

Creates a schedule for recording and deleting programs that maximizes the value of available storage space Specifies explicit programs to be recorded Specifies customized filters to capture specific types of program Manages storage space allocation by using storage budgets Explicitly locks recorded programs to prevent automatic deletion Implicitly locks programs to prevent automatic deletion if program is likely to be watched again Controls aging of implicit locks Automatically determines programs to delete Resolves conflicts among programs scheduled for recording Creates virtual channels containing recorded programs, for convenient presentation Manages playback of virtual channels Provides EPG information for virtual channels Provides a simple, unified interface by which to access DVCR functionality Displays the expected list of programs to be recorded, before actually recording them Allows viewers to modify the list of programs to be automatically recorded.

For a more detailed list of SDM features see detailed discussion of the SDM elsewhere in the disclosure.

Architecture

PDM

The MbTV PDM is a machine learning system for a STB environment that learns about a user preference in TV programs by monitoring viewing activity. The knowledge gained by the learning process, which may also be referred to as a user profile, is then used to recommend programs that match the learned TV viewing preference. The learning process employs a wide variety of techniques ranging from statistics, Bayesian probability, to fuzzy logic and concepts of AI. Depending on the implementation requirements the PDM can be implemented as an independent library that could be used to simply rank TV programs. Alternatively when the automatic recording of desirable programs and enabling DVCR functionality for live broadcast channels is included in the implementation requirements, the PDM module could work in conjunction with a Storage and DVCR Manager (SDM) to facilitate automatic recording of TV programs based on the resident user profile. The PDM can be implemented in two ways:

As an independent library that ranks TV programs

As a facilitator of automatic program recording. The decision to record is based on the resident user profile. The PDM also enables DVCR functionality for live broadcast channels. This implementation requires that the PDM module work in conjunction with the Storage and DVCR Manager (SDM), discussed in Section 2.6.

Customer applications can use the data structures and functions in this section to target and manage advertisements, personalize Electronic Program Guides (EPGs) and VCRs, and perform other tasks suitable to your business requirements.

PDM Basic Operations

The PDM operates as a library, providing functions that compute preference determination. It monitors the click stream, the sequence of IR commands issued by the user, and uses this input with EPG information to generate a preference profile. The PDM provides a callback function to the CApp that specifies the requests the user generates during a TV viewing session. The PDM then processes these requests.

The PDM maintains an internal subset of EPG information for all the time periods spanning active viewing sessions, and generates viewer program records from the channel change information provided by the PDM callback function. This data is then used to generate a Preference Database, which creates and updates the user profile.

The PDM interface includes a number of functions.

Callback functions. These are mandatory functions, and must be invoked by the CApp for the PDM to function. The CApp invokes these functions in response to specific user events, with as little delay as possible.

Service functions. These functions provide the PDM services, and their invocation by the CApp is optional unless otherwise specified.

Housekeeping functions. These are mandatory functions that perform various housekeeping tasks for the PDM. They must be invoked by the CApp, but invoking them is not as time-critical as the callback functions.

Proper functioning of the PDM also assumes certain support functions from the CApp.

EPG library functions. These are EPG specific functions that control EPG-related data. The PDM may invoke them in the context of a low-priority thread or from one of the PDM functions. Unless otherwise specified, there are no restrictions under which these functions may be invoked.

OS support functions. These are general-purpose functions, usually provided by the operating system that hosts the CApp.

In addition to the features detailed above, the feature set of the PDM may also include:

Automatic learning of viewer preferences from user requests generated in an active viewing session Generate personalized rating (MbTV rating) for programs Generate a list MbTV rating programs for any requested time in order of preference and optimized for the viewers currently active Ability to manually train the MbTV PDM Override MbTV selections in choice of programs Disable automatic learning feature based on certain criteria Provide personalized theme search to generate best programs by genre Automatic recognition of the current set of viewers Manual creation of profiles for multiple viewers in the household Allow profile configuration to activate/deactivate a profile and freeze a profile Allow explicit login and logout Automatic logout for explicit logins based on current TV viewing behavior.

A graphical representation of the STB architecture that includes the PDM is given in FIG. 44. The main control of the STB resides in a Controlling Application (CApp) which interfaces with various modules (including the PDM) of a STB to manage the aggregate functionality of a STB. The CApp manages the UI for the STB and calls the appropriate modules to execute user requests. All user requests typically associated with TV Viewing (such as channel change operations) are passed to the PDM. Specific requests to rate programs and control automatic learning are also passed to the PDM.

The PDM also provides the basic functionality of rating programs that are viewed on a MbTV enabled Set Top Box (STB). These rating could be used to generate the list of favorite show for that STB.

The other functionality provided by the PDM is to map the viewing patterns exhibited in the STB to a pre-determined number of clusters.

A cluster is also referred to as a profile. The number of clusters is either specified by the CApp or set to some default value by the PDM.

The PDM is comprised of several modules which interact with each other to provide the above aggregate functionality. These modules execute in 2 distinct contexts or in 2 separate threads of execution, the foreground context (also referred to as executing as a foreground task) and the background context (also referred to as executing as a background task).

Foreground Tasks

The foreground tasks are initiated by the Controlling Application (CApp) in response to actual requests made by the viewer. Of all the request made by a viewer, some of the request are communicated to the PDM only as event notifications, while some of the requests are actually passed to the PDM for further processing.

Event Notifications

One of the most important user requests which is passed by the CApp to the PDM as an event is the channel change event. Each channel change request is monitored by the Viewing Record Manager (VRM) module of the PDM. The VRM uses consecutive channel change operations events to determine the length of the viewing time for a channel. The length of viewing time so determined is stored in a viewer record along with the time of the viewing event and the channel id. Information on which profiles are active at the time of creating the record is also stored in the viewing record. The VRM invokes a PIM function which returns the probability value of the profile being active for all the profiles.

Viewing records whose viewing duration are below a certain threshold are ignored and not processed. The viewing records created by the VRM in the foreground context are then stored for further processing in the background context.

In addition to generating viewer records for future processing, the VRM also forwards the event notifications from the CApp to the PIM.

The PIM uses these notification events to generate its own records which would be processed in the background context to generate clustering information and determining the current profile mix. For details on the records created by the PIM in the foreground context please refer to the PIMEventRec structure defined in the document titled "Interface Specification for Profile Identification Module".

PDM Request Processing

The requests which are actually processed by the PDM are requests to generate top 10 list of preferred programs, adjustment of MbTV rating of programs, controlling PDM learning behavior & profile operations (such as creating & deleting profiles, modifying profile operation, logging in/out profiles). References to "top 10 list" are meant to denote MbTV picks returned by the functions MbTVGetBestPrograms and MbTVGetCriteriaBasedBestPrograms, as described below.

Background Tasks

The primary responsibility of the background task is to process the viewing records generated by the VRM in the foreground context. The basic inputs for further processing are the viewer records, PIMEventRec records and the EPG data for the programs available during the viewing session for all the viewing record.

The Background Task interacts with all the PDM Modules and co-ordinates and synchronizes all the activity executed in the background context. If there are no background tasks to be done or all background tasks are currently completed, the background task goes to sleep. This task is either wakes itself up to complete scheduled tasks or is woken up by the VSM module when it generates a power on event. The tasks handled by the background task are:

copying of the EPG data for periods when the Viewing Device is active. This handled by the Internal EPG Manager (EM) and is described in the document "IEM_Pat .doc".

processing the viewer records to determine which programs were watched. This handled by the VRM in background context. When the viewer record are first generated in the foreground context, the duration might actually include more than a single program.

Such records are further split so that each viewer record refers to a single program. For example if a viewer watches channel NBC without changing channels from 8:00 pm to 9:00 pm a single viewer record is generated in the foreground context. However during this period the programs available could have been "Friends" (from 8:00-8:30 pm) followed by "Fraiser" (from 8:30-9:00 pm).

During the background processing of VRM records such records whose duration straddle multiple programs are split so that each record refers to a single program. In the above example the above record is replaced by 2 new records (NBC at 8:00 pm for 30 minutes and NBC at 8:30 pm for 30 minutes).

In addition to sub-dividing viewer records, the VRM also determines which programs have been watched. Each program that is watched by the viewer beyond a certain threshold is communicated to the Viewing History Module (VHM). Input to the VHM for each program viewed is:

the channel id associated the channel on which the program was watched time at which this program was available.

The VHM uses the above information to query the EM to get the title, subtitle and episode title of the program watched. The title, subtitle & episode title strings returned by the EM are used to generate a unique 4 byte id. This is then stored by the VHM to keep a track of the programs watched on the STB.

updating the Category Database (CDB) using the processed viewer records and the internal EPG data. This task is handled by the Category Database Manager (CDB). The CDB takes as input the viewer records and the EM EPG data and generates liking records which are then inserted or updated in the CDB.

updating the profile to refine the cluster information and compute the current profile mix. The background task schedules the function to compute the profile mix often enough so as to keep the generated profile mix current.

scheduling backups to save all the generated information onto some persistent memory device. This is handled by the I/O manager on a periodic basis (once a day) to save all the PDM generated data.

In addition to the daily scheduled backup, the I/O manager also handles unscheduled backups if requested by some other PDM module. This data backup is used as an error recovery mechanism in the event of a power failure. When booting up the STB, it is the I/O manager's responsibility to restore the previously saved MbTV generated data.

The data which is backed up (and restored when booting up) includes the CDB, the VHM data and the String Table. If there are any unprocessed viewer records these are backed up (& restored) as well along with the EM records.

Preference Determination Engine

The preferred Preference Determination algorithm uses the principles of a Bayesian classifier to rate programs. The rating given to a program is the probability that the program would be watched by the user. This rating is computed independent of other programs in the lineup, so this is not the probability of the user picking the program from the lineup. The rating is only an indication of how appealing a particular program is to a user.

The probability that a user may watch the program is computed as the probability of the user watching a program given all relevant information available about the situation, P(w/info). For example, in a channel lineup with 50 channels, all channels showing different programs with no information available about the channel line up or the program in those channels, the probability that a user may choose any of these programs is $1/50$, i.e. P(w/info)=$1/50$, where info is NULL. If we know the probability of the user picking a program from TNT is $1/5$, then P(w/info)=P(w/channel=TNT)=$1/5$.

If we know all parameters which are relevant and can compute P(w/all relevant parameters), we may obtain the most accurate computation of P(w/info). But we cannot monitor all parameters which influence the viewer's choice of programs. This is due to two reasons: a) some of the parameters may be unknown or cannot be measured, and b) the memory and processing power needed to store all relevant parameters may be too high.

We approximate P(w/info) to P(w/monitored parameters) where the monitored parameters are the most relevant N parameters which we can afford to monitor within our limited resources.

There are numerous ways to compute P(w/monitored parameters). One method is to approximate P(w/monitored parameters) as a function of monitored parameters and compute the coefficients of this function. Any standard regression technique can be used to compute the coefficients of this function. The problem with this approach is that we need to maintain a rather large matrix of information regarding the effects that each parameter, or any arbitrary combination of parameters, has on watching of programs. We therefore preferably employ a different technique to approximate P(w/monitored parameters).

We directly monitor P(w/set of parameters) for different sets of parameters. We qualify the sets of parameters observed by assessing the relevance of the set and also the information content of P(w/set of parameter).

Since we monitor only P(w/set of parameters) for different sets of parameters, we will have to compute P(w/monitored parameters) using the values of P(w/set of parameters) which are monitoring. We use the following principle to compute P(w/monitored parameters):

$$P(w/a,b)=P(w/a)*P(w/b)/P(w)$$

if a and b are non correlated.

If a and b are correlated and if P(w/b) is greater than P(w), we approximate $$P(w/a,b)=P(w/a) \text{ if } P(w/a)>P(w/b).$$

This is a good approximation as the most likely values of P(w/a,b) would be between P(a/b) and P(w/a)*P(w/b)/P(w). This is a conservative estimate for P(w/a,b) and thus may be less than the actual value of P(w/a,b).

Since the combination of monitored variables which we are interested in may occur only very rarely, the observed value of P(w/set of parameters) may not be very reliable. In this case we have to assign a weight to this monitored variable which is proportional to the confidence we have for the value of P(w/set of parameters).

If the parameters we are monitoring are a, b, c, d and e, and if we need to compute P(w/a,b,c,d,e) we use the following method to approximate P(w/a,b,c,d,e):

1. Check if P(w/a,b,c,d,e) is monitored. If it is, find out the confidence we have for the monitored value. If the confidence is more that a predefined threshold, use this value as the P(w/a,b,c,d,e).
2. If the confidence is not below the threshold, use the confidence value to weight P(w/a,b,c,d,e).
3. Deduce different ways to compute P(w/a,b,c,d,e) from the monitored combinations of parameters like P(w/a), P(w/c,d,e), P(w/a,b,c) etc. This is done by finding P(w/set of parameters) with the most number of parameters of interest (e.g. choose P(w/a,b,c,d) from the list of possible choices of P(w/a), P(w/a,b), P(w/a,b,c) and P(w/a,b,c,d) and finding the complementary P(w/X) which contains the rest of the parameters (e.g. complementary value for P(w/a,b,c,d) will be P(w/e) if we are trying to compute P(w/a,b,c,d,e)).
4. If the pair of values chosen to approximate P(w/a,b,c,d,e) are P(w/a,b) and P(c,d,e) then choose the bigger of these values as the approximation for P(w/a,b,c,d,e). Weight this with a confidence value which is a function of the number of records we have for P(w/a,b) and P(c,d,e).
5. Combine the computed value of P(w/a,b,c,d,e) and the monitored value of P(w/a,b,c,d,e) using the confidence value to weight each of these values.

PDM Interface Data Structures

The C programming language data structures required by the PDM-CApp interface for the preferred embodiment of the MbTV system disclosed herein are described below.

cBackInfo_t

This C structure is used by the CApp when invoking the PDM callback function for event notification. Event notifications are typically associated with channel change operations and the start or completion of a DVCR operations.

The structure definition of cBackInfo_t is given below.

```
typedef struct __cBackInfo__
{
    int currEventType;
    int prevEventType;
```

```
        time_t      eventTime;
        time_t      eventDuration;
        void*       channelID;
        int channelType;
        int errorNum;
        int reserved;
} cBackInfo_t, *pcBackInfo_t;
```

The semantics of the various fields in the above structure is the following.

currEventType stores the event type which invoked the callback. Possible values for currEventType are

```
#define MBTV_POWER_ON           1
#define MBTV_POWER_OFF          2
#define MBTV_REWIND             3
#define MBTV_FAST_FORWARD       4
#define MBTV_PAUSE              5
#define MBTV_RESUME             6
#define MBTV_PLAY               7
#define MBTV_JUMP_TO_LIVE       8
#define MBTV_CHANNEL_CHANGE     9
#define MBTV_ADD_CHANNEL        10
#define MBTV_DEL_CHANNEL        11
#define MBTV_STOP               12
#define MBTV_RECORD             13
#define MBTV_SKIP_FORWARD       14
#define MBTV_SKIP_BACKWARD      15
```

The above events are defined below.

The MBTV_POWER_ON event indicates a transition in the TV Viewing Device from the inactive to the active state.

The MBTV_POWER_OFF event indicates a transition in the TV Viewing Device from the active to the inactive state.

The MBTV_REWIND event indicates the start of the rewind operation. Information on the duration by which a program has been rewound is available later through a separate stop event.

The MBTV_FAST_FORWARD event indicates the start of the fast forward operation. Information on the duration by which a program has been fast forwarded is available later through a separate stop event.

The MBTV_STOP event indicates the termination of the current DVCR request. Information available through this callback is dependent on the DVCR operation that has been terminated. The callback indicates the operation that has been terminated and specifies the relevant duration of the concluded operation.

The MBTV_PAUSE event indicates pausing of playback or recording on the current channel. This event is not used to indicate the stopping of a rewind or fast forward operation.

The MBTV_RESUME event indicates resumption of playback on the current channel that was paused.

The MBTV_PLAY event to indicate start of playback on the current channel. Playback operation that are initiated due to a channel change operation are not indicated through this event.

The MBTV_JUMP_TO_LIVE event indicates invocation of the Jump to live request.

When channelType is set to CHANNEL_TYPE_VIRTUAL, the MBTV_ADD_CHANNEL & MBTV_DELETE_CHANNEL events indicate addition or deletion of a virtual channel. Each program that is recorded is associated with a Virtual Channel and the recorded program is considered to be available on that Virtual Channel. Creation and deletion of stored programs are synonymous with program recordation and deletion.

When channelType is set to CHANNEL_TYPE_LIVE, the MBTV_ADD_CHANNEL and MBTV_DELETE_CHANNEL events are used to indicate changes in the live broadcast channel lineup.

Changes in the subscription of live premium channels are also indicated with the MBTV_ADD_CHANNEL and MBTV_DELETE_CHANNEL events. When indicating a subscription to a live premium channel, the currEventType field is set to MBTV_ADD_CHANNEL and the channelType field has the CHANNEL_TYPE_LIVE and CHANNEL_TYPE_PREMIUM bits set. To indicate an un-subscription of a premium channel, the MBTV_DELETE_CHANNEL event is used with the channelType field set as above.

The MBTV_SKIP_FORWARD & MBTV_SKIP_BACKWARD events indicate the completion of a skip forward or a skip backward operation.

The MBTV_CHANNEL_CHANGE event indicates a channel change operation.

The MBTV_RECORD event indicates start of a record operation.

prevEventType is valid only if the currEventType is set to MBTV_STOP or MBTV_PAUSE. The prevEventType field stores the DVCR operation that has been stopped or paused explicitly by a requested stop or pause operation or implicitly by an EOF/BOF condition. Legal values of prevEventType, when currEventType is set to MBTV_STOP, are MBTV_FAST_FORWARD, MBTV_REWIND, MBTV_PLAY and MBTV_RECORD. Legal values of prevEventType, when currEventType is set to MBTV_PAUSE, are MBTV_PLAY and MBTV_RECORD.

eventTime stores the time in GMT format at which event occurred.

eventDuration contains context dependent information. When prevEventType is set to MBTV_REWIND or MBTV_FAST_FORWARD, eventDuration stores the amount of time (in seconds) by which the current program has been rewound or fast forwarded. When prevEventType is set to MBTV_PLAY or MBTV_RECORD, eventDuration contains the playback duration or recording duration. When currEventType is set to MBTV_RESUME eventDuration contains the playback duration or recording duration depending on the operation that was resumed. The CApp does not provide information on the operation which has been resumed and assumes that the callback target maintains the necessary context information. When prevEventType is set to MBTV_SKIP_BACKWARD or MBTV_SKIP_FORWARD, the duration field is set to the amount of time that has been skipped backward or skipped forward respectively.

channelID stores the channel ID of the channel associated with the event.

channelType stores the channel type as to whether it refers to a live broadcast channel or a Virtual Channel for a pre-recorded program. Information in this field is stored in a bit-wise manner. For live broadcast channels, an additional bit, CHANNEL_TYPE_PREMIUM, is used to indicate premium channels. Possible values of channelType are

```
#define CHANNEL_TYPE_LIVE       0x01
#define CHANNEL_TYPE_VIRTUAL    0x02
#define CHANNEL_TYPE_PREMIUM    0x80000000
``` reserved is a reserved field and should accessed or modified by the PDM.

pgmInfo_t

This C structure is used by the CApp when invoking the PDM service functions to get rating of TV programs. The structure definition of pgmInfo_t is given below.

typedef struct_pgmInfo_

```
{
    void*   channelID;
    int     channelType;
    char*   pgmTitle;
    short   pgmTitleLen;
    time_t  pgwStartTime;
    float   pgmRating[MBTV_MAX_NUM_PROFILE];
    int     pgmDuration;
    int     pgmRank;
    uint    pgmReserved;
} pgmInfo_t, *ppgmInfo_t;
```

The semantics of the various fields in the above structure are the following.

channelID stores the channel ID associated with the channel in which the program is being played.

channelType stores the channel type as to whether refers to a live broadcast channel or a Virtual Channel for a pre-recorded program. Possible values of channelType are as described in the pervious section.

pgmTitle stores a pointer to a string describing the title name. It points to a valid memory location allocated by the owner of the pgmInfo_t structure. The number of bytes allocated for the title string is specified in the field pgmTitleLen.

pgmTitleLen is used both as an input and output variable. On input it specifies the number of bytes allocated for storing the title string including the string terminator. On output it specifies the actual length of the title string. The title string is truncated if the title string length is more than the number of bytes specified in pgmTitleLen on input. pgmTitleLen is set to 0 if no program is available during the time specified in pgmStartTime.

pgmStartTime stores the start time of the program in GMT format or any time within the program duration. It can also be set to 0 to specify the current time as the start time.

pgmRating stores an array of MbTV generated rating for this program.

pgmDuration stores the duration of the program in minutes.

pgmRank stores the rank of the program in a list of specified list of programs.

pgmReserved is reserved for future use and its contents are ignored by the PDM.

profile_t

This C structure is used by the CApp to set and modify various parameters associated with a profile. The structure definition of profile_t is given below.

typedef struct_profile_

```
{
    ulong   id;
    int     probability;
    ulong   status;
#define PROFILE_DISABLED    0x01
#define PROFILE_FROZEN 0x02
    char    name[MBTV_MAX_PROFILE_NLEN];
} profile_t, *pprofile_t;
```

The semantics of the various fields in the above structure are the following.

id uniquely identifies this profile.

probability specifies the probability as a percentage value of the profile being currently logged on either explicitly by a viewer or implicitly as deduced by the PDM.

status is a bit-wise field and specifies the current state of the profile. When the PROFILE_DISABLED bit is set, all learning activity for this profile is suspended. The programs matching the preferences of such a profile are not considered by the PDM when generating top 10 lists. In configurations that support storage devices, recording storage space allocated for such a profile is released. When the PROFILE_FROZEN bit is set, only learning activity for this profile is suspended. The programs matching the preferences of such a profile are still considered by the PDM when generating top 10 lists and by the SDM during automatic recording.

name associates an alpha-numeric identifier with the profile.

prob_t

This C structure is used by the PDM to specify the set of profiles that are currently engaged in watching TV. This information is passed for each profile supported by the PDM as the probability of a profile being currently engaged in watching TV. The structure definition of prob_t is given below.

```
typedef struct_prob_
{
    ulong   profileId;
    int     probability;
} prob_t, * pprob_t;
```

The semantics of the various fields in the above structure are the following.

profileId specifies the profile.

probability specifies the probability of the associated profile being currently engaged in watching TV as a percentage value.

dfilter_t

This C structure is used by the CApp to provide learning deactivation information. Learning deactivation is based on channels and/or specific viewing times. The structure definition of dfilter_t is given below.

```
typedef struct_dfilter_
{
    ulong   id;
    void*   chnlID;
    int     deactivateStart;
    int     deactivateEnd;
} dfilter_t, *pdfilter_t;
```

The semantics of the various fields in the above structure are the following.

id uniquely identifies this learning deactivation filter.

chnlID stores the channel ID associated with the channel on which learning is being disabled. If this field is set to NULL, no channels are monitored for learning purposes during the time specified by the deactivateStart & deactivateEnd.

deactivateStart stores the start time of the deactivation period. Live TV programs available during the deactivation period are not monitored for learning purposes. This field is specified in 24 hour hhmm format.

deactivateEnd stores the end time of the deactivation period. This field is specified in 24 hour hhmm format. If deactivateStart and deactivateEnd are set to a negative value, the corresponding channel is no longer monitored to for learning purposes.

filterType_t

This C structure is used by the CApp to provide filter type information for all filter types supported by the CApp. Filter types are used to provide search parameters when requesting ratings of programs matching a specified search criteria or for controlling automatic storage configuration in the SDM. The CApp determines the number of filter types that are to be supported and it uses the filterType_t structure to pass filter type information to MbTV modules. Some examples of filter types are PROGRAM TYPE, PROGRAM CHANNELS, PERFORMERS, PARENTAL RATING etc.

```
typedef struct_filterType_
{
    ulong    filterTypeID;
    int      numEPGParams;
    int      epgParamNums[MBTV_MAX_NUM_SFILTER];
    int      epgDataType;
    #define  MBTV_TYPE_CHAR 1
    #define  MBTV_TYPE_INT16      2
    #define  MBTV_TYPE_INT32      3
    #define  MBTV_TYPE_UINT16     4
    #define  MBTV_TYPE_UINT32     5
    #define  MBTV_TYPE_SUBSTRING  6
    #define  MBTV_TYPE_STRING     7
    char filterTypeName[MBTV_MAX_FTYPE_NLEN];
} filterType_t, *pfilterType_t;
```

The semantics of the various fields in the above structure are the following.

the filterTypeID uniquely identifies each filter type. This field is passed to the SDM when creating SDM filters.

the numEPGParams field specifies the number of EPG parameters associated with this filter type.

the epgParamNums array stores the EPG parameters associated with this filter type. Most filter types are associated with a single EPG parameter, however there are instances of a single filter type being mapped to multiple EPG parameters provided all the mapped EPG parameters are of the same data type. A typical example of a filter type that is associated with multiple EPG parameters is PERFORMERS. EPG data for movies usually contain names of multiple performers.

the epgDataType field stores the data type of the EPG parameters associated with the filter type. In scenarios where multiple parameters are mapped to a single filter type, all the mapped EPG parameters must be of the same data type. Details on the data types enumerated above are:

MBTV_TYPE_CHAR to specify a single byte character.
MBTV_TYPE_INT16 to specify a 2 byte integer
MBTV_TYPE_INT32 to specify a 4 byte integer
MBTV_TYPE_UINT16 to specify a 2 byte unsigned integer
MBTV_TYPE_UINT32 to specify a 4 byte unsigned integer
MBTV_TYPE_STRING to specify a NULL terminated string (to specify whole string matches)
MBTV_TYPE_SUBSTRING to specify a NULL terminated substring (to specify matches with a part of a string).

the filterTypeName stores the name of the filter type in a NULL terminated string.

srchFilter_t

This C structure is used by the CApp to provide search data when searching for best programs based on a specified criterion. The structure definition of srchFilter_t is given below.

```
typedef struct_srchFilter_
{
    ulong    filterTypeID;
    char     searchString[MBTV_MAX_NUM_SFILTER]
                         [MBTV_MAX_SFILTER_PLEN];
}srchFilter_t, *psrchFilter_t;
```

The semantics of the various fields in the above structure are the following.

the filterTypeID identifies the filter type associated with this search criteria. The filterTypeID is used to get information on which parameters of the EPG yield information corresponding to this filter.

the searchString array field stores the search string associated with the search filter. The CApp converts non-string data into a NULL terminated string before being passed it in the srchFilter_t structure. If the filter type corresponds to Program Channel, possible values for the search filter string could be CNN, TNT etc. Alternatively if the filter type corresponds to Program Type, possible values for filter string could be sitcoms, talk show etc. The number of strings specified in the searchString array could be less than or equal to the number of EPG parameters specified in the associated filter type. For filter types which are mapped to multiple EPG parameters, each string passed in searchString array is searched in all the EPG parameters specified in the associated filter type.

PDM Interface Functions

The interface functions provided by the PDM are described in the following sections.

PDM Callback Functions

These functions are mandatory functions which must be invoked by the CApp for the PDM to function correctly. The CApp invokes these functions to indicate user requests to the PDM.

MbTVCallback
void
MbTVCallback(struct cbackInfo_t* pcBackInfo)

This function is called during a channel change event, when a DVCR function (such as pause, resume, play, rewind or fast forward) is invoked, during a channel lineup change event, during a TV Power on event or a TV Power off event. (TV Power on & TV Power off events do not alter the power status of the Set Tob Box but of the TV viewing device only). pcBackInfo points to a structure of type cBackInfo_t allocated by the CApp. The CApp is free to use this structure on returning from.

PDM Service Functions

These functions expose the services provided by the PDM. These functions are invoked to rank programs based on the preferences of a user profile.

MbTVGetProgramRating
int
MbTVGetProgramRating(struct pgmInfo_t *pgmInfo)

This function computes the MbTV rating of the TV program specified in the pgmInfo_t structure pointed to by pgmInfo. A composite rating is computed for the profile/ profiles currently logged on, either logged explicitly by the viewer or implicitly as deduced by the PDM. This composite rating is returned in the first element of the pgmRating array. Alternatively MbTVGetProgramRating could also be used for computing the ratings for all the currently active profiles. A profile is considered to be active if it is not in a disabled state. The rating for each of the individual profiles is returned in the pgmRating array. A negative number is returned for an inactive (ie disabled) or deleted profile.

The CApp allocates the pgmInfo_t structure and sets the channelID and pgmStartTime fields in the pgmInfo_t structure. The caller ensures that the pgmTitle points to a valid memory location in the callers address space and contains the program title in a NULL terminated string. Setting of the pgmDuration and pgmTitle fields by the CApp is optional.

If the pgmStartTime is set to 0, this functions returns that rating of the program currently available in the channelID channel. If the pgmStartTime does not match the start time of any program, MbTVGetProgramRating returns the rating for the appropriate program available at pgmStartTime time on that channel and updates the pgmStartTime with the corresponding start time. A composite rating is returned when the first element of the pgmRating array is set to 0 and profile specific rating is returned otherwise.

MbTVGetProgramRating returns a 0 value in case of success and a non zero error value is returned in case of failure. In case of success, the PDM initializes the pgmRating array either for a composite rating or for specifically for each profile. The rating for the Nth profile is returned in the N−1th location in the pgmRating array.

MbTVSortPrograms
int
MbTVSortPrograms(int progCount, pgmInfo_t *ppgmInfo[ ])

MbTVSortPrograms sorts the input list of TV programs in descending order of program preference with the most preferred program being given a rank of 1. This function automatically determines the profiles that are currently logged on and performs the sort operation based on the composite preferences of the profiles currently logged on either explicitly or implicitly as deduced by the PDM. The same set of programs might thus be sorted in a different order depending on which profiles are currently actively engaged in watching TV. Alternatively MbTVSortPrograms could also be used to sort the input list of TV programs based on the preferences of a specific profile.

progCount contains the number of programs to sort. ppgmInfo is an array of pointers for the TV programs which need to be sorted. The array of pointers and the corresponding pgmInfo_t structures are allocated by the CApp. The CApp sets the channelID pgmStartTime fields of all the programs referred to by the ppgmInfo array. The caller ensures that the pgmTitile points to a valid memory location in the callers address space and contains the program title in a NULL terminated string. Setting of the pgmDuration and pgmTitle field by the CApp is optional. Sorting based on the composite preference is done if all the elements of the pgmRating array are set to 0. Sorting is done based on a specific profile if the corresponding pgmRating array element is set to 1 and all other elements are set to 0. If the specified profile is an invalid profile or a deleted profile, an error is returned and the pgmRating array element is set to a negative number. An error is also retuned if the pgmRating array is not initialized as specified above.

This function would be called by the CApp in response to a user's request to rank programs. It is assumed the CApp can provide Program parameters for the programs specified in ppgmInfo.

On success a zero value is returned and a non zero error value otherwise. In case of success, the PDM initializes the pgmRank field of all the programs referred to by the ppgmInfo array. The contents of the pgmRating array are undefined when a composite sort is performed.

MbTVGetBestPrograms
int
MbTVGetBestPrograms(int progCount, pgmInfo_t* ppgmInfo[ ],
    time_t startTime, time_t endTime)

MbTVGetBestPrograms returns a list in descending order of preference of the top n TV programs starting between startTime and endTime where n is specified in progCount. This function automatically determines the profiles that are currently logged on and generates the best program list based on the composite preferences of the profiles currently logged on either explicitly or implicitly as deduced by the PDM. The same specified time period might generate a different set of programs depending on which profiles are currently actively engaged in watching TV. Alternatively MbTVGetBestPrograms could also be used to generates the best program list based on the preferences of a specific profile.

The array of pointers and the corresponding ppgmInfo_t structures are allocated by the CApp. startTime and endTime are specified in GMT format. The caller ensures that each pgmTitle pointer is set to a valid memory location in the callers address space if the pgmTitleLen field is set to an integer value greater than 0. Generating the list of best programs based on the composite preference is done if all the elements of the pgmRating array are set to 0. Generating the list of best programs based on a specific profile is done if the corresponding pgmRating array element is set to 1 and all other elements are set to 0. If the specified profile is an invalid profile or a deleted profile, an error is returned and the pgmRating array element is set to a negative number. An error is also retuned if the pgmRating array is not initialized as specified above.

This function would be called by the CApp in response to a user's request to get the most preferred programs.

On success a zero value is returned and a non zero error value otherwise. In case of success, the PDM sets the channelID, pgmStartTime, pgmDuration and pgmRank fields of all the programs referred to by the ppgmInfo array. The pgmTitle field is set only if the pgmTitleLen field is set to an integer value greater than zero. The array is sorted in descending order of pgmRank with the most preferred program having a rank of 1.

MbTVGetCriteriaBasedBestPrograms
int
MbTVGetCriteriaBasedBestPrograms (int progCount,
    pgmInfo_t* ppgmInfo[ ],
    time_t startTime, time_t endTime,
    int numFilters,
    srchFilter_t *psrchFilter)

MbTVGetCriteriaBasedBestPrograms provides the same functionality as the MbTVGetBestPrograms function with the difference being that only programs matching a specified criterion are considered.

The array of pointers and the corresponding ppgmInfo_t structures are allocated by the CApp. startTime and endTime are specified in GMT format. The caller ensures that each pgmTitle pointer is set to a valid memory location in the callers address space if the pgmTitleLen field is set to an integer value greater than 0. The search criteria are passed in an array of srchFilter_t structures pointed to by the parameter psrchFilter. The size of this array is specified in the parameter numFilters. Only those programs whose EPG data matches all the specified search criterion are considered when generating the list of preferred programs.

On success a zero value is returned and a non zero error value otherwise. In case of success, the PDM sets the channelID, pgmStartTime, pgmDuration and pgmRank fields of all the programs referred to by the ppgmInfo array. The pgmTitle field is set only if the pgmTitleLen field is set to an integer value greater than zero. The array is sorted in descending order of pgmRank with the most preferred program having a rank of 1.

MbTVGetNumProfiles
int
MbTVGetNumProfiles(int *cntProfile)

The CApp calls this function to get the number of profiles currently supported. The input parameter cntProfile is used to return the number of profiles currently available.

On success it returns a zero value and non-zero error value otherwise. The input parameter cntProfile is set when returning success.

MbTVGetProfileID
int
MbTVGetProfileID(int profileNum, ulong *profileID)

This functions is called to get the profile ID. Input to this function is an integer parameter, profileNum, set between 0 and N−1 where N is the return value of MbTVGetNumProfiles. The associated profile ID is returned in the parameter profileId.

On success it returns a zero value and non-zero error value otherwise.

MbTVGetProfileNumber
int
MbTVGetProfileNumber(ulong profileID, int *profileNum)

This function provides the reverse functionality of the MbTVGetProfileID functions and gives the mapping from the profile id specified by profileId to the profile number. The input parameter profileNum is set to a value between 0 to N−1 where N is the return value of MbTVGetNumProfiles.

On success it returns a zero value and non-zero error value otherwise. The input parameter profileNum is set when returning success.

MbTVAddProfile
int
MbTVAddProfile (ulong *profileID)

This functions is used to create a new profile with a set of predefined defaults. The maximum number of profiles that can be created is implementation specific and is set to some predefined upper limit. Calls to MbTVAddProfile fails when the number of filters created equals this predefined upper limit.

On success it returns a zero value and non-zero error value otherwise. On success the input parameter profileID is set to the profile ID of the newly created profile.

MbTVDeleteProfile
int
MbTVDelProfile (ulong profileID)

This function is used to delete the profile specified by the input parameter profileID.

On success it returns a zero value and non-zero error value otherwise.

MbTVGetProfileParams
int
MbTVGetProfileParams (ulong profileID, profile_t *pprofile)

This function copies the profile_t structure associated with the profile profileID into the profile_t structure pointed to by pprofile. pprofile points to an area allocated in the caller address space.

On success it returns a zero value and non-zero error value otherwise.

MbTVSetProfileParams
int
MbTVSetProfileParams (ulong profileID, profile_t *pprofile)

This function sets the profile parameters associated with the profile profileID as per the profile data in the profile_t structure pointed to by pprofile. pprofile points to an area allocated in the caller address space.

On success it returns a zero value and non-zero error value otherwise.

MbTVGetCurrentProfile
int
MbTVGetCurrentProfile(int numProfiles, prob_t *profileProbability)

This function returns information on which of the specified profiles are currently engaged in watching TV. The profiles of interest are passed in the profileID field of the prob_t structures pointed to by profileProbability. If the profileID field is set to NULL, information is passed for first numProfiles profiles supported by the PDM and the profileID field is set accordingly. The probability field is set to the probability of that profile being currently engaged in watching TV. A probability value of 100 indicates an explicitly logged in profile. A probability value above a predetermined threshold may be considered as a completely recognized profile.

On success it returns a zero value and non-zero error value otherwise.

MbTVLoginProfile
int
MbTVLoginProfile (ulong profileID)

This function is called to explicitly login the profile specified by profileID.

An explicit login is used as a mechanism to explicitly inform the PDM about the presence of a profile in a TV viewing session. Explicit logins also influences the program lists generated by MbTV functions such as MbTVSortPrograms, MbTVGetBestPrograms and MbTVGetCriteriaBasedBestPrograms.

On success it returns a zero value and non-zero error value otherwise.

MbTVLogoutProfile
int
MbTVLogoutProfile (ulong profileID)

This function is called to explicitly logout the profile specified by profileID. A profile might also be logged out automatically as the login session ages and the viewing behavior of a previously logged in profile diverges.

On success it returns a zero value and non-zero error value otherwise.

MbTVGetNumDFilters
int
MbTVGetNumDFilters(int *cntDFilters)

The CApp calls this function to get the number of learning deactivation filters currently supported. The input parameter cntDFilters is used to return the number of deactivation filters currently available.

On success it returns a zero value and non-zero error value otherwise. The input parameter cntDFilters is set when returning success.

MbTVGetDFilterID int

MbTVGetDFilterID(int dfilterNum, ulong *dfilterID)

This function is called to get the learning deactivation filter ID. Input to this function is an integer parameter, dfilterNum, set between 0 and N−1 where N is the return value of MbTVGetNumDFilter. The associated deactivation filter ID is returned in the parameter dfilterID.

On success it returns a zero value and non-zero error value otherwise.

MbTVCreateDFilter int

MbTVCreateDFilter (ulong *dfilterID)

This function is used to create a new learning deactivation filter. The maximum number of deactivation filters that can be created is implementation specific and is set to some predefined upper limit. Calls to MbTVCreateDFilter fails when the number of filters created equals this predefined upper limit.

On success it returns a zero value and non-zero error value otherwise. On success the input parameter dfilterID is set to the filter ID of the newly created deactivation filter.

MbTVDeleteDFilter int

MbTVDeleteDFilter (ulong dfilterID)

This function is used to delete the learning deactivation filter specified by the input parameter dfilterID.

On success it returns a zero value and non-zero error value otherwise.

MbTVGetDFilter int

MbTVGetDFilter (ulong dfilterID, dfilter_t *pdFilter)

This function returns information on the learning deactivation filter specified by dfilterID. The dfilter_t structure, allocated by the caller, is filled with the filter information.

On success it returns a zero value and non-zero error value otherwise.

MbTVSetDFilter int

MbTVSetDFilter (ulong dfilterID, dfilter_t *pdfilter)

This function sets the learning deactivation filter parameters associated with dfilterID as per the filter data in the dfilter_t structure pointed to by pdFilter. pdFilter points to an area allocated in the caller address space.

On success it returns a zero value and non-zero error value otherwise.

MbTVAdjustRating int

MbTVAdjustRating(pgmInfo_t* ppgmInfo, float newRating)

MbTVAdjustRating accepts user input in terms of modification of the rating of a program. ppgmInfo structure specifies the program for which the rating has to be modified. PDM will modify the rating of this program to newRating. This will affect the profile logged on, either explicitly by a viewer or implicitly as deduced by the PDM This function would be called by the CApp in response to a user's modification of a rating of a program. It is assumed that the CApp can provide Program parameters for the programs specified in ppgmInfo.

Invocation of this function is mandatory if the program rating have been modified by the user.

On success a zero value is returned and a non-zero error value otherwise.

PDM Housekeeping Functions

These functions perform various housekeeping tasks of the PDM. These are mandatory functions which must be invoked by the CApp as indicated below.

MbTVInit int

MbTVInit ( )

MbTVInit initializes the PDM and starts the PDM. This routine may perform memory allocations and spawn threads to perform various house keeping tasks of the PDM. This routine must be the first PDM function invoked by the CApp.

On success a zero value is returned and a non zero error value otherwise. The PDM application will not launched in case of error.

This function would be called once by the CApp to launch the PDM. It is assumed that this function is allowed to allocate memory and spawn threads for back ground tasks.

PDM Support Functions

The support functions required by the PDM are described in the following sections.

These EPG support functions are EPG specific functions which generally deal with EPG related data. The PDM may invoke them in the context of a low priority thread or from one of the PDM functions. It is assumed that there are no restrictions under which these functions may be invoked unless other specified. Details on EPG library functions are given below.

EPGGetNumChannels int

EPGGetNumChannels (int *cntChannel)

EPGGetNumChannels returns the number of TV Program Channels in the current lineup. The number of channels are returned by the EPG in the cntChannel parameter.

On success a zero value is returned and a non zero error value otherwise. The cntChannel parameter is set on success.

EPGGetChannelID int

EPGGetChannelID(int channelIndex, void* channelID)

EPGGetChannelID returns a unique 4 byte channel Id in the channelID parameter for the channel number specified by channelIndex. The value of channelIndex ranges from 0 to N−1 where N is the number of channels returned by the EPGGetNumChannels call. The channelID is set to a valid memory location allocated in the callers address space. The channel ID returned must be a unique and must not be reused without first notifying the PDM through MBTV_ADD_CHANNEL and MBTV_DEL_CHANNEL events. Typical situations where a channel ID may be reused would include deletion of a channel from the lineup and reusing the channel ID for a new channel added subsequently to the lineup.

It is assumed that the channel ID returned by this routine will be used to refer to a channel in all PDM functions and all future calls to CApp support functions.

On success a zero value is returned and a non zero error value otherwise. On success the channelID parameter is set by EPGGetChannelID.

EPGGetChannelParams int

EPGGetChannelParams(void* channelID, int paramNum, char *channelParam)

EPGGetChannelParams returns information on the Nth parameter of the channel information specific to channelID. The value of N is specified in paramNum. The information returned by parameter N and the acceptable values for paramNum is EPG specific. EPGGetChannelParams returns the parameter information as a NULL terminated string and copies the string into the memory location pointed to by channelParam and allocated by the caller in its own memory space. If no channel information is available, an NULL string is copied into channelParam. The amount of memory to be allocated should be MBTV_MAX_CHNL_PARAM_SIZE. The EPG used by the CApp and all EPG specific values and parameters are known by the PDM at compile time.

On success a zero value is returned and a non zero error value otherwise. The channelParam parameter is set when successful.

EPGGetChannelDataBufferSize
int
EPGGetChannelDataBufferSize(void* channelID, int* size)

EPGGetChannelDataBufferSize returns the buffer size required to copy the entire channel data information for the channel specified by the channelID parameter. The actual format of the structure for passing channel information is EPG specific and is transparent to MbTV modules but it would contain all the information that would be returned by multiple invocations of EPGGetChannelParams with valid values of paramNum.

On success a zero value is returned and the input parameter size is set to size of the buffer required. A non zero error value is returned in case of failure.

EPGFillChannelDataBuffer
int
EPGFillChannelDataBuffer(void* channelID, void* chnlData, int size)

EPGFillChannelDataBuffer copies the entire channel data information into the specified buffer allocated by the caller. The buffer is accessed through the input void pointer chnlData and on successful completion of this call contains all channel parameters specific to the channel in channelID. The size of the buffer is specified by the size parameter The actual format of the structure for passing channel information is EPG specific and is transparent to MbTV modules but it would contain all the information that would be returned by multiple invocations of EPGGetChannelParams with valid values of paramNum.

On success a zero value is returned and a non zero error value otherwise.

The chnlData parameter is set when successful. An error is returned if the specified buffer size is less than the memory required for copying the channel data information.

| EPGGetChannelParamFromDataBuffer |
| --- |
| EPGGetChannelParamFromDataBuffer (void* chnlData,<br>    int paramNum,<br>    int *paramType,<br>    char *paramValue) |

EPGGetChannelParamFromDataBuffer returns information on the Nth parameter of the channel data information specific to the channel specified by contents of the input buffer chnlData. The value of N is specified in paramNum. and the contents of the chnlData buffer are initialized by an earlier call to the EPGFillChannelDataBuffer function.

The information returned by parameter N and the acceptable values for paramNum is EPG specific. EPGGetChannelParamFromDataBuffer returns the parameter value as a NULL terminated string and copies the string into the memory location pointed to by paramValue and allocated by the caller in its own memory space. The amount of memory to be allocated is EPG specific. The EPG used by the CApp and all EPG specific values and parameters are known by the PDM at compile time. The actual data type of the EPG parameter is specified in the parameter paramType. Acceptable value for data type are as enumerated in the filterType_t structure.

On success a zero value is returned and a non zero error value otherwise.

The parameter value is copied into paramValue parameter is set when successful.

EPGGetProgramInfo
int
EPGGetProgramInfo (pgmInfo_t* pgmInfo)

EPGGetProgramInfo returns information on the TV program specified by the channelID and pgmStartTime fields in the pgmInfo parameter.

The EPGGetProgramInfo sets pgmDuration field and copies the program title as a NULL terminated string into the memory location specified by the pgmTitle field if the pgmTitleLen field is set an integer value greater than 0. The amount of memory space allocated for the program title is specified in the pgmTitleLen field on input and allocated by the caller in its own memory space. On output the pgmTitleLen field is set to the actual length of the program title. The program title is truncated if the memory provided does not accommodate the entire title string. If the pgmStartTime is set to a zero value on input, information is returned for the current TV program available on that channel and the pgmStartTime field is updated with the corresponding start time. If the pgmStartTime does not match the start time of any program, EPGGetProgramInfo returns information for the appropriate program available at pgmStartTime time on that channel and updates the pgmStartTime with the corresponding start time. The channelType, pgmRating and pgmRank fields are ignored.

If no program is available at the requested time, the pgmTitleLen field is set to 0 and the memory location specified by pgmTitle contains a NULL string, the pgmStartTime is set to the time from when no programs are available and the pgmDuration is set to the number of minutes for which no programs are available.

On success a zero value is returned and a non zero error value otherwise.

EPGGetProgramParams
int
EPGGetProgramParams(ppgmInfo_t pgmInfo, int paramNum, char *pgmParam)

EPGGetProgramParams returns information on the Nth parameter of the program information specific to the program specified by pgmInfo. The value of N is specified in paramNum. The information returned by parameter N and the acceptable values for paramNum is EPG specific.

EPGGetProgramParams returns the parameter information as a NULL terminated string and copies the string into the memory location pointed to by pgmParam and allocated by the caller in its own memory space. The size of the buffer provided by the caller should be MBTV_MAX_PGM_PARAM_SIZE. The EPG used by the CApp and all EPG specific values and parameters are known by the PDM at compile time.

The caller sets the channelID, and pgmStartTime fields of the pgmInfo parameter. Initialization of the pgmInfo structure by the EPGGetProgramParams function is as described above for the EPGGetProgramInfo function. Additionally the pgmTitleLen filed is set to 0 and a NULL string is copied into the pgmParam parameter if no program is available at the specified time.

On success a zero value is returned and a non zero error value otherwise. The pgmParam parameter is set when successful.

EPGGetProgramDataBufferSize int
EPGGetProgramDataBufferSize(ppgmInfo_t pgmInfo, int* size)

EPGGetProgramDataBufferSize returns the buffer size required to copy the entire program data information for program specified by the pgmInfo parameter. The actual format of the structure for passing program information is EPG specific and is transparent to MbTV modules but it would contain all the information that would be returned by multiple invocations of EPGGetProgramParams with valid values of paramNum.

The caller sets the channelID, and pgmStartTime fields of the pgmInfo parameter. Initialization of the pgmInfo structure is as described above for the EPGGetProgramInfo function.

On success a zero value is returned and the input parameter size is set to size of the buffer required. A non zero error value is returned in case of failure.

EPGFillProgramDataBuffer int
EPGFillProgramDataBuffer(ppgmInfo_t pgmInfo, void* pgmData, int size)

EPGFillProgramDataBuffer copies the entire program data information into the specified buffer allocated by the caller. The buffer is accessed through the input void pointer pgmData and on successful completion of this call contains all program parameters specific to the program in pgmInfo. The size of the buffer is specified by the size parameter The actual format of the structure for passing program information is EPG specific and is transparent to MbTV modules but it would contain all the information that would be returned by multiple invocations of EPGGetProgramParams with valid values of paramNum.

The caller sets the channelID, and pgmStartTime fields of the pgmInfo parameter. Initialization of the pgmInfo structure is as described above for the EPGGetProgramInfo function.

On success a zero value is returned and a non zero error value otherwise.

The pgmData parameter is set when successful. An error is returned if the specified buffer size is less than the memory required for copying the program data information.

---

EPGGetProgramParamFromDataBuffer
EPGGetProgramParamFromDataBuffer (void* pgmData,
   int paramNum,
   int *paramType,
   char *paramValue)

---

EPGGetProgramParamFromDataBuffer returns information on the Nth parameter of the program data information specific to the program specified by contents of the input buffer pgmData. The value of N is specified in paramNum. and the contents of the pgmData buffer are initialized by an earlier call to the EPGFillProgramDataBuffer function.

The information returned by parameter N and the acceptable values for paramNum is EPG specific.
EPGGetProgramParamFromDataBuffer returns the parameter value as a NULL terminated string and copies the string into the memory location pointed to by paramValue and allocated by the caller in its own memory space. The amount of memory to be allocated is EPG specific. The EPG used by the CApp and all EPG specific values and parameters are known by the PDM at compile time. The actual data type of the EPG parameter is specified in the parameter paramType. Acceptable value for data type are as enumerated in the filterType_t structure.

On success a zero value is returned and a non zero error value otherwise.

The parameter value is copied into paramValue parameter is set when successful.

PDM OS Support Functions

The PDM assume the availability of the following OS support functions.

OSPopen int
OSPopen (char *fileName, int flags )

OSPopen opens the file filename on a persistent storage device such as hard drive or flash memory. The file is created if it does not exist. fileName can be an absolute or relative path name. The flags parameter specifies the mode in which the file is to be opened—possible modes are read-only, write-only, read-write, create, append, or truncate or any combination thereof. OSPopen returns a file handle which will be used for all future operations on this file.

On success it returns a non negative file handle integer. In case of error, returns −1.

OSPread int
OSPread(int fileHndl, char *buf, size_t size)

OSPread reads size bytes of data from the file referred to by fileHndl into buffer buf. Caller should ensure that the buffer is big enough for size bytes of data. fileHndl should have been returned by a previous call to OSPopen.

On success OSPread returns the actual number of bytes read. In case of an EOF condition a zero is returned and in case of error a negative integer is returned.

OSPwrite int
OSPwrite(int fileHndl, char *buf, size_t size)

OSPwrite writes size bytes of data to the file referred to by fileHndl from buffer buf. fileHndl should have been returned by a previous call to OSPopen.

On success return the actual number of bytes written. In case of error, returns a negative integer.

OSPlseek int
OSPlseek(int fileHndl, int offset, int whence)

OSPlseek repositions the offset of the file referred to by fileHndl to the argument offset according to the directive whence. Possible values of whence allow the file offset to be repositioned at offset bytes, at the current file position plus offset bytes or at EOF plus offset bytes. fileHndl should have been returned by a previous call to OSPopen On success return the repositioned offset in actual number of bytes from the beginning of the file. In case of error, returns a negative integer.

OSPclose int
OSPclose (int fileHndl)

Close the file associated with fileHndl.

On success return zero and non zero error value otherwise.

OSPprocesscreate void *
OSPprocesscreate(void (*pmain)(void *), void *arg, int priority)

OSPprocesscreate creates a new thread of execution and place this thread in the active state. pmain specifies the function to be executed when the new thread starts. arg is the argument to be passed to pmain. priority specifies the initial priority for the process/thread.

On success a non-zero process/thread identifier is returned and a zero value otherwise.

OSPsetprocesspriority
signed char
OSPsetprocesspriority(signed char delta)

OSPsetprocesspriority changes the current process/thread priority by delta where delta specifies the signed value to add to the current logical priority.

It returns the resulting priority as a positive value. No error is indicated it the priority is unchanged.

OSPcriticalstart
unsigned int
OSPcriticalstart (void)

OSPcriticalstart ensures that only the calling thread may run after this call. It is used to mark the beginning of a critical section of code.

OSPcriticalstart returns previous state, which can be used for the following OSPcriticalStop call.

OSPcriticalstop
void
OSPcriticalstop(unsigned int prevState)

OSPcriticalstop restore previous execution state, allowing return to normal running state after a critical state. prevState specifies the previous state to switch back to.

CriticalStop( ) does not return any value.

OSPexit
void
OSPexit (int exitcode)

OSPexit kills the current process/thread by removing it from the active thread queue. All resources allocated to this thread/process are released and the next thread waiting in the active queue is activated. be Exit Status for this thread/process is passed in the parameter code.

OSPexit does not return any values.

OSPsleep
void
OSPsleep(int msec)

OSPsleep moves the current process/thread from the active queue to the sleeping queue and activates the next thread waiting in the active queue. msec specifies the maximum time duration of the sleep, in milliseconds. The process/thread will remain in the sleep state until either someone requests to wake it up or the given timeout expires.

If msec is 0, the process/thread will sleep until someone requests it to wakeup.

OSPsleep returned immediately if a wakeup event is pending and does not have a return value.

OSPwakeup
void
OSPwakeup (void *procId)

OSPwakeup removes the specified process/thread from the sleeping state and resume its execution. procid specifies the process/thread Identifier, returned by an earlier call to ProcessCreate( ), of the process/thread to resume.

OSPwakeup does not return any value.

OSPsignal
int
OSPsignal (void *pid, int signo)

OSPsignal sends signal signo to the process/thread specified by pid.

On success a zero value is returned and a non zero value otherwise.

OSPsetsig
int
OSPsetsig (void *pid, void *handle)

OSPsetsig installs a signal handler for the process/thread specified by pid. handle specifies the signal handler to be installed.

On success a zero value is returned and a non zero value otherwise.

OSPalloc
void *
OSPalloc(int size)

OSPalloc allocates a memory block of size bytes.

On success returns a non zero memory address, 0 otherwise.

OSPmemfree
void
OSPmemfree (void *addr)

OSPmemfree frees the previously allocated memory block pointed to by addr. This address should have been returned by an earlier call to OSPalloc.

OSPmemfree ( ) does not return any values.

OSPsemcreate
void *
OSpsemcreate (void)

OSpsemcreate creates a semaphore and returns the semaphore ID to be used for future semaphore operations. The initial value of the semaphore will be 0.

On success the newly created semaphore Id is returned. In case of an error it returns zero.

OSPsemdelete
void
OSPsemdelete (void *handle)

OSPsemdelete deletes the existing semaphore pointed to by handle. This semaphore should have been allocated by a previous call to Ospsemcreate.

OSPsemdelete does not return any value.

OSPsemsignal
void
OSPsemsignal (void *handle)

OSPsemsignal returns a token to an existing semaphore value, and depending on the value, wakes up one process in the local process sleeping queue. handle specifies the semaphore identifier returned by a previous call to OSPsemcreate.

OSPsemsignal does not return any value.

OSPsemwait
void
OSPsemwait (void *handle)

OSPsemwait takes a semaphore token or waits until one is available. Handle specifies the semaphore identifier returned by a previous call to OSPsemcreate.

OSPsemwait does not return any value.

OSPmesgcreate
int
OSPmesgcreate (int msgKey)

OSPmesgcreate creates/opens a message queue associated with msgKey. A new message queue will be created if the msgKey does not have one associated with it. The maximum possible size of a message is defined by MBTV_MAX_MESG_SIZE macro.

On success return a non negative message queue identifier. In case of error, return −1.

OSPmesgsend
int
OSPmesgsend(int msgqId, void *msgData, int length)

OSPmesgsend sends a message msgData into message queue msgqId. length specifies the size of the message. The msgData should point to a Data buffer filled in by the caller.

length cannot exceed MBTV_MAX_MESG_SIZE. The message length cannot exceed MBTV_MAX_MESG_SIZE. The message queue msgqId should have been created by a previous call to OSPmesgcreate.

On success return 0 and non zero error value otherwise.
OSPmesgrecv
Int
OSPmesgrecv(int msgqId, void *msgDataBuf, int *length)

OSPmesgrecv reads message from message queue msgqId into message buffer msgDataBuf. The buffer should be allocated by the caller. The actual length of the message received is returned in length. The maximum size of a message is MBTV_MAX_MESG_SIZE. The call will block if no message is available. The message queue should have been created by a previous call to OSPmesgcreate.

On Success return 0 and non zero error value otherwise.
OSPmesgdelete
void
OSPmesgdelete(int msgqId)

OSPmesgdelete deletes message queue pointed to by msgqId.

OSPmesgdelete does not return any value.
OSPreadblock
int
OSPreadblock(unsigned int blockNo, char *buf, size_t size)

OSPreadblock reads size bytes of data from blockNo (some storage device like flash memory or hard disk) into the data buffer buf. Caller should ensure that blockNo is big enough for size bytes.

This function is provided if the I/O functions for file operation are not available.

On success return the actual number of bytes read. In case of error return a negative integer and a zero value on encountering an EOF condition.
OSPwriteblock
int
OSPwriteblock(unsigned int blockNo, char *buf, size_t size)

OSPwriteblock writes size bytes of data from data buffer buf into block blockNo (some storage device like flash memory or hard disk).

This function is provided if the I/O functions for file operation are not available.

On success return the actual number of bytes written. In case of error return a negative integer.
OSPeraseblock
int
OSPeraseblock (unsigned int blockNo)

OSPeraseblock erases a block from some storage device like flash memory or hard disk. blockNo specifies the block number to be erased.

This function is provided if the I/O functions for file operation are not available.

On success return zero and non zero value otherwise.
OSPtime
time_t
OSPtime (time_t * tloc)

OSPtime function returns the number of seconds elapsed since midnight (00:00:00), Jan. 1, 1970, Coordinated Universal Time. A copy of the time value is stored in the location given by tloc. If tloc is NULL, no value is stored.

On success OSPtime( ) returns the value of time. Otherwise a value of (time_t) −1 is returned.
OSPmktime
time_t
OSPmktime(struct tm * tmptr)

OSPmktime function converts the broken down time, expressed as local time, in the structure pointed to by tmptr into a time_t calendar time value. The converted time has the same the same encoding as the values returned by OSPtime( ) function.

The functionality of OSPmktime( ) is as defined by ANSI mktime( ) function.

On success OSPmktime( ) returns the converted time. Otherwise a value of (time_t) −1 is returned.
OSPgmtime
struct tm *t
OSPgmtime(time_t *clock, struct tm * tmptr)

OSPgmtime function converts the time value (specified in time_t format) pointed at by clock, and returns a pointer to a "struct tm" which contains the broken-out time information. No time zone conversions are done by OSPgmtime( ). If pointer tmptr is non-NULL, it is filled with the broken-out time information.

The functionality of OSPgmtime( ) is as defined by ANSI gmtime( ) function.
OSPlocaltime
struct tm *t
OSPlocaltime(time_t *clock, struct tm * tmptr)

OSPlocaltime function converts the time value (specified in time_t format) pointed at by clock, and returns a pointer to a "struct tm" which contains the broken-out time information for the value, after adjusting for the current time zone and any other factors such as Daylight Saving Time. If pointer tmptr is non-NULL, it is filled with the broken-out time information.

The functionality of OSPlocaltime ( ) is as defined by ANSI localtime ( ) function.

On success OSPlocaltime( ) returns the pointer to converted time. Otherwise NULL is returned.
OSPgettimezoneoffset
int
OSPgettimezoneoffset ( )

OSPgettimezoneoffset function returns the difference between Universal Coordinated Time and local time, expressed in seconds. This function will return a negative offset for time zones east of GMT.

This function is provided if other time manipulation functions are not available.
OSPgetDSTinfo
int
OSPgetDSTinfo ( )

OSPgetDSTinfo function returns a non-zero value if daylight savings time is in effect for the current location. Otherwise it returns zero.

This function is provided if other time manipulation functions are not available.

PDM Modules

The PDM, as shown in FIG. 44, comprises a number of modules, including the Internal EPG Module (IEPG), the Profile Identification Module (PIM), the Viewer Recording Module (VRM), the Category Database Module (CDM), the Viewer Status Module (VSM), and the String Table Manager (STM). In addition, an API must be provided to interface between the PDM and the CApp, as well as between the SDM and the CApp.

MbTV OS API

The Public Interface Functions and Macros, as listed and defined below, are declared in include/mbtvos_p.h.

```
#define MAX_MESG_SIZE 64
int OSPopen (char *fileName, int flags);
int OSPread(int fd, char *buf, size_t size);
int OSPwrite(int fd, char *buf, size_t size);
int OSPlseek (int fd, int offset, int whence);
int OSPclose(int fd);
```

```
void *OSPprocesscreate(void (*pmain) (void *), void
    *arg, int priority);
char OSPsetprocesspriority(char delta);
unsigned int OSPcriticalstart (void);
void OSPcriticalstop(unsigned int prevState);
void OSPexit(int exitcode);
void OSPsleep(int msec);
void OSPwakeup (void *procId);
int OSPsignal (void *pid, int signo);
int OSPsetsig(void *pid, void *handle);
void *OSPalloc(int size);
void OSPmemfree (void *addr);
void OSPsemcreate(int semKey,/* int semVal */ . . . );
void OSPsemdelete(void *handle);
void OSPsemsignal (void *handle);
void OSPsemwait (void *handle);
void * OSPmesgcreate(int msgKey,/* int mesgSize */ . . . );
int OSPmesgsend(void *msgqId, void *msgData, int
    length);
int OSPmesgrecv(void *msgqId, void *msgDataBuf, int
    *length);
void OSPmesgdelete(void *msgqId);
time_t OSPtime(time_t *tloc);
time_t OSPmktime(struct tm *tmptr);
struct tm *OSPgmtime(time_t *clock, struct tm *tmptr);
struct tm *OSPlocaltime(time_t *clock, struct tm *tmptr);
```

Name
OSPopen
Synopsis
include <include/mbtvos_p.h>
int OSPopen(char *fileName, int flags);
Description
OSPopen( ) opens the file filename on a persistent storage device such as hard drive or flash memory. The file is created if it does not exist. fileName can be an absolute or relative path name.
The flags parameter specifies the mode in which the file is to be opened. Possible modes are read-only, write-only, read-write, create, append, or truncate or any combination thereof.
Return Value
On success, returns a file handle which will be used for all future operations on this file. In case of error, returns −1.

Name
OSPread
Synopsis
include <include/mbtvos_p.h>
int OSPread(int fd, char *buf, size_t size);
Description
OSPread( ) reads size bytes of data from the file referred to by file handle fd into buffer buf. Caller should ensure that the buffer is big enough for size bytes of data.
Return Value
On success OSPread( ) returns the actual number of bytes read. In case of an EOF condition a zero is returned and in case of error a negative integer is returned.

Name
OSPwrite
Synopsis
include <include/mbtvos_p.h>
int OSPwrite(int fd, char *buf, size_t size);
Description
OSPwrite( ) writes size bytes of data to the file referred to by file handle fd from buffer buf.
Return Value
On success return the actual number of bytes written. In case of error, returns a negative integer.

Name
OSPlseek
Synopsis
include <include/mbtvos_p.h>
int OSPlseek (int fd, int offset, int whence);
Description
OSPlseek( ) sets the offset in the file referred to by file handle fd to the argument offset according to the directive whence. Possible values of whence allow the file offset to be set at offset bytes from the beginning, from the current offset or from the EOF.
Return Value
On success return the new offset in actual number of bytes from the beginning of the file. In case of error, returns a negative integer.

Name
OSPclose
Synopsis
include <include/mbtvos_p.h>
int OSPclose(int fd);
Description
Close the file associated with fd.
Return Value
Returns 0 on success, non-zero otherwise.

Name
OSPprocesscreate
Synopsis
include <include/mbtvos_p.h>
void * OSPprocesscreate(void (*pmain)(void *), void *arg, int priority);
Description
OSPprocesscreate( ) creates a new thread of execution and places this thread in the active state. pmain specifies the function to be executed when the new thread starts. arg is the argument to be passed to pmain.
priority specifies the initial priority for the process/thread.
Return Value
On success a non-zero process/thread identifier is returned and a zero value otherwise.

Name
OSPsetprocesspriority
Synopsis
include <include/mbtvos_p.h>
char OSPsetprocesspriority(signed char delta);
Description
OSPsetprocesspriority( ) changes the current process/thread priority by delta where delta specifies the signed value to add to the current logical priority.
Return Value
Returns the resulting priority as a positive value. No error is indicated if the priority is unchanged.

Name
OSPcriticalstart
Synopsis
include <include/mbtvos_p.h>
unsigned int OSPcriticalstart(void);
Description
OSPcriticalstart( ) ensures that only the calling thread may run after this call. It is used to mark the beginning of a critical section of code. (Internally it is implemented using OSPsetprocesspriority( ) call to set the highest priority to the calling thread.)
Return Value
Returns previous state, which can be used for the following OSPcriticalstop( ) call.

Name
OSPcriticalstop

Synopsis
include <include/mbtvos_p.h>
void OSPcriticalstart(unsigned int prevState);
Description
OSPcriticalstop( ) restore previous execution state, allowing return to normal running state after a critical state. prevState specifies the previous state to switch back to. (Internally it is implemented using the OSPsetprocesspriority( ) call to set the previous priority value to the calling thread.)
Return Value
None.
Name
OSPexit
Synopsis
include <include/mbtvos_p.h>
void OSPexit (int exitCode);
Description
OSPexit( ) terminates the current process/thread. Exit status for this thread/process is passed in the parameter exitCode.
Return Value
None.
Name
OSPexit
Synopsis
include <include/mbtvos_p.h>
void OSPexit (int exitCode);
Description
OSPexit( ) terminates the current process/thread. Exit status for this thread/process is passed in the parameter exitCode.
Return Value
None.
Name
OSPsleep
Synopsis
include <include/mbtvos_p.h>
void OSPsleep (int msecs);
Description
OSPsleep( ) function suspends execution of the calling thread/process for msec milliseconds. The process/thread will remain in the sleep state until either someone requests to wake it up or the given timeout expires. If msec is 0, the process/thread will sleep until someone requests it to wakeup. OSPsleep( ) returns immediately if a wakeup event is pending.
Return Value
None.
Name
OSPwakeup
Synopsis
include <include/mbtvos_p.h>void OSPwakeup(void *procId);
Description
OSPwakeup( ) wakes up the process/thread specified by the its process/thread identifier procId.
Return Value
None.
Name
OSPsignal
Synopsis
include <include/mbtvos_p.h>
int OSPsignal(void *pid, int signo);
Description
OSPsignal( ) sends signal signo to the process/thread specified by pid.
OSPsignal( ) function is used to notify a thread waiting in OSPsleep( ) function that some event has occured.
Note: The only signal implemented is SIGALARM.
Return Value
On success, returns 0 and a non zero value otherwise.
Name
OSPsetsig
Synopsis
include <include/mbtvos_p.h>
int OSPsetsig(void *pid, void *handle);
Description
OSPsetsig( ) installs a signal handler specified by handle argument for the process/thread specified by pid.
The signal handle is semaphore handle which then is used by OSPsleep and OSPwakeup( ) functions to implement sleep/wakeup functionality.
Note: Don't use semaphores which protect some common data as signal handlers.
Return Value
On success, returns 0 and a non zero value otherwise.
Name
OSPalloc
Synopsis
include <include/mbtvos_p.h>void * OSPalloc(int size);
Description
OSPalloc( ) allocates a memory block of size bytes.
Return Value
On success, returns a non zero memory address, 0 otherwise.
Name
OSPmemfree
Synopsis
include <include/mbtvos_p.h>
void OSPmemfree(void *addr);
Description
OSPmemfree( ) frees the previously allocated memory block pointed to by addr. This address should have been returned by an earlier call to OSPalloc( ).
Return Value
None.
Name
OSPsemcreate
Synopsis
include <include/mbtvos_p.h>
void OSPsemcreate(int semKey,/* int semVal */ . . . );
Description
OSPsemcreate( ) creates/opens a semaphore associated with semKey. A new semaphore will be created if the msgKey does not have one associated with it. The initial value of the semaphore will be set (if provided) for newly created one. Otherwise it will be a current value.
Return Value
On success semaphore Id is returned. In case of an it returns NULL.
Name
OSPsemdelete
Synopsis
include <include/mbtvos_p.h>
void OSPsemdelete(void *handle);
Description
OSPsemdelete( ) deletes the existing semaphore pointed to by handle.
Return Value
None.
Name
OSPsemsignal
Synopsis
include <include/mbtvos_p.h>void OSPsemsignal(void *handle);

Description
OSPsemsignal( ) signals to semaphore specified by handle to increment current semValue by 1. If semValue becomes greater then 0 one of the threads waiting on this semaphore resumes its execution.
Return Value
None.
Name
OSPsemwait
Synopsis
include <include/mbtvos_p.h>
void OSPsemwait(void *handle);
Description
OSPsemwait( ) waits until current semValue of the semaphore specified by handle becomes greater then 0, then it decrements semValue and resumes thread execution.
Return Value
None.
Name
OSPmesgcreate
Synopsis
include <include/mbtvos_p.h>
void *OSPmesgcreate(int msgKey,/* int msgSize */ . . . );
Description
OSPmesgcreate( ) creates/opens a message queue associated with msgKey. A new message queue will be created if the msgKey does not have one associated with it. The optional msgSize argument defines the size of the message queue buffer. The maximum (default) size of a message is defined by MAX_MESG_SIZE macro.
Return Value
On success returns message queue identifier.
Name
OSPmesgsend
Synopsis
include <include/mbtvos_p.h>
int OSPmesgsend(void *msgqId, void *msgData, int length);
Description
OSPmesgsend( ) sends a message msgData into message queue msgqId.
length specifies the size of the message. The msgData should point to a Data buffer filled in by the caller. The length cannot exceed MAX_MESG_SIZE.
Return Value
Returns 0 if success and non zero otherwise.
Name
OSPmesgrecv
Synopsis
include <include/mbtvos_p.h>
int OSPmesgrecv(void *msgqId, void *msgDataBuf, int *length);
Description
OSPmesgrecv( ) reads message from message queue msgqId into message buffer msgDataBuf. The buffer should be allocated by the caller. The actual length of the message received is returned in length. The maximum size of a message is MAX_MESG_SIZE.
The call will block if no message is available.
Return Value
Returns 0 if success and non zero otherwise.
Name
OSPmesgdelete
Synopsis
include <include/mbtvos_p.h>
void OSPmesgdelete(void *msgqId);

Description
OSPmesgdelete( ) deletes message queue pointed to by msgqId.
Return Value
None.
Name
OSPtime
Synopsis
include <include/mbtvos_p.h>
time_t OSPtime(time_t * tloc);
Description
OSPtime( ) function returns the number of seconds elapsed since midnight (00:00:00), Jan. 1, 1970, Coordinated Universal Time. A copy of the time value is stored in the location given by tloc. If tloc is NULL, no value is stored.
Return Value
On success, returns the value of time. Otherwise the value of (time_t) −1) is returned.
Name
OSPmktime
Synopsis
include <include/mbtvos_p.h>
time_t OSPmktime(struct tm * tmptr);
Description
OSPmktime( ) function converts the broken down time, expressed as local time, in the structure pointed to by tmptr into a time_t calendar time value. The converted time has the same encoding as the values returned by OSPtime( ) function. The functionality of OSPmktime( ) is as defined by ANSI mktime( ) function.
Return Value
On success, returns the value of time. Otherwise the value of (time_t) −1) is returned.
Name
OSPgmtime
Synopsis
include <include/mbtvos_p.h>
struct tm * OSPgmtime(time_t *clock, struct tm * tmptr);
Description
OSPgmtime( ) function converts the time value (specified in time_t format) pointed at by clock, and returns a pointer to a "struct tm" which contains the broken-out time information. No time zone conversions are done by OSPgmtime( ). It fills tmptr with the broken-out time information. The functionality of OSPgmtime( ) is as defined by ANSI gmtime( ) function. The argument tmptr must be a valid pointer.
Return Value
On success, returns tmptr value. Otherwise NULL.
Name
OSPlocaltime
Synopsis
include <include/mbtvos_p.h>
struct tm * OSPlocaltime(time_t *clock, struct tm * tmptr);
Description
OSPlocaltime( ) function converts the time value (specified in time_t format) pointed at by clock, and returns a pointer to a "struct tm" which contains the broken-out time information for the value, after adjusting for the current time zone and any other factors such as Daylight Saving Time. It fills tmptr with the broken-out time information. The functionality of OSPlocaltime( ) is as defined by ANSI localtime( ) function. The argument tmptr must be a valid pointer.
Return Value
On success, returns tmptr value. Otherwise NULL.
Internal EPG Module
The Internal EPG Module (EM) maintains EPG information for all programs provided by the External EPG in an internal database for the time for which the TV is in "POWER ON" mode. The amount of information maintained by the EM is configurable. Depending on the configuration, the EM might store all the fields of the EPG information or a number of selected fields. The information stored in this module is used for further processing by other several internal modules. This processing by other internal MbTV modules is done as a part of a background task and is typically done at a much later time. The EPG information needs to be saved by EM as EPG libraries currently provide information on programs currently or in the future. Each program is stored by the EM in the form of EPG record in an internal database. The size of the EM EPG record is variable as not all parameters are available for all programs. The variable size of the EPG record is also used in order to reduce the memory required for the internal database. The EM provides supporting functions which allow the insertion, deletion, and retrieval of EM EPG records. Retrievals are based on getting EPG records for a specific time.

EPG parameters are typically in the form of strings. As EPGs typically contain a lot of repetitive data the same set of strings might appear in the EPG parameters of a number of programs. When storing EPG records in the EM database, all strings associated with the EPG record are first inserted in a string Table. For each string inserted in the String Table, an index is returned. The EM in lieu of the actual string uses this index when storing EPG records in the EMs internal database. The same index is returned when a string is stored multiple times in the String Table.

Internal Data Structures
The C data structure defined by EM is described below.

```
                                      epgRec_t
typedef struct
{
    time_t           pgmStartTime;
    ushort           pgmDuration;
    uint             mask :24;
    uint             len :8;
    mbtv_t           ptrs[24];
} epgRec_t;
```

The semantics of the fields in the above structure is the following.
  pgmStartTime stores the start time of the program in GMT format.
  pgmDuration stores the duration of the program in minutes.
  mask indicates which categories of epg information of this program is available in the current record. Each bit of 24 bits corresponds to a category of epg information of the program. If a bit of this variable is set to 1, there is a string pointer to its category in ptrs.
  len has the total length of a epg record in byte. Using this value, the number of bits whose value are set to 1 can be calculated.
  ptrs is an array of the string pointer. The size of this array is variable according to the value of mask. The size of the epgRec_t is also variable because of ptrs.

```
                                      epgDb_t
typedef struct
{
    uint             size;
    uint             maxSize;
    ushort           del;
```

```
                                      -continued
    char             *data;
} epgDb_t;
```

The semantics of the fields in the above structure is the following.
  size is the current size of epg database that is occupied by epg records.
  maxSize the total size of the data memory that is allocated for epg database.
  del indicates the number of epg records that is marked as deleted.
  data points the base address of the memory that is allocated for epg database.

Basic Functionality
The Insertion of EPG Record to Database
  If a program is to be added to the internal data base, the EPG information for the program is first obtained from the External EPG library. All strings associated with EPG parameters of interest are first stored in string table. The index associated with the string in string table is stored in ptrs field of the EPG record and the bit corresponding to its EPG field in mask of the record is set to 1. EPG Parameters that do not carry any information for a specific record are not stored and the corresponding mask bit in the EPG record is set to 0.

The Deletion of EPG Record from Database
  If an EPG record is to be deleted, pgmStartTime of the EPG record is set to 0 and del in EPG database header is increased. All strings pointed by ptrs are deleted from the string tables. When del is greater than pre-determined value, the compaction mechanism of EPG database is executed.

The Retrieval of EPG Record from Database
  The internal EPG database stores channel associated with a program in the internal database by the string index returned for the channel name. During retrieval the channel ID passed by caller is converted into the string index associated with the channel name in string tables. The pointer to channel name in ptrs, pgmStartTime, and pgmDuration are used to search the EPG record of the program that is requested.
  Data structures accessed by this module
  Program Info structure in pgm.h: pgmInfo_t, ppgmInfo_t
  MbTV string pointer structure in types.h: mbtv_t
  Structure for readLn( ) in mbtvos.h: fdbuf_t
  Interface functions of this module
  int EMInit(void)
Description: Initializes and starts the EM. This routine performs memory allocation and semaphore creation. Returns: 0 is returned on SUCCESS and 1 is returned on FAIL.
Note: none

```
int EMGetNextCompetingPrgm(pgmInfo_t *pgmInfo,
                           int       scanMode,
                           void      **context,
                           int       force)
```

Description: This function returns information on a program that competed with the program specified by channelID, pgmStartTime and pgmDuration in pgmInfo. Actually pgmStartTime has viewing start time and pgmDuration has viewing duration. A program is considered to be a competing program if it was available within time span covered by the pgmStartTime and pgmDuration. If a viewing record has N competing programs, this function has to be called N times to get program information on each of the N programs.

On input the caller sets the channelID, pgmStartTime, and pgmDuration from the viewer record. In the first call of each viewer record, the context parameter is set to NULL. On subsequent calls it is set to the value returned in the preceding call to this function.

On output this function sets the channelID, pgmStartTime and pgmDuration in pgmInfo. If there are no more programs, pgmStartTime field is set to 0.

The context parameter is used by this function to store some context information so that subsequent call to this function will use this information to return the next competing program. The calling program should not modify the context parameter.

The scanMode parameter is used to set the order in which the competing programs are returned. Possible values for scanMode are SCAN_TIMEWISE and SCAN_CHANNEL-WISE. But currently only SCAN_TIMEWISE is supported.

The force parameter is used to restrict the search for competing programs to subscribed channels if the channel is CHANNEL_TYPE_PREMIUM. If force parameter is set to 1, there is no restriction on the search of competing programs. If force parameter is set to 0, programs that belong to channels that are CHANNEL_TYPE_PPV or channels that are CHANNEL_TYPE_PREMIUM and not subscribed are excluded from competing programs.

Returns: 0 is returned on SUCCESS and 1 is returned on FAIL.

Note: This function is not safe in multi-thread environment because of the context parameter. Currently there is only one place at which this function is called.

int EMGetProgramInfo(pgmInfo_t *pgmInfo, epgRec_t **pRec)

Description: This function returns information of the program that is found by channelID, pgmChannelType, and pgmStartTime in pgmInfo. A program is found if pgmStartTime falls on the time span that belongs to the program in EPG database. If pgmChannelType is CHANNEL_TYPE_VIRTUAL, SDMGetProgramInfo( ) is called with pgmInfo parameter. If pgmStartTime is greater than start time of the latest program in EPG database, EPGGetProgramInfo( ) is called with pgmInfo parameter. On input if pRec is NULL, target program is searched from the start of EPG database. If it is not NULL, program is searched from the position it has. On output if matched program is found, pgmStartTime, pgmDuration, and pRec is updated with the program found. If there is no match, information of the next available program is returned and pRec is set to NULL. If next available program does not exist, prmStartTime is set to 0.

Returns: 0 is returned on SUCCESS and 1 is returned on FAIL.

Note: none

| int EMGetProgramParams (pgmInfo_t | *pgmInfo, |
|---|---|
| int | paramNum, |
| int | *cntParam, |
| mbtv_t | *strPtr) |

Description: Sets up the strPtr to point to the string associated with the paramNum for the program specified by the pgmInfo.

On input the caller sets the channelID and pgmStartTime fields of the pgmInfo. paramNum is set to indicates category number to get the string and optionally cntParam is set to indicate string number in paramNum category that is multi-string category.

On output if cntParam is set to −1, the first string of the paramNum is returned. If it is set to N($\geq$0), the Nth string of the paramNum is returned. If cntParam is set to −1, cntParam returns the number of strings associated with the paramNum.

Returns: 0 is returned on SUCCESS and 1 is returned on FAIL.

Note: none int EMSetRecBuffer(pgmInfo_t *pgmInfo, epgRec_t *epgRec, int force)

Description: This function fills the internal EPG record that is pointed by epgRec with information using pgmInfo. Each string from the program of the pgmInfo is added to a string table and epgRec is filled with program and string information. If the same program already exists in EPG database, the existing record is copied to epgRec and the reference count of each string of the record is increased in string tables.

On input the caller sets channelID and pgmStartTime in pgmInfo.

On output if there is no program at pgmStartTime in EPG data, pgmInfo is returned with the information of fake program. pgmDuration is set to the difference of pgmStartTime and the start time of next available program.

The force parameter is used to restrict the program that can be inserted to EPG database. If force is set to 1, every program can be inserted. If force is set to 0, the program that belongs to the channel of CHANNEL_TYPE_PPV or the channel that is CHANNEL_TYPE_PREMIUM and not subscribed is excluded from the insertion to the EPG database.

Returns : 0 - SUCCESS
                1 - if there is a hole in EPG data.
                2 - others.
Note : none

| int EMGetRecBufferParams (epgRec_t | *epgRec, |
|---|---|
| int | paraNum, |
| int | *cntParam, |
| mbtv_t | *strPtr) |

Description: Sets up the strPtr to point to the string associated with the paramNum for the program specified by the epgRec.

On input if cntParam is set to −1, the first string of the paramNum is returned. If it is set to N(>0), the Nth string of the paramNum is returned.

On output if cntParam is set to −1, cntParam returns the number of strings associated with the paramNum.

Returns: 0 is returned on SUCCESS and 1 is returned on FAIL.

Note: none int EMDelRecBuffer(epgRec_t *epgRec)

Description: This function clears the EPG record specified by epgRec and all strings releated to this record is deleted from the string tables. But the memory of this record is not returned to the system.

Returns: 0 is returned on SUCCESS and 1 is returned on FAIL.

Note: none int EMCopy(time_t startTime, time_t stopTime, int firstCopy)

Description: This function copies external EPG data into internal EPG database and updates the channel line-up if it is enabled.

On input caller sets the startTime, stopTime, and firstCopy.

The firstCopy is used to select EPG programs that is to be copied into the internal database. If firstCopy is 1, only programs that are available within the time span specified by startTime and stopTime are copied into the internal database.

If firstCopy is 0, only programs that start after startTime and before stopTime are copied into the internal database.
Returns: 0 is returned on SUCCESS and 1 is returned on FAIL.
Note: none
    int EMDelAfter(time_time)
Description: Deletes from EPG database all EPG records whose pgmStartTime is greater than or equal to time. All strings related to these records are deleted from the string tables.
Returns: 0 is returned on SUCCESS and 1 is returned on FAIL.
Note: none
    int EMDelBefore(time_t time)
Description: Deletes from EPG database all EPG records whose program ends before time. All strings related to these records are deleted from the string tables.
Returns: 0 is returned on SUCCESS and 1 is returned on FAIL.
Note: none
4.9 int EMAddSubscrChannel(void *channelID, int addType, time_t viewTime)
Description: Adds a channel to the list of subscribed channel in EM.
    On input caller sets channelID, addType, and viewTime. The addType parameter is used to specify the method by which a channel is added to the list of subscribed channel. Possible values for addType are:
    EXPLICIT_ADD—This type is given by TV viewer through user interface.
    IMPLICIT_ADD—This type is given by internal module of PDM.
    If the channel was already in the list, viewTime is updated and addType is compared with the type in the list. If the type in the list is IMPLICIT_ADD and addType in input is EXPLICIT_ADD, the type in the list is set to EXPLICIT_ADD. The viewTime parameter is used to specify the time at which this program was watched. If viewTime is 0, current time is used. Internally viewTime is converted to the time at which this channel is to be deleted from the list of subscribed channel. If a subscribed channel is not updated for some period from outside, it will be deleted from the list after the fixed amount of time passes.
Returns: 0 is returned on SUCCESS and 1 is returned on FAIL.
Note: This function can be called after EMLockSubscrChannelList( ) and before EMUnlockSubscrChannelList( ).
    int EMDeleteSubscrChannel(void * channelID)
Description: Deletes a channel specified by channelID from the list of subscribed channel.
Returns: 0 is returned on SUCCESS and is returned on FAIL.
Note: This function can be called after EMLockSubscrChannelList( ) and before EMUnlockSubscrChannelList( ).
    int EMGetNumberOfSubscrChannels(int *numSubscrChannels)
Description: Returns the number of subscribed channel in the list.
Returns: Always 0
Note: This function can be called after EMLockSubscrChannelList( ) and before EMUnlockSubscrChannelList( ).
    int EMGetSubscrChannelID(int subscrChanIndex, void **channelID)
Description: Returns the channel ID specified by the index of subscrChanIndex in the list of subscribed channel. Before calling this function, caller should call EMGetNumberOfSubscrChannels( ) to get the total number of the channel in the list. On output channel ID is returned through channelID parameter.
Returns: 0 is returned on SUCCESS and 1 is returned on FAIL.
Note: This function can be called after EMLockSubscrChannelList( ) and before EMUnlockSubscrChannelList( ).
    int EMLockSubscrChannelList (void)
Description: Tries to get the semaphore of the subscribed channel list. Anybody who wants to access subscribed channel list should call this function at the beginning and EMUnlockSubscrChannelList( ) at the end.
Returns: Always 0
Note: The time interval between EMLockSubscrChannelList( ) and EMUnlockSubscrChannelList( ) should be as short as possible.
    int EMUnlockSubscrChannelList (void)
Description: Releases the semaphore, which enables another thread to access subscribed channel list . . . . This function is called after EMLockSubscrChannelList( ).
Returns: Always 0
Note: The time interval between EMLockSubscrChannelList( ) and EMUnlockSubscrChannelList( ) should be as short as possible.
    int EMGetNumChannels(int *numChannels)
Description: Returns the number of channels in the current channel line-up. Channel line-up can be changed with time.
Returns: Always 0.
Note: This function can be called after EMUnlockChannelIDList( ) and before EMUnlockChannelIDList( ).
    int EMGetChannelID(int channelIndex, void **channelID)
Description: Returns the channel ID specified by the index of channelIndex. After getting the number of channels through EMGetNumChannels( ), caller calls this function.
Returns: Always 0.
Note: This function can be called after EMUnlockChannelIDList( ) and before EMUnlockChannelIDList( ).
    int EMLockChannelIDList(void)
Description: Tries to get the semaphore of the channel line-up. Anybody who wants to access current channel line-up from EM should call this function at the beginning and EMUnlockChannelIDList( ) at the end.
Returns: Always 0
Note: The time interval between EMLockChannelIDList( ) and EMUnlockChannelIDList( ) should be as short as possible.
    int EMUnlockChannelIDList(void)
Description: Release the semaphore, which enables EM to update channel line-up. This function is called after EMLockChannelIDList( ).
Returns: Always 0
The time interval between EMLockChannelIDList( ) and EMUnlockChannelIDList( ) should be as short as possible.
Interface Functions Accessed by this Module
Related to string table:
    STAddRec( )
    STDelRec( )
    STSearch( )
    STGetStrPtr( ) MBTV_GET_STRING( )
Related to CDM:
    CDMGetCategoryInfo( )
Related to time:
    mktime( )
    localtime_r( )
Related to external epg data:
    EPGGetChannelID( )
    EPGGetProgramInfo( )

EPGGetNumChannels( )
EPGGetChannelParams( )
EPGGetChannelIDFromName( )
Related to semaphore:
  SemCreate( )
  SemWait( )
  SemSignal( )
Related to memory allocation
  AllocateMemory( )
  FreeMemory( )
Related to IO manager:
  readLn( )
Related to SDM:
  SDMGetProgramInfo( )

String Table Manager

The String Table Manager (STM) is used to store strings required by various internal modules of the PDM. The internal modules that currently use the String Table are the EM and the CDB. The STM internally allocates a number of String Tables to store strings of various lengths. For example the STM might allocate 4 string tables where each string table could hold up to a maximum of 100 strings each. Each string table is used to store strings that are less than or equal to a specified length. The size of a string table could thus be used to refer to the size of the string that could be stored in the string table. The first string table could be used for all strings which are less than or equal to 30 characters long, the second string table could be used to store strings which are less than or equal to 60 characters long & so on. The STM stores any given string in the string table with the smallest possible size. If there is no space available in that string table, it tries to fit it in the next smallest string table. The STM returns a String Table ID (STID) for each string inserted in the string table. The STID is derived from the position of the string in the string table and which string table it is inserted in. Since the number of strings that can be stored in a string table is fixed, the STID returned by the STM could be used to determine which string table was used to store a string and the position of the string in the string table. If a string is inserted in the string table multiple times, the same STID is returned by the STM.

The STM provides basic functionality for string insertion, deletion & retrieval.

String Insertion

The STM first determines if the string is already inserted in a string table. If the string is already inserted, the STM returns the STID for the string and increments the reference count for that string by 1. If the string is not already inserted, it fits it in the smallest possible string table and in the first free location within the string table and set the reference for the string to 1 and returns the STID generated from the location where the string is inserted.

String Deletion

To delete a string, the caller provides the STID of the string to be deleted. The STM decrements the references count by 1. If the reference count becomes 0 the location occupied by the string becomes free and is available for insertion of a new string.

String Access

The STM provides support for string searches in the String Table. Based on the string size, the STM searches the smallest string table that could accommodate the string. If the string is not found in that table the next smallest table is searched. This process is continued till the string is found or not depending on whether the string was stored in the string table.

For each string table allocated by the STM, it maintains a separate sorted list of all strings in the string table. This sorted list is updated whenever a new string is inserted or when the reference count of a deleted string becomes 0. When searching for a string in a string table the STM uses this sorted list to optimize the string search.

Profile Identification Module

The PIM is responsible for creating and maintaining cluster information. In this document terms "Cluster" and "Profile" are used interchangeably. The PIM is also responsible for computing profile mix at given time. Thus, the PIM performs three functions:

Maintaining a list of events
  Updating/Creating clusters
  Computing profile mix The PIM receives events from the Viewer Record Module (VRM) and saves them in a data structure. Further, it uses this data to either update clusters or to compute profile mix.

Architecture

Maintaining a List of Events

As shown in FIG. 45, the VRM receives events such as channel change from the CApp and passes them down to the PIM. These events are passed using the cBackInfo_t structure. VRM passes the same structure to PIM.

The VSM keeps track of viewer's activities and generates power off event if there is no viewer activity for a pre-defined period. The VSM passes this event to VRM using cBackInfo_t structure. The VRM passes the same structure to the PIM.

Internally, the PIM saves all the events in a structure "PimEventList". Each of the events in this list is of type PIMEventRec. PIMEventRec is described below.

```
typedef struct _PIMEventRec_
{
    ushort   type;
    ushort   timeDiff;
    ushort   epgTimeDiff;
    union _param1_
    {
        void*    channelID;
        time_t   epochTime;
        ulong    profileID;
        int      probability;
    } param1;
} PIMEventRec;
```

In the above structure,
  type: Provides type of the event. Example of an event type if PIM_CHANNEL_CHANGE.
  timeDiff: This variable is used to compute time when the event was generated.
  epgTimeDiff: This variable is used to find out the program being watched at the time of event generation.
  param1: Depending on event type, param1 holds one of the four variables described below.
  channelID: If the event is generated as a result of channel change event then this variable holds id of the current channel.
  epochTime: This variable, in conjunction with timeDiff and epgTimeDiff, lets PIM compute the event time.
  profileID: If the event is of type profile login or profile logout, this variable provides id of the profile.
  probability: If the event is of type profile mix, this variable provides probability of profiles that were active at the time of event generation.

Updating/Creating Clusters

FIG. 46 describes the process of creating/updating clusters.

The PDM Thread (a.k.a. PDM background thread) performs various housekeeping operations for the PDM. One of the operations is to call a function of the PIM that creates/updates clusters.

Sub-module Cluster Generation (shown in FIG. 45) performs three steps:
1. Divide PIMEventList into various viewing sessions
2. Learn parameters of viewer's interest, per session, using events
3. Update clusters using EM clustering algorithm. This algorithm uses the information generated in step 2. For each cluster, the algorithm computes average liking and variation of various parameters.

Example: Assume Cluster Generation learns only about sets of channels watched during various viewing sessions (step 2). The EM algorithm then creates clusters of channels where each cluster reflects behavior of a profile. In other words, a set of channels in a cluster reflects liking of that cluster.

Computing the Profile Mix

FIG. 47 describes the process of profile mix computation. It also shows how other modules use the profile mix. The profile mix gives the probability of any profile being active at the given time.

The PDM thread periodically calls a function of the PIM to compute the profile mix. The PIM, using the clusters it created during the process as described previously, and viewer events of the current viewing session, computes the profile mix. The PIM accesses the events occurred during the current viewing session from PIMEventList.

Computing the profile mix entails the following steps:
1. Divide PIMEventList into various viewing sessions
2. Use events from the current viewing session to learn viewer's liking for various parameters.
3. Compare these liking values with all the clusters' liking values (as computed in section "Clustering Generation"). Compute probability of each cluster being active for the current session.

While computing current profile mix, PIM takes into consideration the explicit login or logout actions taken by the viewer.

Example: Assume there are 3 active clusters in the system. Based on events received, the PIM computes the profile mix to be {0.3, 0.6, 0.1} for a set of profiles {Profile 1, Profile 2, Profile 3}. Let us also assume that profile 1 explicitly logged in. Because of explicit login the probability of Profile 1 being active increases. Thus the resultant profile mix for the given set becomes {0.1, 0.85, 0.05}.

The effect of explicit login reduces with time. This way, the PIM can take care of the situation where a profile logs in but the subsequent viewer events reflect absence of this profile.

Usage of the Profile Mix

The Category Database Module (CDM) and CApp use the profile mix for various purposes.

Get best programs: As shown in FIG. 47, CApp calls a function of CDM to get N best programs (or MbTV picks). The CDM returns a list of programs that includes programs of different profiles' liking. To decide the number of programs for a particular profile, the CDM uses profile mix provided by the PIM.

Example: Assume CApp calls the CDM function to get the 10 best programs. The CDM gets current profile mix from the PIM. Assume the mix is {0.2, 0.7, 0.1} corresponding to a profile set {profile 1, profile 2, profile 3}. In this case, the CDM returns a list of programs that includes 2 programs of profile 1's liking, 7 programs of profile 2's liking and 1 program of profile 3's liking.

Update CDM database: At the time of viewer record generation, VRM gets the current profile mix from PIM. It put this mix in every viewer record it generates.

As shown in FIG. 3, the PDM thread calls a function of the CDM to update the CDM database. This function learns about the viewer's interests. To perform this operation it uses viewer records generated by the VRM. For each viewing record, the CDM updates the liking of profiles based on the profile mix stored in the viewing record.

Example: Assume a profile mix stored in a viewing record is {0.1, 0.9, 0.0} corresponding to a profile set {profile 1, profile 2, profile 3}. In this case, the CDM does not update liking of profile 3 and updates liking of profile 1 and profile 2 based on their respective probabilities.

PIM Functions
  int VIMGetProfileMix(float *profioleMix) This function call can be used to get the profile mix.
  int VIMNotify(viewRec_t *viewRec, cBackInfo_t cBack); This function is called by VRM to pass all the events to VIM.
  int VIMProfileLogin(int id) This function is called at the time of explicit login. Note that this function accepts profile id for logging in and not viewer id.
  int VIMProfileLogout(int id) This function is called at the time of explicit logout.
  int VIMComputeProfileMix( ) VIMComputePofileMix is called by PDM housekeeping thread. This function computes profile mix. It function should be called periodically (every 10 to 30 minutes).
  int VIMComputeClusters( ) VIMComputeClustes is called by PDM housekeeping thread. This function computes/updates clusters. This function should be called before CDMUpdateDatabase function.
  int VIMGetNumProfiles( )
  int VIMAddProfile(int id) This function is called to add a profile.
  int VIMDeleteProfile(int id) Returns number of active profiles.
  int VIMLoad(char fileName, int mode, int offset)
  int VIMCommit(char fileName, int mode, int offset)
  int VIMInit( )
  The PIM interacts with
  VRM
  CDM
  PDM Thread
  EM
  CApp
  IO Manager
  VIM-VRM Both of these modules share view record database. This database is not processed, which means, operations such as, dividing a viewing record into two or more viewing records if it spans across multiple programs, are not performed. VIM uses this database to compute current profile mix.

For every viewing record VRM stores current profile mix. VRM uses VIMGetProfileMix( ) function to get the current profile mix.

The viewing record may be updated with the current profile mix as soon as the VRM creates a viewing record, or optionally the VIM may put the viewing mix in VIMComputeProfileMix, in which case all the explicit login/logout must be stored.

The VRM informs the VIM about various MbTV events. VIMComputeClusters function calls the VRM to get competing programs.

VIM-CDM

The CDM calls VIMGetProfileMix from CDMGetBestProgram function. The CDM builds a list of MbTV picks based on the current profile mix. The CDM also uses the profile mix value to update the CDM database.

VIM-PDM Thread

The PDM thread calls VIMComputeProfileMix( ) and VIMComputeClusters( ) periodically.

VIM-EM

The VIMComputeClusters function calls the EM functions to get program information.

VIM-CApp

CApp calls the VIMProfileLogin and VIMProfileLogout functions. It also calls the VIMAddProfile and VIMDeleteProfile functions.

VIM-IO Manager

IO Manager calls the VIMCommit and VIMLoad functions.

The interface specifications for the preferred embodiment of the PIM are described below.

```
        Declared in custom.h.
#define MAX_PROFILE_NAME_LEN         40;
        Declared in <include/pim_p.h>
#define MAX_PROFILE_COUNT            6;
#define PROFILE_DISABLED             0x01
#define PROFILE_FROZEN               0x02
typedef struct _profile_
{
    ulong        id;
    int          probability;
    ulong        status;
    char         name[MAX_PROFILE_NAME_LEN];
} profile_t, *pprofile_t;
typedef struct _prob_
{
    ulong        profileId;
    int          probability;
} prob_t, *pprob_t;
#define MBTV_NO_SUCH_PROFILE             1
#define MBTV_PROFILE_MAX_REACHED         2
        Declared in pim.h
typedef struct _PIMEventRec_
{
    uchar        type;
    ushort       timeDiff;
    union        _param1_
    {
        void*        channel ID;
        time_t       time;
        ulong        profileID;
        int          probability;
    } param1;
} PIMEventRec, *pPIMEventRec;
/* Events stored in PIM event list */
#define PIM_CHANNEL_CHANGE           1
#define PIM_TV_ON                    2
#define PIM_TV_OFF                   3
#define PIM_TIME_EPOCH               4
#define PIM_PAUSE                    5
#define PIM_RECORD                   6
#define PIM_STOP                     7
#define PIM_LOGIN                    8
#define PIM_LOGOUT                   9
#define PIM_PROFILE_MIX              10
#define PIM_EVENT_EXTENSION          11
#define MAX_PREDICTED_ITEMS          20;
#define MBTV_INVALID_PROFILE_ID      MAX_PROFILE_COUNT
        Declared in pim.c
    /* Max allocation for PimEventList is
PimEventList[MAX_EVENT_COUNT];
PIMEventRec       *PimEventList;
    /* Number of events available in PimEventList. */
int               PimEventCount;
    /* Allocation for PredictedExpectation is
PredictedExpectation[MAX_PROFILE_COUNT]
[MAX_PREDICTED_IT
EMS];
    */
float             **PredictedExpectations;
    /* Allocation for Variations is
Variations[MAX_PROFILE_COUNT];
    */
float             *Variations;
    /* Allocation for ViewingMixture is
ViewingMixture[MAX_PROFILE_COUNT];
    */
float             *ViewingMixture;
profile_t         *profiles;
int               *profileActive;
Name
PIMGetNumProfiles
Synopsis
include <include/pim_p.h>
int
PIMGetNumProfiles(int     *cntProfiles)
```

Description

The input parameter cntProfiles is used to return the number of profiles currently available.

Return Value

On success, returns 0.

Name

PIMGetProfileID

Synopsis include <include/pim_p.h> int

PIMGetProfileID(int profileNum, ulong *profileID)

Description

This function is called to get profile ID. Input to this function is an integer parameter, profileNum, set between 0 and (N−1) where N is the return value of PIMGetNumProfiles. The associated profile ID is returned in the parameter profileID.

Return Value

On success, returns 0.

Error

Returns MBTV_NO_SUCH_PROFILE if there is no profile id associated to profileNum.

Name

PIMGetProfileNumber

Synopsis include <include/pim_p.h> int

PIMGetProfileNumber(ulong profileID, int *profileNum)

Description

This function provides the reverse functionality of the PIMGetProfileID functions and gives the mapping from the profile id specified by profileID to the profile number.

Return Value

On Success, returns 0.

Error

MBTV_NO_SUCH_PROFILE, if profileID is not valid.

Name

PIMAddProfile

Synopsis include <include/pdm.h> int

PIMAddProfile(ulong *profileID)

Description

This function is used to create a new profile id with a set of predefined defaults. The maximum number of profiles that can be created is implementation specific and is set to some predefined upper limit.

Return Value 0 if success. Non-zero otherwise. On success the input parameter profileID is set to the profile id of the newly created profile.

Error

Returns MBTV_PROFILE_MAX_REACHED if maximum number of profiles has been reached.

Name

PIMDeleteProfile

Synopsis include <include/pdm.h>
int
PIMDeleteProfile(ulong profileID)

Description

This function deletes the profile specified by input parameter profileID.

Return Value

Returns 0 on success, non-zero otherwise.

Error

Returns MBTV_NO_SUCH_PROFILE if no profile is associated to profileID.

Name

PIMGetProfileParams

Synopsis include <include/pdm.h>
int
PIMGetProfileParams(ulong profileID, profile_t *pprofile)

Description

This function copies the profile_t structure associated with the profile profileID into the profile_t structure pointed to by pprofile. pprofile points to an area allocated in the caller space.

Return Value

Return 0 on success, non-zero otherwise.

Error

Returns MBTV_NO_SUCH_PROFILE if there is no profile associated to profileID.

Name

PIMSetProfileParams

Synopsis include <include/pdm.h>
int
PIMSetProfileParams(ulong profileID, profile_t *pprofile)

Description

This function sets the profile parameters associated with the profileID as per the profile data in the profile_t structure pointed to by pprofile. pprofile points to an area allocated in the caller space. The caller cannot change profile id using this function.

Return Value

Return 0 on success, non-zero otherwise.

Error

Returns MBTV_NO_SUCH_PROFILE if there is no profile associated to the profileID.

Name

PIMGetCurrentProfile

Synopsis include <include/pdm.h>
int
PIMGetCurrentProfile(ulong numProfiles, prob_t *profileProbability)

Description

This function returns information on which of the specified profiles are currently engaged in watching TV. The profiles of interest are passed in the profileID field of prob_t structures pointed to by profileProbability. If the profileID field is set to MBTV_INVALID_PROFILE_ID, information is passed for first numProfiles profiles supported by the PDM and the profileID field is set to accordingly. The probability field is set to the probability of the profile being currently engaged in watching TV. A probability value of 100 indicates an explicitly logged in profile. A probability value above a predetermined threshold may be considered as a completely recognized profile.

Return Value

Return 0 on success. If profileID is set to MBTV_INVALID_PROFILE_ID at input, it is set to proper values if the function call succeeds. If for any porfileID there exists no associated profile then that profileID is set to MBTV_INVALID_PROFILE_ID.

Error

Returns MBTV_NO_SUCH_PROFILE if for any of the profileID values, there is no associated profile.

Name

PIMNotify

Synopsis include <src/pdm/inc/pim.h>
int
PIMNotify(cBackInfo_t *pcBackInfo, time_t epgTime)

Description

PIMNotify should be called whenever MbTVCallback function is called. pcBackInfo points to a structure of type cBackInfo allocated by the caller. This function does not modify the structure.

Return Value

Always 0

Error

None.

Name

PIMLoginProfile

Synopsis include <src/pdm/inc/pim.h>
int
PIMLoginProfile(ulong profileID)

Description

PIMLoginProfile is called to explicitly inform the presence of a profile in a TV viewing session.

Return Values 0 if no error, non-zero value error value otherwise.

Errors

MBTV_NO_SUCH_PROFILE if profile for the given profileID does not exist.

Name

PIMLogoutProfile

Synopsis include <src/pdm/inc/pim.h>
int
PIMLoginProfile(ulong profileID)

Description

PIMLogoutProfile is called to explicitly logout the profile specified by profileID.

Return Values 0 if no error, non-zero value error value otherwise.

Errors

MBTV_NO_SUCH_PROFILE if profile for the given profileID does not exist.

Name

PIMComputeProfileMix

Synopsis include <include/pdm.h>
include <src/pdm/inc/pim.h>
int
PIMComputeProfileMix( )

Description
PIMComputeProfileMix is called by PDM housekeeping thread. It computes current profile mix. It should be called periodically.
Return Value
Return 0 if successful, non-zero otherwise.
Name
PIMComputeProfiles
Synopsis
include <include/pdm.h>
include <src/pdm/inc/pim.h>
int
PIMComputeProfiles( )
Description
PIMComputeProfiles is called by PDM housekeeping thread. It computes and updated profiles. It should be called periodically. This function should be called before updating CDM database.
Return Value
Return 0 if successful, non-zero otherwise.
Name
PIMLoad
Synopsis
include <include/pdm.h>
include <src/pdm/inc/pim.h>
int
PIMLoad(char *fileName, int mode, int offset)
Description
IO manager calls this function to load PIM related data from a file. PIMLoad reads data into the following data structures.
   PimEventList
   PredictedExpectations
   Variations
   profiles
   ViewingMixture
Return Value
Returns number of bytes read by this function if successful. Negative value in case of an error.
Name
PIMCommit
Synopsis
include <include/pdm.h>
include <src/pdm/inc/pim.h>
int
PIMCommit(char *fileName, int mode, int offset)
Description
IO manager calls this function to save PIM related data into a file. PIMCommit writes following data structured into a file.
   PimEventList
   PredictedExpectations
   Variations
   profiles
   ViewingMixture
Return Value
Returns number of bytes written by this function if successful, or a negative value in case of an error.
Viewer Record Manager
   The interface specifications of the preferred embodiment of the VRM are described below.

```
    Declared in <include/pim_p.h>
#define MAX_PROFILE_COUNT          6;
        Declared in <include/common_p.h>
/* VRM states */
#define MBTV_POWER_ON              1
#define MBTV_POWER_STANDBY         2
#define MBTV_REWIND                3
#define MBTV_FAST_FORWARD          4
#define MBTV_PAUSE                 5
#define MBTV_RESUME                6
#define MBTV_PLAY                  7
#define MBTV_RECORD                8
#define MBTV_STOP                  9
#define MBTV_JUMP_TO_LIVE         10
#define MBTV_CHANNEL_CHANGE       11
#define MBTV_LINEUP_CHANGE        12
#define MBTV_END_CHANNEL          13
#define MBTV_SKIP_BACKWARD        14
#define MBTV_SKIP_FORWARD         15
typedef struct _cBackInfo__
{
    int         currEventType;
    int         prevEventType;
    time_t      eventTime;
    time_t      eventDuration;
    void*       channelID;
    int         channelType;
    int         errorNum;
    int         reserved;
} cBackInfo_t, *pcBackInfo_t;
        Declared in config.h
#define BINARY_FORMAT       2
#define ASCII_FORMAT        1
        Declared in <include/vrm.h>
#define PGM_JUMP_MAX_TIME   120 /* 120 minutes of
*/
/*   jumping off and on          */
#define PGM_WATCH_TRESHOLD   1    /* 5 minutes treshold
*/
/* to create viewer record       */
#define PGM_SCAN_TRESHOLD    7    /* 7 seconds to treshold
*/
typedef struct
{
    void       *channelID;
    time_t     viewingTime;
    time_t     epgTime;
    ushort     viewingDuration;
    uchar      channelType;
#ifdef _VIM_
#define MAX_PROFILE_NUM    MAX_PROFILE_COUNT
    uchar   probability[MAX_PROFILE_NUM];
#endif
} viewRec_t;
        Declared in vrm.c
/* max allocation for viewer record database (implementation
dependent) */
#define VIEWER_MAX_SIZE     (1024 * sizeof(viewRec_t))
        Public Interface Functions
        Declared in names_p.h
#define MbTVCallBack       VMCallBack
        Declared in vrm_p.h
int    VMCallBack(cBackInfo_t *cBInfo);
        Internal Interface Functions
        Declared in vrm.h
int    VMInit(void);
int    VNCommit(char *fName, int offset, int mode);
int    VMLoad(char *fName, int offset, int size, int mode);
viewRec_t *VMGetNextViewingRec(viewRec_t *ptr, time_t start);
int    VMProcessViewingRec(time_t start, time_t end);
int    VMDeleteViewingRec(time_t till);
```
Name
VMInit
Synopsis
include <pdm/inc/vrm.h>
int VMInit(void)
Description
Initialises VRM by allocating memory for all internal objects and assigning default values to all global variables,
Return Value
On success, returns 0.
Name
VMCommit Synopsis
include <pdm/inc/vrm.h>
int VMCommit(char *fName, int offset, int mode);
Description
This function stores all VRM inetrnal objects and states into the file given by fName argument at the offset given by offset argument. The argument mode is used to specify either binary or asci mode of data representation on the file. It can be respectively BINARY_FORMAT or ASCII_FORMAT.
Return Value
On success, returns 0.
Name
VMLoad
Synopsis
include <pdm/inc/vrm.h>
int VMLoad(char *fName, int offset, int size, int mode);
Description
This function restores all VRM inetrnal objects and states from the file given by fName argument at the offset given by offset argument. The argument mode is used to specify either binary or asci mode of data representation on the file. It can be respectively BINARY_FORMAT or ASCII_FORMAT.
Return Value
On Success, returns 0.
Name
VMGetNextViewingRec
Synopsis
include <pdm/inc/vrm.h>
viewRec_t    *VMGetNextViewingRec(viewRec_t    *ptr, time_t start)
Description
This function gets viewer records from database. Fist time it is called With NULL value of the ptr argument. It returns pointer to the first available viewer record since the time which is given by start argument.
If the value of start argument is (time_t)0 the function returns the first record in the current viewing session. In all subsequent calls the argument ptr is to be used as positional context for the next viewer record.
The argument start is used to get viewer record starting from this particular time. If viewer record has a viewingTime value less then a value of the start argument and a viewingDuration+viewingTime is greater then this value such viewer record will be skipped.
Before call to VMGetNextViewingRec( ) be sure to call VMProcessViewingRec( ) to prepare viewer records for the given period of time.
Return Value
On success: a pointer to the next viewer record, otherwise (no more viewer records) NULL.
Name
VMProcessViewingRec
Synopsis
include <pdm/inc/vrm.h>
int VMProcessViewingRec(time_t start, time_t end);
Description
VMProcessViewingRec( ) generates viewer record starting from given start time value till end. It fills in all fields of viewRec_t structure what is not possible during viewing record creation. It calls EPG library functions and TSM module functions to obtain all information needed for viewer record.
Viewer records originally are created by VMCallback( ) function and keep information on when and on which channel it has been done.
VMProcessViewingRec( ) function may divide original record into several different ones accordingly to how many programs were available during the period described by the viewingDuration field of the viewer record.
Return Value
Returns 0 on success, non-zero otherwise.
Name
VMDeleteViewingRec
Synopsis
include <pdm/inc/vrm.h>
int VMDeleteViewingRec(time_t till);
Description
VMDeleteViewingRec( ) deletes all viewer records since start of the current viewing session and until the time specified by the till argument. It also unlocks virtual channel data in SDM for each deleted record corresponding to that virtual channel.
Return Value
Return 0 on success, non-zero otherwise.
Name
VMCallBack
Synopsis
include <pdm/inc/vrm p.h>
void VMCallBack(cBackInfo_t *cBInfo);
Description
VMCallBack( ) supports communications between the VRM, the Category Database Manager (CDM), the Profile Identification Module (PIM) and the Storage and DVCR Manager (SDM). VMCallBack( ) is called by the SDM every time any of VRM events has come.
The following is the set of VRM events.

| #define MBTV_POWER_ON | 1 |
| #define MBTV_POWER_STANDBY | 2 |
| #define MBTV_REWIND | 3 |
| #define MBTV_FAST_FORWARD | 4 |
| #define MBTV_PAUSE | 5 |
| #define MBTV_RESUME | 6 |
| #define MBTV_PLAY | 7 |
| #define MBTV_RECORD | 8 |
| #define MBTV_STOP | 9 |
| #define MBTV_JUMP_TO_LIVE | 10 |
| #define MBTV_CHANNEL_CHANGE | 11 |
| #define MBTV_LINEUP_CHANGE | 12 |
| #define MBTV_END_CHANNEL | 13 |
| #define MBTV_SKIP_BACKWARD | 14 |
| #define MBTV_SKIP_FORWARD | 15 |
| #define MBTV_ADD_CHANNEL | 16 |
| #define MBTV_DELETE_CHANNEL | 17 |

In response to these events VMCallBack( )
MBTV_POWER_ON, MBTV_POWER_STANDBY: creates or terminates a viewing session;
MBTV_CHANNEL_CHANGE, MBTV_POWER_STANDBY,
MBTV_PAUSE, MBTV_STOP, MBTV_END_CHANNEL: generates viewing records;
MBTV_ADD_CHANNEL, MBTV_DELETE_CHANNEL: add/delete premium channels to/from channel lineup.

In addition, for every event it notifies the VIM by calling VIMNotify( ) function and for every viewer record generated it notifies the VIM by calling VIMGetProfileMix( ) function. Viewer records are generated in the following way.

If channel viewing duration is less than PGM_SCAN_TRESHOLD (7 seconds) then viewing record is not created. Otherwise it is created and goes into intermediate buffer. If it stays in this buffer longer than PGM_WATCH_TRESHOLD (5 minutes) it is processed to break it onto set of viewer records corresponding to all different programs watched during live time of the original record and then all of them which are longer than PGM_WATCH_TRESHOLD go into viewer record database.

If viewer record coresponds to a virtual channel its EPG data is locked in SDM by call to SDMLockChannelEPG-Data( ) made by the VRM.

Return Value

None.

Categories Database Module

The viewer record generated by VRM gives information about events such as channel change, power on and power off. The CDM uses these viewer records to generate the Liking records. Liking records are used to monitor a set of EPG parameters of the programs derived from the viewer records. Of all the EPG parameters available for a program, only a few selected ones are relevant for generating CDB Liking records. Each liking record comprises of a set of EPG parameters. Information is also kept on the cumulative viewing duration of the set of parameters and the cumulative duration for which it was available for viewing. For storing the EPG parameters in the liking record, the CDB first inserts the EPG parameter strings in the String Table and uses the index (returned by the String table) in place of the actual parameter string.

Functional Design Description

The CDM functions can be classified into

Creation and updating of Liking records. The array of Liking records is also called the Category Database. This is described in the following section.

Computation of MbTV picks or MbTV top 10 and Program Ratings from the data in Category Database. This is described in the document-titled cdb.txt.

The VRM maintains a list of viewer actions as viewer records. The CDM uses these viewer records to create liking records.

The PDM background thread calls the CDMUpdateDatabase function. The CDMUpdateDatabase is achieved in 2 passes.

Pass-1: It reads viewing records from VRM. CDM uses information stored in a viewing record to get program information from Internal EPG (IEPG). It creates a set of index (these indexes are created when the EPG parameter string is entered in the String table) using the program information. This set of index forms a part of Liking record. It there exists no liking record with the given set of index, CDM creates one such record and puts it into Liking Record Database. Liking records created are of type self-learnt or user-prompted. There are some cases, such as Pay Per View channels, where some special handling is done. When inserting a new liking record the CDB scans for existing liking records for which some of the EPG parameter's values are the same. For each such matching record, a new liking record is created which consists of the only the matched parameter values.

Consider the following example. Let the EPG parameters being monitored be the Channel Parameter, Program Type & Title. Let one of the existing liking records comprise of the parameter values of (CNN, News, Evening News) respectively. Let the new record to be inserted comprise of the parameter values of (FOX NEWS, News, Fox News) respectively. When insert the above record, an additional record is also inserted which comprises of (DC, News, DC). Here DC refers to a predefined value (to signify a Don't Care condition) which would be considered a match with all parameter values that it is compared with. For example liking records comprising of (CNN, News, Evening News) and (DC, News, Evening News) are considered to be completely matched.

Pass-2: It updates the time watched and the time available fields for all matched the liking records. For a program viewed by the viewer, value of time watched and time available is computed using the viewing record and the liking records of all the matched records are updated. For all other programs that were available at the same time the time available field is updated for all the matching records. The watched/available value correlates to the viewer's interest and is the basis for future computations for program preference.

Consider the liking records given in the table below. Keys used in the table are given below.

| Table Keys | |
|---|---|
| Recordno - | RNO |
| ProgramType - | PTY |
| Channel - | CHN |
| Category - | CTG |
| Stars - | STR |
| Affiliation - | AFF |
| ProgramTitle - | PTT |
| TimeWatched - | TWP(x) |
| TimeAvailable - | TAP(x) |
| RecordCount.- | RCN |
| Episode - | EPI |
| Comedy | COM |

Note in the above field acronyms since there are multiple profiles TimeWatched and TimeAvailable take on multiple values. Thus TimeWatched - TWP(x) means TimeWatchedProfile(1), TimeWatchedProfile(2) etc. Similarly for TimeAvailable.

| RNO | PTY | CHN | CTG | STR | AFF | PIT | TWP (1) | TAP (1) | TWP (2) | TAP (2) | RCN |
|---|---|---|---|---|---|---|---|---|---|---|---|
| 1 | EPI | ABC | COM | DC | DC | 0 | 0 | 0 | 0 | 0 | 0 |
| 2 | EPI | TNN | COM | DC | DC | Kids in the Hall | 30 | 60 | 15 | 15 | 1 |
| 3 | EPI | TNN | Music | Carey | 0 | DC | 0 | 0 | 15 | 15 | 1 |
| 4 | EPI | TNN | Action | Chan | 0 | Bronx Rumbles | 60 | 60 | 15 | 15 | 1 |
| 5 | EPI | TNN | COM | Jane | 0 | For your love | 20 | 20 | 0 | 0 | 1 |
| 6 | EPI | ABC | Music | DC | 0 | DC | 15 | 45 | 0 | 0 | 1 |
| 7 | EPI | ABC | Music | DC | DC | DC | 10 | 60 | 45 | 45 | 1 |

| 8 | EPI | DC | News | 0 | 0 | DC | 15 | 15 | 15 | 45 | 1 |
| 9 | EPI | CNN | News | 0 | 0 | Evening News | 0 | 0 | 30 | 30 | 1 |
| 10 | EPI | FOXNews | News | 0 | 0 | Fox News | 0 | 60 | 0 | 0 | 1 |

Let the viewing record specify a viewing duration of 15 minutes for the program comprising of EPG parameters (CNN, News, Evening News). Let the set of programs available at that time be programs comprising of the EPG parameters FOXNews, News, FoxNews) and (CNN, News, Evening News). The liking records updated for both watched & available values are record numbers 9 & 8. The liking records updated for available values only records 10 & 8.

Data Structures
The main data structures used by the CDM are:
1. The viewRec_t structure. (described in the document VRM.doc)
2. The likingRecord structure
3. The ProgramInfo structure (described in the PDM I/F document)

The likingRecord structure is as follows:

```
typedef _likingRecord_    likingRecord, *plikingRecord;
struct _likingRecord_
{
    ushort      index[INDEX_COUNT];
    uint        watched[MAX_PROFILE_COUNT];
    uint        available[MAX_PROFILE_COUNT];
    ushort      recordCount[MAX_PROFILE_COUNT];
    /* Assuming maximum 16 profiles. Each profile will use
    one bit from    recordCountUpdated variable */
    ushort      recordCountUpdated;
};
```

In the liking record structure:

| | |
|---|---|
| Index: | This is an array of parameters that relate to program watched. The parameters themselves can be "Program Name", "Program Title", "Program Category" etc. |
| Watched: | This gives the duration of time for which the program was watched. |
| Available: | This gives the duration of time for which the program was available. |
| RecordCount: | This is incremented as and when the similar type of liking record is generated. It is mainly used as a reference count. |
| RecordCountUpdated: | This is used to identify the profile under which the record count was updated. |

The interface specifications of the preferred embodiment of the VRM are described below.

The Implicit Filters
The interface functions that are available for implicit filters are:
Name
SDMGetNumImplicitFilters—Returns the number of Implicit filters that are available for use.
Synopsis
include "src/sdm/inc/sdm.h"
int SDMGetNumImplicitFilters(int *fltCnt)
Description
This function returns the number of implicit filters supported. This is known at compile time itself by a #define.

Return Value
On success, zero is returned. On error a non-zero is returned.
Name
SDMGetImplicitFilterID—Returns the ids of Implicit filters that are available for use.
Synopsis
include "src/sdm/inc/sdm.h"
int SDMGetImplicitFilterID(int filterNum,void **filterID);
Description
This function returns the ids of implicit filters supported. These ids are known at compile time itself by a #define. The id for the implicit filters is always some number other than those assigned to the explicit filters.
Return Value
On success, zero is returned. On error a non-zero is returned
Name
GetMaxFilters—Returns the max number of filters that are permitted.
Synopsis
include "src/sdm/inc/sdm.h"
int getMaxFilters(int filterFlag);
Description
This function takes as argument an integer which denotes whether it is for explicit filters OR implicit filters and returns the maximum number of filters that are permitted for each category.
Return Value
On success, the max number is returned On error a negative-number is returned.
  CDM Updating
Name
CDMUpdateDatabase—Updates the Category database up to a given endtime.
Synopsis
include "src/pdm/inc/cdm.h"
int CDMUpdateDatabase(time_t endTime);
Description
This function updates the Category Database Manager with the available viewer records up to a given time period.
Return Value
On success, zero is returned. On error a non-zero is returned.
  Deactivation Filters
  The following data structure is used for Learning deactivation.

```
Struct dfilter_t
{
    ulong id;
    void * chnlID;
    int   deactivateStart;
    int   deactivateEnd;
}
```

The CDM supports the following functions for Learning Deactivation:
Name
CDMCreateDFilter—To create a new Deactivation Filter.

Figure 49:
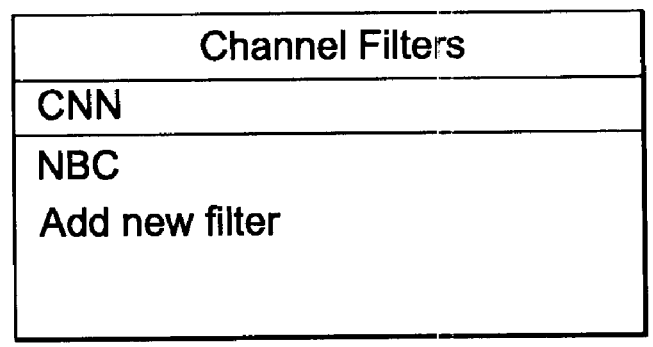

Synopsis
include "src/pdm/inc/cdm.h"
int CDMCreateDFilter(ulong *dfilterID);
Description
This function creates the new learning deactivation filter with an id value
0<id<MAX_DFILTER_ID
Return Value
On success, zero is returned. On error a non-zero is returned.
Name
CDMDeleteDFilter—To delete a Deactivation Filter.
Synopsis
include "src/pdm/inc/cdm.h"
int CDMDeleteDFilter(ulong *dfilterID);
Description
This function deletes deactivation filter with the specified id.
Return Value
On success, zero is returned. On error a non-zero is returned.
Name
CDMGetDFilter—Returns the learning deactivation filter information for the specified id.
Synopsis
include "src/pdm/inc/cdm.h"
int CDMGetDFilter(ulong dfilterID,dfilter_t *pdFilter);
Description
This function fills in the dfilter_t structure with information when it is called with a specific id, and preallocated dfilter_t structure.
Return Value
On success, zero is returned. On error a non-zero is returned.
Name
CDMSetDFilter—The learning deactivation filter information for the specified id is updated using this function
Synopsis
include "src/pdm/inc/cdm.h"
int CDMSetDFilter(ulong dfilterID,dfilter_t *pdFilter);
Description
This function updates the dfilter_t structure with information when it is called with a specific id.
Return Value
On success, zero is returned. On error a non-zero is returned.
PDM Operation
FIGS. 48 and 49 depict the data flow stream of the various modules of the PDM and their interaction with the other elements comprising the overall system within which the present invention is preferably intended to function. The following sections present examples of the type of data generated by the various modules as part of the preference determination process.
Click Stream Data
Generated by the VRM Foreground Module
As the user operates the Television, or displayed STB, events such as channel change and power off are saved in the Click Stream data storage, see example in table n9x.
The actual value stored is a Unique Identifier (EPG-UID), fetched via the CAPP from the EPG Library module, and originally generated by the native EPG system for the channel. This can be cross-referenced back to the actual tuning details and channel name by the EPG Library module at a later time as required. For the case of Power-Off the MBTV software generates another Unique ID value.
The probability columns are added after computation by the PIM to predict which profile (cluster) or viewer or viewing group is watching now based on past viewing, see PIM data and profiles data later.

| Event number | Channel Change ID Event or Power Event | TIME | Profile 1 Probability | Profile 2 Probability | Profile n Probability |
|---|---|---|---|---|---|
| 1 | EPG-UID Channel 1 | 6:00:00 | 0.1 | 0.9 | 0 |
| 2 | EPG-UID Channel 2 | 6:10:00 | 0.4 | 0.6 | 0 |
| 3 | EPG-UID Channel 1 | 6:15:00 | 0.2 | 0.8 | 0 |
| 4 | EPG-UID Channel 2 | 6:25:00 | 0.3 | 0.7 | 0 |
| 5 | UID for Power Off | 6:35:00 | | | |
| 6 | | | | | |

Viewer Record Data
Generated by the VRM Background Module
The number of records of the Click Stream data is expanded to also include program change events, see 6:30 in the example in table n9x. So a 'lack of action' taken by a viewer as a program changes is compensated for by adding the Program change events and saving the new data in the Viewer Record Data store.
The probability columns are copied down from the click stream data.

Viewer Record Data Store Example

| Event number | Enhanced Channel Change ID Event or Power Event | TIME | Profile 2 Probability | Profile 2 Probability | Profile n Probability |
|---|---|---|---|---|---|
| 1 | EPG-UID Channel 1 | 6:00:00 | 0.1 | 0.9 | 0 |
| 2 | EPG-UID Channel 2 | 6:10:00 | 0.4 | 0.6 | 0 |
| 3 | EPG-UID Channel 1 | 6:15:00 | 0.2 | 0.8 | 0 |
| 4 | EPG-UID Channel 2 | 6:25:00 | 0.3 | 0.7 | 0 |
| 5 | EPG-UID Channel 2 | 6:30:00 | 0.3 | 0.7 | 0 |
| 6 | UID for Power Off | 6:35:00 | | | |
| 7 | | | | | |

Viewer History Data
Generated by the VHM Background Module
This time information is saved about which programs have been viewed (not channels this time). This is for use by modules that use the Preference Database, e.g. the Storage Module (DKM), where there is only a need to know which programs have been watched.
Three items are used by the VHM software module to make a unique 4 byte Program ID value called PGM-UID which is saved in the store. The three items are as follows:
(1) Program Title
(2) Program Sub-Ttitle
(3) Episode Title.
The PGM-UID, once generated, cannot be reverse processed back to the original information. As a point of information, this is text rather than knowledge based. So for example spelling mistakes in any of the original three items are unavoidably processed to give the appearance of a different program.

| Viewer History Data Store Example | |
|---|---|
| Event number | Program Viewed MBTV ID Event |
| 1 | PGM-UID |
| 2 | PGM-UID |

-continued

Viewer History Data Store Example

| Event number | Program Viewed MBTV ID Event |
|---|---|
| 3 | PGM-UID |
| 4 | |

PIM Event List Data

This is a collection of click stream data but contains the Event type e.g. Channel Change is an event type, Login is an event type and also Power On or Power Off. Also included is the time of the Event and any necessary parameters. The stored TYPE value is an MBTV defined constant number. This number can be cross-referenced to the description of the event.

Relevant parameters are the EPG-UID (Channel Unique ID) for the Channel Change Event. For the Login event type the parameter is an MBTV derived number.

PIM Event List Example

| Event number | Event -TYPE of Event | TIME | Related PARAMETER |
|---|---|---|---|
| 1 | CHANNEL CHANGE | 6:00:00 | Channel (EPG-UID) 1 |
| 2 | CHANNEL CHANGE | 6:10:00 | Channel (EPG-UID) 2 |
| 3 | CHANNEL CHANGE | 6:15:00 | Channel (EPG-UID) 1 |
| 4 | CHANNEL CHANGE | 6:25:00 | Channel (EPG-UID) 2 |
| 5 | POWER OFF | 6:35:00 | None |
| 6 | PROFILE LOGIN | 6:45:00 | Profile (MBTV number) |

The information in the above table is used to derive the profile or cluster data.

Profile Data (Also Called Cluster Data)

The default set-up is for 3 of these Profile data sets (i.e. 3 tables) though this may be changed by user intervention. Single or group viewing data is sorted in to Profiles sometimes called Clusters. The PIM software examines the PIM Event list table. Channel change events are copied in to each profile and values set. Based on viewing statistics collected over a time the Average Liking and Deviation is calculated by MBTV software using the 'EM Algorithm' for clustering which is referenced.

The lower the actual value for Average Liking the less the channel is favored by the particular profile. The values are used periodically to compute which profile is viewing at that time. That is a probability number attached to the Click Stream Data. So the guess about which profile is viewing at this time is based on past history.

PIM Profile (Cluster) Example of one of the 3.

| Entry number | Channel ID | Average (Liking) | Deviation |
|---|---|---|---|
| 1 | EPG-UID | 0.008 | 0.0002 |
| 2 | EPG-UID | 0.01 | 0.0004 |
| 3 | EPG-UID | 0.02 | 0.0006 |
| 4 | EPG-UID | 0.008 | 0.0002 |
| 5 | | | |

Back-Up IO Manager Module

The I/O Manager is the module which will interacts with all other modules in PDM and SDM for the storage and retrieval of data i.e. backup and loading of all the data from these modules. Following are the list of the modules and also the sub modules present in the system with which IO Manager interacts.

PDM
String Table (ST)
Category Database (CDB)
Viewer Record Module (VRM)
Internal EPG (IEPG)
Viewer History Module (VHM)
Profile Identification Module (PIM)
SDM
Storage and Retrieval Data from the each module is stored in a separate files which will have the prefix which is read from the customs.h or from the read from the config file and the undersigned module name with that. For example if we are having the prefix as Mbtv in config file then we will have the following files created by the IO Manager Mbtv_cdb
Mbtv_st
Mbtv_vrm
Mbtv_vhm
Mbtv_pim
Mbtv_iepg
Mbtv_sdm The different functions that are supported by the IO Manager are as follows:

1. IOLoad(void);

Description: This function loads the all the data for the PDM and SDM by calling the appropriate Load functions that are present in the different modules.

Returns: Returns 0 upon success and non zero value if any error occurs.

The data for the different modules are loaded in the following sequence.

STLoad(char fileName, int offset,int mode);
/* String Table Load */ CDMLoad(char fileName, int offset,int mode);
/* Category Database Load */ VMLoad(char fileName, int offset,int mode);
/* Viewer Record Load */ EMLoad(char fileName, int offset,int mode);
/* Internal EPG Load */ VHMLoad(char fileName, int offset,int mode)
/* Viewers History Load */ PIMLoad(char fileName, int offset,int mode)
/* PIM Load */ SDMLoad(char fileName, int offset,int mode);
/* SDM Load */

2. IOCommit(void);

Description: This function commits the all the data for the PDM and SDM by calling the appropriate commit functions that are present in the different modules. The setIOState ( ) function is called before calling this function which will set the flag, which in turn indicates the module data to be committed.

Returns: Returns 0 upon success and non-zero value if any error occurs.

3. setIOState(int. flag);

Description: This function is used for setting the value for the flag variable, which will indicate module to be committed.

Returns: Returns 0 upon success and non-zero value if any error occurs.

Following are the different flag values that are passed to the setIOState function.

| | |
|---|---|
| # define ST_COMMIT | 0x8000 |
| # define CDM_COMMIT | 0x4000 |
| # define VRM_COMMIT | 0x2000 |
| # define PIM_COMMIT | 0x1000 |
| # define VHM_COMIMIT | 0x0800 |
| # define EM_COMMIT | 0x0400 |
| # define SDM_COMMIT | 0x0200 |
| # define ALL_COMMIT | 0x0100 |

When the flag is set to ALL_COMMIT the following commit functions that are available in the different modules are called.

CDMCommit(char fileName,int offset,int mode); /* Category Database Commit*/

STCommit(char fileName,int offset, int mode); /* String Table Commit */

VMCommit(char fileName, int offset, int mode); /* Viewer Record Commit */

EMCommit(char fileName, int offset, int mode); /* Internal EPG Commit */

VHMCommit(char fileName, int offset, int mode) /* Viewers History Commit */

PIMCommit(char fileName, int offset, int mode) /* PIM Commit */

SDMCommit(char fileName, int offset, int mode); /* SDM Commit */

4. int getIOState(int *flag);

Description: This function is used for reading the value of flag variable, which is set by using the setIOState function.

Returns: Returns 0 upon success and non-zero value if any error occurs.

5. int clearIOState(int flag);

Description: This function is used for resetting the value of flag variable, which is set by using the setIOState function.

Returns: Returns 0 upon success and non-zero value if any error occurs.

CDB File Format
File Header

```
        struct CDMFileHeader
        {
            char    name[128];
            float      version;
            long     time;
            int       indexCount;
            int       nonWildIndexCount;
        };
```

Data from the CDB:—

```
struct __likingRecord__
{
    unsigned short  index[INDEX_COUNT];
    unsigned int    watched[MAX_PROFILE_COUNT];
    unsigned int    available[MAX_PROFILE_COUNT];
    unsigned long   recordCount[MAX_PROFILE_COUNT];
    unsigned short  recordCountUpdated;
};
```

VRM File Format:
File Header

```
            struct VRMFileHeader
            {
                char    name[128];
                float      version;
                long     time;
                int       Number of records.
    int.          Size.
            };
```

Data

```
        typedef struct
        {
            char    *data;  /* pointer to data */
            uint    size;   /* memory image size in bytes */
            uint    maxSize;
            uint    alive;  /* position in the viewer
            database of the first alive record */
            short   del;    /* number of deleted records */
        } viewer_t;
typedef struct
{
    void    *channelID;
    time_t  viewingTime;
    time_t  epgTime;
    ushort  viewingDuration;
    uchar   channelType;
#ifdef _VIM__
#define MAX_PROFILE_NUM    MAX_PROFILE_COUNT
    uchar   probability[MAX_PROFILE_NUM];
#endif
} viewRec_t;
        While Storing in ASCII
        .One record per one line
        .ChannelID is replaced by Channel Name
```

IEPG File Format
File Header

```
            struct IEPGFileHeader
            {
                char    name[128];
                float      version;
                long     time;
                int       Number of records.
    int.          Size.
            };
```

Data

```
typedef struct {
    time_t  pgmStartTime;
    ushort  pgmDuration;
    uint    mask :24;           /* 24 possible
available Mbtv pointers */
    uint    len :8;             /* total record
length */
    mbtv_t  ptrs[24];
} epgRec_t;
typedef struct {
    uint    size;               /* memory image size in
bytes */
    uint    maxSize;            /* max size of the image */
    ushort  del;                /* number of deleted
records */
```

ST File Format:
Table Header

```
    char        *data;           /* pointer to data */
} epgDb_t;
```

```
    ulong       delList;         /* offset of the list
of  */
                                 /* deleted strings
*/
    ulong       size;            /* offset of free space
*/
    ulong       maxSize;         /* maximum table size
*/
    ulong       strNum;          /* string number */
    ulong       maxStrNum;       /* maximum string number
*/
```

Data
String Table Data.
Note:
String table is not stored in ASCII mode.

VHM File Format
File Header

```
struct VHMFileHeader
{
    int     idCount;
    int     sortedListIDCount;
    int     historyListSize;
    float   version;
};
```

Data
Array of Ulong

PIM File Format
File Header

```
struct PIMFileHeader
{
    char    name[128];
    float   version;
    long    time;
    int.    Number of records.
int.    Size.
};
```

Data
1. PIM Event List

```
            PIMEventRec *PimEventList;
            typedef struct PIMEventRec
            {
                uchar type;
                ushort timediff;
                union param1
                {
                    void* channelID;
                    time_t time;
                    ulong profileID;
                    int probablity;
                }param1;
            } profile_t;
```

2. Predicted Expectations
float **PredictedExpecttations;
3. Variations
float *Variations;
4. Profiles

```
typedef struct profile_ {
    ulong   id;
    int     probablity;
    ulong   status;
    char    name[MAX_PROFILE_NAME_LEN];
} profile_t;
```

5. Viewing Mixture
float *ViewingMixture;

SDM File Format
File Header

```
struct SDMFileHeader
{
    char    name[128];
    float   version;
    long    time;
};
```

Data
Virtual Channel Count
Virtual Channel Data

```
struct _channel_info_
{
    void    *chID;
    char    chName[CH_NAME_SIZE];
    void    *chData.
    char    prm1[20];
    char    prm2[20];
};
```

No of Filters
Filter Data

```
typedef struct _filter_
{
    ulong   filterID;
    int     userID;
    ulong   filterTypeID;
    char    filterString[MAX_NUM_PARAMS] [MAX_PARAM_LEN];
    int     currAllocation;
    int     maxAllocation;
    int     desiredAllocation;
} filter_t, *pfilter_t;
```

Current State of SDM
Config File Manager

Config File manager is the module, which is used to read the different values from the configuration file for the particular tag value. The different interface functions that are present in the config file manager are as follows.

1. int readconfig(char *filename,char *token,char *buffer, int *len);

Description: This function is called for reading the value of the tokens from the text file. The first argument for the function is the filename from which the token has to be read, second argument is the name of the token whose values are going to be read, third argument is the buffer to which the token values are copied and the fourth argument is the length of the buffer.

Returns: Returns 0 upon success and non-zero value if any error occurs.
Calls: int fileinit(char[ ],char[ ]);
int readtockens(char*,int,char*,int*);
2. FILE* fileinit(char *filename,char *mode);
Description: This function open the file mentioned in the first argument with the mode mentioned in the second argument.
Returns: Returns FileHandle upon success and NULL if any error occurs.
3. int readtockens(char *tag,int fp,char *buffer,int *len);
Description: This function will read the token values for the tag present in the first argument from the file fp and stores in the buffer with a separator "@" and the length of the buffer is stored in len.
Returns: Returns 0 upon success and non-zero value if any error occurs.

Config File Format:—
[Tag_BEGIN] ← Specifies the tokens whose values have to read.
Value
Value
Value
[Tag_End]

Sample Config File With the above Format:—
MBTV_CONFIG_FILE_NAME_BEGIN
Mymbtv.txt
MBTV_CONFIG_FILE_NAME_END
MBTV_IO_PREFIX_BEGIN
Mbtv
Mbnw
IOFile
MBTV_IO_PREFIX_END Storage and DVCR Manager The viewer preferences and program ratings monitored by the PDM are stored and managed by the Storage and DVCR Manager, or SDM.

The SDM is a machine storage manager that records and stores user program preferences. It is an independent storage module, working in conjunction with the PDM to optimize storage content. It controls access to the DVCR in the Set Top Box, recording desirable programs, either through the automatically learned set of viewer preferences provided by the PDM or through explicit viewer request.

The main control of the STB resides in a Controlling Application (CApp) which interfaces with various modules (including the SDM and PDM) of a STB to manage the aggregate functionality of a STB. The CApp manages the UI for the STB and calls the appropriate modules to execute user requests. All requests requiring DVCR functionality and recordation are directed by the CApp to the SDM. To provide DVCR functionality the SDM relies on an underlying independent DVCR library. All request to record, play, fast forward or rewind a live or recorded program are passed by the CApp to the SDM which in turn forwards them to the DVCR library with the appropriate parameters. To obtain EPG data for recording purposes the SDM assumes the availability of an external EPG library to which it make appropriate calls to retrieve required program data (it relies on the same EPG interface the PDM accesses to obtain EPG data). Control of the TV tuner for channel change purposes is done independent of the SDM by the CApp. For automatic recording of programs the SDM uses the services of the PDM and a Viewing Status Module (VSM). The PDM is used to determine the choice of programs being recorded. The VSM module determines when the viewing device has been turned off or has become inactive so as to start the process of automatic recording and when the viewing device has been turned on or has become active to stop automatic recording.

To provide DVCR functionality the SDM relies on an underlying independent DVCR library. All user requests to record, play, fast forward or rewind a live or recorded program are passed by the CApp to the SDM, which forwards them with the appropriate parameters to the DVCR library.

The SDM is largely managed by the CApp, which controls the TV tuner for channel change and provides an EPG Database library. The SDM makes appropriate calls to the EPG library to retrieve required program data, relying on the same EPG interface that the PDM accesses.

The SDM also requires a Viewing Status Module (VSM), which tells the SDM when the viewing device, or TV screen, is inactive. Automatic recording, requested by the PDM, can only be performed by the SDM when the viewing device is off. The VSM module determines when the viewing device is inactive, so that the SDM can start automatically recording programs the viewer has requested or the PDM has determined to be desirable by examining the viewer's profile. When the viewing device becomes active the VSM stops automatic recording.

SDM Features

The SDM feature set includes these activities:
Recording programs specified by the PDM
Deleting stored programs, either by user request or automatically
Providing filters that allow users to control storage policies, by choosing which factors will cause a program to be stored or deleted
Providing locking mechanisms that prevent the automatic deletion of stored programs if the viewer wishes to retain them
Providing Electronic Program Guide (EPG) information for all the programs it has recorded
Notifies the Controlling Application (CApp) of all requests that require DVCR functionality and recording SDM Basic Operations The SDM has two basic operations: it records programs, optimizing storage content, and it controls access to DVCR functionality.

Notice, however, that the SDM interface with the CApp provides services to two types of MbTV channel:
live programs watched with time shift functionality. The channels on which such programs occur are called Time Shift Enabled (TSE) channels.
Virtual Channels, which contain previously recorded material, also require SDM service functions to provide DVCR services.

Program Recording

The SDM typically initiates program recording when the VSM has determined that the viewing device (e.g. TV) is off, and while it records it generates an event list of desirable programs. When storage becomes a constraint, the SDM determines which stored programs should be deleted to make room for more desirable programs, including the viewer's explicit recording requests. The SDM stops automatic recording when the viewing device is turned on again. During such automatic recording sessions the SDM assumes that available CApp functions will enable the SDM to change channels in order to find the programs the PDM determines to be desirable.

The SDM presents programs recorded while the viewing device is off to the viewer on virtual channels. A virtual channel is simply a channel created by MbTV, and shown on the EPG, on which a viewer can see what programs have been recorded while the TV was off. Unless a viewer explicitly requests only part of a program, the SDM considers a program to be recorded and displays it on a virtual channel only when the entire program has been recorded.

Controlling DVCR Functionality

When the viewing device is active, the SDM provides DVCR functionality. Since the SDM manages the storage resources and keeps track of the available space, customer applications must pass all DVCR calls to the SDM. The DVCR library and the SDM communicate through a set of non-blocking DVCR service calls provided by the DVCR library, and a non-blocking callback function provided by the SDM.

The DVCR library uses the SDM callback to return information related to a requested DVCR operation. The callback function indicates the completion of the current DVCR operation, which may be triggered by an End Of File (EOF) condition or by an explicitly requested STOP event.

The information that the SDM passes to the callback function is context dependent. When the callback indicates the completion of the operations fast forward, skip forward, rewind and skip backwards, it passes the time displacements in units of time. When it indicates completion of a recording operation, it passes the duration of the recording. All this information is forwarded to the CApp through CApp callback functions.

SDM Storage Configuration

The SDM conFIGS. the storage medium through a filter mechanism. Filters can control both the program content recorded and the amount of storage allocated for specific types of programs. Customer applications can use filters to
  Limit the amount of storage allocated for children's programs
  Prevent recording live sports programs
  Ensure a percentage of storage for situation comedies
  Prevent recordings from a specified channel
  Record all movies featuring a specific actor Each SDM filter is associated with a specific filter type. The CApp determines the number of filter types to support and provides interface functions that pass information on supported filter types. Each filter type is identified by a unique ID number and is associated with a single EPG parameter or set of parameters, determined by the CApp.

The CApp invokes the SDM filter interface functions to create and modify SDM filters, associating each filter with a specified filter type. When the CApp creates a filter, it coordinates the UI activities to extract the filter strings, the associated EPG parameter, and any other relevant parameters, and passes them to the SDM. When the SDM chooses a program to record, it determines whether the corresponding EPG data matches the existing filter strings and decides whether the program should be stored. The choice of a program to record and store depends on the current allocation of the filter, the desired allocation of the filter, and the maximum storage allowed by that filter.

SDM Recording Configuration

The SDM provides various mechanisms for managing recurring requests, resolving conflicting recording requests, providing alerts to the CApp for recording events requested by the viewer, and controlling recording quality.

The recording quality is controlled by specifying the recording bit rate (RBR) at which a recording operation is performed. The SDM accepts various default values at which recordings may be done. These defaults are:
  System Default: This is used when no recording bit rate information is provided at the time of specifying the record request. All automatic recording requests use this value if no other default exists.
  Type Default: This value is used to specify the recording bit rate of programs of a certain type. The type of a program is derived from a set of EPG parameters specified by the Capp. The Capp specifies which EPG parameters will be taken into consideration for determining the type of a program and then specifies recording bit rate values for specific values of the chosen EPG parameters. When choosing the set of EPG parameters the CApp will not include more than a predefined number of EPG parameters and will not include parameters such as a the title, sub-title or episode-titles.

Consider an example of an EPG where 2 of the EPG parameters are Program Category and Category Type. The possible values for the Program Category parameter could be MOVIES and SPORTS. The possible values for the Category Type parameter could be ACTION, ADVENTURE, BASEBALL, BASKETBALL etc. In this scenario the Capp could specify a Type Default recording bit rate for MOVIES & ACTION and a different Type Default recording bit rates for SPORTS & BASKETBALL. Any recording of programs that contain the above combination of EPG parameters would now use the applicable Type Default recording bit rate values as the default When the Capp makes an explicit record request and the recording bit rate is not specified, the SDM attempts to determine if an applicable Type Default exists and uses it if it is available. Programs chosen for automatic recording by the SDM also chooses a Type Default if such an applicable default exists. The Type Default gets precedence over the System Default.
  Program Specific: The program specific bit rate is specified by the Capp at the time of making an explicit request. This value takes precedence over all other default values and is used for the current recording and future recurring request if applicable.

The SDM provides features that accept recurring requests for repetitive programs and overtime recordings. The CApp provides information on the repeat rate and the time period after which the request should be repeated. The customer can use the overtime recording feature to cover situations in which a program extends beyond the intended duration: sports and political events are examples of programs whose duration often goes over the time scheduled for them. Notice that overtime recording allows a customer application to extend the recording for a fixed period, but it does not provide verification procedures that check whether a program has in fact overrun its scheduled duration.

The SDM provides mechanisms that customer applications can use to notify the CApp about recording conflicts. Such conflicts can occur when either the viewer or the PDM specifies a recording request to the SDM. Notice that the SDM will accept an explicit recording request only if there are no conflicts with other explicit requests that were specified earlier. The SDM also provides notification if there is an active viewer session at the time of executing an explicit recording request.

SDM Bit Rate Configuration

The SDM will notify the CApp if there is an active viewer session (that is, if the viewing device is on) at the time it should execute an explicit recording request.

The SDM controls recording quality by specifying the recording bit rate (RBR) at which it performs a recording operation. The SDM accepts various default values for recordings:
  System Default. This default is used when the CApp provides no recording bit rate information when requesting the recording in response to a viewer request.

Type Default. This value provides the recording bit rate of programs of a specified type. The SDM derives the type of a program from a set of EPG parameters specified by the CApp. The CApp specifies which EPG parameters will determine the type of a program, and then provides recording bit rate values for specific values of the chosen EPG parameters. Notice that the CApp will not include more than a predefined number of EPG parameters, nor will it include such parameters as title, subtitle, or episode title.

For example, consider an EPG recording request in which two of the EPG parameters are Program Category and Category Type. Possible values for Program Category could be MOVIES and SPORTS. Possible values for the Category Type parameter could be ACTION, ADVENTURE, BASEBALL, BASKETBALL, or FOOTBALL. If the SDM records any programs that contain this combination of EPG parameters it uses whatever Type Default recording bit rate values are already specified for recording movies and sporting events.

When the CApp, in response to a user event, makes an explicit record request and the recording bit rate is not specified, the SDM attempts to determine whether an applicable Type Default exists, and uses it if it is available. If the PDM chooses a program to be recorded automatically, the SDM also chooses a Type Default if an applicable Type Default exists.

The Type Default value takes precedence over the System Default value.

Program Specific Default. The CApp specifies a specific bit rate for recording a program at the time a viewer makes an explicit request. This value takes precedence over all other default values, both for the current recording and for any future recurring requests for that program.

DVCR Library

The SDM manages DVCR functionality in a set-top box through a set of service functions provided by an underlying DVCR library. DVCR requests are relayed by the CApp to the SDM, which in turn invokes DVCR functions with appropriate parameters. The CApp-SDM interface calls programs channel IDs, but the SDM-DVCR Library interface uses file names to refer to programs.

The DVCR library interfaces directly with the underlying file system for performing input/output (I/O) operations, such as file playback and recording. All functions exported by the DVCR library to the SDM are non-blocking, and return control to the caller within a fixed period of time, irrespective of the duration of the DVCR operation the SDM requests. Through background tasks, The DVCR library manages any extended monitoring activities that result from a DVCR request.

The DVCR library uses a callback function to communicate status and information on incoming DVCR requests and other notification events. The callback may be invoked within the context of an incoming DVCR request or from some other appropriate context. All information that the callback function passes to the SDM is described below.

All DVCR operations, once started through the DVCR library, are expected to continue until an explicit viewer request occurs to discontinue the operation. Exceptions include Beginning of File (BOF) and End of File (EOF) conditions, when the current operation can no longer be continued. Callback functions indicate these conditions to the SDM and higher modules for appropriate resolutions. When passing DVCR requests to the DVCR library, it is the responsibility of the SDM to terminate the current DVCR operation before initiating a new one. The SMD maintains DVCR information and uses it to direct the correct sequence of calls to the DVCR library.

Figure 50:
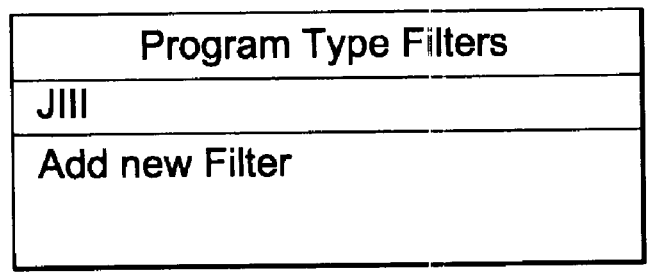

The state diagram depicted in FIG. 50 shows the DVCR state machine implemented by the MbTV compliant DVCR library.

The boxes represent DVCR states, and the arrows represent the transitions between them. The label on each transition shows which DVCR command causes the transition, and the action the DVCR library takes as a result of that transition. If more than one DVCR command can cause a state transition, the commands are separated by a slash ("/").

In this diagram, the action taken by the DVCR library is enclosed within square brackets and in italicized characters. The action taken by the DVCR library refers to the information that the DVCR library passes through the callback function provided by the SDM. The information shown includes the initialization of the preEventType and eventDuration fields of the callback data structure; the initialization of the currEventtype is not shown in the state diagram. It is implicitly assumed to be part of the information passed by the DVCR library.

The various states of the DVCR library are discussed below:

STOP CIS

A transition to the STOP CIS occurs when the current playback operation is stopped to change the input stream source, whether from one Virtual Channel to another or from a Time Shifted Channel to a Virtual Channel, or vice versa. A transition to this state occurs when a DVCRStop call occurs and the channelChange parameter is set to TRUE (shown in the state diagram as DVCRTStop).

STOP

A transition to the STOP state occurs when the current DVCR operation stops, due either to an explicit user request or to encountering an EOF/BOF condition. No change in the input stream source is possible while in this state; any DVCR command that follows must operate on the same input stream. Transition to this STOP state occurs when a DVCRStop call is made while the channelChange parameter is set to FALSE (shown in the state diagram as DVCRFStop).

The diagram assumes that when entering the STOP state from the TIME SHIFTED PLAY all subsequent transitions between the STOP, VARIABLE FASTFORWARD, REWIND, and TIME SHIFTED PLAY states refer to operations on a Time Shifted Channel, although this is not explicitly shown. The same holds true for transitions between the STOP, VARIABLE FASTFORWARD & REWIND, and VIRTUAL CHANNEL PLAY states. The STOP state is primarily intended to prevent execution of consecutive DVCR operations without an intervening DVCRStop command.

TIME SHIFTED PLAY

The TIME SHIFTED PLAY state indicates ongoing playback operations with time shift capability, when the input stream is a live source. The function DVCRFlushTSBuffer initiates.channel change operations from one Time Shifted Channel to another. These operations do not cause a state transition.

Virtual Channel Play

The VIRTUAL CHANNEL PLAY state indicates ongoing playback operations with time shift capability when the input stream is not a live source, but a prerecorded input source available on the DVCR storage media. These prerecorded input sources are also called Virtual Channels. An EOF condition Channel (shown in the state diagram as StopDueToVCEOF) causes an automatic state transition to the STOP state.

Variable Fastforward & Rewind

The VARIABLE FASTFORWARD & REWIND state indicates ongoing rewind or fast forward operations at variable speeds, on a Time Shifted Channel or on a Virtual Channel. An automatic transition from this state occurs when the operation encounters a BOF or EOF condition during the rewind or fast-forward operation. A BOF condition (shown in the state diagram as StopDueToBOF) causes a transition to the STOP state for both Virtual Channel and Time Shifted Channels. An EOF condition on a Virtual Channel (shown in the state diagram as StopDueToVCEOF) causes an automatic transition to the STOP state. On a Time Shifted Channel, however, an EOF condition (shown in the state diagram as StopDueToTSEOF) causes a state transition to the TIME SHIFTED PLAY state, and the prevEventType field is set to DVCR_JUMP_TO_LIVE.

Record

The RECORD state indicates an ongoing recording operation. An EOF condition encountered during a recording operation on a Time Shifted Channel (shown in the state diagram as StopDueToTSEOF) causes an automatic transition to the STOP state. This is an illegal state if the current input stream is associated with a Virtual Channel.

Pause

A transition to the PAUSE state occurs when the current playback or record operation is explicitly paused by the user. The playback operation is valid both on a Time Shifted Channel or a Virtual Channel, whereas the record operation applies only to a Time Shifted Channel. Though it is not explicitly shown, the diagram of FIG. 50 assumes that when entering the PAUSE state from a RECORD state, the DVCRResume command following causes a transition back to the RECORD state. The same hold true for state transitions between the state TIME SHIFTED PLAY & PAUSE and the state VIRTUAL CHANNEL PLAY & PAUSE.

EOF Condition

Virtual Channels

In Virtual Channels an EOF Condition during fast-forward and playback operations causes an automatic transition to the STOP state. The DVCR library does not initiate an error recovery on its own. Error recovery from such a state is handled primarily by user intervention. Possible recovery procedures in such a condition are rewind or channel change.

The rewind operation in such situations is a valid operation and does not require any special handling by the DVCR library. In the case of a channel change operation, the Controlling Application Module forces a temporary transition to the VIRTUAL CHANNEL PLAY state (by issuing a DVCRPlay command) before entering the STOP CIS state (by issuing a DVCRStop with the channelChange parameter set to TRUE). It is assumed that a DVCRStop(True) call, invoked within a small predefined interval after issuing a DVCRPlay call, would cause a transition from the STOP state to the STOP CIS state via an intermediate VIRTUAL CHANNEL PLAY state. (This maybe achieved by delaying the indication of an EOF condition by a small interval when a DVCRPlay call is issued on an EOF condition).

Time Shifted Channels

In Time Shifted Channels, an EOF condition encountered during recording appears as an error. A lack of available recording space generates EOF conditions encountered during recording. Again, the DVCR library does not initiate an error recovery on its own and depends on the Controlling Application Module for error recovery. The Controlling Application Module can delete the channel or choose any other recovery mechanism.

EOF conditions during fast forward operations automatically transition to the TIME SHIFTED PLAY states and are indicated by a DVCR_JUMP_TO_LIVE event.

State Transitions Due to User Requests

The Controlling Application Module ensures that the sequence of commands issued to the DVCR library allows the DVCR library to maintain state and consistency with the above state diagram. At the same time, the CApp accepts any combination of DVCR requests the user issueds. For example, the Controlling Application Module accepts a user request to change to a Virtual Channel in the middle of an ongoing rewind operation in a Time Shifted Channel. The sequence of commands issued to the DVCR Library in this specific example is:

DVCRStop (False)
DVCRPlay (Null, Tse_Channel, Null)
DVCRStop (True)
DVCRPlay ("filename", Virtual_Channel, pcontext)

The semantics of these calls are more fully described in the following sections.

Electronic Program Guide (EPG)

The Electronic Program Guide contains television program information, such as scheduled program time, program or movie titles, and channel information. The EPG library is responsible for its own data downloading mechanisms, from the internet or directly through the input stream. MbTV supplies a recommended list of channel and program parameters. Based on this list, the customer then provides a list of parameters that are applicable to the customer environment. The format of the parameter information is described in the following sections.

Some of the EPG parameters MbTV requires are mandatory. Customers must provide changes to the channel lineup to MbTV,
the original EPG requirements.
The customer must also provide unique channel Ids for the all channel information.

Tuner

The tuner provides tuning capabilities. The tuner module provides an interface for channel changing. Any channel changing the user initiates is controlled by CApp. Tuning to various channel for recording is controlled by SDM.

User Interface

User Interface is controlled by the Controlling Application CApp. It displays the various navigational screens to invoke MbTV functions. Although MbTV does not interact directly with the User Interface, MbTV has provided examples of these user interfaces to demonstrate implementation possibilities. The customers provide the presentation and navigation of the user interface, but the remote control is handled by the user interface.

O/S Support

MbTV modules run on both preemptive and non-preemptive operating systems, in real-time or non-real time environments. MbTV allocates all the resources it requires, such as memory and semaphores, during initialization. Resources cannot be dynamically allocated.

Specific operating system functions are described in the following sections. Most MbTV processing is run as low-priority background tasks. The task is either a process or a thread. The Controlling Application invokes the MbTV interface functions as foreground tasks, to synchronize access to shared objects between the foreground and background tasks. MbTV uses whatever synchronized mechanism is provided by the customer operating system. The synchronization mechanism provided by the operating system must ensure that the task holding the resource executes at the highest priority among the tasks competing for the same resources. The customer decides the priorities of all tasks, both foreground and background. MbTV schedules between three and five background tasks, the number depending on the specific MbTV implementation the customer chooses.

Data Structures

The C data structures required by the various SDM interfaces are listed below.

pgmInfo_t

The pgmInfo_t structure is used to store information on a specific TV program. Details on the pgmInfo_t structure are given below.

```
typedef struct _pgmInfo_
{
void*          channelID;
int            channelType;
char*          pgmTitle;
short          pgmTitleLen;
time_t         pgmStartTime;
float          pgmRating[MBTV_MAX_NUM_PROFILE];
int            pgmDuration;
int            pgmRank;
uint           pgmReserved;
} pgmInfo_t, *ppgmInfo_t;
```

The semantics of the various fields in the above structure is the following.

channelID stores the channel ID associated with the channel in which the program is being played.

channelType stores the channel type as to whether refers to a live broadcast channel or a Virtual Channel for a pre-recorded program. Possible values of channelType are

| #define CHANNEL_TYPE_LIVE | 0 × 01 |
| #define CHANNEL_TYPE_VIRTUAL | 0 × 02 | pgmTitle stores a pointer to a string describing the title name. It points to a valid memory location allocated by the owner of the pgmInfo_t structure. The number of bytes allocated for the title string is specified in the field pgmTitleLen.

pgmTitleLen is used both as an input and output variable. On input it specifies the number of bytes allocated for storing the title string including the string terminator. On output it specifies the actual length of the title string. The title string is truncated if the title string length is more than the number of bytes specified in pgmTitleLen on input. pgmTitleLen is set to 0 if no program is available during the time specified in pgmStartTime.

pgmStartTime stores the start time of the program in GMT format.

pgmRating stores the MbTV generated rating for this program.

pgmDuration stores the duration of the program in minutes.

pgmRank stores the rank of the program in a list of specified list of programs.

pgmReserved is reserved for future use and its contents are ignored by the PDM.

recRequest_t

The recRequest_t structure used by the CApp to specify a record request is described below.

```
typedef struct _recRecquest_
{
ulong         requestID;
void*         channelID;
char title[MBTV_MAX_TITLE_LEN];
ulong         recBitRate;
time_t        pgmStartTime;
time_t        recStartTime;
time_t        recEndTime;
time_t        repeatTill;
int   repeatRate;
#define REPEAT_WEEKLY          0 × 01
#define REPEAT_DAILY           0 × 02
#define REPEAT_ANYTIME         0 × 03
ulong         flag;
#define OVERTIME_RECORDING                  0 × 01
#define DELETE_REQUEST         0 × 02
#define PURGE_REQUEST          0 × 04
#define SKIP_NEXT     0 × 08
}recRequest_t, *precRequest_t;
```

The semantics of the various fields in the above structure is the following.

chnlID stores the channel ID of the channel associated with the program being recorded.

the title field stores that title of the program being recorded.

the recBitRate field stores the bit rate at which the program is being recorded. When set to 0, a default recording bit rate is chosen. This value is passed by the Capp and is presented as-is to the DVCR library by the SDM without interpretation.

the pgmStartTime field indicates program start time in local time. This is the actual start time of the program.

the recStartTime field indicates recording start time in local time. By default, the recording start time is the start time of the program.

the recEndTime field stores the recording end time in local time and by default it does not exceed beyond the playing time of the program.

repeatTill stores the date in (yymmdd format) till which the request will be repeated and is valid only for recurring programs.

repeatRate stores the time intervals between the recordings. When set to REPEAT_ANYTIME, the record request is executed whenever the program is available in the channel specified by the chnlID field. Program availability is checked in the specified channel only and would require multiple record requests with appropriate channel ids for scanning availability in multiple channels.

the flag is a bit wise field and is used to communicate modifications in user requests. The OVERTIME_RECORDING bit is used to specify overtime recording (ie record a fixed number of seconds beyond the end time). The DELETE_REQUEST is used to delete a record request, whereas the PURGE_REQUEST is used to remove the request from the request list. In both cases the recording request is cancelled. However requests with the DELETE_REQUEST bit set can be modified to unset the DELETE_REQUEST bit. The SKIP_NEXT bit is applicable for recurring requests only. When set, by the Capp, the next occurrence of the program is not recorded and is cleared by the SDM.

cBackInfo_t

The C structure used by the SDM for event notifications to the CApp to indicate start or a completion of a DVCR operation is given below.

```
typedef struct      _cBackInfo_
{
    int     currEventType;
    int     prevEventType;
    time_t  event Time;
    time_t  eventDuration;
    void*   channelID;
    int     channelType;
    int     errorNum;
    int     reserved
} cBackInfo_t,      *pcBackInfo_t;
```

The semantics of the various fields in the above structure is the following.

currEventType stores the event type which invoked the callback. Possible values for currEventType are

```
#define SDM_REWIND              1
#define SDM_FAST_FORWARD        2
#define SDM_STOP                3
#define SDM_PAUSE               4
#define SDM_RESUME              5
#define SDM_PLAY                6
#define SDM_JUMP_TO_LIVE        7
#define SDM_ADD_CHANNEL         8
#define SDM_DELETE_CHANNEL      9
#define SDM_IMPLICIT_STOP       10
#define SDM_RECORD              11
#define SDM_SKIP_FORWARD        12
#define SDM_SKIP_BACKWARD       13
#define SDM_RECORD_ALERT        14
``` the prevEventType field is valid only if the currEventType is set to SDM_PAUSE, SDM_STOP or SDM_IMPLICIT_STOP. The prevEventType stores the DVCR operation that has been stopped or paused explicitly by a requested stop operation or implicitly by an EOF condition. Legal values of prevEventType, when currEventType is set to SDM_STOP or SDM_IMPLICIT_STOP, are SDM_FAST_FORWARD, SDM_REWIND, SDM_PLAY and SDM_RECORD. Legal values of prevEventType, when currEventType is set to SDM_PAUSE, are SDM_PLAY, and SDM_RECORD.

eventTime stores the time in GMT format at which event occurred.

The information in eventDuration field is context dependent. When prevEventType is set to SDM_REWIND or SDM_FAST_FORWARD eventDuration stores the amount of time (in seconds) by which the current program has been rewound or fast forwarded. When prevEventType is set to SDM_PLAY or SDM_RECORD, eventDuration contains the playback duration or recording duration. When currEventType is set to SDM_RESUME eventDuration contains the playback duration or recording duration depending on the operation that was resumed. The SDM does not provide information on the operation which has been resumed and assumes that the callback target maintains the necessary context information. When currEventType is set to SDM_SKIP_BACKWARD or SDM_SKIP_FORWARD, the duration field is set to the amount of time that has been skipped backward or skipped forward respectively.

channelType stores the channel type as to whether refers to a live broadcast channel or a Virtual Channel for a pre-recorded program. Possible values of channelType are

```
#define CHANNEL_TYPE_LIVE       0 x 01
#define CHANNEL_TYPE_VIRTUAL    0 x 02
``` channelID stores the channel ID of the channel associated with the event. The channelID field is valid only if the channelType is set to CHANNEL_TYPE_VIRTUAL.

the errorNum field is used to indicate an error condition which occurred when executing the DVCR request.

sdmCBackInfo_t

The C structure used by the DVCR Library for event notifications to the SDM to indicate completion of a DVCR operation is as given below. This structure is identical to the cBackInfo_t structure used by the SDM for CApp notification with the exception of an additional context field.

```
typedef struct _sdmCBackInfo
{
    cBackInfo_t     commomData;
    ulong           context;
} sdmCBackInfo_t, *psdmCBackInfo_t;
```

The semantics of the various fields in the above structure is the following.

the commonData field of type a cBackInfo_t structure. The callback status and information passed by the SDM to the CApp is almost identical to that passed by the DVCR Library to the SDM.

currEventType field in the commomData stores the event type which invoked the callback. Possible values for eventType are

```
#define DVCR_REWIND 1
#define DVCR_FAST_FORWARD       2
#define DVCR_STOP       3
#define DVCR_PAUSE      4
#define DVCR_RESUME 5
#define DVCR_PLAY       6
#define DVCR_JUMP_TO_LIVE       7
#define DVCR_IMPLICIT_STOP      8
#define DVCR_RECORD 9
#define DVCR_SKIP_FORWARD       10
#define DVCR_SKIP_BACKWARD      11
``` the context field is set by the DVCR library and is passed by the DVCR library when the current DVCR operation (rewind, fast-forward or playback) is terminated for a program on a Virtual Channel. This context is passed back to the DVCR when a playback operation is resumed.

filterType_t

The C structure for storing filter type information is given below. The CApp determines the number of filter types that are to be supported and it uses the filterType_t structure to pass filter type information to the SDM. Some examples of filter types are PROGRAM TYPE, PROGRAM CHANNELS, PERFORMERS, PARENTAL RATING etc.

```
typedef struct_filterType_
{
    ulong       filterTypeID;
    int         numEPGParams;
    int         epgParamNurns[MBTV_MAX_NUM_SFILTER];
```

```
    int     epgDataType;
#define     MBTV_TYPE_CHAR 1
#define     MBTV_TYPE_INT16         2
#define     MBTV_TYPE_INT32         3
#define     MBTV_TYPE_UINT16        4
#define     MBTV_TYPE_UINT32        5
#define     MBTV_TYPE_SUBSTRING     6
#define     MBTV_TYPE_STRING        7
    char filterTypeName[MBTV_MAX_FTYPE_NLEN];
} filterType_t, *pfilterType_t;
```

The semantics of the various fields in the above structure is the following.

the filterTypeID uniquely identifies each filter type. This field is passed to the SDM when creating SDM filters.

the numEPGParams field specifies the number of EPG parameters associated with this filter type.

the epgParamNums array stores the EPG parameters associated with this filter type. Most filter types are associated with a single EPG parameter, however there are instances of a single filter type being mapped to multiple EPG parameters provided all the mapped EPG parameters are of the same data type. A typical example of a filter type that is associated with multiple EPG parameters is PERFORMERS. EPG data for movies usually contain names of multiple performers.

the epgDataType field stores the data type of the EPG parameters associated with the filter type. In scenarios where multiple parameters are mapped to a single filter type, all the mapped EPG parameters must be of the same data type. Details on the data types enumerated above are as below MBTV_TYPE_CHAR to specify a single byte character.
MBTV_TYPE_INT16 to specify a 2 byte integer
MBTV_TYPE_INT32 to specify a 4 byte integer
MBTV_TYPE_UINT16 to specify a 2 byte unsigned integer
MBTV_TYPE_UINT32 to specify a 4 byte unsigned integer
MBTV_TYPE_STRING to specify a NULL terminated string (to specify whole string matches)
MBTV_TYPE_SUBSTRING to specify a NULL terminated substring (to specify matches with a part of a string).

the filterTypeName stores the name of the filter type in a NULL terminated string.

filter_t

The C structure used to store filter information is given below.

```
typedef struct _filter_
{
ulong filterID;
int userID;
ulong filterTypeID;
char filterString[MBTV_MAX_NUM_SFILTER]
               [MBTV_MAX_SFILTER_PLEN];
int currAllocation;
int maxAllocation;
int desiredAllocation;
} filter_t, *pfilter_t;
```

The semantics of the various fields in the above structure are described in the preceding Filters and Storage Configuration section. As in the case of the pgmInfo_t structure, the owner of the filter_t structure ensures that filterString point to a valid memory location allocated by the owner. The semantics of the various fields in the above structure is the following.

the filterId field uniquely identifies the filter.

the userID field uniquely identifies the user profile with which this filter is associated. This field is currently unused.

the filterTypeID identifies the filter type associated with this filter. The filterTypeID is used to get information on which parameters of the EPG yield information corresponding to this filter.

the filterString array field stores the filter string associated with the filter. The CApp converts non-string data into a NULL terminated string before being passed it in the filter_t structure. If the filter type corresponds to Program Channel, possible values for filter string could be CNN, TNT etc. Alternatively if the filter type corresponds to Program Type, possible values for filter string could be sitcoms, talk show etc. The number of strings specified in the filterString array could be less than or equal to the number of EPG parameters specified in the associated filter type. For filter types which are mapped to multiple EPG parameters, each string passed in filterString array is searched in all the EPG parameters specified in the associated filter type.

the currAllocation field specifies how much of storage space has already been allocated to TV programs whose EPG parameters match this filter.

the maxAllocation field specifies the maximum allocation allowed for this filter the desiredAllocation field specifies the amount storage space that should be reserved for TV programs whose EPG parameters match this filter.

tdBitRate_t

This C structure is used to pass bit rate values for specific values of the chosen Type Default EPG parameters. This bit rate is chosen when recording a program whose EPG parameters matches the corresponding EPG parameter values specified in this structure.

```
typedef struct _tdBitRate_
{
    ulong   tdBitRateID;
    ulong   filterTypeID;
    ulong   bitRate;
    char tdValues[MBTV_MAX_NUM_TDEF_PARAMS]
                 [MBTV_MAX_TDEF_PLEN];
} tdBitRate_t, *ptdBitRate_t;
```

The semantics of the various fields in the above structure is the following.

the tdBitRateID field uniquely identifies this Type Default bit rate.

the filterTypeID field uniquely identifies the EPG parameters associated with this Type Default bit rate.

the bitRate field specifies the recording bit rate for the EPG parameter values specified in this structure.

the tdValues array specifies the EPG parameter values associated with this Type Default bit rate. Each value is specified as a NULL terminated string and is associated with the corresponding EPG parameter specified in the pgmTDparams_t structure.

sbudget_t

This C structure is used to store the recording space allocated for a PDM profile. The space allocated is specified as a percentage of the total available recording space.

```
typedef struct _sbudget_
{
    ulong   profileID;
    int     spaceAllocated;
} sbudget_t, *psbudget_t;
```

The semantics of the various fields in the above structure is the following.
- the profileID field uniquely identifies the profile for which the recording space is allocated.
- the spaceAllocated field specifies the amount of space allocated for the corresponding profile as a percentage of the total recording space available.

VSM Events

Every user request generated during a viewing session are indicated to the VSM in the form of an event. The events indicated by the CApp to the VSM are listed below.

```
#define MBTV_POWER_ON        1
#define MBTV_POWER_OFF       2
#define MBTV_REWIND          3
#define MBTV_FAST_FORWARD    4
#define MBTV_PAUSE           5
#define MBTV_RESUME          6
#define MBTV_PLAY            7
#define MBTV_JUMP_TO_LIVE    8
#define MBTV_CHANNEL_CHANGE  9
#define MBTV_ADD_CHANNEL     10
#define MBTV_DEL_CHANNEL     11
#define MBTV_STOP            12
#define MBTV_RECORD          13
#define MBTV_SKIP_FORWARD    14
#define MBTV_SKIP_BACKWARD   15
```

Of the events listed above the MBTV_ADD_CHANNEL event is not indicated to the VSM and has been included here for the sake of completeness. Indication of MBTV_POWER_ON and MBTV_POWER_OFF by the CApp are optional depending on availability of hardware support. MBTV_DEL_CHANNELS events are indicated only when programs are deleted explicitly by user request. Automatic program deletions by the SDM are not indicated to the VSM.

SDM Interfaces

The SDM interacts with the other modules in a STB through specific well defined interfaces. Details on these interfaces are given in the sections below. In the interface functions defined below unless otherwise stated it is assumed that all pointers that are passed as I/F function parameters point to a valid memory location allocated by the caller in its own address space.

SDM & CApp Interface

This interface is primarily used for invocation of SDM service functions by the CApp and event notification by the SDM to the CApp.

SDM services are required for live programs that are watched with time shift functionality enabled. Live channels when viewed with the time shift functionality enabled are also referred to as Time Shift Enabled (TSE) channels. The time shift capability of a TSE channel is achieved by performing a record operation of the program's audio/video stream and providing simultaneous DVCR services on the recorded stream. The recorded audio/video stream is stored as a circular buffer in a file allocated for this purpose. In terms of file I/O time shifted functionality is equivalent to maintaining a set of 2 file pointers, viz—a write pointer which controls the record operation and a read pointer which controls the playback, fast-forward and rewind operation. The duration for which such live programs are stored is determined by the size of circular buffer.

SDM service functions also provide DVCR services for pre-recorded programs made available on Virtual Channels. The SDM generates a Virtual Channel for each recorded program. Unlike TSE Channels which require simultaneous read and write capability, Virtual Channels require only read capability to be operational.

All SDM functions are non-blocking and control is returned to the caller within a fixed period of time. Details on the service functions provided by the SDM are given below SDMStop int SDMStop (boolean channelChange)

Called by the CApp to terminate the current DVCR operation which could be a playback, rewind, fast-forward or record operation being performed on a Virtual Channel or a TSE Channel. The CApp must ensure that the current DVCR operation is stopped by invoking SDMStop before a new one is started. The current DVCR operation should be stopped by an explicit user request or implicitly by the CApp. For example in a possible scenario of 2 successive DVCR requests of playback and rewind, the CApp should issue a SDMStop call to stop the playback operation before generating the new rewind request. Status and other information on the DVCR operation that has been terminated is communicated to the CApp by posting an SDM_STOP event through the CApp callback routine. In case of successful completion of a record operation an additional SDM_ADD_CHANNEL event is returned after indicating a SDM_STOP event.

The SDMStop function is also called by the CApp during a channel change operation from a TSE or Virtual Channel. The input parameter channelChange is set to TRUE when SDMStop is invoked for the purpose of a channel change operation and is set to FALSE otherwise. No callback to the CApp is generated if channelChange is set to TRUE.

On success it returns a zero value and non-zero error value otherwise.

SDMPlay int SDMPlay(int chnlID, int channelType, boolean channelChange)

The CApp calls this function when changing the channel to a Virtual Channel or when changing the channel from a Virtual Channel to TSE Channel. This function is also called to pass an explicit playback request on a Virtual Channel or a TSE Channel. (For channel change operations from one TSE channel to another TSE channel, the CApp invokes SDMFlushTSBuffer.) When passing an explicit playback request, the chnlID parameter is set to NULL. The input parameter channelChange is set to TRUE when SDMPlay is invoked for the purpose of a channel change and is set to FALSE otherwise. The input parameter channelType is used to indicate whether the playback operation is requested for a TSE channel (CHANNEL_TYPE_LIVE) or a Virtual Channel (CHANNEL_TYPE_VIRTUAL). In case of changing to a Virtual Channel, the virtual channel ID (which was passed to the CApp by the SDM in an earlier call) is passed as input in the chnlID parameter. When changing the channel to a TSE channel, the chnlID parameter is set to NULL. Controlling the tuner device to change the channel to or from a live broadcast channel is handled independently by the CApp.

Once the SDMPlay function is invoked for a Virtual Channel, playback continues till either it is terminated by an explicit SDMStop invocation or an End-Of-File condition has been reached. In case of a TSE Channel playback operation continues till the channel is changed. The SDM assumes that playback function will always be terminated (either due to an EOF condition or explicit request) before the CApp performs a channel change operation.

The SDMPlay function generates a SDM_PLAY event for the CApp only when it is invoked with the channelChange parameter set to FALSE.

On success it returns a zero value and non-zero error value otherwise.

SDMDelete int SDMDelete(int chnlID, int chnlType)

The CApp calls this function to delete a recorded program. The program to be deleted is identified by the specified channel ID. If the channel ID corresponds to a live broadcast channel, no action is taken. The CApp must ensure that the Virtual Channel associated with the recorded program is not active at the time of presenting the delete request. Delete request for currently active stored programs are returned with an error status.

The SDMDelete function generates a SDM_DELETE_CHANNEL event for the CApp.

On success it returns a zero value and non-zero error value otherwise.

SDMPause int SDMPause (void)

The CApp calls this function to pause playback or recording on the current channel. For pausing playback the current channel could correspond to a Virtual Channel for a pre-recorded programs or a TSE Channel. It does not have effect on rewind and fast-forward operations.

The SDMPause function generates a SDM_PAUSE event for the CApp. It also returns information on the duration of the preceding playback or recording operation.

On success it returns a zero value and non-zero error value otherwise.

SDMResume int SDMResume (void)

The CApp calls this function to resume the playback or recording of a previously paused operation on the current channel. The current channel could correspond to a Virtual Channel for a pre-recorded programs or a TSE Channel. It does not have effect on rewind and fast-forward operations.

The SDMResume function generates a SDM_RESUME event for the CApp.

On success it returns a zero value and non-zero error value otherwise.

SDMFastForward int SDMFastForward(ulong privateData)

The CApp calls this function to do a fast-forward operation on the current channel. The privateData parameter is used by the Capp to pass information directly to the DVCR library. The SDMFastForward function passes this parameter directly to the DVCR library without any modifications. This parameter maybe used to pass the fast forward speed or any other data specific to the DVCR library. Additionally consecutive invocations of the SDMFastForward function are passed directly to the DVCR library for further processing. The DVCR library may use these consecutive invocations to modify the operation of the ongoing fast forward request if it so desires.

The current channel on which the fast forward operation is being done could correspond to a Virtual Channel for a pre-recorded programs or a TSE Channel. Fast forward operations on a Virtual Channel can be carried out till an EOF condition occurs. For TSE Channels, the fast forward operation can be carried on till the end of the circular buffer.

The SDMFastForward function generates a SDM_FAST_FORWARD event for the CApp. The total duration, in seconds, of the fast forward operation is returned in the callback for the DVCR_STOP and DVCR_IMPLICIT_STOP events.

On success it returns a zero value and non-zero error value otherwise.

SDMRewind int SDMRewind(ulong privateData)

The CApp calls this function to do a rewind operation on the current channel. The privateData parameter is used by the Capp to pass information directly to the DVCR library. The SDMRewind function passes this parameter directly to the DVCR library without any modifications. This parameter maybe used to pass the rewind speed or any other data specific to the DVCR library. Additionally consecutive invocations of the SDMRewind function are passed directly to the DVCR library for further processing. The DVCR library may use these consecutive invocations to modify the operation of the ongoing rewind request if it so desires.

The current channel on which the rewind operation is being done could correspond to could correspond to a Virtual Channel for a pre-recorded program or a TSE Channel. Rewind operations on a Virtual Channel can be carried out till a BOF (Beginning-Of-File) condition occurs. For TSE Channels, the rewind operation can be carried on till the beginning of the circular buffer.

The SDMRewind function generates a SDM_REWIND event for the CApp. The total duration, in seconds, of the rewind operation is returned in the callback for the SDM_STOP and SDM_IMPLICIT_STOP events.

On success it returns a zero value and non-zero error value otherwise.

SDMSkipForward int SDMSkipForward(int duration)

The CApp calls this function to do a skip forward operation on the current channel. The amount skipped is specified by the input parameter duration in seconds. Unlike a fast-forward operation, skip forward does not display intermediate frames. The current channel could correspond to a Virtual channel for a pre-recorded programs or a TSE Channel.

The SDMSkipForward function generates a SDM_SKIP_FORWARD event for the CApp and includes information on the length of time that has been skipped forward.

On success it returns a zero value and non-zero error value otherwise.

SDMSkipBackward int SDMSkipBackward(int duration)

The CApp calls this function to do a skip backward operation on the current channel. The amount skipped is specified by the input parameter duration in seconds. Unlike a rewind operation, skip backward does not display intermediate frames. The current channel could correspond to a Virtual Channel for a pre-recorded programs or a TSE Channel.

The SDMSkipBackward function generates a SDM_SKIP_BACKWARD event for the CApp and includes information on the length of time that has been skipped backward.

On success it returns a zero value and non-zero error value otherwise.

SDMLive int SDMLive(void)

This command is relevant only for TSE Channels. When viewing a program in time-shifted mode, this calls starts displaying live frames from the end of the circular buffer.

The SDMLive generates the SDM_JUMP_TO_LIVE event for the CApp.

On success it returns a zero value and non-zero error value otherwise.

SDMFlushTSBuffer

Int SDMFLushTSBuffer( )

The SDMFlushTSBuffer function flushes the time shift buffer associated with a TSE channel. The CApp calls this function when performing a channel change operation from a TSE channel to another TSE channel.

The SDMFlushTSBuffer does not generate any event notification for the CApp. On success it returns a zero value and non-zero error value otherwise.

SDMRecord int SDMRecord(precRequest_t pRecordRequest, int conflictOverride, precRequest_t pConflictingRequest, ulong *requestID)

The CApp calls this function to send a request to record a broadcast program. The record request could specify an immediate recording operation on a currently available program or for a program available in future. This function is not invoked for resuming a paused recording operations.

A pointer to the record request structure is passed in the parameter pRecordRequest. The chnlID, title and startTime fields are filled by the caller. Initializing the endTime field is optional and by default is set to the end of the program. If the chnlID corresponds to a Virtual Channel, no action is taken. If the startTime and endTime are set to NULL values the record request is executed immediately on the current channel. Such immediate request automatically override any conflicting record requests specified earlier.

If the specified record request is not an immediate request and conflicts with a prior request, SDMRecord returns a non-zero value and initializes the recRequest_t structure, allocated by the caller, and pointed to by pConflictingRequest to contain information on the conflicting request and the requestID parameter is set to NULL. In the absence of request conflicts, SDMRecord initializes the requestID parameter to a non NULL value.

The conflictOverride parameter when set to TRUE is used to override the conflict with the program specified by pConflictingRequest. When conflictOverride is set to TRUE and pConflictingRequest refers to a valid conflicting program, the conflicting request is removed from the list of requests and the record request is added. In case of multiple conflicts, this process is repeated till all conflicts are resolved.

For immediate record requests the SDMRecord generates an SDM_RECORD event for the CApp to indicate the start of the record operation. Such immediate record requests take precedence over all conflicting requests if any. The recording operation is continued till explicitly stopped by the user or due an implicit stop condition generated by an EOF condition. No events are generated by this function otherwise.

On success it returns a zero value and non-zero error value otherwise. If successful it sets the input parameter requestID to the ID for the request. The request ID is required for all future references to this record request.

SDMGetNumRecConflicts

SDMGetNumRecConflicts(precRequest_t pRecordRequest, int *cntConflicts)

This function returns the number of explicit recording requests that conflicts with the specified input recording request.

The SDMGetNumRecConflicts does not generate any event for the CApp.

On success it returns a zero value and sets the input parameter cntConflicts to the number of explicit record request that conflict with the specified recording request. A non-zero error value is set in case of error.

SDMGetRecConflicts int SDMGetRecConflicts(precRequest_t pRecordRequest,
int conlfictNum,
precRequest_t pConflictingRequest,)

This function returns an explicit request that conflicts with the specified input recording request. The conflicting request that is to be returned is specified by the caller in the conlfictNum parameter. conlfictNum ranges from 0 to N−1 where N is the number of conflicting requests returned by SDMGetNumRecConflicts. If conlfictNum is set N or higher an error is returned.

The SDMGetRecConflicts does not generate any event for the CApp.

On success it returns a zero value and initializes the input parameter recRequest_t structure, allocated by the caller, and pointed to by pConflictingRequest to contain information on the conflicting request. A non-zero error value is set in case of error.

SDMGetNumRecRequests int SDMGetNumRecRequests(int *cntRequest)

This function returns the number of explicit record request currently outstanding. Unless explicitly deleted by the CApp, each record request is automatically deleted on completion of the record request.

The SDMGetNumRecRequests does not generate any event for the CApp.

On success it returns a zero value and sets the input parameter cntRequest to the number of outstanding explicit record request. A non-zero error value is set in case of error.

SDMGetRecRequestID ulong SDMGetRecRequestID(int num, ulong *requestID)

SDMGetRecRequestID returns the ID associated with a request. The input parameter is an integer between 0 & N−1 where N is the return value of the SDMGetNumRecRequests call. It should be noted that there is no relationship between the specified input integer and the request ID returned by this function. As more requests are added and deleted the same value of the num parameter might yield different values of requests ID's at different times. However each request ID will always be associated with the same request.

The SDMGetRecRequestID does not generate any event for the CApp.

On success it returns a zero value and sets the value of the requestID parameter. A non-zero error value is returned in case of error.

SDMGetRecRequest int SDMGetRecRequest(ulong reqID, precRequest_t precRequest)

This function returns information on the request associated with the specified request ID by initializing the fields of the recReqData structure pointed to by precRequest. The caller ensures that precRequest points to a valid recReqData structure.

The SDMGetRecRequest does not generate any event for the CApp.

On success it returns a zero value and non-zero error value otherwise.

SDMSetRecRequest int SDMSetRecRequest(ulong reqID, precRequest_t precRequest, precRequest_t pConflictingRequest,
int conflictOverride)

The SDMSetRecRequest allows the CApp to modify a record request. The request to be modified is identified by the input parameter reqID and the precRequest parameter points to the modified recRequest_t structure. The fields which can be modified are startTime, endTime, repeatTill, repeatRate and flag fields. startTime and endTime can be set to any time within the playing duration of the program provided startTime is less than endTime. The repeatTill field should be filled in local time format and the repeatRate can be set to REPEAT_DAILY or REPEAT_WEEKLY. The flag field can be modified to set or clear the OVERTIME_RECORDING, DELETE_REQUEST and PURGE_REQUEST bits. Setting any other bits in this field is returned as error. The chnlID and title fields should not be modified. All illegal modification are returned as error.

If the modified request results in a conflict with an existing record request, an error is returned and the recRequest_t structure, allocated by the caller, and pointed to by the pConflictingRequest parameter is initialized with information on the conflicting program. If the specified modification does not conflicts with any existing request, all fields in the pConflictingRequest structure are set to zero or NULL.

If the conflictOverride parameter is set to TRUE and pConflictingRequest is associated with a valid conflicting explicit request, the record request associated with precRequest is preferred over the conflicting request. If multiple conflicting requests exist, the SDMSetRecRequest will have to be invoked multiple times.

The SDMSetRecRequest does not generate any event for the CApp.

On success it returns a zero value and non-zero error value otherwise.

SDMDelRecRequest
int SDMDelRecRequest(ulong reqID)

A prior record request can be deleted by calling the SDMDelRecRequest call. The request to be deleted is specified by the reqID input parameter.

The SDMDelRecRequest does not generates any event for the CApp.

On success it returns a zero value and non-zero error value otherwise.

SDMGetAutoRecordStatus
int SDMGetAutoRecordStatus(int *status)

The CApp calls this function to determine if automatic recording is enabled. Possible values for status is are

| #define AUTO_RECORD_ENABLE | 0x1 |
| #define AUTO_RECORD_DISABLE | 0x2 |

On success it returns a zero value and non-zero error value otherwise.

SDMSetAutoRecordStatus
int SDMSetAutoRecordStatus(int cmd)

The CApp calls this function to enable or disable automatic recording. When automatic recording is disabled, recording is done only explicit record request. The input parameter cmd is set to the values defined above.

On success it returns a zero value and non-zero error value otherwise.

SDMSetRBRDefault
int SDMSetRBRDefault(ulong bitRate)

The Capp calls this function to set the default bit rate, in the parameter bitRate, for recording operations. This bit rate is passed by the SDM to the DVCR library as the default value when no bit rate is specified during a record operation. This parameter is passed directly to DVCR library when issuing record request to the DVCR library. The SDM does not process or attempt to validate the semantics of the specified parameter.

The Capp must not use a direct interface to the DVCR library to specify the default bit rate.

On success it returns a zero value and non-zero error value otherwise.

SDMGetRBRDefault
int SDMGetRBRDefault(ulong *bitRate)

The Capp calls this function to get the default bit rate, in the parameter bitRate, currently used by the SDM when making record requests to the DVCR library. A value of 0 is returned in the bitRate parameter if no default bit rate has been specified to SDM by the Capp or during intialization.

On success it returns a zero value and non-zero error value otherwise.

SDMGetNumTDRBR
int SDMGetNumTDRBR(int *cntTDrbr)

The Capp calls this function to get the number of Type Default recording bit rates (RBR) that have currently been specified to the SDM. The input parameter cntTDrbr is used to return the number of Type Default recording bit rates currently available.

On success it returns a zero value and non-zero error value otherwise. The input parameter cntTDrbr is set when returning success.

SDMGetTDRBRid
int SDMGetTDRBRid(int num, ulong * tdRBRID)

SDMGetTDRBRid returns a unique Type Default RBR Id for the input number specified by the parameter num. The value of num ranges from 0 to N−1 where N is the number of Type Default RBR returned by the SDMGetNumTDRBR call. All future references to this RBR is based on the RBR id returned by SDMGetTDRBRid.

On success it returns a zero value and sets the input paramter tdRBRID to the corresponding RBR id. A non-zero error value is returned otherwise.

SDMGetTDRBR
int SDMGetTDRBR(ptdBitRate_t ptdBitRate)

SDMGetTDRBRid returns the RBR and the Type Default EPG parameter values associated with the Type Default RBR specified as input. The caller sets the tdBitRateID field in the ptdBitRate_t structure pointed to by input parameter ptdBitRate. The SDMGetTDRBRid sets all the other fields of this structure associated with the specified ID.

On success it returns a zero value and sets the fields of the input ptdBitRate_t structure. A non-zero error value is returned otherwise.

SDMSetTDRBR
int SDMSetTDRBR(ptdBitRate_t ptdBitRate)

SDMSetTDRBRid sets or updates the RBR and the values for Type Default EPG parameters for the Type Default RBR specified in the tdBitRateID field in the ptdBitRate_t structure specified as input. The caller sets the tdBitRateID field in the ptdBitRate_t structure and all the other fields pointed to by input parameter ptdBitRate.

On success it returns a zero value and sets the RBR and the values of the EPG parameters for the specified Type Default RBR. A non-zero error value is returned otherwise.

SDMCreateTDRBR
int SDMCreateTDRBR(ulong * tdRBRID, ptdBitRate_t ptdBitRate)

SDMCreateTDRBR creates a new Type Default RBR and returns the associated ID for the RBR in the input parameter tdRBRID. The CApp passes the RBR and the values for the Type Default EPG parameters in tdBitRate_t structure pointed to by the input parameter ptdBitRate. These values are used to setup the newly created RBR if the SDMCreateTDRBR call succeeds.

On success it returns a zero value and sets the RBR ID in the tdRBRID parameter. A non-zero error value is returned otherwise SDMDeleteTDRBR
int SDMDeleteTDRBR(ulong tdRBRID)

SDMDeleteTDRBR deletes the Type Default RBR specified by the input parameter tdRBRID.

On success it returns a zero value and deletes the RBR ID specified by the tdRBRID parameter. A non-zero error value is returned otherwise SDMMakeStorageList int SDMMakeStorageList (time_t recStartTime, ulong *cookie)

This function is called to generate the list of programs that will be recorded by the SDM from the time specified by the parameter recStartTime. Programs maybe chosen automatically based on user preference or due to an explicit request. This function is typically called when the viewing device is turned off so that the SDM may initiate the activities for program recordation. A cookie is returned by this function which is required for future access to the list generated by SDMMakeStorageList.

On success it returns a zero value and non-zero error value otherwise.

SDMGetStorageListSize int SDMGetStorageListSize(time_t displayTime, ulong cookie, int *cntRecPgm)

This function returns the number of recorded programs that will be available in the SDM storage at the time specified by the parameter displayTime. The cookie returned by the SDMMakeStorageList is passed as an input to the SDMGetStorageListSize call.

On success it returns a zero value and initializes the cntRecPgm parameter and non-zero error value otherwise.

SDMGetStorageList int SDMGetStorageList(time_t displayTime, ulong cookie, pgmInfo_t **pgmInfo)

This function is called to determine the list of recorded programs that will be available at the time specified by the parameter displayTime. The number of programs that will be returned in the list of recorded programs is set to N where N is the return value of the preceding SDMGetStorageListSize call. The list of programs is returned in an array of pointers of type pgmInfo_t specified by the pgmInfo parameter. The caller ensures that each pointer in the array points to a valid pgmInfo_t structure. The cookie returned by the SDMMakeStorageList is passed as an input to the SDMGetStorageList call.

On success it returns a zero value and non-zero error value otherwise.

SDMGetProgReqInfo int SDMGetProgReqInfo(pgmInfo_t *pgmInfo, int *info)

This function is called by the CApp to get information on any requests associated with the program specified by the input parameter pgmInfo. The info parameter returns information on whether a recorded program has been explicitly locked or whether there has been a record request on a broadcast program. The possible values for the info parameter are

| #define RECORD_REQUESTED | 0x01 |
| #define PROGRAM_LOCKED | 0x02 |

A value of PROGRAM_LOCKED is returned if the program has been locked by explicit request. Such locked programs are not deleted immediately for purposes of automatic recording. This value is meaningful for Virtual Channels (ie recorded programs) only. A value of RECORD_REQUESTED is returned if there is an explicit record request pending for that program. For recorded programs on Virtual Channels a value of RECORD_REQUESTED is returned if the program was recorded due to an explicit request. This value is meaningful both for live and recorded programs.

This function is provided for the CApp if it wishes to visually indicate such information when displaying EPG information. When getting program information for Virtual Channels, specifying the Virtual Channel ID in the channel ID field of the pgmInfo_t structure is sufficient. For live programs, the channelID, pgmStartTime and pgmTitle must be set by the caller.

On success it returns a zero value and non-zero error value otherwise.

SDMGetLockStatus int SDMGetLockStatus(void* vchannelID, int *flag)

This function is called to determine if there is an explicit lock request for the recorded program available in the Virtual Channel specified by vchannelID. The parameter flag is set to one of the following values depending on whether the program has an explicit lock or not.

| #define ELOCK_ENABLED | 0x01 |
| #define ELOCK_DISABLED | 0x02 |

On success it returns a zero value and non-zero error value otherwise.

SDMSetLockStatus int SDMSetLockStatus(void* vchannelID, int flag)

This function is called to set or clear the lock on the program available on the Virtual Channel specified by vchannelID. When flag is set to ELOCK_ENABLED, the program is locked and the lock is cleared if flag is set to ELOCK_DISABLED.

On success it returns a zero value and non-zero error value otherwise.

SDMSetNumSProfiles int SDMSetNumSProfiles(int numProfiles)

The CApp calls this function to set the number of PDM profiles for which recording space allocation is required. The maximum number of profiles that can be supported is set to a pre-defined number and is known at compile time.

On success it returns a zero value and non-zero error value otherwise.

SDMGetNumSProfiles int SDMGetNumSProfiles(int *numProfiles)

The CApp calls this function to get the number of PDM profiles currently supported by the SDM for which recording space is allocated.

On success it returns a zero value and set the numProfiles parameter to the number of profiles currently supported. A non-zero error value is returned in case of error.

SDMGetSBudget int SDMGetSBudget(psbudget_t psbudget)

The CApp calls this function to get the current recording space allocated for PDM profiles the currently supported by the SDM. A pointer to an array of structures of type sbudget_t is passed in the psbudget parameter. This array is allocated in the callers address space and the array size is set to the value that would be returned by SDMGetNumSProfiles function if invoked at that time.

On success it returns a zero value and initializes each field of the sbudget_t array with the appropriate values. A non-zero error value is returned in case of error.

SDMSetSBudget int SDMSetSBudget(psbudget_t psbudget)

The CApp calls this function to set the current recording space allocated for PDM profiles the currently supported by the SDM. A pointer to an array of structures of type sbudget_t is passed in the psbudget parameter. This array is allocated in the callers address space and the array size is set to the value that would be returned by SDMGetNumSProfiles function if invoked at that time. The caller initializes all fields of the input array structure.

On success it returns a zero value and accepts all the values specified in the sbudget_t array. A non-zero error value is returned in case of error.

SDMInit int SDMInit((void)(*CAppEventNotification) (struct cBackInfo_t *))

The CApp invokes this functions to initialize the SDM and passes the address of a callback function for event notification as an input parameter. The SDM initializes itself and does other house keeping activities to become operational.

On success it returns a zero value and non-zero error value otherwise.

SDMEventNotification void SDMEventNotification(struct sdmCBackInfo_t *))

This SDM function is called by the DVCR to indicate the completion status of the current DVCR operation. The DVCR passes the address of a completed sdmCBackInfo_t structure as input. The SDM is responsible for forwarding these events to other modules (such as the CApp) which request notification of such events.

CApp Filter Type Functions

The CApp controls the SDM filter mechanism by providing filter types. Each filter type is mapped to one or more EPG parameters. Through these filter types the CApp controls which EPG parameters will be used by the SDM to determine the desirability of a program for recording purposes. Every filter provided by the SDM is mapped to a filter type. When choosing programs for recording, the SDM scans EPG parameters based on the available filter types and tries to match these EPG parameters with the SDM filter data.

The functions provided by the CApp to pass filter type information are given below.

CAppGetNumFilterTypes int CAppGetNumFilterTypes(int *cntParams)

This CApp function returns the number of filter types supported by the Capp.

On success it returns a zero value and non-zero error value otherwise. On success the input parameter cntParams is set to the number of filters types currently available.

CAppGetFilterTypeID int CAppGetFilterTypeID(int num, ulong *filterTypeID)

CAppGetFilterTypeID returns the ID associated with a filter type. The input parameter num is an integer between 0 & N−1 where N is the return value of the CAppGetNumFilterTypes call. The ID returned by this function is used in all future references to this filter type.

On success it returns a zero value and sets the value of the filterTypeID parameter. It returns a non-zero error value in case of error.

CAppGetFilterTypeData int CAppGetFilterTypeData(pfilterType_t ppgmParamData)

CAppGetFilterTypeData returns the filter type data in the filterType_t structure pointed to by the input parameter ppgmParamData. The caller allocates the filterType_t structure and sets the filterTypeID field. The other fields are initialized by the CApp during the invocation of this function.

On success it returns a zero value and a non-zero error value in case of error.

SDM Filter Functions

The SDM provides filter mechanisms to controls the program content it records. Each filter is uniquely identified by a filter ID and is associated with a specific filter type. The SDM allows modification of the filter parameters based on this filter ID. The number of possible filter types is determined by the Capp.

The functions provided by the SDM that create and control filters are listed below.

SDMGetNumFilters int SDMGetNumFilters(int *cntFilters)

The CApp calls this routine to determine the number of filters that have been currently created.

On success it returns a zero value and non-zero error value otherwise. On success the input parameter cntFilters is set to the number of filters currently created.

SDMGetFilterID int SDMGetFilterID(int filterNum, ulong *filterID)

This functions is called to get the filter ID. Input to this function is an integer parameter, filterNUM, set between 0 and N−1 where N is the return value of SDMGetNumFilters. The associated filter ID is returned in the parameter filterID.

On success it returns a zero value and non-zero error value otherwise.

SDMGetFilter int SDMGetFilter(ulong filterID, pfilter_t pfilter)

This function sets the input pointer to point to the information associated with the input filter ID. The caller allocates the filter_t structure pointed to by pfilter.

On success it returns a zero value and non-zero error value otherwise.

SDMSetFilter int SDMSetFilter(ulong filterID, pfilter_t pFilter)

This functions is used to set or modify the filter information associated with the filter specified by the input parameter filterID. This function is invoked after the caller has initialized or modified the various fields of the filter structure pointed to by the parameter pFilter. The fields which can be modified are filterType, filterString, maxAllocation and desiredAllocation.

On success it returns a zero value and non-zero error value otherwise.

SDMCreateFilter int SDMCreateFilter(ulong *filterID)

This functions is used to create a new filter. The maximum number of filters that can be created is implementation specific and is set to some predefined upper limit. Calls to SDMCreateFilter fails when the number of filters created equals this predefined upper limit.

On success it returns a zero value and non-zero error value otherwise. On success the input parameter filterId is set to the filter ID of the newly created filter.

SDMDeleteFilter int SDMDeleteFilter(ulong filterID)

This function is called to delete the filter associated with the filter ID specified by the input parameter.

On success it returns a zero value and non-zero error value otherwise.

SDM & DVCR Interface

The SDM manages DVCR functionality in a STB through a set of service functions provided by an underlying DVCR library. DVCR requests are passed on by the CApp to the SDM which in turn invokes DVCR functions with the appropriate parameters as necessary. All references to programs in the CApp-SDM interface are in terms of a channel ID whereas in the case of the SDM-DVCR Library interface, programs references are based on filenames. The DVCR library interfaces directly with the underlying file system for performing I/O for file playback and recordation. All functions exported by the DVCR library to the SDM are non-blocking and returns control back to the caller in a fixed period of time irrespective of the duration of the DVCR operation being requested. Any extended monitoring activity that may results from a DVCR request are managed by the DVCR library through background tasks. DVCR library uses a callback function to communicate status and information on incoming DVCR requests and other events. The callback may be invoked within the context of an incoming DVCR request or from some other appropriate context. All information is passed to the SDM through the callback function in the cBackInfo_t structure described earlier. The set of functions provided by the DVCR library are given below.

All DVCR operations once started through the DVCR library are expected to continue till an explicit request is made to discontinue the operation. Exception situations (such as BOF and EOF conditions) when the current operation can no longer be continued are indicated to the SDM and higher modules for appropriate resolutions through callback functions. When passing DVCR request to the DVCR library it is the responsibility of the SDM to ensure that the current DVCR operation is terminated before a new one is initiated. The DVCR state information is maintained by the SDM and is used to direct the correct sequence of call to the DVCR library.

DVCRStop
ulong DVCRStop(int channelChange)

This function terminates the current ongoing operation (such as rewind, playback, record or fast-forward). It returns an DVCR_STOP event and other context dependent information. If the operation that was terminated was a fast-forward or a rewind it indicates displacement in units of the time (in seconds) and sets the prevEventType to DVCR_FAST_FORWARD or DVCR_REWIND. When terminating a playback or record operation, it sets the prevEventType field to DVCR_PLAY or DVCR_RECORD and indicates the duration accordingly. The duration returned is from the preceding playback, record or resume operation till the execution of the current stop operation. The DVCR library also sets the context field in the cbackInfo_t structure when terminating a rewind, fast-forward or playback operation in a Virtual Channel. This context is passed as an argument when invoking the DVCR playback function.

DVCR operations may also terminate automatically. Examples are automatic termination due to EOF condition for a fast-forward or playback operation, a BOF (Beginning-Of-File) condition for a rewind condition, lack of storage space during recording etc. Such events are monitored by the DVCR library and are communicated to the SDM through the callback with an DVCR_IMPLICIT_STOP event. The duration and context fields of the cBackInfo_t structure is set as described for the DVCRStop command. It is assumed that the CApp will initiate the succeeding appropriate operation as and when necessary. Typically in most cases the following operation should be a playback operation.

The DVCRStop function is also invoked to stop playback during a channel change from a TSE channel or from a Virtual Channel. Such invocations of the DVCRStop function also generate the DVCR_STOP event for the SDM and are indicated by passing a TRUE value in the input parameter channelChange. The DVCR library may choose to do any housekeeping work, such as closing of files etc., associated with such an event.

On success it returns a zero value and non-zero error value otherwise.

DVCRPause
int DVCRPause (void)

This function pauses the playback or recording operation of the current file and does not affect the fast-forward, rewind or skip operations. It returns a DVCR_PAUSE event and sets duration from the preceding play or record operation till the execution of the pause operation. No context information is provided when invoking the callback for this function.

On success it returns a zero value and non-zero error value otherwise.

DVCRResume
int DVCRResume (void)

This function resumes a previously paused playback or recording operation of the current file.

On success it returns a zero value and non-zero error value otherwise.

DVCRFastForward
int DVCRFastForward(ulong privateData)

This function starts a fast-forward operation on the current file. This function accepts the privateData parameter to control the operation of the fast forward request. The privateData parameter acts a direct interface between the Capp and the DVCR library and is used to pass information without interpretation by the SDM. Typical usage's for such a parameter include passing the fast forward speed. All fast forward request received by the SDM are forwarded to the DVCR library. It is assumed that the DVCR library can process multiple consecutive fast forward requests and may use these consecutive requests to modify the current fast forward operation if it so desires.

If the current file is associated with a Virtual Channel, the fast forward operation can be carried out till an EOF condition is reached. For TSE Channels, the fast forward operation can be carried on till the end of the circular buffer. This operation can be terminated either on reaching an EOF condition or through an explicit user request to stop the fast-forward operation. DVCRFastForward returns a DVCR_FAST_FORWARD event if an error occurred otherwise no event is generated. The amount by which the file has been fast forwarded is returned in the callback generated for the DVCR_STOP and DVCR_IMPLICIT events. In the case when consecutive fast forward request have been made, the callback should return the aggregate amount, in seconds, by which the file has been fast forwarded.

On success it returns a zero value and non-zero error value otherwise.

DVCRRewind
int DVCRRewind(ulong privateData)

DVCRRewind starts a rewind operation on the current file. This function accepts the privateData parameter to control the operation of the rewind request. The privateData parameter acts a direct interface between the Capp and the DVCR library and is used to pass information without interpretation by the SDM. Typical usage's for such a parameter include passing the rewind speed. All rewind request received by the SDM are forwarded to the DVCR library. It is assumed that the DVCR library can process multiple consecutive rewind requests and may use these consecutive requests to modify the current rewind operation if it so desires.

If the current file is associated with a Virtual Channel, the rewind operation can be carried out till an BOF condition is reached. For TSE Channels, the rewind operation can be carried on till the beginning of the circular buffer. This operation can be terminated either on reaching an BOF condition or through an explicit user request to stop the rewind operation. DVCRRewind returns a DVCR_REWIND event if an error occurred otherwise no event is generated. The amount by which the file has been rewound is returned in the callback generated for the DVCR_STOP and DVCR_IMPLICIT events. In the case when consecutive rewind request have been made, the callback should return the aggregate amount, in seconds, by which the file has been rewound.

On success it returns a zero value and non-zero error value otherwise.

DVCRSkipForward int DVCRSkipForward(int duration)

This function is invoked to do a skip forward operation on the current file. The amount to be skipped is specified by the input parameter duration in seconds. Unlike a fast-forward operation, skip forward does not display intermediate frames. It returns a DVCR_SKIP_FORWARD event and sets the duration field to the amount skipped.

On success it returns a zero value and non-zero error value otherwise.

DVCRSkipBackward int DVCRSkipBackward(int duration)

This function is invoked to do a skip backward operation on the current file. The amount to be skipped is specified by the input parameter duration in seconds. Unlike a rewind operation, skip backward does not display intermediate frames. It returns a DVCR_SKIP_BACKWARD event and sets the duration field to the amount skipped.

On success it returns a zero value and non-zero error value otherwise.

DVCRPlay int DVCRPlay(const char *szFileName, int chnltype, ulong positionalcontext)

This function is invoked to start the playback operation. The playback operation maybe associated with a channel change operation (ie user tuned into Virtual Channel or a TSE Channel) or maybe due to an explicit playback request generated by the UI.

The szFileName parameter specifies the file from which to initiate the playback operation. This parameter is set if the playback is associated with a channel change operation to a Virtual Channel and is set to NULL otherwise. Thus when invoked for a channel change operation from a Virtual Channel to a TSE Channel, or due to an explicit playback request the szFileName parameter is set to NULL.

The chnltype parameter specifies whether the playback is associated with a TSE Channel or a Virtual Channel. Possible values of chnltype are

| #define TSE_CHANNEL | 0x1 |
| #define VIRTUAL_CHANNEL | 0x2 |

The positional context is used by the DVCR library to determine the location in the file form where the playback operation is to be initiated. This parameter is valid when the chnltype is set to VIRTUAL_CHANNEL, and is ignored for TSE Channels. When starting the playback operation for the first time, no positional context is passed (by passing a value of 0). The DVCRPlay functions then starts the playback operation from the start of the file. Subsequently when the playback operation is stopped, the DVCRStop passes a positional context to the SDM through the callback routine. This positional context is then used in the subsequent playback operation from that file. A positional context is also returned when the rewind and fast-forward operations are completed by the DVCRStop commands. DVCRPlay returns a DVCR_PLAY event if an error occurred otherwise no event is generated.

On success it returns a zero value and non-zero error value otherwise.

DVCRSetTSBuffer int DVCRSetTSBuffer(const char *szFileName, time_t size)

This function is invoked during initialization to specify the name of the file to be used for storing the circular buffer. The size parameter specifies the size of the buffer in seconds.

On success it returns a zero value and non-zero error value otherwise. DVCRSetTSBuffer does not generate any event.

DVCRFlushTSBuffer int DVCRFlushTSBuffer( )

This function is invoked by the SDM to flush the current contents of the time shifted buffer associated a TSE channel. This function is typically called when changing channels from a TSE channel to another TSE channel. Thus rewind and fastforward operations subsequent to a DVCRFlushTSBuffer invocation will not access A/V data from the previous channel.

On success it returns a zero value and non-zero error value otherwise. DVCRFlushTSBuffer does not generate any event.

DVCRRecord int DVCRRecord(const char *szFileName, int recBitRate)

This function is called to record the incoming audio/video stream onto the file specified by the input parameter. To support recordings at multiple bit rates it accepts the recording bit rate in the recBitRate parameter. When recBitRate is set to a zero value, the DVCRRecord function uses its own default value. The audio & video streams may be stored in a single file or separate files depending on the DVCR library. The record operation is continued till an EOF condition is reached or through an explicit user request to stop the record operation. DVCRRecord returns a DVCR_RECORD event if an error occurred otherwise no event is generated.

On success it returns a zero value and non-zero error value otherwise.

DVCRDelete int DVCRDelete (const char *szFileName)

This function is called to delete all the file/files associated with the specified file name passed as an input parameter. If a NULL string is passed as parameter, all non archived files stored by the DVCR library are deleted. (Archived files are referred to above are relevant only for possible future versions of the SDM with archival support). This is used as an error recovery mechanism in the event the SDM loses information on the current Virtual Channels available.

On success it returns a zero value and non-zero error value otherwise. The delete operation is completed upon return from this call.

DVCRGetFreeSpace

Int DVCRGetFreeSpace(ulong *numUnits)

This function returns the amount of free space available in the storage media for recording purposes. The amount of free space available is returned in the input parameter numUnits. The unit used to specify available recording space is transparent to SDM.

On success it returns a zero value and non-zero error value otherwise.

DVCRGetSpaceRequired int DVCRGetSpaceRequired(ulong *numUnits, time_t duration, ulong bitRate)

This function returns the amount of storage space required for a recording operation of a specified duration at a specified bitrate. The amount of space required is returned in parameter numUnits. The unit used to specify required recording space is transparent to SDM. The recording duration and the recording bit rate are specified in the duration and bitRate parameters. If a zero value of bitRate is specified, the DVCR-GetSpaceRequired uses its own default value used for recording operations to compute the space required.

It is assumed that the space returned by the above two functions is in terms of the same allocation unit.

On success it returns a zero value and non-zero error value otherwise.

DVCRLive int DVCRLive (void)

This function is relevant for TSE channels only and is ignored for other channels. DVCRLive sets the read pointer associated the circular buffer to the same location as the write pointer. It returns a DVCR_JUMP_TO_LIVE event.

On failure, it returns a zero value and non-zero otherwise.

DVCRSetCallback int DVCRSetCallback ((void) (*SDMEventNotification) (struct sdmCBackInfo_t *))

The SDM invokes this function during SDM initialization to pass the address of the SDM callback function as an input parameter for event notification.

On success it returns a zero value and non-zero error value otherwise.

DVCRInit int DVCRInit (void *pDVCRInitInfo))

The DVCRInit function is invoked to initialize the DVCR library. The library initializes itself and does other house keeping activities to become operational. The information that is passed in the input parameter pDVCRInitInfo is specific to the DVCR library.

It is assumed that this function is called by the CApp before the CApp initializes the MbTV modules. Though not an SDM I/F function, it has been included to specify the order in which this function will be invoked in relation to initialization of the SDM module.

On success it returns a zero value and non-zero error value otherwise.

SDM & PDM Interface

The SDM uses the services of the PDM to determine the user's preference in programs for the purposes of automatic recording. Automatic recording is initiated when the viewing device is considered to be turned off. The SDM ranks programs based on the user's preference and schedules the most desirable programs for recording. The set of functions provided by the PDM to rank programs based on a user's preference is given below.

MbTVGetProgramRating int MbTVGetProgramRating(pgmInfo_t *pgmInfo)

This function computes the rating of the TV program specified in the pgmInfo_t structure pointed to by pgmInfo.

The SDM allocates the pgmInfo_t structure and sets the channelID, pgmStartTime and pgmTitle fields in the pgmInfo_structure. Setting of the pgmDuration field by the SDM is optional. If the pgmStartTime does not match the start time of any program MbTVGetProgramRating returns the rating for the program which has the closest start time preceding the specified pgmStartTime.

On success it returns a zero value and non-zero error value otherwise.

SDM Virtual Channel EPG Interface

The SDM presents each recorded program to the CApp as a program available on a virtual channel. It maintains EPG data on all these recorded programs and allows access to this data through the set of calls given below.

SDMGetNumChannels int SDMGetNumChannels (int *cntVChannel)

This function returns the number of Virtual Channels created by the SDM. The SDM presents each recorded program in a separate Virtual Channel. The number of channels are returned by the SDM in the cntVChannel parameter.

On failure, it returns a zero value and non-zero otherwise.

SDMGetChannelID int SDMGetChannelID(int vchannelIndex, void* vchnlID)

SDMGetChannelID returns a unique channel Id for the channel number specified by the parameter vchannelIndex. The value of vchannelIndex ranges from 0 to N−1 where N is the number of channels returned by the SDMGetNumChannels call. All future references to the stored program or the Virtual Channel is based on this channel ID returned by SDMGetChannelID.

On success it returns a zero value and sets the input paramter vchnlID to the channel ID corresponding to vchannelIndex. A non-zero error value is returned otherwise.

SDMGetChannelParams int SDMGetChannelParams(void* vchannelID, int paramNum, char* paramValue)

This function initializes the buffer pointed to by paramValue to Nth parameter of the channel information specific to vchannelID. All parameters are returned as NULL terminated C strings irrespective of the native data type of the parameter. This buffer is allocated by the caller and should be of size MBTV_MAX_CHNL_PARAM_SIZE. The value of N is specified in paramNum. This function is used when channel parameters are accessed one at a time as opposed to accessing all the channel parameters in a single call. The channel parameter information provided by the SDM for various values of paramNum in ascending order are listed as below.

| | | |
|---|---|---|
| #define VCHANNEL_ID | 1 | |
| #define VCHANNEL_NAME | 2 | |
| #define VCHANNEL_OCHID | 3 | |
| #define VCHANNEL_TSTAMP | | 4 |
| #define VCHANNEL_CRTYPE | | 5 |
| #define VCHANNEL_DURATION | | 6 |

The semantics of the enumerated channel parameters stored by the SDM for Virtual Channels are as given below.

the VCHANNEL_ID parameter is a numeric parameter of type unsigned long. It returns the Virtual Channel ID for the channel.

the VCHANNEL_NAME parameter is a string parameter and it returns the Virtual Channel name for the channel.

the VCHANNEL_OCHID parameter is a 4 byte void pointer and it returns the channel id of the TSE channel from which the program was recorded.

the VCHANNEL_TSTAMP parameter is a 4 byte entity of type time_t and it returns the time at which the Virtual Channel was created (the time at which recording for the program was started).

the VCHANNEL_CRTYPE parameter is a 4 byte numeric parameter of type unsigned long and stores information on whether the Virtual Channel was created due to an explicit record request by the user or due to automatic recordation by the SDM. A value of 1 indicates creation due to an explicit record request by the user.

the VCHANNEL_DURATION parameter is a 4 byte numeric parameter and returns the recording duration of the program associated with this Virtual Channel. The recording duration may not be the same as the actual duration of the program.

On success it returns a zero value and non-zero error value otherwise.

SDMGetChannelData
int SDMGetChannelData(void* vchannelID, char *vchnlInfo)

This function initializes the buffer pointed to by vchnlInfo with the channel information specific to vchannelID. This buffer is allocated by the caller and should be of size MBTV_MAX_CHNL_DATA_SIZE. The channel information is returned as a C String with each parameter separated by commas. The channel information includes the virtual channel id, the virtual channel name, the channel ID of the live broadcast channel from which this program was recorded, the time stamp for channel creation (which is the same as the program start time), data on whether it was created automatically or at user's request and the actual length of the of the associated recorded program in minutes. This information is passed in ascending order of parameter number.

On success it returns a zero value and sets the input parameter vchnlInfo to point to the channel information. A non-zero error value is passed otherwise.

SDMGetProgramInfo
int SDMGetProgramInfo(pgmInfo_t* pgmInfo)

This function returns information on the TV program specified by the channelID field in the pgmInfo parameter. This function initializes the pgmTitle and pgmDuration fields of the pgmInfo_t structure, allocated by the caller, and pointed to by pgmInfo. All other fields are not modified.

On success it returns a zero value and non-zero error value otherwise.

SDMGetProgramParams
int SDMGetProgramParams(void* vchannelID, int paramNum, void* paramValue)

This function initializes the paramValue buffer, allocated by the caller, to the Nth parameter of the program information corresponding to the channel ID specified by the input parameter. The size of the buffer provided by the caller should be MBTV_MAX_PGM_PARAM_SIZE. The information returned here is reproduced from the program parameter information returned for this program by the external EPG library. The information presented therefore is EPG specific. All EPG specific values, parameters and structures are specified at compile time.

On success it returns a zero value and non-zero error value otherwise.

SDMGetProgramDataBufferSize
int SDMGetProgramDataBufferSize(void* vchannelID, int* size)

SDMGetProgramDataBufferSize returns the buffer size required to copy the entire program data information for program in the virtual channel specified by the vchannelID parameter. The actual format of the structure for passing program information is EPG specific and is transparent to the SDM module but it would contain all the program data information that would be returned by the external EPG library for this program.

On success a 0 value is returned and the input parameter size is set to size of the buffer required. A non zero error value is returned in case of failure.

SDMFillProgramDataBuffer
int SDMFillProgramDataBuffer (void* vchannelID, void* pgmData, int size)

SPGFillProgramDataBuffer copies the entire program data information into the specified buffer allocated by the caller. The buffer is accessed through the input void pointer pgmData and on successful completion of this call contains all program parameters specific to the program in the Virtual Channel vchannelID. The size of the buffer is specified by the size parameter The program data information that is copied is reproduced from an earlier call to the EPGFillProgramDataBuffer for this program. The program data information passed is EPG specific and is transparent to the SDM module. The external EPG library is used to access the EPG parameters associated with the program data returned by this function.

On success a 0 value is returned and a non zero error value otherwise. An error is returned if the specified buffer size is less than the memory required for copying the program data information.

Event Notification

This section describes the event notification mechanism of the various modules. Each user request generated during a viewing session is processed by the CApp by invoking the relevant function in the appropriate module. DVCR request are passed to the SDM which may forwards them to the DVCR library if required. Commands which originate from the user may thus be trickled down to the SDM and DVCR through the CApp. Status returned by lower level modules in this scenario is communicated back to the CApp through an event notification mechanism. Status for commands that require DVCR support are passed by the DVCR to the SDM which then indicates them to the CApp. As each event is indicated to the CApp, it forwards them on to other modules (such as the PDM) which might require them for monitoring purposes. At each stage of the event notification procedure the event passed to a module maybe remapped to a different event before being indicated further. Details of event notification by each module is described in the following sections.

Event Notification by SDM

The event notification by the SDM to the CApp is through a callback function provided by the CApp. The SDM uses the callback mainly to pass status, indicate events and other information generated as a result of the requests made by the CApp. Callbacks are made mostly to indicate a start of a DVCR request or the completion of a DVCR request. Event notification by the SDM to the CApp is done only when the request originated from the CApp. Events which result from automatic recordation and deletion operations initiated by the SDM are not indicated to the CApp. The events indicated through the callback are given below.

The SDM_REWIND event to indicate the start of the rewind operation. Information on the duration by which a program has been rewound is available later through a separate stop event.

The SDM_FAST_FORWARD event to indicate the start of the fast forward operation. Information on the duration by which a program has been fast forwarded is available later through a separate stop event.

The SDM_STOP event to indicate the termination of the current DVCR request. Information available through this callback is dependent on the DVCR operation that has been terminated. The callback indicates the operation that has been terminated and specifies the relevant duration of the concluded operation. The stop operation may also be invoked during a channel change operation and such operations are not indicated to the CApp.

The SDM_PAUSE event to indicate pausing of playback or recording on the current channel.

The SDM_RESUME event to indicate resumption of playback or recording on the current channel that was paused.

The SDM_PLAY event to indicate start of playback on the current channel. The playback operation may also be invoked during a channel change operation and such operations are not indicated to the CApp.

The SDM_JUMP_TO_LIVE event to indicate completion of the Jump To Live request.

The SDM_ADD_CHANNEL & SDM_DELETE_CHANNEL to indicate addition of a virtual channel or deletion of a virtual channel. Each program that is recorded is associated with a Virtual Channel and the recorded program is considered to be available on that Virtual Channel. Creation and deletion of stored programs are synonymous with program recordation and deletion. The SDM_ADD_CHANNEL event is indicated after an SDM_STOP has been indicated for the record operation. This indication may be done on completion of recording or when the viewing device transitions to an active state. The SDM_ADD_CHANNEL event is indicated only for programs recorded in its entirety.

The SDM_IMPLICIT_STOP event indicates automatic termination of the current DVCR operation. The DVCR operation that may terminate automatically are REWIND due to a BOF condition or a FASTFORWARD or PLAYBACK due an EOF condition or a RECORD due lack of storage resources. On receiving an SDM_IMPLICIT_STOP event the CApp may wait for an explicit user request to handle the automatic termination of the current operation or it may initiate its own implicit stop processing. Additionally PLAYBACK, RECORD, REWIND and FASTFORWARD may terminate due to I/O errors.

The SDM_SKIP_FORWARD & SDM_SKIP_BACKWARD event indicate the completion of a skip forward or a skip backward operation.

The SDM_RECORD_ALERT event is generated when there is an explicit recording request scheduled during an active viewing session. This event is triggered at a predefined interval before the start of the actual recording operation. No other action is taken by the SDM other than providing the alert. The recording request for which the notification is provided is aborted. The aborted record request can now be executed only through an explicit immediate record request issued by the Capp. The SDM sets the eventTime and channelID fields to the start time (in local time) and the channel ID of the program to be recorded.

Details of the event notification function and other CApp support functions required by the SDM are given below CAppEventNotification
void CAppEventNotification(struct cBackInfo_t *pcBackInfo)

This CApp function is called by the SDM to indicate the start of the current DVCR operation or completion of the previous DVCR operation. The SDM passes the address of a completed cBackInfo_t structure as input. The CApp is responsible for forwarding these events to other modules (such as the PDM) which request notification of such events.

CAppChannelChange
int CAppChannelChange(int chnlID)

This CApp function is called by the SDM to change the current channel. The channel being changed to is passed as input.

On success it returns a zero value and generates a channel change event for the other modules (such as the PDM). In case of failure it returns a non-zero error value.

Event Notification by DVCR Library

The set of event notifications indicated by the DVCR is a subset of the events indicated by the SDM. Unlike the SDM notification which indicate both the start and completion of a DVCR operation, the DVCR library notification primarily include completion of DVCR operations. The events generally indicated to the SDM are The DVCR_STOP event to indicate the termination of the current DVCR request. Information available through this callback is dependent on the DVCR operation that has been terminated. The callback indicates the operation that has been terminated and specifies the relevant duration of the concluded operation.

The DVCR_PAUSE event to indicate pausing of playback or recording on the current channel.

The DVCR_JUMP_TO_LIVE event to indicate completion of the Jump To Live request.

The DVCR_IMPLICIT_STOP event to indicate automatic termination of the current DVCR operation. The DVCR operation that may terminate automatically are rewind due to a BOF condition or a fast forward or playback due an EOF condition or a RECORD due lack of storage resources. Additionally playback, record, rewind and fast forward may terminate due to I/O errors.

The DVCR_SKIP_FORWARD & DVCR_SKIP_BACKWARD event to indicate the completion of a skip forward or a skip backward operation.

The DVCR_REWIND, DVCR_FAST_FORWARD, DVCR_PLAY and DVCR_RESUME events are returned in case of error conditions.

CApp Event Notification

Events communicated by the CApp are typically due to SDM event notifications resulting from servicing user requests. The CApp remaps some of the events indicated by the SDM before they are forwarded to other modules. Details of event notification provided by the CApp are given below.

MBTV_POWER_OFF event is indicated by the CApp when it processes a power off request for the viewing device. Indication of the MBTV_POWER_OFF is not mandatory and is usually done by the CApp when it has specific hardware support to detect such an event. In most configurations this event will not be indicated by the CApp.

MBTV_POWER_ON event is indicated by the CApp when it processes a power on request for the viewing device. Indication of the MBTV_POWER_ON is not mandatory and is usually done by the CApp when it has specific hardware support to detect such an event. In most configurations this event will not be indicated by the CApp.

MBTV_REWIND event is indicated by the CApp when it receives a SDM_REWIND event from the SDM. The CApp generates a MBTV_REWIND event indication to signal the start of a rewind operation.

MBTV_FAST_FORWARD event is indicated by the CApp when it receives a SDM_FAST_FORWARD event from the SDM. The CApp generates a MBTV_FAST_FORWARD event indication to signal the start of a fast forward operation.

MBTV_PAUSE event is indicated by the CApp when it receives a SDM_PAUSE event from the SDM. The CApp generates a MBTV_PAUSE event indication to signal the start pausing playback on the current channel.

MBTV_RESUME event is indicated by the CApp when it receives a SDM_RESUME event from the SDM. The CApp generates a MBTV_RESUME event indication to signal the resumption playback on the current channel.

MBTV_PLAY event is indicated by the CApp when it receives a SDM_PLAY event from the SDM. The CApp generates a MBTV_PLAY event indication to signal the start of playback on the Virtual Channel or a TSE Channel in response to a user request for a playback operation. Channel change requests to a Virtual or TSE Channel also result in the CApp invoking the SDMPlay function. However no event are indicated by the SDM to CApp in such cases.

MBTV_JUMP_TO_LIVE event is indicated by the CApp when it receives a SDM_JUMP_TO_LIVE event from the SDM. The CApp generates a MBTV_JUMP_TO_LIVE event indication to signal the completion of a Jump To Live request.

MBTV_CHANNEL_CHANGE event is indicated by the CApp when it completes the channel change operation requested by the user. A channel change operation to or from a Virtual Channel or a TSE Channel may involve the invocation of the SDMStop and SDMPlay function. In such requests no SDM events are indicated to the CApp except to communicate error conditions. In all such situations, the CApp generates a MBTV_CHANNEL_CHANGE as opposed to a MBTV_STOP or a MBTV_PLAY indication. Channel change operations, initiated by the user or by the SDM for automatic program recordings, are handled independently by the CApp and are always indicated to other modules (such as the PDM).

MBTV_ADD_CHANNEL event is indicated by the CApp when it receives a SDM_ADD_CHANNEL event from the SDM. The CApp indicates this event to signal the addition of a Virtual Channel. Each recorded program is presented as being available on a Virtual Channel provided it has been recorded in its entirety. Incomplete recording programs are not presented by the SDM and are automatically deleted.

MBTV_DEL_CHANNEL event is indicated by the CApp when it receives a SDM_DEL_CHANNEL event from the SDM. The CApp indicates this event to signal the deletion of a program due to an explicit delete request from a user.

MBTV_STOP event is indicated by the CApp when it receives an SDM_STOP event from the SDM. An SDM_STOP event is generated due to an explicit stop operation requested by the user. Channel change operations which require the invocation of the SDMStop and SDMPlay function do not generate a SDM_STOP event. The MBTV_STOP event also provides context dependent information on the operation that has been terminated by the user. The MBTV_STOP event is also indicated when it receives an SDM_IMPLICIT_STOP due to BOF or EOF conditions on explicit playback, record, rewind and fastforward request.

MBTV_RECORD event is indicated by the CApp when it receives a SDM_RECORD event from the SDM. The CApp generates a MBTV_RECORD event indication to signal the start of an explicit record request generated by the user for the currently viewed program. Record operations initiated by the SDM for automatic or explicit recording when the viewing device is considered to be inactive are not indicated by the SDM and hence are not indicated by the CApp.

The MBTV_SKIP_FORWARD and MBTV_SKIP_BACKWARD events are indicated by the CApp when it receives a SDM_SKIP_FORWARD & SDM_SKIP_BACKWARD event respectively from the SDM. These events are indicated by the CApp to signal the completion of a skip forward or a skip backward operation.

VSM Interfaces

The VSM interfaces with the SDM and the CApp to determine the status of the viewing device. The SDM uses this information to decide when to initiate automatic recording.

VSM-SDM Interface

The SDM provides a callback function to the VSM for notification on status of the viewing device. The VSM calls this function whenever there is a transition in the viewing status of the viewing device. Details on the function and other functions required for viewing status determination are given below.

SDMViewingStatus int SDMViewingStatus(int eventType, time_t eventTime)

This SDM function is called by the VSM to indicate a transition in status of the viewing device through the input parameter eventType. The time at which the specified event occurred is passed in the parameter eventTime. Possible values of eventType are

```
#define VDEVICE_ON        0x01
#define VDEVICE_OFF       0x02
#define VDEVICE_CHECK_STATUS        0x04
```

The input parameter eventType is set to VDEVICE_ON when the viewing device status has transitioned from the inactive state to the active state.

The input parameter eventType is set to VDEVICE_OFF when the viewing device status has transitioned from the active state to the inactive state. The VSM uses this value when it is certain that the viewing status has transitioned to the inactive state. To communicate VDEVICE_OFF events, the VSM may rely on available hardware/software mechanism provided by the CApp for monitoring such activity. In the absence of such mechanism the VSM might uses other heuristics to determine an inactive state.

The VDEVICE_CHECK_STATUS value is used when the VSM does not have very high confidence that the a transition to the inactive state has taken place. It is used as a mechanism to alert the SDM of a possible pending VDEVICE_OFF event which could occur at the specified eventTime. For such events the VSM provides the VSMStatusCheckRequest function to the SDM to re-evaluate the viewer device status at any time beyond eventTime. The SDM make this callback before it starts any scheduled recording activity.

On success it returns a zero value and non-zero error value otherwise.

VSMStatusCheckRequest int VSMStatusCheckRequest (void)

This non blocking VSM function is used by the SDM to request an evaluation of the viewing status. On receiving this call, the VSM schedules an invocation of the SDM callback function SDMViewingStatus.

On success it returns a zero value and non-zero error value otherwise.

CApp-VSM Interface

The VSM uses the available services of the CApp to determine viewing status. It provides a callback function to receive status information from the CApp. The CApp communicates all user requests to the VSM first before routing it to the appropriate module for execution. Other request for channel change operations and DVCR requests initiated by the SDM for purposes of automatic recordation and deletion are not indicated to the VSM. Details on the function and other functions required for viewing status determination are given below.

VSMSetViewingStatus int VSMSetViewingStatus(int eventType, time_t eventTime)

This VSM function is called by the CApp to indicate all user requests generated during a viewing session. The type of events indicated are listed in the section on data structures. Event notification is mandatory for all events with the exception of the MBTV_POWER_OFF and MBTV_POWER_ON events. If the CApp is capable the MBTV_POWER_OFF event would indicate a transition from the active to inactive state, while a reverse transition would be indicated by a MBTV_POWER_ON. In the absence of appropriate support for MBTV_POWER_OFF and MBTV_POWER_ON events the VSM might uses other heuristics to determine such state. transitions.

Before routing user requests to the SDM, the CApp always invokes VSMSetViewingStatus first to indicate the request.

On success it returns a zero value and non-zero error value otherwise.

CAppRequestStatus
int CAppRequestStatus(int *status)

This CApp function is called by the VSM to generate a query in the viewing device to elicit a user response. CAppRequestStatus allows for a fixed delay in eliciting a response before it returns a viewing status. A lack of user response is considered to be indicative of an inactive viewing session.

On failure, a non zero error value is returned. On success it returns a zero value and sets the input parameter status to a non-zero value to indicate an inactive session. status is set to a zero value to indicate an active session.

Features and Implementation Guidelines Overview

The following section discusses examples of how each feature of the preferred system of the present invention can be implemented. The Invocation Screens are intended to illustrate a possible user interface. Customers can implement many other formats. Not all the features are presented with an invocation screen, since many features share the same screen.

Only a sampling of the features available via tuse of the present invention are discussed herein. Those skilled in the ar will readily understand that many other features are enabled by the present invention.

Features
Getting the Best Programs
Feature Description

Returns a list of top TV programs in a descending order of preference associated with a specific viewer profile. This function automatically determines which profile is currently engaged in viewing a device and generates the best program list for that profile. A different profile will generate a different set of programs for the same time frame.

Implementation Guidelines

The CApp invokes the function MbTVGetBestPrograms, which returns the list of programs and takes the necessary steps to display the list to the viewer. The CApp can also scroll forward or back in time, presenting the best programs for a specified profile at a different time, by using the same function with a different time parameter Getting Criteria Based Best Programs
Feature Description Provides the same functionality as the feature Getting the Best Programs, except that only programs that match a specified criterion are considered.

Invocation Screen:

See the feature Get Best Programs for a screen of this feature.

Implementation Guidelines

The CApp calls MbTVGetCBBestPrograms, which returns a list of the programs and takes the necessary steps to display the list to the viewer.

Getting Number of Profiles
Feature Description

Obtains the number of profiles currently supported.

Implementation Guidelines

The CApp calls MbTVGetNumProfiles, which returns the number of profiles a device currently supports.

Getting Profile Parameters
Feature Description

Gives the current values of a profile: its name and its status, whether active, frozen, or disabled.

Active Profile: The SGM allocates space for the preferences of an active profile, and the PDM collects information about the profile so that it can predict and update program information appealing to that profile.

Frozen Profile: The SGM still considers the preferences of a frozen profile, allocates space, and records programs that will appeal to the profile. But the PDM does not continue to update and refine the profile's preferences and pass them to the CApp.

Disabled Profile: The SGM releases space previously allocated to the specified profile.

Implementation Guidelines

The CApp first calls MbTVGetNumProfiles, then the function MbTVGetProfileID, then MbTVGetProfileParams, which returns the parameters of a specified profile, copying the appropriate values from the profile_t data structure.

Setting Profile Parameters
Feature Description

Modifies a profile by changing its name or status. This feature can disable or freeze a profile, as explained in the feature Get Profile Parameters.

Invocation Screen

Setting Profile Parameters is not shown in an invocation screen.

Implementation Guidelines

The CApp calls MbTVSetNumProfiles, then the function MbTVSetProfileId, then MbTVSetProfileParams, which returns the parameters of a specified profile, copying the appropriate values from the profile_t data.

Display Current Profiles
Feature Description

Shows existing profiles by name.

Invocation Screen

See Getting Number of Profiles to see an invocation screen for Display Current Profiles.

Implementation Guidelines

The CApp calls the function MbTVGetNumProfiles. This function calls the function MbTVGetProfileID, which calls MbTVGetProfileParam, which returns one profile name. The system iterates through the loop for each profile until all the profile names are extracted, and the CApp displays them for the viewer.

Add Profile
Feature Description

Adds one profile to the existing profiles.

Invocation Screen

See Getting Number of Profiles to see an invocation screen for Add Profile.

Implementation Guidelines

The CApp calls MbTVAddProfile, which creates a new profile with a set of predefined defaults, specified in a field of the data structure profile_t (See Section 4.3 of the PDM Interface Specification for this data structure).

The maximum number of profiles that can be created is implementation specific, set to a predefined upper limit. Until that limit is reached, the CApp can create new profiles as appropriate and display them to the user by name.

Notification Requirements

This section describes the event notification mechanism of the various modules. There are two types of events:

Those that are generated by a specific module
Those that are forwarded by a specific module All commands originate from the user, and trickle down to the SDM and DVCR through the CApp. Each user request generated during a viewing session is processed through the CApp. The CApp invokes the relevant function in the appropriate module. DVCR requests are then passed to the SDM, which may forward them to the DVCR library if required.

The status returned by lower level modules in this procedure is communicated back to the CApp through an event notification mechanism. For example, the status for commands that require DVCR support is passed by the DVCR to the SDM, which then notifies the CApp. As the CApp receives each event it forwards events to other modules (such as the PDM), which might require them for monitoring or storage purposes.

At each stage of the event notification procedure the event passed to a module may be remapped to a different event, or renamed, before it is forwarded.

Details of event notification by each module is described in the following sections.

Events Generated by the DVCR Library

The PDM must know the DVCR status at any point in time. This information is communicated through callbacks. Event notification can be either generated or forwarded. When a function is initiated by DVCR operations, no event notification is necessary. Most DVCR notification events occur when an operation is stopped or paused, except DVCR_SKIP_FORWARD and DVCR_SKIP_BACKWARD.

The Controlling Application must be a context of the DVCR sequence. The Controlling Application and DVCR can also implement calls with any context, but they must maintain the sequence of the events.

Unlike the SDM notifications, which notify both the start and completion of a DVCR operation, the DVCR library notifications primarily indicate the completion of DVCR operations. The events initiated from the DVCR to the SDM are communicated through a callback function, provided by the SDM. These events are:

- The DVCR_STOP event is generated when the function DVCRStop is invoked. The DVCR_STOP event notifies the termination of the current DVCR request. Information available through this callback depends on the DVCR operation that has been terminated. The callback notifies the operation that has been terminated and specifies the relevant duration of the concluded operation.
- Under special circumstances, the DVCR library does not generate a DVCR_STOPevent: whenever the DVCR_STOP operation is called for a channel change, the DVCR library does not generate a stop event.
- The DVCR_PAUSE event is generated when the function DVCRPause is invoked. The DVCR_PAUSE event notifies the pausing of playback on the current channel.
- The DVCR_JUMP_TO_LIVE event is generated two ways: by invoking the function DVCRLive, and by default, when the event encounters an End of File (EOF) condition during a fast forward operation on a Time Shift Enabled (TSE) channel. The DVCR_JUMP_TO_LIVE event notifies completion of the Jump To Live request.
- The DVCR_IMPLICIT_STOP event is not associated with a DVCR function. It notifies automatic termination of the current DVCR operation. The DVCR operations that may terminate automatically are REWIND, due to a Beginning of File (BOF) condition, FAST FORWARD or PLAYBACK, due to an End of File (EOF) condition, or RECORD, due to lack of storage resources. These events may also terminate due to I/O errors.
- The SDM_SKIP_FORWARD event is generated when the function DVCRSkipForward is invoked. It notifies the completion of a skip forward operation. This operation cannot be stopped or paused once it has begun.
- The SDM_SKIP_BACKWARD event is generated when the function DVCRSkipBackward is invoked. It notifies the completion of a skip backward operation. This operation cannot be stopped or paused once it has begun.
- The DVCR_SKIP_BACKWARD event is generated when the function DVCRSkipBackward is evoked. The DVCR_SKIP_BACKWARD event indicates the completion of a skip backward operation. This operation cannot be stopped or paused once it has begun.
- The DVCR_REWIND event is generated when the function DVCRRewind is evoked. This event is returned only if an error occurs.
- The DVCR_FAST_FORWARD event is generated when the function DVCRFastForward is evoked. This event is returned only if an error occurs. This event is returned only if an error occurs.
- The DVCR_PLAY event is generated when the function DVCRPlay is evoked. This event is returned only if an error occurs.
- The DVCR_RECORD event is generated when the function DVCRPlay is evoked. This event is returned only if an error occurs.

Events Generated by the SDM Library

Event notification by the SDM to the CApp is through a callback function provided by the CApp. The SDM uses the callback mainly to pass status, notifying the CApp of events and other information generated as a result of requests made by the CApp.

Callbacks are typically made to indicate the start of a DVCR request or the completion of a DVCR request.

Not all recording and deleting operations initiated by the SDM need to be notified to the CApp.

Events generated by the SDM through the callback function are discussed below.

- The SDM_REWIND event is generated when the function SDMRewind is evoked. It notifies the start of the rewind operation. Information on the duration by which a program has been rewound is available through a separate stop event.
- The SDM_FAST_FORWARD event is generated when the function SDMFastForward is evoked. It notifies the start of the fast forward operation. The duration of a fast-forward event in a program is available through a separate stop event.
- The SDM_STOP event is generated when the function SDMStop is evoked. It notifies the termination of the current DVCR request. Information available through this callback is dependent on the DVCR operation that has been terminated. The callback notifies the operation that has been terminated and specifies the relevant duration of the concluded operation. Under special circumstances, i.e. when the function SDMStop is called during a channel change operation, the SDM library does not generate the SDM_STOP event.
- The SDM_PAUSE event is generated when the function SDMPause is evoked. It notifies the pausing of playback on the current channel.
- The SDM_RESUME event is generated when the function SDMResume is evoked. It notifies that playback on the current channel, which was paused, resumes.
- The SDM_PLAY event is generated when the function SDMPlay is evoked. It notifies the start of playback on the current channel. The playback operation may also be invoked during a channel change operation, and such operations are not indicated to the CApp.

In special circumstances, i.e. when SDMPlay is called during a channel change operation, no event is generated.

The SDM_JUMP_TO_LIVE event is generated when the function SDMLive is evoked. It notifies completion of the Jump To Live request.

The SDM_ADD_CHANNEL is not associated with any function. It generates the addition of a virtual channel. Each program recorded is associated with a Virtual Channel, and the recorded program is available on that Virtual Channel. The creation of stored programs is synonymous with program recording. The SDM_ADD_CHANNEL event is used to notify after an SDM_STOP for the recording operation. The SDM_ADD_CHANNEL event is notified of programs recorded in their entirety. The SDM_ADD_CHANNEL event is generated after the function DVCRStop has been received.

The SDM_DELETE_CHANNEL is not associated with any function. It generates the deletion of a virtual channel. Each program recorded is associated with a Virtual Channel, and the recorded program is available on that Virtual Channel. The deletion of stored programs is synonymous with program deleting. The SDM_DELETE_CHANNEL event is used to notify after an SDM_STOP for the recording operation.

The SDM_DELETE_CHANNEL event is notified of programs recorded in their entirety. The SDM_DELETE_CHANNEL event is generated on returning from the DVCRDelete operation.

Events Forwarded by the SDM

The SDM forwards the events below, usually to map them to its own terminology.

The SDM_SKIP_FORWARD event is generated when the function DVCRSkipForward is evoked. It notifies the completion of a skip forward operation. The SDM_SKIP_FORWARD event remaps the DVCR_SKIP_FORWARD event.

The SDM_SKIP_BACKWARD event is generated when the function DVCRSkipBackward is evoked. It notifies the completion of a skip backward operation. The SDM_SKIP_BACKWARD event remaps the DVCR_SKIP_BACKWARD event.

The SDM_IMPLICIT_STOP event is generated when it receives the DVCR_IMPLICIT_EVENT. It notifies automatic termination of the current DVCR operation. When the CApp receives the SDM_IMPLICIT_STOP event, it can either do nothing and allow the user to recover (by rewinding, for instance), or automatically process the recovery. The SDM_IMPLICIT_STOP event remaps the DVCR_IMPLICIT_STOP event.

The SDM_PAUSE event remaps the DVCR_PAUSE event.

The SDM_JUMP_TO_LIVE event remaps the DVCR_JUMP_TO_LIVE event.

The SDM_IMPLICIT_STOP event remaps the DVCR_IMPLICIT_STOP event.

The SDM_IMPLICIT_STOP event remaps the DVCR_IMPLICIT_STOP event.

The SDM_IMPLICIT_STOP event remaps the DVCR_IMPLICIT_STOP event.

The SDM_REWIND event remaps the DVCR_REWIND event.

The SDM_FAST_FORWARD event remaps the DVCR_FAST_FORWARD event.

The SDM_PLAY event remaps the DVCR_PLAY event.

The SDM_RECORD event remaps the DVCR_RECORD event.

The SDM_RECORD_ALERT event differs from other events forwarded by the SDM, as discussed in detail in the following sections.

Events Generated by the CApp

Some user actions cause the CApp to generate events, which are processed directly by the CApp.

The CApp generates the MBTV_POWER_OFF event when it processes a power-off request for the viewing device. Indication of the MBTV_POWER_OFF is not mandatory, and the CApp usually issues this event only when it has specific hardware support designed to detect such an event.

The CApp generates the MBTV_POWER_ON event when it processes a power-on request for the viewing device. Notification of MBTV_POWER_ON is not mandatory and the CApp usually issues it only when it has specific hardware support designed to detect such an event The CApp generates the MBTV_CHANNEL_CHANGE event when it completes the channel change operation requested by the user. A channel change operation to or from a Virtual Channel or a TSE Channel may invoke the SDMStop and SDMPlay functions. In such requests no SDM events are forwarded to the CApp unless an error occurs. In all such situations, the CApp generates the MBTV_CHANNEL_CHANGE event as opposed to MBTV_STOP or MBTV_PLAY notification. Channel change operations, initiated by the user or by the SDM for automatic program recordings, are handled independently by the CApp and are always notified to other modules (such as the PDM).

Events Forwarded by the CApp

Events forwarded by the CApp are typically due to SDM event notifications that result from servicing user requests. The CApp remaps some of the events initiated by the SDM before it forwards them to other modules. Details of event notification forwarded by the CApp are given below.

The CApp forwards the MBTV_REWIND event when it receives the SDM_REWIND event from the SDM. The CApp generates the MBTV_REWIND event notification to signal the start of a rewind operation.

The CApp forwards the MBTV_FAST_FORWARD event when it receives the SDM_FAST_FORWARD event from the SDM. The CApp generates MBTV_FAST_FORWARD to signal the start of a fast forward operation.

The CApp forwards the MBTV_PAUSE event when it receives a SDM_PAUSE event from the SDM. The CApp generates MBTV_PAUSE to signal the start of pausing playback on the current channel.

The CApp forwards the MBTV_RESUME event when it receives a SDM_RESUME event from the SDM. The CApp generates MBTV_RESUME to signal resuming playback on the current channel.

The CApp forwards the MBTV_PLAY event when it receives the SDM_PLAY event from the SDM. The CApp generates MBTV_PLAY to signal the start of playback on the Virtual Channel or a Time Shift Enabled (TSE) Channel, in response to a user request for a playback operation. Channel change requests to a Virtual or TSE Channel also cause the CApp to invoke the SDM-Play function. However, no event is sent by the SDM to the CApp in such cases.

The CApp forwards the MBTV_JUMP_TO_LIVE event when it receives the SDM_JUMP_TO_LIVE event from the SDM. The CApp generates MBTV_JUMP_TO_LIVE to signal the completion of a viewer's Jump to Live request.

The CApp forwards the MBTV_ADD_CHANNEL event when it receives a SDM_ADD_CHANNEL event from the SDM. The CApp notifies this event to signal the addition of a Virtual Channel. Each recorded program is presented as available on a Virtual Channel, provided it has been recorded in its entirety. Incomplete recording programs are not presented by the SDM and are automatically deleted unless otherwise specified by the user.

The CApp forwards the MBTV_DEL_CHANNEL event when it receives a SDM_DEL_CHANNEL event from the SDM. The CApp sends this event to signal the deletion of a program due to an explicit delete request from a user.

The CApp forwards the MBTV_STOP event when it receives an SDM_STOP event from the SDM. An SDM_STOP event is generated by an explicit stop operation requested by the user.

Channel change operations that require invoking the SDM-Stop and SDMPlay functions do not generate a SDM_STOP event.

The MBTV_STOP event also provides context-dependent information on an operation that has been terminated by the user. The MBTV_STOP event is also notified when it receives an SDM_IMPLICIT_STOP due to BOF or EOF conditions on explicit playback, record, rewind and fast forward requests.

The CApp forwards the MBTV_RECORD event when it receives a SDM_RECORD event from the SDM. The CApp generates MBTV_RECORD to signal the start of an explicit record request generated by the user for the program the user is currently viewing. Recording operations initiated by the SDM for automatic or explicit recording when the viewing device inactive are not notified by the SDM, and hence are not forwarded by the CApp.

The CApp forwards the MBTV_SKIP_FORWARD event when it receives SDM_SKIP_FORWARD from the SDM. It is forwarded by the CApp to signal the completion of a skip forward operation.

The CApp forwards the MBTV_SKIP_BACKWARD event when it receives SDM_SKIP_BACKWARD from the SDM. It is forwarded by the CApp to signal the completion of a skip backward operation.

Events Serviced by the CApp

The SDM_RECORD_ALERT event is generated when there is an explicit recording request scheduled during an active viewing session. This event is triggered at a predefined interval before the start of the actual recording operation. No other action is taken by the SDM, other than providing the alert. The recording request for which the notification is provided is aborted. The aborted recording request can now be executed only through an explicit immediate record request issued by the CApp. The SDM sets the eventTime and channelID fields to the program start time (in local time) and the channel ID of the program to be recorded.

Events Generated for the VSM

The CApp communicates all user requests to the VSM first, before routing them to the appropriate module for execution. The events forwarded by the CApp to the VSM are as follows.

The MBTV_POWER_ON event is forwarded by the CApp to the VSM to turn power on in the viewing device.

The MBTV_POWER_OFF event is forwarded by the CApp to the VSM to turn power off in the viewing event.

The MBTV_VSM_EVENT is forwarded by the CApp to the VSM for every user interaction except power on and power off.

MbTV User Interface Manager Specifications

This section provides an architectural overview and draft specification for the User Interface Manager (UIM).

1. User Interface Manager

User Interface Manager is special MbTV software module which is integrated with CApp
and uses all main components of MbTV (SDM, PDM, EPG library and etc.).

Also User Interface Manager (UIM) employs several special services from CApp such as:

Timing Service;
Configuration Service.

UIM gets a command from remote control and other input devices from user and sends
the stream of drawing instructions to Draw Engine. Each drawing instruction reflects drawing
the corresponding UI object on a screen. For full redrawing of the screen Screen Composer sends the drawing instruction for every objects currently displaying on a screen. For channel changing Screen Composer sends only a couple drawing instructions for changing colors on

| Controlling application (CApp) |

1.1 Main Components of UIM
Input Device Manager (IDM);
Input Device Drivers (IDD);
Serial Driver (RS-232);
PC keyboard Driver;
USB Driver;
IrDA Driver;
Object Manager;
Channel Browser;
Screen Composer;

1.2 Object Manager
During initialization of UI object manager creates all UI objects. Each object has
predefined list of views. The main objects which reflect current design of UI are the following:
chBrowser—channel Browser object (for channel navigation);
PreObj—preview TV object (for live and recorded TV programs);
TVObj—full size TV object (for full screen showing);
AppObj—application object (MbTV Weather channel, MbTV News channel and etc.)
SysObj—system object (for ads, bars, menus and ets.).

All objects are described by the following structure.

```
typedef struct _objectList_
{
    int             typeObject;      // type of object
    bool            visibleObject;   // visible/not on a screen;
    bool            activeObject;    // active/not (has a input focus);
    objectView_t    *curView;        // current view of object;
    objectView_t    *listView;       // list of object view;
    objectList_t    *nextObject;
} objectList_t, *pobjectList_t;
#define MbTV_UIOBJECT_CHBROWSER   1
#define MbTV_UIOBJECT_PREWND      2
#define MbTV_UIOBJECT_TVWND       3
#define MbTV_UIOBJECT_APPWND      4
#define MbTV_UIOBJECT_SYSWND      5
```

Each object is placed in preferred area of screen and can be visible or invisible (has a hidden status). The layout of objects on a screen manages by configuration files and depends from user profile. UI objects can be modified by means of configuration files and each object can get focus and can get commands. The focused object get all command from the user.

Some object has a permanent status and some of them temporal status.

Filters is a example of the objects with temporal status.

```
typedef struct _objectView_
{
    int             typeView;       // type of view
    objectView_t    *nextView;      // list of object view
    bool            show;           // show/hide view
    objectDesc_t    *objectDesc;    // object description
} objectView_t, *pobjectView_t;
typedef objectDesc_t void;
```

Each objectDesc has different representation depends from the type of object and type of view.

Also typeView item depends from category of object. Some types of views for chBrowser:

```
#define MbTV_CBVIEW_NOVIEW        0
#define MbTV_CBVIEW_GRID          1
#define MbTV_CBVIEW_TOPTEN        2
#define MbTV_CBVIEW_STORAGE       3
#define MbTV_CBVIEW_RECORDED      4
#define MbTV_CBVIEW_APPCH         5
#define MbTV_CBVIEW_LATEST        6
#define MbTV_CBVIEW_MOVIE         7
```

1.2.1 Object ChBrowser

Object ChBrowser has a following items:

| | |
|---|---|
| TimeBar | current time range for showing channel's program; |
| ListChannelBars | channels information list (number or name of channels, program info, program status); |
| ProgInfo | information about current program; |
| Rating | rating of program. |

Channel Browser supports two modes of browsing channels:
time mode;
channel mode.

In time mode channel browser shows one or more programs per channel in indicated period of time. In channel mode channel browser shows only specified amount of programs per each channel.

```
typedef struct   _objectBrowser_
{
    chbTimeBar_t     timeBar;        // time bar
    chbListChs_t     listChs;        // list of channels
    chbProgInfo_t    progInfo;       // information about selected program
    int              tzsec;          // local time zone in second
                                     // Difference in seconds between UTC and local time
    int              type;
#define MbTV_CHBROWSER_TIME      0
#define MbTV_CHBROWSER_CHANNEL   1
    time_t           startTime;      // start time of showing
    int              widthTime;      // width of grid in seconds for showing
    int              selectedCh;     // selected channel
    int              selectedPgm;    // selected program
    int              chOnTop;        // channel on top
    int              totalChs;       // total number of channels
} objectBrowser_t, *pobjectBrowser_t;
typedef struct   _chbTimeBar_
{
    time_t           localStartTime;
    time_t           localEndTime;
```

-continued

```
    itemRect_t          bar;                        // location bar on a screen
    itemColor_t         colorBack;                  // background color
    itemColor_t         colorText;                  // text color
    itemFont_t          fontText;                   // font of text
    itemImage_t         imageNoTV;                  // image
    itemText_t          text;                       // text of bar
} chbTimeBar_t, *pchbTimeBar;
typedef struct _chbListChs_
{
    int                 chs;                        // number of channels in list channels
    chbCh_t             *fCh;                       // ref to first channel
    chbCh_t             *sCh;                       // ref to selected channel
    int                 status;                     // status of list channels
    int                 reserved;
} chbListChs_t, *pchbListChs;
typedef struct _chbCh_
{
    int                 pgms;                       // number of programs in channel
    itemRect_t          bar;                        // location channel bar on a screen
    itemColor_t         normal;                     // normal color of the bar
    itemColor_t         selected;                   // selected color of the bar
    chbProg_t           *fpgm;                      // first program of channel
    chbProg_t           *sPgm;                      // current selected program of channel
    chbChName_t         chName;                     // name of channel
    int                 chNum;                      // number of channel
    int                 chImageID;                  // image ID of channel
    void                *chID;                      // channel ID
    int                 status;
    chbBar_t            *next;                      // reference to next channel in list
    int                 chType;
} chbCh_t, *pchbCh;
typedef struct _chbProg_
{
    long                duration;                   // duration of this program
    time_t              startTime;                  // start time of this program, read from EPG
    uint                rating;                     // overall rating of this program;
    char                *fields[CATEGORIES];        // epg fields of program
#define CHANNEL_INDEX                  0
#define TITLE_INDEX                    1
#define SUBTITLE_INDEX                 2
#define EPISODE_NAME_INDEX             3
#define ACTOR_INDEX                    4
#define ACTOR_COUNT                    7
#define TITLE_SUB_INDEX               11
#define DSCR_SUB_INDEX                12
#define PROGRAM_TYPE_INDEX            13
#define PROGRAM_CATEGORY_INDEX        14
#define COUNTRY_ORIGIN_INDEX          15
#define MPAA_RATING_INDEX             16
#define QUALITY_INDEX                 17
#define AFFILIATION_INDEX             18
#define QUALIFIER_FOUR_INDEX          19
    int                 status;                     // lock/unlock, live/recorded
#define    RECORD_REQUESTED        0x01
#define    PROGRAM_LOCKED          0x02
```

```
#define    LIVE_PROGRAM              0x04
    chbProg_t         *next;                           // reference
to next program
} chbProg_t, *pchbProg;
typedef struct   _chbProgInfo_
{
    itemRect_t        progInfo;                        //
location of ProgInfo rect on a screen
    itemColor_t       colorBack;                       //
background color
    itemColor_t       colorText;                       // text
color
    itemColor_t       colorBorder;                     // border
color
    itemFont_t        fontText;                        // font
of text
    itemText_t        text;                            // prog
info text
} chbProgInfo_t, *pchbprogInfo_t;
typedef struct   _chbRating_
{
    int               imageID;                         // image
ID of channel
}
typedef struct   _itemRect_
{
    int               left;                            // specifies the x-
coordinate of the upper-left corner of the item
    int               top;                             // specifies the y-
coordinate of the upper-left corner of the item
    int               right;                           // specifies the x-
coordinate of the lower-right corner of the item
    int               bottom;                          // specifies the y-
coordinate of the lower-right corner of the item
} itemRect_t, *pitemRect;
typedef struct   _itemColor_
{
    uint              color;                           // color (RGB)
} itemColor_t, *pitemColor_t;
typedef struct   _itemFont_
{
    int       nHeight;
    int       nWidth;
    int       nEscapement;
    int       nOrientation;
    int       nWeight;
    uchar     bItalic;
    uchar     bUnderline;
    uchar     cStrikeOut;
    uchar     nCharset;
    uchar     nOutPrecision;
    uchar     nClipPrecision;
    uchar     nQuality;
    uchar     nPitchAndFamily;
    char*     lpszFacename;
} itemFont_t,    *pitemFont;
typedef itemText_t char*;
Auxilary structures are introduced for more convenient
programing.
typedef struct   _chbChName_
{
    char              name[MAX_NAME_OF_CHANNEL];
} chbChName_t, *pchbChName_t;
```

Some Algorithms for Channel Browser.

During initialization of channel browser UIM initiates all UI objects and CDM, SDM modules. Using the user profile UIM determines the list of views for each UI object.

```
CHBInit
int
CHBInit ( )
{
        // initialize list of views
    for (each available view from user profiles)
```

```
{
    if (current type of view == MbTV_CBVIEW_GRID)
    {
        set objectBrowser.tzsec;
        set objectBrowser.startTime;           // start time of showing program
        if (objectBrowser.type == MbTV_CHBROWSER_TIME)
        {
            set objectBrowser.widthTime;       // width of grid = 1 hour
        }
        if (objectBrowser.type == MbTV_CHBROWSER_CHANNEL)
        {
            set    objectBrowser.listChs.chs;  // number of showing channel
        }
                // initialize timeBar object
                chbTimeBar.text = " " ;
                set chbTimeBar.localStartTime;
                set chbTimeBar.localEndTime = chbTimeBar.localStartTime + objectBrowser.widthTime;
                set chbTimeBar.bar;            // location bar on a screen
                set chbTimeBar.colorBack;      // background color
                set chbTimeBar.colorText;      // text color
                set chbTimeBar.fontText;       // font of text
                set chbTimeBar.imageNoTV;      // image
                set chbTimeBar.text;           // text of bar
                // initialize chbListCh object
                for (each channel in list channels)
                {
                    set chbCh.bar;             // location channel bar on a screen
                    set chbCh.normal;          // normal color of the channel bar
                    set chbCh.selected;        // selected color of the channel bar
                    set chbCh.chName;          // name of channel
                    set chbCh.chNum;           // number of channel
                    set chbCh.chImageID;       // image ID of channel
                    set chbCh.chID;            // channel ID
                    set chbCh.status;
                    chbLoadPgm_t    loadInfo;
                    loadInfo.startTime = objectBrowser.startTime;   // start time of loading
                    loadInfo.widthTime = objectBrowser.widthTime;   // width of grid in seconds
                    if (objectBrowser.type == MbTV_CHBROWSER_TIME)
                    {
                        loadInfo.pgms = 0;
                    }
                    if (objectBrowser.type == MbTV_CHBROWSER_CHANNEL)
                    {
                        loadInfo.pgms = objectBrowser.showCh;  // number of loading programs
                    }
                    loadInfo.type = objectBrowser.type;   // type of loading
                    loadInfo.chID = chbCh.chID;           // channel ID
                    if (CHBLoadPgmGrid (chbCh.fPgm, &loadInfo))
                    {
                        SYS_ERR(PANIC, " CHBLoadPgmGrid( ): Loading programs") ;
                    }
                    chbCh.sPgm = chbCh.fPgm;             // current selected program = first pgm
                }
```

```
}
        if (current type of view == MbTV_CBVIEW_TOPTEN )
        {
                chbTimeCh.text = "MbTV Picks at ";
                        // initialize chbListChs object
                for (each channel in list channels)
                {
                        set chbCh.bar;                          // location channel bar on a screen
                        set chbCh.normal;                       // normal color of the channel bar
                        set chbCh. selected;                    // selected color of the channel bar
                        set chbCh.chName;                       // name of channel
                        set chbCh.chNum;                        // number of channel
                        set chbCh.chImageID;                    // image ID of channel
                        set chbCh.chID;                         // channel ID
                        set chbCh.status;
                        chbLoadPgm_t    loadInfo;
                                loadInfo.startTime = objectBrowser.startTime; // start time of loading
                        loadInfo.widthTime = 0;
                        loadInfo.pgms = 0;
                        loadInfo.type = MbTV_CHBROWSER_ CHANNEL;
                        if (CHBLoadPgmTop (chbCh.fPgm, &loadInfo))
                        {
                        SYS_ERR(PANIC, " CHBLoadPgmTop( ): Loading programs") ;
                        }
                        chbCh.sPgm = chbCh.fPgm;                // current selected program = first pgm
                }
        }
        if (current type of view == MbTV_CBVIEW_STORAGE )
        {
                chbTimeBar.text = "MbTV Expected Recorded Programs at ";
        }
        if (current type of view == MbTV_CBVIEW_RECORDED )
        {
                chbTimeBar.text = "MbTV Recorded Programs";
        }
        if (current type of view == MbTV_CBVIEW_LATEST )
        {
                chbTimeBar.text = "MbTV Latest Programs"
        }
}
typedef struct   _chbLoadPgm_
{
        time_t       startTime;      // start time of program
        int          widthTime;      // width of grid in seconds
        int          pgms;           // number of loading programs
        int          type;           // type of loading
#define MbTV_CHBROWSER_TIME       0
#define MbTV_CHBROWSER_CHANNEL 1
        void         *chID;          // channel ID
} chbLoadPgm_t, *pchbLoadPgm_t;
CHBLoadPgmGrid
```

This function is used for loading all programs of specified channel for grid view.

```
int
CHBLoadPgmGrid(chbProg_t    *lPgm,               // list of programs
                chbLoadPgm_t    *loadInfo)       // load info
```

-continued

```
{
  if (loadInfo.type == MbTV_CHBROWSER_TIME)
  {
  }
  if (loadInfo.type == MbTV_CHBROWSER_CHANNEL)
  {
    counter = 0;
    while (counter < loadInfo.pgms)
    {
                result = CHBCheckPgmCache (loadInfo.chID,
loadInfo.startTime) ;
                if (result == SUCCESS)         // in cache
                {
                        call Load program from cache;
                }
                else
                {
                        result = CHBLoadPgmToCache (pgm, loadInfo);
                }
    }
  }
}
CHBCheckPgmCache
int
CHBCheckPgmCache(void*    chID,              // channel ID
                             time_t startTime)         // start
time of program
{
  if (program in cache)
  {
    return SUCCESS;
  }
  return FAILED;
}
CHBLoadPgmToCache
int
CHBLoadPgmToCache (chbProg_t    *pgm,              //
program descriptor
                             chbLoadPgm_t    *loadInfo)
// load info
{
    pgmInfo_t pgmInfo;
    pgmInfo.channelID = loadInfo->chID;
    pgmInfo.pgmStartTime = loadInfo->startTime;
    pgmInfo.pgmDuration = 0;
    pgmInfo.pgmRank = 0;
    pgmInfo.pgmTitle = NULL;
    pgmInfo.pgmRating = 0.0;
    pgmInfo.pgmChnlType = CHANNEL_TYPE_CABLE;
    pgmInfo.pgmFiller = 0;
    pgmInfo.pgmMark1 = 0;
    pgmInfo.pgmMark2 = 0;
    VOID* pgmData;
    if (EPGGetProgramInfo (&pgmInfo))
    {
            SYS_ERR(PANIC, "CHBLoadPgmGrid(): Reading date");
    }
    if (pgmInfo.pgmDuration == -1)
    {
            if (loadInfo->startTime <pgmInfo.pgmStartTime)
            {
                    startTime = (loadInfo->startTime/(30 *
ONE_MINUTE)) * (30 * ONE_MINUTE);
                    duration = pgmInfo.pgmStartTime - startTime;
                    char *ch;
                    EPGGetChannelParams (loadInfo->chID,
EPG_CHANNELPARAMS_NAME, &ch) ;
                    call PutProgramToCache (startTime, duration, ch);
                    return;
            }
    }
    if (!EPGGetProgramData (&pgmInfo, (CHAR**) &pgmData))
    {
      if (pgmInfo.pgmStartTime > loadInfo->startTime )
      {
          fake = 1;
      }
      else
      {
          strcpy (buf, (char*) pgmData) ;
```

-continued

```
        }
    }
    else
    {
        fake = 1;
    }
    if (fake)
    {
        startTime = (loadInfo->startTime / (30 *
ONE_MINUTE)) * (30 * ONE_MINUTE) ;
        if (pgmInfo.pgmStartTime > loadInfo->startTime)
        {
        duration = pgmInfo.pgmStartTime – startTime;
        }
        else
        {
                duration = 0;
        }
        char *ch;
        EPGGetChannelParams (channelID, EPG_CHANNELPARAMS_NAME,
&ch);
        call PutProgramToCache (startTime, duration, ch) ;
        return;
    }
    /* construct start time */
    pos = 0
    // Step 1 : Read date
    if ((begin = extract(buf, &len, &pos)) < 0)
    {
      SYS_ERR(PANIC, " CHBLoadPgmGrid( ): Reading date");
    }
        // Read time
    if ((begin = extract (buf, &len, &pos)) < 0)
    {
    SYS_ERR (PANIC, " CHBLoadPgmGrid( ) : Reading time") ;
    }
    if (EPGGetProgramInfo (&pgmInfo))
    {
            SYS_ERR(PANIC, " CHBLoadPgmGrid( ): Reading date");
    }
    startTime = pgmInfo.pgmStartTime;
    if ((begin = extract(buf, &len, &pos)) < 0)
    {
            SYS_ERR(PANIC, " CHBLoadPgmGrid( ): Reading channel");
    }
    call PutProgramToCache (startTime, duration, ch);
    return TRUE;
}
CHBLoadPgmTop
int
CHBLoadPgmTop (chbProg_t      *1Pgm,                    //
list of programs
                                    chbLoadPgm_t   *loadInfo)         //
load info
{
}
CHBMoveUp
int
CHBMoveUp (chbListChs_t listChs)
{
    if (listChs->sCh == listChs->fCh)     // selected
channel is a first channel already
    {
        call load new channels;
    }
    else
    {
        set listChs->sCh to previous channel;
    }
}
CHBMoveDown
int
CHBMoveDown (chbListChs_t listChs)
{
    if (listChs->sCh == LASTBAR)    // selected channel is a
last channel
    {
        call load new channels;
    }
    else
```

```
{
    set listChs->sCh to next channel;
  }
}
```

PreObj

This object represents the pre-view window with TV-live (from tuners) or recorded (from DVR) programs. It's possible to have several pre-view windows if hardware allows. UIM supports
multiple PreObj object for several tuners or DVRs.
Status—current status of showing TVObj
This object has several information items each of them can be hidden.

| | |
|---|---|
| CurrentTime | current time on a screen; |
| ChannelName | short channel name; |
| ChannelNumber | channel number; |
| InputField | for remote control input (channel number or something else); |
| PlayRecordingTime | actual time from starting program; |
| RemainingTime | for TV it's time until the end of program and for recording program It's a ending time of record; |
| FastMoveBar | for fast navigation in the recorded program; |
| VolumeBar | volume control; |
| DVRStatusInfo | play/recording, pause, FF, rewind, slow motion, fast motion. |

AppObj

This object looks like a Internet-base technology applications (MbTV application) written on Java, Html, JavaScript and used IE controls for informational representation on Windows CE 2.12 and up or Windows 98 platforms. MbTV applications work in special view-windows by using multiple IE (Internet Explorer) ActiveX controls one for each application. This applications represent special virtual programs (virtual A-channels) from MbTV Applications Servers, such as MbTV Weather channel, MbTV News channel, MbTV Shopping channel and etc.);
SysObj

| | |
|---|---|
| DateBar | current date bar; |
| UserInfo | current user info (name and etc.); |
| MenuLock | menu for locking recorded program; |
| MenuUnLock | menu for unlocking recorded program; |
| MenuRecord | menu for recording program; |
| MenuDelRec | menu for delete record of program; |
| MenuFilter | filters |
| Ads | advertising window |

1.3 Channel Browser

Channel Browser is used for browsing information about channels. Channel Browser supports a list of different channel views. Each element of this list represent one of the type of bunching channels (channel grid, top 10, Recorded channels, Application channels, sliding storage and etc.).

```
            viewCB_t    *viewListCB;         // list
            of view
            typedef struct_viewCB_
```

```
            {
              int          typeView;         //
            type of view
              viewCB_t     *nextView;        // next
            view in the list
              chListCB_t   *chList;          //
            list of viewing channels
              time_t       timeAt;           //
            launching time for timer
            } viewCB_t, *pviewCB_t;
```

1.4 UI Draw Engine

UI Draw Engine provides independent level of implementation from the target platform for drawing instructions (primitives) for representation MbTV on a user screen (user TV). The stream
of drawing instructions goes from Screen Composer to Draw Engine. The stream of
drawing instruction is prepared by Screen Composer according the layout of screen objects
and their visibility, screen resolution (NTSC, HDTV) and etc.
Draw stream consists from
sequence of draw instructions with a code-operation and data for each instruction.
Functions interface for Draw Engine are also provided.
Some functions of Draw Engine:
DEngLoadBitmap
int
DEngLoadBitmap(BITMAP bitmap, int *imageID)
This function loads specified bitmap to memory and returns bitmap ID.
DEngDrawRect
int
DEngDrawRect(itemRect_t rect, itemColor_t color)
This function fills specified rectangle with color.
DEngDrawText
DEngDrawText(itemText_t text, itemRect_t rect, itemFont_t font, itemColor_t color)
This function draws specified text in rect location with font and color.
DEngDrawBitmap
int
DEngDrawBitmap(itemRect_t rect, int imageID)
This function draw bitmap in specified location.
1.5.1 UIChannelUp

```
int
UIChannelUp (objectView_t *view)
{
    if (view->selectedCh == 0)
        return;
    if (CAppCheckState (MBTV_CHANNEL_CHANGE))
        return;
    view->selectedCh--;
    view->selectedPgm = 0;
    if (view->selectedCh >= view->chOnTop)
    {
        if (view->typeView == MbTV_CBVIEW_GRID ||
            view->typeView == MbTV_CBVIEW_TOPTEN ||
```

```
                view->typeView == MbTV_CBVIEW_STORAGE)
                UIDrawChannelGrid (view);
        }
        else
        {
            // Need to scroll down
            view->chOnTop--;
            if (view->typeView == MbTV_CBVIEW_GRID   ||
                view->typeView == MbTV_CBVIEW_TOPTEN ||
                view->typeView == MbTV_CBVIEW_STORAGE)
            {
                UIDrawChannelNames (view);
                UIDrawChannelGrid (view);
            }
        }
    }
    chbCh_t ch = UIGetSelectedCh() ;
    CAppChannelChange ( (VOID*) ch->chID, ch->chType,
UIGetClockTime() );
    if (view->typeView == MbTV_CBVIEW_GRID ||
        view->typeView == MbTV_CBVIEW_TOPTEN )
    {
        UIDrawVideoBorder (view);
    }
}
```

1.5.2 UIChannelDown

```
int
UIChannelDown(objectView_t *view)
{
    if ((view->selectedCh +1) >= view->totalChs)    // This
is the last channel
    {
        return;
    }
    if (CAppCheckState(MBTV_CHANNEL_CHANGE))
    {
        return;
    }
    view->selectedCh++;
    view->selectedPgm = 0;
    if (view->selectedCh <= (view->chOnTop + view->chs - 1))
    {
        // No scrolling involved
        if (view->typeView == MbTV_CBVIEW_GRID   ||
            view->typeView == MbTV_CBVIEW_TOPTEN ||
            view->typeView == MbTV_CBVIEW_STORAGE)
        {
            UIDrawChannelGrid ( );
        }
        else
        {
            // Need to scroll up
            view->chOnTop++;
            if (view->typeView == MbTV_CBVIEW_GRID   ||
                view->typeView == MbTV_CBVIEW_TOPTEN ||
                view->typeView == MbTV_CBVIEW_STORAGE)
            {
                UIDrawChannelNames(view);
                UIDrawChannelGrid(view);
            }
        }
        chbCh_t ch = UIGetSelectedCh( );
        CAppChannelChange((VOID*)ch->chID, ch->chType,
UIGetClockTime( ));
        if (view->typeView == MbTV_CBVIEW_GRID ||
            view->typeView == MbTV_CBVIEW_TOPTEN )
        {
            UIDrawVideoBorder(view);
        }
    }
}
```

1.5.3 UIUpdateView

```
int
UIUpdateView(int typeView)
{
    objectView_t *view = UIGetView(typeView);
    if (view->typeView == MbTV_CBVIEW_GRID   ||
        view->typeView == MbTV_CBVIEW_TOPTEN ||
        view->typeView == MbTV_CBVIEW_STORAGE)
    {
        UIDrawChannelGrid( );
    }
    if (view->typeView == MbTV_CBVIEW_GRID ||
        view->typeView == MbTV_CBVIEW_TOPTEN )
    {
        UIDrawVideoBorder(view);
    }
}
```

2. Main Features of UIM

The User Interface Manager provides the following set of functionality:
- controlling of UI input devices, using unified access to devices by means of device drivers (to Remote Control via Serial Driver (RS232), to PC keyboard via Keyboard Driver);
- supporting of UI objects by means of Object Manager;
- switching between the objects and perfoming object functionality;
- managing the layout of UI objects and compose the UI screen;
- supporting several TV pre-view windows from several video sources (tuners, DVR);
- supporting MbTV applications;
- auto-tuning remote control devices;
- multilingual interface;
- provides a stream of drawing instructions for drawing on a screen;

2.1 Controlling of Input Devices supports user commands from remote control device used several types of keystrokes;

down&up keystroke (produce only one command for keystroke after down or up the key). For example such type of keysrokes used by POWER key;

press&hold keystroke (produce sequence of command after press and hold the key). For example such type of keystrokes used by CH LEFT or CH RIGHT or VOLUME CONTROL keys. Each key employ two parameters:

starting delay and repeating speed.

provides mapping for remote control keys to MbTV functions;

supporting different profiles for key's mapping;

3.1 Input Device Manager

Input Device Manager (IDM) performs the initialization of input device drivers. IDM reads SYS-configuration set and initiates all active MbTV input device drives. IDM creates Driver Control Block (DCB) for each device. All DCB are binded in list. All information requests from device drivers can reflect some modification in DCB. IDM supports two conceptions—the MbTV buttons and MbTV keys. MbTV buttons reflects the real buttons of remote control device or PC keyboard.

MbTV keys abstracts the actions (MbTV functions or operations). Special map tables are used for mapping MbTV buttons to MbTV keys. System for common using and user defined mapping tables exist.

IDM checks the information in each DCB and performs some kind of actions according the button generation rules.

Each input device has unique Input Device Name (IDN) and Input Device ID.

IDM supports the timer interval in 100 msec for detecting of repeating interval.

The maximum amount of repeating sequence of keys is 10 per second.

3.1.2 Driver Control Block

```
typedef struct _idmDCB_
{
    int             idID;        // input device ID
    int             status;      // driver status
    int             btnID;       // button ID
    int             keyID;       // key ID
    int             timeCount;   // counter for timer
    int             btnDelay;    // starting delay of button
    int             btnFreq;     // frequency of button (repeating speed)
    int             btnFlag;     // special for button
    idmDCB_t        *nextDCB;    // next DCB
} idmDCB_t, *pidmDCB_t;
```

MbTV_VB_UNDEFINED button indicates the waiting state for device. Code of any other button in btnID item indicates active input state for device. IDM generates sequence of keys according to rule for each button (frequency of generation) and places them to KeyBuffer. KeyBuffer is a FIFO data structure (FIFO buffer) which stores the MbTV keys for next processing by UIM.

IDM also support several auxiliary data structures for storing button information, mapping and etc.

For processing KeyBuffer UIM calls KeyHandler. KeyHandler handles each key on FIFO basis by invoking the corresponding functions.

3.1.3 IDMBtnDown int
IDMBtnDown(int idID, int btnID)

This function informs IDM about the pressing of button. IDMBtnDown returns a 0 value in case of success and a non zero value is returned in case of failure. IdID specifies the device ID and btnID specifies MbTV button ID. IDM checks the current state of device. If driver was in DOWN state before than no any actions takes. In UP state IDM performs scaning button table and gets the parameters of button (speed, delay and flags).

Also IDM maps button to key and gets key ID for this button. If btnID is DOWN/UP button with DOWN producing stage, IDM generates the MbTV key for this button. If btnID is PRESS/HOLD button, IDM starts to generate the sequence of MbTV key according to speed and delay.

3.1.4 IDMBtnUp int
IDMBtnUp(int idID, int btnID)

This function informs IDM about the releasing of button. IDMBtnUp returns a 0 value in case of success and a non zero value is returned in case of failure. IdID specifies the device ID and btnID specifies MbTV button ID. If btnID is DOWN/UP button with UP producing stage, IDM generates the MbTV key for this button.

3.1.5 IDMMouseEvent

```
int
IDMMouseEvent (int event, int x, int y)
#define MbTV_MOUSEEVENT_NOEVENT       0
#define MbTV_MOUSEEVENT_LEFTDOWN      1
#define MbTV_MOUSEEVENT_LEFTUP        2
#define MbTV_MOUSEEVENT_RIGHTDOWN     3
#define MbTV_MOUSEEVENT_RIGHTUP       4
```

3.1.6 List of MbTV Buttons

```
#define MbTV_VB_UNDEFINED    0
#define MbTV_VB_POWER        1
#define MbTV_VB_PLAY         2
#define MbTV_VB_RECORD       3
#define MbTV_VB_STOP         4
#define NbTV_VB_PAUSE        5
#define MbTV_VB_FFORWARD     6
#define MbTV_VB_REWIND       7
#define MbTV_VB_UP           8
#define MbTV_VB_DOWN         9
#define MbTV_VB_LEFT         10
#define MbTV_VB_RIGHT        11
#define MbTV_VB_PGUP         12
#define MbTV_VB_PGDOWN       13
#define MbTV_VB_SELECT       14
#define MbTV_VB_DISPLAY      15
#define MbTV_VB_MENU         16
#define MbTV_VB_GUIDE        17
#define MbTV_VB_CLEAR        18
#define MbTV_VB_ENTER        19
#define MbTV_VB_TVPCMODE     20
#define MbTV_VB_VOLUMEUP     21
#define MbTV_VB_VOLUMEDOWN   22
```

3.1.7 List of MbTB Keys

```
#define MbTV_VK_UNDEFINED    0
#define MbTV_VK_POWER        1
#define MbTV_VK_PLAY         2
#define MbTV_VK_RECORD       3
#define MbTV_VK_STOP         4
#define MbTV_VK_PAUSE        5
#define MbTV_VK_FFORWARD     6
#define MbTV_VK_REWIND       7
#define MbTV_VK_UP           8
#define MbTV_VK_DOWN         9
#define MbTV_VK_LEFT         10
#define MbTV_VK_RIGHT        11
#define MbTV_VK_PGUP         12
#define MbTV_VK_PGDOWN       13
#define MbTV_VK_SELECT       14
#define MbTV_VK_DISPLAY      15
#define MbTV_VK_MENU         16
#define MbTV_VK_GUIDE        17
#define MbTV_VK_CLEAR        18
#define MbTV_VK_ENTER        19
#define MbTV_VK_TVPCMODE     20
#define MbTV_VK_VOLUMEUP     21
#define MbTV_VK_VOLUMEDOWN   22
```

4. MbTV Timing Service

MbTV Timing Service provides several syncronizing functions for different modules of UI on callback basis. Several structures are used for setting and getting timing information from UI modules.

4.1 timerSet_t

This structure is used for setting timer.

```
typedef struct _timerSet_
{
   int period;                          // launch
interval timer with this period
      time_t timeAt;                    // launching
   time for timer
      void    callBack(void *timerID);  // callback
   function for timer
} timerSet_t, *ptimerSet_t;
Period of timer is set in milliseconds.
4.2 timerInfo_t
typedef struct_timerInfo_
{
   int timeRemain;
   int countTimer;
} timerInfo_t, *ptimerInfo_t;
```

4.3 TSTimerOnce
int
TSTimerOnce(void** timerID, ptimerSet *timerSet)

This function sets the timer for using once. TSTimerOnce returns a 0 value in case of success and a non zero value is returned in case of failure. In case of success TSTimerOnce returns the timer identifier in timerID.

4.4 TSTimerAt
int
TSTimerAt(void** timerID, ptimerSet *timerSet)

This function sets the timer at specific time. TSTimerAt returns a 0 value in case of success and a non zero value in a case of failure. In case of success TSTimerAt returns the timer identifier in timerID. This function uses timeAt field for setting time.

4.5 TSTimerStatus
int
TSTimerStatus(void*timerID, ptimerInfo_t* timerInfo)

TSTimerStatus returns the current status of timer information corresponding to the timerID in timerInfo structure. TSTimerStatus returns a 0 value in case of success and a non zero value in a case of failure.

4.6 TSTimerStart
int
TSTimerStart(void** timerID, ptimerSet *timerSet)

This function starts the interval timer with a specific period. TSTimerStart returns a 0 value in case of success and a non zero value in a case of failure. In case of success TSTimerStart returns the timer identifier in timerID.

4.7 TSTimerStop
int
TSTimerStop(void* timerID)

This function stops the specified interval timer. TSTimerStart returns a 0 value in case of success and a non zero value in a case of failure.

5. MbTV Configuration Service

Configuration Service (CS) supports several different configuration sets:
  system configuration set (for main modules itself);
  UI configuration sets (layout and form for UI objects)
  user profiles configuration sets (special prefered settings for each end users)
CS uses configuration files for storing values (not the Windows registry for portability).
Values bunching in sections.
Each levels of configuration files have several modes:
  main-mode;
  previous-mode;
  safe-mode;

Main mode uses the current setting of configuration values. In previous mode CS returns the previous value. For each changing of parameters the previous value is stored in a predetermined storage location and can be used in case of request Safe mode supposes to return only default value.

5.1 CSSetMode
int
CSSetMode(int mode)

This function sets the current mode for getting values from CS. CSSetMode returns a 0 value in case of success and a non zero value in a case of failure. Mode is defined as:

```
#define CS_MAINMODE       0
#define CS_PREVMODE       1
#define CS_SAFEMODE       2
```

5.2 CSGetValueInt
int
CSGetValueInt(char *set, char *section, char *valuename, int *value)

This function returns the specified configuration integer value from configuration storage.
Set indicates the name of configuration set, section specifies section name of value and valuename indicates the name of value. The configuration value is set in integer value. CSGetValueInt returns a 0 value in case of success and a non zero value in a case of failure.

5.3 CSGetValueString
int
CSGetValueString(char *set, char *section, char *valuename, char *value, int size)

This function returns the specified configuration string value. Set indicates the name of configuration set, section specifies section name of value and valuename indicates the name of value. The configuration value is set in value string with a size maximum length. CSGetValueString returns a 0 value in case of success and a non zero value in a case of failure.

5.4 CSWriteValueInt
int
CSWriteGetValueInt(char *set, char *section, char *valuename, int value)

This function writes the specified configuration integer value to configuration storage. Set indicates the name of configuration set, section specifies the section name of value and valuename indicates the name of value. The value is written as a integer to configuration storage.
CSWriteValueInt returns a 0 value in case of success and a non zero value in a case of failure.

5.5 CSWriteValueString
int
CSWriteValueString(char *set, char *section, char *valuename, char *value)

This function writes the specified configuration string value to configuration storage.
Set indicates the name of configuration set, section specifies section name of value and valuename indicates the name of value. The configuration value is written as a string to configuration storage. CSWriteValueString returns a 0 value in case of success and a non zero value in a case of failure.

5.6 Example of Configuration Files

The following is the preferred embodiment of the MBTV main configuration file:

```
; -----------------------------------------------
; Input Device Manager section [IDM]
; ----
; Installed input device driver
DrvSERIAL=1
```

DrvKBD=1
; ----
; MbTV buttons:
VK_POWER=0
VK_PLAY=0
VK_RECORD=0
VK_STOP=0
VK_PAUSE=0
VK_FFORWARD=0
VK_REWIND=0
VK_UP=2
VK_DOWN=2
VK_LEFT=2
VK_RIGHT=2
VK_PGUP=2
VK_PGDOWN=2
VK_SELECT=0
VK_DISPLAY=0
VK_MENU=0
VK_GUIDE=0
VK_CLEAR=0
VK_ENTER=0
VK_TVPCMODE=0
; ------------------------------------------------------------
; Storage and DVCR Manager
[SDM]
Path=".Storage"
; ------------------------------------------------------------
; Preference Determination Module
[PDM]
; ------------------------------------------------------------
; Electronic Program Guide
[EPG]
Path="P:ITVmbtvGenericdataMbTVDa-
    taepgFREMONT"
; ------------------------------------------------------------
; Serial Input Device Driver
[Drv-SERIAL]
Device=COM2
Type=1
; ------------------------------------------------------------
; PC Keyboard Input Device Driver
[Drv-KBD]
; ------------------------------------------------------------
; USB Input Device Driver
[Drv-USB]
; ------------------------------------------------------------
; Infrared Input Device Driver
[Drv-IrDA]
; ------------------------------------------------------------
[IOManager]
Path=".Data"
File="load.bin"
; ------------------------------------------------------------
; Debugger
[DBG]
LogFile=".DataMbTV.log"

Interface Functions Supported by the UI Modules

I. For Screen Contexts i.e. Full Screen, Channel Grid Top 10 (MbTVPicks) and Storage List.

The id/pointer to the UI module that is currently active is stored in Context Stack. The top element in the stack will be sent the command to perform the user task requested.
  MoveUp
Parameters: None
Called: When the user presses UP key, this function will be called.
Description: In Channel Grid, Top 10 and Storage List, Move to the grid above the current Selection and take necessary actions to repaint screen etc.
  MoveDown
Parameters: None
Called: When the user presses the DOWN key, this function will be called.
Description: In Channel Grid, Top 10 and Storage List, Move to the grid below the current Selection and take necessary actions to repaint screen etc.
  MoveLeft
Parameters: None
Called: When the user presses the LEFT key, this function will be called.
Description: In Channel Grid, Top 10 and Storage List, Move to the grid to the left of current Selection and take necessary actions to repaint screen etc.
  MoveRight
Parameters: None
Called: When the user presses RIGHT key, this function will be called.
Description: In Channel Grid, Top 10 and Storage List, Move to the grid to the right of current Selection and take necessary actions to repaint screen etc.
  PageUp
Parameters: None
Called: When the user presses PAGEUP key, this function will be called.
Description: In Channel Grid, Top 10 and Storage List, Move to the grid one page above current Selection and take necessary actions to repaint screen etc.
  PageDown
Parameters: None
Called: When the user presses PAGEDOWN key, this function will be called.
Description: In Channel Grid, Top 10 and Storage List, Move to the grid one page below current Selection and take necessary actions to repaint screen etc.
  SelectionMenu
Parameters: None
Called: When the user presses ENTER/SELECT key, this function will be called.
Description: Based on the selected channel type, record or lock menu is presented to the user. Context is changed to SelectionMenu.
  ClearMenu
Parameters: None
Called: When the user presses CLEAR key, this function will be called.
Description: Present the virtual channel deletion prompt.
  Context is changed to ClearMenu.
  In cases where there is nothing to do (e.g. because the cursor is already at the end or because it does not apply to the currently active object) when these functions are called, the functions return immediately.
  The Following Menus are also accessible from the above contexts:
  MainConfigMenu
Parameters: None
Called: When the user presses MAIN_MENU key, this function will be called.
Description: Present the main menu of the application.
  Context is changed to MainConfigMenu.
  ThemeMenu
Parameters: None
Called: When the user presses THEME_MENU key, this function will be called.
Description: Present the Theme search Menu.
  Context is changed to ThemeMenu.
  LoginMenu Parameters: None
Called: When the user presses THEME_MENU key, this function will be called.
Description: Present the Toggling Login Menu.
(When a user is already logged in Logout menu is presented)
Context is changed to LoginMenu.
To allow the user to navigate between the Full Screen, Channel Grid, Top 10 (MbTVPicks) and Storage List, we need enter and exit functions for each of the screens.
SwitchToChannelGrid
SwitchToFullScreen
EnterTop10
ExitTop10
EnterStorageList
ExitStorageList
II. For Menu Contexts
Once in one of the above menus, the following keys are used to select menu items, set menu item values, allow name editing functionality, present sub menus, clear menus etc.
KeyRight
Parameters: None
Called: When the user presses RIGHT key, in one of the above menus, this function will be called.
Description: Useful for menus with normal values and menus with name editing.
In case of normal values, the item values are changed accordingly.
In case of menus with name editing, the position of the cursor is moved to the next editing position or on to the menu item itself.
KeyLeft
Parameters: None
Called: When the user presses LEFT key, in one of the above menus, this function will be called.
Description: Useful for menus with normal values and menus with name editing.
In case of normal values, the item values are changed accordingly.
In case of menus with name editing, the position of the cursor is moved to the next editing position or on to the menu item itself.
NOTE: In case of menus with name editing, when cursor position is on menu item itself (i.e. not in one of the edit locations), keyup and keydown behave as though the menus are normal.
KeyUp
Parameters: None
Called: When the user presses UP key, in one of the above menus, this function will be called.
Description: Useful for all menu items.
In case of normal values, selects the item above the current item.
In case of menus with name editing, cycles to the next value for the position.
KeyDown
Parameters: None
Called: When the user presses DOWN key, in one of the above menus, this function will be called.
Description: Useful for all menu items.
In case of normal values, selects the item below the current item.
In case of menus with name editing, cycles to the previous value for the position.
KeyEnter
Parameters: None
Called: When the user presses Enter/Select key, in one of the above menus, this function will be called.
Description: Useful for all menu items.

Performs action associated with current menu, such as presentation of sub menu or taking user's input and taking appropriate action requested by the user.
Note: In many cases, the menus are cleared when a user presses enter after taking appropriate action. If there are multiple items in the menu all actions are to be taken into account. Also the Menu is popped from the context stack.
KeyEscape
Parameters: None
Called: When the user presses clear/Escape key, in one of the above menus, this function will be called.
Description: Useful for all menu items.
Menu is cleared without taking any action, even if the values were changed etc.
Menu is also popped from the context stack.
Interface functions used by the GUI and CAPP
Recording Conflict Resolution—GUI
If SDMGetNumRecConflicts call returns a false, then there are no conflicts.
If there are conflicts indicated by the above call, Call SDMGetRecConflicts for each conflict and format for presentation to the User. These conflicting requests are kept in temporary memory until the record request is fully handled.
If the user chooses to override all conflicts, then SDMSetRecRequest is called for each conflict with the override flag, until all conflicts are resolved.
Recording Quality—GUI
Structures Used: tdBitRate t
Interface Functions: SDM*TDRBR*
Rewind and Fast Forward speed—CAPP
All rewind and fast forward requests (when the same operation is in progress) are propagated down to library functions.
NOTE: Since we currently do not have known speeds, 0 will be passed for speed.
Deactivate Learning—GUI
Structures Used: dFilter t
Interface Functions: MbTV*Dfilter*
Premium Channels—GUI
Call the PDM callback function with the following two events:
Structures Used: cBackInfo t
MBTV ADD CHANNEL and MBTV DELETE CHANNEL with the appropriate bits set for premium channels.
Record Date End—GUI
User Interface will format the date with midnight time (converted to time t), so that it can be passed in repeatTill parameter of recRequest t structure.
Structures Used: recRequest t
PDM Background thread
EMCopy (startTime, EndTime, firstCopy) to copy the External EPG to internal EPG
Start time is maintained by the PDM background thread. VMProcessViewingRec(startTime, endTime) to ProcessVRM PIMComputeProfiles ( ) to ProcessPIM CDMUpdateDatabase(endtime)
IOCommit (Conditional call, Only if there are changes indicated i.e. any of the bits are set.)
In addition to the above at predefined periodical interval Full Backup needs to be made of all the files. All the bits in the save state are set and IOCommit is called.
PIMComputeProfileMix ( ) needs to be called when the interval specified in the config file passes.

EPG Download-PDM Background Thread

```
OnTimerEvent for the EPGDownload ( )
{
   CreateProcess Call with the utility path.
   Reset Time
   Wait for next timer event...
}
```

Advertising Manager

To facilitate a discussion and understanding of the functionality provided by the Ad Manager, it is helpful to understand the current advertisement process and identify the areas in which improvements can be made.

The Current Advertisement Model

The effectiveness of an advertisement can be attributed to the effectiveness of the following:

Identifying the Target Segment

This is the process of identifying the segments of population which are more likely to consume the product. This process is typically done by conducting surveys to understand the product consumption of people with various characteristics. The output of this process is an index for each identified category of people. This index quantifies how much the product consumption of this group different from the general population.

For example, consumption of Coke may be 10 Cokes consumed per day by 1000 people. Consumption of Coke by people between 15 and 25 years of age (category 1) may be 15 Cokes per day by 1000 people. Consumption of Coke by people between 15 and 25 years of age who are earning between 20,000 and 40,000 dollars per year (category 2) may be 20 Cokes per day by 1000 people. In this example the consumption index of category 1 is 150 and consumption index of category 2 is 200. If the same marketing and message strategy is used for all segments and if the effectiveness of the messaging strategy is the same for all category of people, and if the consumption of Coke as opposed to Pepsi can be effected by advertising strategies, Coke can get better use of advertising money by targeting group 2 and group 1 than targeting the general population.

Identifying the target segment involves identifying the people with whom the advertisements will have the most effect. The target segment is represented by a set of parameters which are common to everyone in this segment. Output of this process may be as follows:

Segment id-1
Parameter 1—age—between 15-25
Parameter 2—income—between $20,000 and $40,000
Coverage—5% of total population (this can be the total number of people in this segment)
Consumption index-200
Effectiveness Index-300 (describes the effectiveness of the advertisement strategy on this group)
Segment id-2
Parameter 1—gender—male
Parameter 2—occupation—construction worker
Parameter 3—age between 25-35

Targeting Advertisement

This is the process of finding the most efficient mechanisms to deliver advertisements to the target segment. The effectiveness of a target delivery scheme can be denoted as the percentage of impressions of the advertisement that are shown to the type of people mentioned in the targeting criteria, or may be measured as an index which indicates how much more effective the targeting is in reaching the target segment compared to other mechanisms that do not employ targeting. For example, in the above Coke model, Coke may specify the following as the targeting criteria:

Parameter 1—gender—male
Parameter 2—occupation—construction worker
Parameter 3—age between 25-35.

The Effectiveness of placing a billboard advertisement at a construction site may be denoted as:

| Percentage of targeting - 56% | indicates the percentage of people seeing the advertisement belonging to the target segment. |
| --- | --- |
| Targeting Index - 700 | if the percentage of people in the general population is Y (8%) and if the targeting percentage of the ad is X (56) then the Targeting Index is X/Y *100 (700). |

Messaging Strategies

Messaging strategies are different techniques used in advertising to ensure that viewers of the ad retain the message in memory and also to encourage viewers to consume more of the advertised product. Certain aspects of messaging strategies may benefit from support by the delivery mechanism, such as may be provided by the following parameters:

Rate of display over a period of time (e.g. number of times an advertisement is shown in a day)
Period of time between two consecutive displays
Time of display
Other display related parameters (display only in the middle of the program, or at the beginning of the program, etc.)
Ability to buy smaller quantity of impressions
Ability to specify start and end date for the Ad Campaign
Ability to subject a target person with a defined sequence of advertisements for a product.

Any new mechanism of ad delivery should have the flexibility of the current delivery medium and also additional flexibility that can improve messaging strategies.

Potentials for New Models

Increasing the effectiveness of the above three parameters can increase the effectiveness of an advertisement campaign within a given budget. Identifying the target segment is currently done irrespective of the medium for advertisement. When the target segment is known, the advertisement agencies or the product-marketing group of the company consider different delivery mechanisms. Each delivery mechanism is prioritized based on coverage, effectiveness in targeting, effectiveness in messaging strategy enabled by the medium, and the cost of implementing the campaign. The medium with higher ranking typically is allocated a larger share of the advertisement budget.

If a new advertisement delivery mechanism can increase the effectiveness of advertisements, the new mechanism can command a higher CPM (cost per thousands of impression). If the targeting index can be increased to five times the current targeting index, advertisers potentially will pay a price that is between up to five times the original CPM. This is because the advertisers have to buy only a fifth of the impressions to reach the same number of people in their target segment. The CPM would be less than 5 times the earlier CPM because with the earlier mechanism the advertiser buys five times the impressions, and because all the impressions made outside the target segment are not really a waste due to inaccuracies in identification of target segments or the need for branding in general beyond target segments.

Even if the new CPM can be increased to three times the earlier CPM, the need for buying impressions may go down by a third because of the effectiveness. This will reduce the number of impressions bought by various advertisers. The number of impression available may still remain the same if the industry is not planning to cut down the number of advertisements shown to the consumer every hour.

This may cause a surplus of impressions available and a reduction of demand, accompanied by a consequent reduction in CPM. A reduction in CPM to 2-2.5 times the current rate may make the medium a very attractive delivery mechanism for advertisers. This will cause some of the revenues generated by other media to be diverted to the broadcast/cable/satellite media. This will fill up the remaining available impressions and increase the overall revenues for the Broadcast/Cable/Satellite industry. This also provides a mechanism for the industry to deal with advertisement skipping tendencies shown by viewers of advanced PVRs.

Preferred embodiment of the Ad Manager
  Model
  In a conventional broadcast media, an advertisement is attached to a TV program. People watching the program will see the advertisement if they stay on the same channel when the advertisement is shown. Targeting is done by analyzing the demographics of different programs and choosing the programs that provides the best targeting percentage and coverage. In a system employing the Ad Manager of the invention, advertisements are de-coupled from programs. Targeting parameters, coverage and messaging parameters are specified for advertisements. Advertisements reach consumer set-top boxes through various delivery mechanisms. These may include sending advertisements on different channels or digital multiplex streams, using different delivery mediums, using different time periods or using the same slots used for conventional advertisements. Advertisements are mixed locally on set-top boxes and are displayed based on parameters attached to advertisements. Advertisements may be displayed during the viewing of programs, during the viewing of the guide, during the viewing of stored programs, during the viewing of other interactive services or during the viewing of the contents of a personal channel. Displaying of all advertisements are controlled by the client component of the Ad Manager (see FIG. 1). Samples are collected on a set of selected set-top boxes. The samples may contain the following information:
    a) Demographic parameters of viewers of the set-top box
    b) TV watching behavior of viewers of the set-top box
    c) Advertisements displayed by Ad Manager and viewer responses during the display of advertisements.
  The samples are used for creating behavioral profiles of people with different characteristics. These behavioral profiles are defined in terms of TV watching behaviors that can be used to distinguish people of the target characteristics. This information about different characteristics and how to identify them using their TV watching patterns are coded into rules and broadcast from the head-end to all set-top boxes. Set-top boxes use this information to compute values of different parameters for different viewers in a household. The client component of the Ad Manager may use these computed parameters to decide which advertisements to store, when to present these stored advertisements, and when to remove an advertisement from storage. Viewer sampling also may be used to estimate the targeting effectiveness of the system.

Figure 51:
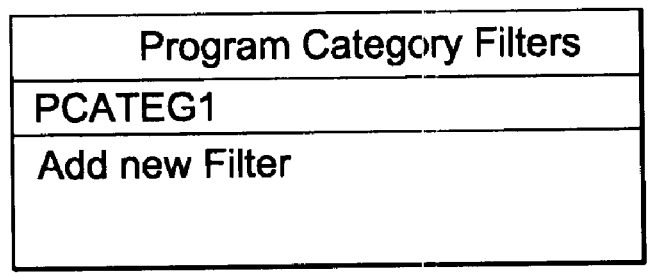

Functionality and Features
  In a preferred embodiment, the Ad Manager would support or offer, at a minimum, the following functions:
    Ability to specify targeting parameters to advertisements
    Ability to measure the targeting effectiveness of advertisement
    Ability to report impressions for an advertisement and also statistics related to people who watched the advertisement
    Ability to specify more defining targeting parameters (late sleeper, pizza eater, early adapter, single mom etc.)
    Ability to specify conjunctions or disjunctions of different targeting parameters (male and 15-25 year of age, etc)
    Ability to specify messaging parameters (between 10 and 11 p.m., 3 times in a day with 30 minutes interval, only on the middle of a program, when not channel surfing, when watching action programs, etc.)
    Make optimal use of hard disk storage space
    Manage rotation strategies with a set of stored advertisements
    Handle multiplexed advertisements (multiple streams with multiple ads of only one is to be shown)
    Allow blocking of specific advertisements (users can express disinterest to a particular advertisement and the spot will be used up for some other ad)
    Optionally decide when to show an advertisement depending on the business relationship with the network/operator (more advertisements for a particular channel, or more advertisement for a particular type of channel etc., or for some channel the advertisement should be inserted at predefined locations in the middle of the program, for some programs more advertisements should be inserted in the middle of the program rather than at the beginning, for some program the ad rate should increase more towards the end, etc.)
    Ability to mix advertisements on cue or automatically
    Ability to handle multiple profiles in a household with multiple characteristics
    Ability to force a viewer to watch an advertisement by increasing the weight for the advertisement
    Ability to subject a viewer with a defined series of advertisements for a particular product.
  Architecture
  The preferred embodiment of the Ad Manager, as depicted in FIG. 51, comprises four major components:
    a) Ad Server
    b) Targeting Server
    c) Ad mixer
    d) Measuring agent
  The Ad Server is the component of the Ad Manager that allows appending targeting parameters to advertisements. The Ad Server provides a GUI for specifying the advertisement for which the parameters are added, the different fields that describe the advertisement, the targeting parameters for the advertisement, the number of impressions for the advertisement, and the messaging parameters for the advertisements. The Ad Server communicates with the Targeting Server to get the targeting parameters and messaging parameters supported by the Ad Manager. The Ad Server generates Meta-data about advertisements that could be processed by the Ad Mixer, and generates data modules and schedules the broadcast times for these data modules. The data modules generated may contain the Meta-data for advertisements in a proprietary format that could be easily processed by PVRs.

In a preferred embodiment, the Ad Server would support or offer, at a minimum, the following functions:
- Provide an easy to use interface to specify ad description and parameters with pull down menus and auto-completes
- Interface with the Targeting Server to obtain targeting parameters and messaging parameters
- Interface with the Targeting Server to obtain estimated coverage and estimated number of viewers for a given targeting parameter
- Interface with the targeting server to obtain additional characteristics, if any, for the segment defined by the targeting parameters
- Interface with Targeting Server to obtain the targeting efficiency for the targeting parameters specified
- Create meta-data for advertisements based on the targeting parameters
- Create data modules in a transmission format from which meta-data could be easily downloaded without processing information about each ad
- Create broadcast schedules for the data modules
- Maintain information about advertisements for future transmission
- Maintain information about past advertisements for reporting impression statistics.

The Ad Mixer is the component of the Ad Manager that interfaces with the Measuring Agent, and stores and presents advertisements on a PVR. The Ad Mixer downloads rules for computing viewer characteristics, monitors TV viewing behaviors of different persons in the household, and computes target characteristics. The Ad Mixer also downloads Meta-data about advertisements and chooses the most relevant advertisements to store locally, and presents advertisements to viewers according to the targeting parameters specified. The Ad Mixer schedules presentation of advertisements according to the messaging parameters specified, and manages the mixing of advertisements with AV streams using an API to access platform functionality, including banner advertisements. The Ad Mixer further removes advertisements from storage when the targeting and messaging requirements for the advertisements are completed, when advertisements age beyond predefined thresholds, or when a higher priority advertisement is available to download.

In a preferred embodiment, the Ad Mixer would support or offer, at a minimum, the following functions:
- Manage the presentation of advertisements in a PVR
- Present advertisements meeting targeting and messaging parameters
- Compute targeting characteristics for different viewers in a household
- Manage the storage and deletion of advertisements
- Download and process meta-data for advertisements
- Interface with the Measuring Agent to report parameters about ad presentation, computed parameters, and viewing parameters
- Create a schedule for ad presentation for different channels, programs and types of content
- Implement fair share scheduling techniques to make sure different advertisements with the same targeting parameters are downloaded by different PVRs with the same characteristics
- Implement fair-share scheduling techniques to make sure impression-quantity requirements for advertisements are satisfied
- Manage presentation of AV ads using a platform API
- Handle presentation of advertisements on cue signals from head end
- Handle automatically generated cue signals
- Manage presentation of Graphical (banner) advertisement.
- Manage block (or kill) signals from viewers.

The Measuring Agent is the component of the Ad Manager that communicates with the Targeting Server to report viewer behavior. The Measuring Agent will typically be activated only in a limited set of PVRs, and will preferably interface with the Ad Mixer through a proprietary API, as well as interface with the EPG data library, the SDM, and the PDM. The Measuring Agent will further interface with the CApp to present viewers with a set of questions to provide feedback to the system operator. The Measuring Agent collects the following information about the PVR:
a) Viewer Characteristics of the viewers
b) Viewing behavior
c) Advertisement presentation information In a preferred embodiment, the Measuring Agent would support or offer, at a minimum, the following functions:
- Interface with the Ad Mixer to collect information about ad presentation
- Interface with the PDM and the SDM to collect information about viewing behavior of viewers
- Interface with the Targeting Server to get targeting parameters and possible values
- Interface with the CApp to query viewers to collect viewer characteristics
- Interfaces with the Targeting Server to report parameters
- Maintain and report queries answered by viewers for accounting purposes.

The Targeting Server is typically operated on the premises of the system operator. The technology employed would preferably be in a form that requires limited operator input and control. The Targeting Server would typically analyze viewer behavior from the samples collected, and take targeting parameters as inputs to generate rules to identify the target characteristics on set-top boxes and PVRs. The Targeting Server would also estimate the coverage for combination of targeting parameters and also estimate the targeting efficiency. The Targeting Server would typically be able to generate messaging parameters for implementing messaging strategies, as well as report parameters from a previous monitoring interval for various advertisements that were presented during that period.

In a preferred embodiment, the Targeting Server would support or offer, at a minimum, the following functions:
- Interface with the Ad Server to provide targeting parameters available
- Interface with the Ad Server to provide estimated coverage and targeting efficiency for the requested set of targeting parameters
- Interface with a Head-End transmission system to broadcast targeting rules
- Interface with the Ad Server to provide messaging rules for different messaging strategies
- Interface with the Measuring Agent to provide targeting parameters for the Measuring Agent to form queries to be presented to viewers
- Interface with the Measuring Agent to collect reporting parameters
- Generate rules to identify target characteristics
- Generate rules to implement messaging strategies
- Provide a GUI to add new target characteristics
- Provide a GUI to edit rules
- Interface with the Ad Manager to report actual impressions for advertisements for the previous monitoring period.

Implementation Technology

The technological considerations that must be taken into account in developing an Ad Manager that functions effectively include:

Ad Server

Defining an interface with the Targeting Server that can be used to transfer required information with minimal interactivity Defining targeting and messaging parameters that will be useful in increasing the effectiveness of targeted advertisement Defining a broadcast data format to transmit meta-data in a form usable by set-top boxes with limited memory, processing and download capability Interfacing with Head-End software to transmit meta-data modules at scheduled periods Handling multiple mechanisms for data transmission and interfacing with Head-Ends with those transmission mechanisms Defining a mechanism to identify advertisements and schedule the transmission of advertisement Defining a mechanism to identify advertisements that are transmitted according to a different schedule that is not managed by the Ad Server Automatically or semi-automatically specifying targeting and messaging parameters to simplify data entry.

Ad Mixer

Algorithms for computing values of target characteristics using rules and viewer behaviors Mechanism for downloading meta-data for relevant advertisements Algorithms to decide what advertisements to download, erase, or keep Algorithms to present advertisements in a manner that satisfies targeting requirements, messaging requirements, and other presentation criteria for each of different advertisement presentation schemes Mechanism to insert AV Advertisements seamlessly Mechanism to insert AV Advertisements on cues from a Head-End Mechanism to interface with different hardware platforms to perform ad mixing, ad storage, and ad presentation Defining an interface between the Ad Mixer and the Measuring Agent.

Measuring Agent

Mechanism to generate queries to be presented to the CApp

Defining an API to interface with the CApp

Defining APIs to interface with other modules.

Targeting Server

Data-mining algorithms for generating rules to identify target parameters

Algorithms to compute the efficiencies for different targeting parameters and combination of parameters Algorithms to generate messaging-rules corresponding to messaging parameters Algorithms to estimate coverage for different targeting parameters and combination of parameters.

Porting Processes

Certain aspects of the MbTV software embodying the preferred embodiment of the present invention depend on the customer's platform and architecture. To optimize the customer's use of the software on a specific platform, certain parameters are provided for the customer to tune the software. These parameters specified in the custom.h file, and are described in the table below. The customer must modify these custom parameters before integrating MbTV software into customer modules.

| MACRO NAME | MACRO DESCRIPTION |
| --- | --- |
| MBTV_SDM_PROCESS_PRIORITY | This specifies the PRIORITY at which the SDM Background Task executes. Generates Recording Events for Automatic and Explicit Record Requests. This value is defined by the customer based on the Operating System and the system architecture. |
| MBTV_PDM_PROCESS_PRIORITY | This specifies the PRIORITY at which the PDM Background Task executes. Does housekeeping tasks for the PDM Module. This value is defined by the customer based on the Operating System & the system architecture |
| MBTV_DATA_FILE_NAME_1 | This specifies the Full Pathname for MbTV Data File. This value is defined by the customer based on the system architecture of the target platform. MbTV will use this file to store MbTV specific data. The customer can use these values to control where MbTV files are stored. |
| MBTV_DATA_FILE_NAME_2 | This specifies the Full Pathname for MbTV Data File. This value is defined by the customer based on the system architecture of the target platform. MbTV will use this file to store MbTV specific data. The customer can use these values to control where MbTV files are stored. |
| MBTV_DATA_FILE_NAME_3 | This specifies the Full Pathname for MbTV Data File. This value is defined by the customer based on the system architecture of the target platform. MbTV will use this file to store MbTV specific data. The customer can use these values to control where MbTV files are stored. |
| MBTV_DATA_FILE_NAME_4 | This specifies the Full Pathname for MbTV Data File. This value is defined by the customer based on the system architecture of the target platform. MbTV will use this file to store MbTV specific data. The customer can use these values to control where MbTV files are stored. |
| MBTV_DATA_FILE_NAME_5 | This specifies the Full Pathname for MbTV Data File is value is defined by the customer based on the system architecture of the target platform. MbTV will use this file to store MbTV specific data. The customer can use these values to control where MbTV files are stored. |

| MACRO NAME | MACRO DESCRIPTION |
|---|---|
| MBTV_DATA_FILE_NAME_6 | This specifies the Full Pathname for MbTV Data File. This value is defined by the customer based on the system architecture of the target platform. MbTV will use this file to store MbTV specific data. The customer can use these values to control where MbTV files are stored. |
| MBTV_DATA_FILE_NAME_7 | This specifies the Full Pathname for MbTV Data File. This value is defined by the customer based on the system architecture of the target platform. MbTV will use this file to store MbTV specific data. The customer can use these values to control where MbTV files are stored. |
| MBTV_DATA_FILE_NAME_8 | This specifies the Full Pathname for MbTV Data File. This value is defined by the customer based on the system architecture of the target platform. MbTV will use this file to store MbTV specific data. The customer can use these values to control where MbTV files are stored. |
| MBTV_DATA_FILE_NAME_9 | This specifies the Full Pathname for MbTV Data File. This value is defined by the customer based on the system architecture of the target platform. MbTV will use this file to store MbTV specific data. The customer can use these values to control where MbTV files are stored. |
| MBTV_DATA_FILE_NAME_10 | This specifies the Full Pathname for MbTV Data File. This value is defined by the customer based on the system architecture of the target platform. MbTV will use this file to store MbTV specific data. The customer can use these values to control where MbTV files are stored. |
| MBTV_MAX_NUM_PROFILE | Maximum number of Profiles supported by MbTV up to a maximum of 6. This value is used by the pgmRating field in the pgmInfo_t structure. |
| MBTV_DEFAULT_NUM_PROFILES | Default number of profiles created by MbTV. |
| MBTV_MAX_PROFILE_NLEN | Maximum length for MbTV Profile Names. |
| MBTV_MAX_NUM_CHANNELS | Maximum number of channels created by MbTV |
| MBTV_MAX_NUM_SFILTERS | Maximum number of filters that can be created. |
| MBTV_MAX_TITLE_LEN | Maximum length for Program Title Names. This is dependent on the EPG Data feed and the External EPG Implementation. This value is used for the pgmTitle field in recRequest and pgmInfo_t structures. |
| MBTV_MAX_SFILTER_PLEN | Maximum length for Filter String Parameter used by MbTV. This value is used by filterString field in the filter_t structure. |
| MBTV_MAX_NUM_TDBITRATE | Maximum number of type defined bit rates |
| MBTV_MAX_NUM_SFILTER_PARAMS | Maximum number of Parameters allowed for Filter String. This value is used by filterString field in the filter_t structure. |
| MBTV_MAX_FTYPE_NLEN | Maximum length for Filter Type Names. This value is used by filterTypeName field in the filterType_t structure. |
| MBTV_MAX_TDEF_PLEN | Maximum length for strings associated with Type Default Bit Rate structure. This value is used by tdValue field in tdBitRate_t structure |
| MBTV_MAX_NUM_TDEF_PARAMS | Maximum number of Parameters allowed for Type Default Bit Rate structure. This value is used by tdValue field in tdBitRate_t structure |
| MBTV_MAX_MESG_SIZE | Maximum size of Messages in Message Queue needed by MbTV. This value will be used by MbTV modules and OS I/F Module. |
| MBTV_MAX_CHNL_DATA_SIZE | Maximum size of the Channel Data provided by the External EPG Module. This would depend on the EPG Data feed and implementation used. This value will be used by SDM and External EPG Module. This value will be decided by the External EPG Module. |
| MBTV_CHLINEUP_NOTIFY | |
| MBTV_MAX_CHNL_PARAM_SIZE | Maximum size of the individual Channel Parameter provided by the External EPG Module. This depends on the EPG Data feed & implementation. This value will be used by SDM and External EPG Module. This value will be decided by the External EPG Module. |
| MBTV_MAX_PGM_DATA_SIZE | Maximum size of the Program Data provided by the External EPG implementation. This would depend on the EPG Data feed & implementation. This value will be used by SDM and External EPG Module. This value will be decided by the External EPG Module. |
| MBTV_MAX_PGM_PARAM_SIZE | Maximum size of the individual Program Parameter provided by the External EPG Module. This depends on the EPG Data feed & implementation. |

-continued

| MACRO NAME | MACRO DESCRIPTION |
|---|---|
| | This value will be used by SDM and External EPG Module. This value will be decided by the External EPG Module. |
| MBTV_EPG_TITLE_PNUM | Parameter Number for Program Title Info. This information is dependent on the EPG Data feed and implementation. MbTV will use this value to request program Title from the EPG module. |
| MBTV_MAX_NUM_EPG_PGM_PARAM | Maximum number of Program Parameters provided by the External EPG module. This depends on EPG data feed and implementation. |
| MBTV_MAX_NUM_EPG_CHNL_PARAM | Maximum number of Channel Parameters provided by the External EPG module. This would depend on the EPG data feed and implementation. |

Viewer Interaction

The following section exemplifies the manner in which a viewer may interact with software and hardware embodying the present invention.

Screen Details

1. An item is always selected in the grid. Preview Screen is shown for the selected program.
2. The times and/or channel names are changed to reflect the grid selection. Date should also be changed when the selection is moved to another date.
3. When navigating within the grid, channel displayed in the preview window is changed only when the user presses enter/select. The details of the program and the Rating Image of the program are changed to reflect the selection. If the program which occurs in the future is selected and user presses enter, do not change the channel. (Alternative is to present a black preview window.)
4. Program Names are to be separated using a thick line as above.
5. Handle partial programs correctly. Display partial title. But when the program is selected, show the description, rating and preview window.

Keys Allowed

1. Navigation within the grid can be done using left, up, down and right arrow keys.
2. Hot Keys to Switch to Full Screen, MbTV Picks, Storage List are permitted.
3. Login/Logout Menu, Theme Menu, Main Configuration Menu Hot keys should present appropriate menus.
4. Enter selects the program to be displayed in the preview window.
5. Selection Menu, When Live Program is selected, the record menu is to be shown, and when virtual channel is selected, lock menu is shown. (Lock menu is superset of record menu with one additional item for Locking the current program)
6. To release a lock, the current profile must have appropriate privileges, MbTV Picks (Also called Favorites and Top 10 List)

Screen Details

1. When Picks key is pressed the above screen is presented to the user. The order of items in the list should be reverse of the above (i.e. live programs listed first then order programs by time.)
2. The default selection is the top item in the list.
3. If a future (not live) program is selected, then for the purpose of the preview selection. (Alternative is to present a black preview window.)
4. Rating Image of the program and description of the program are changed when selection changes.
5. To exit out of this screen, Picks key needs to be pressed.

Keys Allowed

1. Navigation within the grid can be done using left, up, down and right arrow keys.
2. Hot Key to Switch to Grid is permitted.
3. Login/Logout Menu, Theme Menu, Main Configuration Menu Hot keys should present appropriate menus.
4. Enter selects the program to be displayed in the preview window.
5. On Selection Menu Key, Record menu is presented.
6. When navigating to the right, do not allow the user to move beyond 2 days. (The number of days for which we have EPG data loaded.)

Screen Details

1. If a virtual channel is present and is selected, then display the video corresponding to it.
2. Rating Image of the program and description of the program are changed when selection changes.
3. For the purpose of the preview window, do not change channel and leave it at the previous selection. (Alternative is to present a black preview window.)
4. To exit out of this screen, Picks key needs to be pressed.

Keys Allowed

1. Navigation within the grid can be done using left, up, down and right arrow keys.
2. Hot Key to Switch to Grid is permitted.
3. Login/Logout Menu, Theme Menu, Main Configuration Menu Hot keys should present appropriate menus.
4. Enter Key selects the program to be displayed in the preview window.
5. On Selection Menu Key, Record menu is presented.
6. When navigating to the right, do not allow the user to move beyond 2 days. (The number of days for which we have EPG data loaded.)

Handling Power Off/On

When Power is turned off, save the channel & screen mode which was selected. Display a black screen with all components hidden.

| Screen Mode | Action To be performed | Saved Screen Mode |
|---|---|---|
| Menus | Clear all menus | Grid |
| Storage List | | Gird |
| Favorites | | Grid |
| Full Screen | | Full Screen |
| Grid | | Grid |

When power is turned on, select saved channel in one of grid or Full screen mode.

When displaying Grid display programs at current time.

Menu Development
   Descriptor File Format
   Questions:
   Primarily there are three kinds of menu Items
    1. Menu Items without any values. These lead to Sub Menus.

2. Menu Items with normal text values. Once an item is selected, an action is taken based on the selection.

3. Menu Items with editable text values. These are used for editing passwords, specifying profile names etc.

4. Menu Items with Sliders. These items provide visual representation of an item value.

5. Menu Items with Bitmap Images. These items provide visual representation of an item value.

Two bitmaps are used for presentation of a menu.

1. Top Header section image. Stretched to fit an area as required.

2. Menu Bottom Bitmap also stretched fit an area as required.

Menu Object Manager Development

Role: Read the Menu Descriptor file for a given menu and paint the screen.

Also take necessary actions based on the user selection.

Individual Menus Implementation

Task: Provide the Menu descriptor file for this menu.

| Existing Menus | | | |
|---|---|---|---|
| SelectionMenuObject | | | |
| Record Menu or Lock Menu based on selected channel type | | | |
| Record Menu | | | |
| Internal Name: Record Menu | | | |
| Suggested Title: MbTV Channel Menu | | | |
| Menu Item | Item Values | Type of Item | Action On Enter |
| Record | "None", "Once", "Daily", "Weekly", "When Available" | Scrolling List of Constant Values. | Save all menu item modifications. If a new recording command is issued, If SDMGetNumRecConflicts call returns a false, then there are no conflicts If there are conflicts indicated by the above call, Call SDMGetRecConflicts for each conflict and format for presentation to the User. These conflicting requests are kept in temporary memory until the record request is fully handled. If the user chooses to override all conflicts, then SDMSetRecRequest is called for each conflict with the override flag, until all conflicts are resolved. |
| MbTV Rating | "0", "10", "20", "30", "40", "50", "60", "70", "80", "90", represented using 5 rating bitmaps. | Scrolling list of bitmaps | If the rating has been modified save the rating. |

| Lock Menu | | | |
|---|---|---|---|
| Internal Name: Lock Menu | | | |
| Suggested Title: MbTV Channel Menu | | | |
| Menu Item | Item Values | Type of Item | Action On Enter |
| Lock | "No", "Yes" | Scrolling List of Constant Values. | Save the property of the program |
| Record | "None", "Once", "Daily", "Weekly", "When Available" | Scrolling List of Constant Values. | Save all menu item modifications. If a new recording command is issued, If SDMGetNumRecConflicts call returns a false, then there are no conflicts If there are conflicts indicated by the above call, Call SDMGetRecConflicts for each conflict and format for presentation to the User. These conflicting requests are kept in temporary memory until the record request is fully handled. If the user chooses to override all conflicts, then SDMSetRecRequest is called for each conflict with the override flag, until all conflicts are resolved. |
| MbTV Rating | "0", "10", "20", "30", "40", "50", "60", "70", "80", "90", represented using 5 rating bitmaps. | Scrolling list of bitmaps | If the rating has been modified save the rating. |

| ClearMenuObject (Virtual Channel Deletion Prompt) | | | |
|---|---|---|---|
| Internal Name: Lock Menu | | | |
| Suggested Title: MbTV Deletion Alert | | | |
| Menu Item | Item Values | Type of Item | Action On Enter |
| Delete | "No", "Yes" | Scrolling List of Constant Values. | If Yes is selected, delete selected virtual channel Program* p = programs[selectedChannel][selectedProgram]; Delete((VOID*)p->chID, CHANNEL_TYPE_VIRTUAL, gui->getClockTime( )); |

| ThemeMenuObject (Theme Search with a list of parameters) | | | |
|---|---|---|---|
| Internal Name: Theme Menu | | | |
| Suggested Title: MbTV Theme Menu | | | |
| Menu Item | Item Values | Type of Item | Action On Enter |
| "Channel" Program Type | None "Any" Remaining items must be read using the | List of Values, Values are loaded at | Fill the srchFilter typedef struct _srchFilter_ { |

189 -continued

| | | | |
|---|---|---|---|
| | dictionary.<br>char<br>**sStrings;<br>sStrings =<br>Capp_GetDictFil-<br>terValues<br>("Pro-<br>gramTypes.txt",<br>&nVarCount); | run time. | ulong filterTypeID;<br>char<br>searchString<br>[MAX_NUM_PARAMS]<br>[MAX_PARAM_LEN];<br>} srchFilter_t,<br>*psrchFilter_t;<br>filterTypeIDs are<br>to be define<br>Int<br>MbTVGetCriteriaBas-<br>edBestPrograms(int,<br>pgmInfo_t<br>*ppgmInfo[ ],<br>time_t, time_t,<br>int, srchFilter_t<br>*psrchFilter); |
| Program<br>Category | "Any"<br>Remaining<br>items must be<br>read using the<br>dictionary.<br>Char<br>**sStrings;<br>sStrings =<br>Capp_GetDictFil-<br>terValues<br>("ProgramCate-<br>gory.txt",<br>&nVarCount); | List of<br>Values,<br>Values are<br>loaded at<br>run time. | |
| Country | "Any"<br>Remaining<br>items must be<br>read using the<br>dictionary.<br>char<br>**sStrings;<br>sStrings =<br>Capp_GetDictFil-<br>terValues<br>("Countries.txt",<br>&nVarCount); | List of<br>Values,<br>Values are<br>loaded at<br>run time. | |
| MPAA<br>Rating | "Any"<br>Remaining<br>items must be<br>read using the<br>dictionary.<br>char<br>**sStrings;<br>sStrings =<br>Capp_GetDictFil-<br>terValues<br>("MPAARat-<br>ings.txt",<br>&nVarCount); | List of<br>Values,<br>Values are<br>loaded at<br>run time. | |

LoginMenuObject (Login Menu with a list of users)
Internal Name: Login Menu
Suggested Title: MbTV Login Menu
Before presenting this menu, query the list of profiles from PIM
using PIM*Profile functions. Please see PIM interface document
for details.
After adding these profile names to the menu, add another item
called Exit to exit login menu.

| Menu Item | Item Values | Type of Item | Action On Enter |
|---|---|---|---|
| Profile<br>Name(s) | None | Conditional<br>(If password<br>Protected)<br>Submenu | Login the selected<br>user |
| Exit | None | None | Clear Login Menu |

LogoutMenuObject
When a user is logged in and login menu key is pressed, the
following menu is presented.
Internal Name: Logout Menu
Suggested Title: MbTV Logout Menu
Before presenting this menu, query the list of profiles from PIM
using PIM*Profile functions. Please see PIM interface document
for details.

190 -continued

After adding these profile names to the menu, add another item
called Exit to exit login menu.

| Menu Item | Item Values | Type of Item | Action On Enter |
|---|---|---|---|
| Logout | None | Conditional<br>(If password<br>Protected)<br>Submenu | Logout current<br>user. |
| Profile<br>Name(s) | None | Sub menu | Present profile<br>configuration menu. |

LoginPasswordMenuObject (Login Password if password is
required.)
Internal Name: Login Password Menu
Suggested Title: MbTV Password Menu
If a login or logout is protected by a password, the following
Password Menu is shown. If the password is correct Password
Screen is hidden and User is logged in/out.
If the password is incorrectly entered, the user must press
menuExit(Clear) key to exit out of the menu.
MainConfigMenuObject (Main Configuration menu)
Internal Name: Main Configuration Menu
Suggested Title: MbTV Configuration Menu

| Menu Item | Item Values | Type of Item | Action On Enter |
|---|---|---|---|
| Storage<br>Budget | None | Sub menu | Present Storage<br>Budget menu. |
| Storage<br>Filter | None | Sub menu | Present Storage<br>Filter menu. |
| Profiles<br>(Users<br>must be<br>changed<br>to<br>profiles) | None | Sub menu | Present Profiles<br>menu. |
| Settings | None | Sub menu | Present Settings<br>menu. |

StorageBudgetMenuObject (Storage Budget Menu)
Internal Name: Storage Budget Menu
Suggested Title: MbTV Storage Budget Menu

| Menu Item | Item Values | Type of Item | Action On Enter |
|---|---|---|---|
| General<br>Storage | 0 to 100<br>represented<br>by a slider | Slider Item | Save all storage<br>budgets |
| Profile<br>Name | 0 to 100<br>represented<br>by a slider | Slider Item | Save all storage<br>budgets |

Storage Budget is represented using _sbudget_ structure.
The functions to get and set storage budget by profile id are
SDMGetSBudget and SDMSetSBudget
General Storage is (100 − (Storage allocated to all profiles))
StorageFilterMenuObject (Storage Filters Menu)
Internal Name: Storage Filter Menu
Suggested Title: MbTV Storage Filter Menu

| Menu Item | Item Values | Type of Item | Action On Enter |
|---|---|---|---|
| "Channel" | None | Sub Menu | Present Channel<br>Storage Filters Sub<br>menus |
| Program<br>Type | None | Sub Menu | Present Program<br>Type Storage Filter<br>Sub menus |
| Program<br>Category | None | Sub Menu | Present Program<br>Category Storage<br>Filter Sub menus |
| Country | None | Sub Menu | Present Country<br>Storage Filter Sub<br>menus |
| MPAA<br>Rating | None | Sub Menu | Present MPAA Rating<br>Storage Filter Sub<br>menus |

SFListMenuObject (Defined List of Storage Filters)
Channel Filters Menu
Internal Name: Channel Storage Filters Menu
Suggested Title: MbTV Channel Storage Filters Menu

| Menu Item | Item Values | Type of Item | Action On Enter |
|---|---|---|---|
| Channel Names | None | Sub Menu | Present Filter Values Filters Sub menus |
| Add New Filter | None | Sub Menu | Present Add New Filter Sub Menu |

Program Type Filters Menu
Internal Name: Program Type StorageFilters Menu
Suggested Title: MbTV Program Type Storage Filters Menu

| Menu Item | Item Values | Type of Item | Action On Enter |
|---|---|---|---|
| Program Type Names | None | Sub Menu | Present Filter Values Filters Sub menus |
| Add New Filter | None | Sub Menu | Present Add New Filter Sub Menu |

Program Category Filters Menu
Internal Name: Program Category Storage Filters Menu
Suggested Title: MbTV Program Category Storage Filters Menu

| Menu Item | Item Values | Type of Item | Action On Enter |
|---|---|---|---|
| Program Category Names | None | Sub Menu | Present Filter Values Filters Sub menus |
| Add New Filter | None | Sub Menu | Present Add New Filter Sub Menu |

Country Filters Menu
Internal Name: Country Storage Filters Menu
Suggested Title: MbTV Country Storage Filters Menu

| Menu Item | Item Values | Type of Item | Action On Enter |
|---|---|---|---|
| Country Names | None | Sub Menu | Present Filter Values Filters Sub menus |
| Add New Filter | None | Sub Menu | Present Add New Filter Sub Menu |

Internal Name: MPAA Rating Storage Filters Menu
Suggested Title: MbTV MPAA Rating Storage Filters Menu

| Menu Item | Item Values | Type of Item | Action On Enter |
|---|---|---|---|
| MPAA Ratings | None | Sub Menu | Present Filter Values Filters Sub menus |
| Add New Filter | None | Sub Menu | Present Add New Filter Sub Menu |

SFShowMenuObject (Properties of a storage filter)
Representative Picture shown, each one of the filter types has a similar Menu.
Internal Name: Channel Storage Filter Properties
Suggested Title: MbTV Channel Storage Filter Properties
Internal Name: Program Type Storage Filter Properties
Suggested Title: MbTV Program Type Storage Filter Properties
Internal Name: Program Categories Storage Filter Properties
Suggested Title: MbTV Program Categories Storage Filter Properties
Internal Name: Country Storage Filter Properties
Suggested Title: MbTV Country Storage Filter Properties
Internal Name: MPAA Rating Storage Filter Properties
Suggested Title: MbTV MPAA Rating Storage Filter Properties
Properties of a filter are shown to the user and they are configurable from this menu.

| Menu Item | Item Values | Type of Item | Action On Enter |
|---|---|---|---|
| String | Static Name | Static Filter Name | If any of the properties is changed, save the properties. |
| Max Allocation | 0 to 100 represented by a slider | Slider | If any of the properties is changed, save the properties. |
| Desired Allocation | 0 to 100 represented by a slider | Slider | If any of the properties is changed, save the properties. |
| Delete Filter | None | None | Delete this filter. |

SFAddMenuObject (Addition of Storage Filter)
Representative Picture shown, each one of the filter types has a similar Menu.
Internal Name: Add Channel Storage Filter
Suggested Title: MbTV Add Channel Storage Filter
Internal Name: Add Program Type Storage Filter
Suggested Title: MbTV Add Program Type Storage Filter
Internal Name: Add Program Categories Storage Filter
Suggested Title: MbTV Add Program Categories Storage Filter
Internal Name: Add Country Storage Filter
Suggested Title: MbTV Add Country Storage Filter
Internal Name: Add MPAA Rating Storage Filter
Suggested Title: MbTV Add MPAA Rating Storage Filter
The values of the String are based on dictionary for each item.
Char **sStrings;
sStrings = Capp_GetDictFilterValues ("ProgramCategories.txt", &nVarCount);
sStrings = Capp_GetDictFilterValues ("ProgramTypes.txt", &nVarCount);
sStrings = Capp_GetDictFilterValues ("MPAARating.txt", &nVarCount);
sStrings = Capp_GetDictFilterValues ("Countries.txt", &nVarCount);
The Channel names are read from the dictionary of channel name using the following functions. EPGGetNumChannels, EPGGetChannelID and EPGGetChannelParams.

| Menu Item | Item Values | Type of Item | Action On Enter |
|---|---|---|---|
| String | Based on the type | List of values read from dictionary. | Add a new filter and save the properties. |
| Max Allocation | 0 to 100 represented by a slider | Slider | Add a new filter and save the properties. |
| Desired Allocation | 0 to 100 represented by a slider | Slider | Add a new filter and save the properties. |

ProfileListMenuObject
Before presenting this menu, query the list of profiles from PIM using PIM*Profile functions. Please see PIM interface document for details.
After adding these profile names to the menu, add another item called Add New User to add a new user.

| Menu Item | Item Values | Type of Item | Action On Enter |
|---|---|---|---|
| Profile Name(s) | None | Submenu | Profile Configuration Submenu |
| Add New User | None | Submenu | Profile Configuration Submenu |

ProfilePropertiesMenuObject (Properties of a profile)
Before presenting this menu, query the list of profiles from PIM using PIM*Profile functions. Please see PIM interface document for details.
After adding these profile names to the menu, add another item called Add New User to add a new user.
Remove Supervised Profile and Learning Parameters from this menu.

| Menu Item | Item Values | Type of Item | Action On Enter |
|---|---|---|---|
| Hide Profile | Yes, No | List of values | Save the profile configuration |
| Activate Profile | Yes, No | List of values | Save the profile configuration |
| Freeze Profile | Yes, No | List of values | Save the profile configuration |

-continued

| Profile Name | Editable Name | Editable Field | Save the profile configuration |
| Shortcut | Editable Number | Editable Field | Save the profile configuration |
| Password | Editable Number | Editable Field | Save the profile configuration |

AdminPasswordMenuObject (Administrator Password )
Set a password to access administrator functions.
Following New menus are also defined for 0.3

New Menus

MainConfigMenuObject (Main Configuration menu)
Following three new optionsneed to be added to main
configuration menu.
1. RecordingQuality
2. DeactivateLearning
3. PremiumChannels
RECORDING QUALITY
When Recording Quality is selected, the following menu will be
presented.
RecordingQualityMenuObject (Recording Quality Menu)

Channel
Program Type
Program Category
Country
MPAA Rating

For each one of the above, defined list of filters is
presented as below.
RQListMenuObject (Defined List of Recording
Quality Filters)
This is an example for "Program Type"

Sports
Movies
Add New Filter

When Movies item in the above list is selected, as an
example, the following
menu is presented.
RQShowMenuObject (Properties of a Recording
Quality filter)

| Program Type | Movies |
| Recording Quality | High (Normal/SuperHigh) |
| Delete Filter | |

Current Recording quality for this type of program is
High and it can be changed
to one of the other options, if needed. Pressing enter
saves the new setting.
RQAddMenuObject (Addition of Recording Quality
Filter)
When Add New Filter is selected, the following menu is
presented.

| Program Type | Movies/Sports/News/TalkShows (From Dictionary) |
| Recording Quality | Normal/High/SuperHigh |

User selects a program type and a recording quality
setting and presses enter.
DEACTIVATE LEARNING
DeactivateLearningMenuObject (Deactivate Learning
Menu)
DLListMenuObject (Defined List of Deactivate
Learning Filters)
Deactivate Learning Filter name is a combination of
channel and the start and end times.

CNN 8 am-5 pm
NBC 5 pm-7 pm
CBS 5 pm-7 pm

-continued

TNT 8 am-5 pm
TBS 11 pm-5 am

DLShowMenuObject (Properties of a Deactivate
Learning filter)
Once one of the above items is selected, present a menu
with the channel
information and

| Channel | CNN |
| Start Time | 8 AM (Half Hour increments) |
| End Time | 5 PM (Half Hour increments) |
| Delete Filter | |

DLAddMenuObject (Addition of Deactivate
Learning Filter)

| Channel | CNN (Scrolling Dictionary) |
| Start Time | 8 AM (Half Hour increments) |
| End Time | 5 PM (Half Hour increments) |

PREMIUM CHANNELS
PremiumChannelsMenuObject
ListOfPremiumChannels (Each with subscription
information Yes/No)
Get a list of premium channels using the following
calls.
1. EPGGetNumChannels( int *cntChannel)
2. EPGGetChannelID(int channelIndex, void* channelID)
3. EPGGetChannelParams(void* channelID, int paramNum,
char *channelParam)
ParamNum of interest for us is EPG_CHANNEL_TYPE
If the channel type is "Premium" then save it to a
local list.
Present these channels information to the user along
with two options (Yes/No)
Once these are setup, next time they enter this are do
we need to present the channels which are subscribed.
MISCELLANEOUS
RECORDING ALERTS
When TV is on, in a one-tuner system, Explicit Recording Requests
can not be fulfilled. These events are received by the CAPP/UI,
and the message is formatted and presented to the viewer.
RECORDING CONFLICT RESOLUTION
RecordingConflictResolutionMenuObject (When a
SDMSetRecRequest indicates there is a conflict, get all conflicts
and present the info to the user.)
As explained in the record menu, the conflicting record requests
are formatted and presented to the user.
RECORD END DATE SPECIFICATION
RecordDateEndSpecificationMenuObject
Add a new menu item to the record Menu which behaves as
follows.
1. If a periodic record request is selected, then the default
 value of this item should be Always. User may select an
 explicit end date at which time the record request is no
 longer in effect. The date selection in the first
 implementation will be a scrolling list of all dates.
2. If Once is selected the only value of this item should be
 Once. No other options are available.

Message and Control Features and Functions for the Operation of a Personal TV System and Personalized Programming STB (PDR)

The following section describes additional functions that may be implemented in accordance with the present invention in Personal-TV systems including Personal-TV systems with program segmentation. Program segmentation refers to a technology of final TV program production in the STB where video segments of programs (e.g. scenes, sections, highlights) are individually marked (i.e. tagged) and described, such as by content, length, rating, etc. Such program segmentation enables additional services to be offered to a viewer through the STB.

In one embodiment of the present invention, the system (e.g. the STB) may display a message to the viewer requesting that the viewer enter (more) personal details. This system request for viewer entry of more viewer personal details can arise with the AD Manager System targeting in operation in the STB (with HD) or PDR. It may arise if the system has been in operation for only a short time and the personal profile built up is only minimal. Also, it may arise even if the system has been in operation for a longer time and sophisticated audience targeting has begun, e.g. targeting the Income demographic, but the viewer has not yet input this information and the system has been unable to deduce it automatically using learning techniques and demographic conversion rules according to other aspects of the invention as discussed elsewhere.

Thus, the system may detect that it is not operating with enough information to make good personal programming decisions for the viewer, and therefore presents a warning message and request for information, such as
"HELP system operation"
"Please use GUI choice screens to input viewer personal details" OR
"Please key in viewer personal details as requested"
Additional information about the HELP request can also be provided, such as:
"System has detected too few personal information details to operate most efficiently. Personalized programming will probably not be correctly made for you. If you take the trouble and input personal information using the interactive GUI screens provided, choosing or filling some or all of the requested information, the system will operate better for you."

(Personal Information may include a portion or all of the Metabyte, Ad Manager System, targeting metadata information details e.g. sex/age, income salary, education, number of children, number of TVs, geographic location, program type preference, employment industry, etc.)

In another embodiment of the invention, the viewer may be provided with a control function to cause the STB to switch to a different personalized programming set. The need for this type of control and function could arise after the viewer has been viewing personalized programming for some time and the personalization has been working well, perhaps too well, and the viewer has become jaded and bored with the selection. A feature may be provided to satisfy the following types of desires:
"Show completely different programs",
"Surprise me",
"Show me programs out-of-the-box",
"Show me something different".

An Extra Feature Button may be provided on the viewer's remote control to invoke any of these actions:
"If viewer is bored with present personal selection and would prefer to see a completely different selection of programs then press one of the following control buttons". Pressing this button may cause the system to perform any of the following actions:
(1) Request system to scramble (randomly modify) the viewer personal profile data, OR
(2) Request system to erase personal profile data and start learning program preference profile afresh (and re-create demographic profile data), OR
(3) Allow the viewer to selects a complete personal profile from sets of pre-captured or pre-created and canned profiles (examples follow) listed, labeled and presented to the viewer in a control window (GUI) and this profile is kept fixed by the system (not dynamically modified by future viewing) until further notice. If a demographic profile is selected, the program preferences may be looked up using parameters or rules downloaded from the operating server (i.e. the reverse of normal operation of the AD-Manager System). Possible profile examples include:
(3a) Cultural/Demographic based:
Male Asian between 25-29,
Black woman middle-aged,
Eccentric Englishman,
US average man or woman.
(3b) Occupation based:
Politician,
Actress, 20-29 years, from Las Vegas,
Night Owl,
Librarian,
(3c) Specific persons (assuming it's legally available):
Bill Clinton,
Liz Hurley,
(3d) Profiles specific to certain program content. Such types of profiles may actually prove to be somewhat more difficult to automatically learn because the learning process usually involves input of various behavior and program types so would be unlikely to result in a profile as specific as these.

Such difficult to learn cases can involve, for example, types (as exemplified below) that cross the standard content information model categories e.g. GENRE, and require learning using for example words filtered from the TITLE as in the MNI methods
'How To' (how to do or make things)
'Story Of' (programs that tells the story about things)
'Concerts'
The viewer can manually modify or add to the list of Key words, from the more obvious word re-occurrences the system has automatically learned, to search program content information e.g. TITLE with.
(4) Viewer may select a complete personal profile from sets of pre-captured and canned profiles listed, labeled and presented as in (3) and this may be used by the system as the starting point for developing a 'my personal profile' (rather than starting from a clean slate). In this case the final profile, reached after a period of time, may be the same as from a 'clean slate' but may be different if the viewer has developed new interests in programs from the starting profile.
(5) Request system to select a complete personal profile from sets of pre-prepared profiles using a random selection technique.
(6) Request system to select profile details using a random selection technique (e.g. randomly selecting profile parameters from a number of different complete canned viewer profiles) thus in essence making up the profile of a fictitious person.
(7) Viewer may view and have the capability to modify each individual element of the current created program preference profile and/or related inferred demographic profile or any selected canned profile (as per (3) above). Viewer may be shown via a GUI (and text, numerals, graphs e.g. histograms) the in-use viewer program preferences (based on viewed program history) and/or demographic profile (inferred from program preferences). The viewer may be allowed to edit the profile at will to create a more accurate profile or a less-accurate profile to try to make one that works better or is more interesting or is more exciting at this time. This can be done in the GUI by showing histogram graphs of the parameters (e.g. program genre, channels, duration, inferred age, inferred sex, inferred liking for drama programs) and allowing the viewer to click on each parameter and adjust it up and down, e.g. by drag-and-drop techniques. Also, instead of graphs, a GUI with quantity labels and associated buttons can be employed.

Adjustment up or down can be by selecting and clicking buttons where background processing makes sure the selections are sensible, e.g. selection of only one age group from a set of different age groups would be allowed.

In this case the system may be instructed (by viewer via GUI button) to take the changed parameters (after adjustment up or down) as fixed points (of a profile) or as a starting point for the creation of a new profile, in which case the pre-set profile parameters are altered by future use. In the latter case if there is no change in viewer behavior then the profile converges on the original profile prior to the adjustment.

In yet another embodiment of the invention, the system may display messages to the viewer regarding active segment content advisory. This may be a type of active content advisory system suitable for certain types of programs or movies where people of all ages may watch some scenes/segments, and the plot of the program can still be understood where some viewers are prohibited from watching some scenes/segments or do not desire to watch such scenes, and may be provided with alternative scenes.

The Metabyte Ad Manager TV system can operate this type of active rating system where individual video segments (e.g. consecutive scenes in a movie or other TV program) are each linked to demographic target description metadata. When presenting a movie, the STB (with HD) or the PDR may examine the audience targeting metadata and compare it to the viewer profile. If the profile is determined to be for a younger viewer (or in any other way different from) than those targeted, the active content advisory systems operates to prevent the higher rated segments being shown (unless defeated by a master viewer password). The AV segments may be tagged with other type of information, such as content, length, rating, title, subject, or category.

For example, a complying James Bond movie may be made with video segments individually marked and content rated. Thus when children are normally present in the viewer profile, scenes with (for example) exciting stunts can be shown but higher rated scenes with excessive violence or lewdness are tagged appropriately and may be treated differently, such as:

(1) The system may operate an interlock mechanism, and the movie stops and shows a warning message (see below) using an interactive GUI until a password keyed in to disable the interlock. Disablement may only operate for the duration of the one particular program at this one time of showing; OR
(2) The system may automatically skip high rated movie scenes, or substitute an alternative scene suitable for all ages and briefly show a message (e.g. in a graphic/text pop-up window) to indicate the action taken at the time of the scene; OR
(3) As (2) but the message is shown in a GUI window at the beginning of the program and the message feature is disabled for the remainder of the program if a password is given. Disablement may only operate for the duration of the one particular program at the time of showing.

The benefit is that some programs or movies that could/would not be watched by children or adults who prefer not to watch excessive violence, sex, etc., may now be watched.

Examples of Warning Messages include:

"System has detected programming for a higher age range than is thought to be currently watching. Please verify permission to continue." OR "The system has detected program content types not usually viewed by viewers of this system. Please verify permission to continue." OR "The system has detected program content types not usually viewed by viewers of this system. Please verify permission to continue with alternative G rated segments substituted."

In a further embodiment of the invention, the system may examine the metadata of arriving video segments and present the viewer with a targeted index GUI made up from the metadata. This assumes that the Ad Manager System or a similar system is in operation. Also, it assumes programs are marked as segments and also described with sufficient program information to enable a STB agent to make programming decisions. Segments may be a group of related (short) programs or one program with segment markings of different sections of the material linked to segment information descriptions (summary, body detail, conclusions, lewd scenes, violent scenes, etc.).

The program may also be marked in segments that were unknown at the time the program information metadata (e.g. EPG) was produced, as they were perhaps added afterwards (e.g. marking the goal scoring scenes in a live soccer game). As the program is received a STB indexing agent examines the incoming (close-coupled) metadata (i.e. with the segment marking and ID and references to content description information). The agent uses this metadata to create an index of the segments and a GUI for presentation of the index to the viewer. Targeting details, if present (and if in use), can be observed and also shown in the index or used to show only preferred segments.

In another embodiment, the system may prompt the viewer to mark unviewed segments to be stored for later viewing. This may utilize the Ad Manager System or a similar system that may be in operation. This embodiment also requires that programs are marked as segments and described with sufficient program information to enable a STB agent or similar system to make programming decisions.

In this embodiment profile based selected segments are shown while all segments are already stored (or in the process of being stored). The STB system may present a GUI warning/request message to the viewer such as "Selected segments (scenes) not shown from the program are stored or being stored. Do you wish to mark the unviewed segments to be stored for later viewing or allow them to be over-written (or erased)?" If the viewer chooses to retain the omitted scenes for later viewing, these scenes may be recorded/retained onto the HD and marked appropriately for later retrieval and display in the correct chronological or plot-line order.

In another embodiment, the system may prompt the viewer for identification to match the viewer to interest in a particular program or type of program. This embodiment may enable viewers to periodically see a human readable interpretation of existing profiles the system has built, and be able to indicate to the system which profile(s) belong to them, and thereby improve performance without having to explicitly log in for each TV viewing session. The system may also allow the viewer to tag one or more profiles as belonging to her and hide them from other viewers in the household for privacy.

The system may include safeguards to protect the privacy of viewers within the household. There are programs that viewers may watch alone but would not want other viewers in the same household to know about. If the system suggests programs to a viewer that are based upon the preferences of a cohabitant, an embarrassing situation could arise. Possible security methods may include:

1) A passive option that, once the system has a high enough confidence in identifying a viewer, the viewer can ask (e.g. via a GUI pop-up window) to review the profiles that the system inferred to be the viewer's. A consequence of this option is it could possibly allow one viewer to see or affect other viewers' profiles, but the system could detect this type of occurrence and give a warning and then either prevent it or allow it.
2) An 'on-demand' option, where the viewer positively asks to identify the profiles via a GUI, would be to have a module that interprets the machine profiles in a human-intuitive way that the viewer could relatively easily identify if that is their profile or not. A simplistic example includes the STB(PDR) system asking the following question via the GUI:
"This profile watches lots of TV during the morning, and loves sports, if this is you please identify". In this instance any children in the household would instantly realize that this is not their profile, and one of the adults, perhaps the Grandfather, would identify the profile as belonging to him.
3) The 'house taboo' option could filter out any preference engine outputs that contain anything related to an explicit global taboo list created by master viewers in the household.

This is an on-demand GUI presented screen (probably password protected) for a (main) viewer in the house to select what profile items are to be included or left out when the above 6 (1) and 6 (2) presentations are done. For example, the main viewer may choose to leave out all talk-show preferences and force the use of other program data or time to make the presentation profile ID.

In a different embodiment, the system may present a program guide sorted by content and preference. This novel feature sorts the displayed EPG information sorted by 'Preferred' channels, instead of by channel number, so that a viewer can see all the channel guides on one screen and not have to scroll back and forth e.g. from channel 199 to 409 to compare programming. Viewers can then utilize easy-to-use UP/DOWN channel keys on the remote control to access interesting (predicted to be preferred) channels rather than the more cumbersome entering channel number or slow scrolling.

Current Program Guides are typically presented in the manner of Spread Sheets where each row corresponds to a program channel, numbered and named in a first column (or first two columns) with program titles in subsequent columns. They correspond to time slots, typically 30 minutes minimum, (though programs may extend for many columns) with the first time column containing programs for the current time. As time changes the time columns move to the left and off the display and new columns enter from the right. Program Guides do not typically offer the features of a spread sheet, but such features may be a useful addition.

The spread sheet graphics presentation agent examines each row in turn and re-writes the presented information with the rows in a different order more convenient or easier for the viewer. The presentation agent typically includes pre-canned re-sorting triggered by selecting a column item and clicking a labeled (e.g. Sort0>9 or SortA>Z ) GUI button e.g.:
(1) Sorting rows numerically according to a selected one of the columns, e.g. Channel Number in channel number first column (typical fixed format for program guides) or
(2) Sorting rows alphabetically according to a selected one of the columns e.g. Program Titles in a selected Time column.

In addition to typical spread sheet types, program guides can have additional useful features triggered by a specially labeled GUI button e.g.:
(3) Presentation of rows in order according to frequency of access to each row (TV channel) in the program guide. This is based on the ability to record and count the number of program guide accesses to each row in the program guide database over a time period and then sort according to that number.

(4) Ability to select rows manually for presentation e.g. using a button on the remote control, where subsequent order of presentation is in order of selection.

Sorting types using program content description information (normally found in Personal TV systems and not in regular TV systems) may also be included. In this case the program information may add a third and normally unseen (Z) dimension to the program guide 'spread sheet'. This Z-dimension program content description information may include LANGUAGE, GENRE.MAIN, GENRE.SUB, SUBJECT, PUBLISHER, PUBLICATION-DATE, CAST-LIST, and PREFERENCE-RATING. Invocation of this Z-dimension sorting is first by providing a 1st control button in the regular Program Guide GUI, for selecting a sort information parameter. When this button is pressed the program information content types (above) are shown to the viewer for selection e.g. GENRE, possibly shown in place of regular EPG or in a pop-up window over it. After this selection the GUI presentation switches back to the regular Guide display and the display is sorted for Genre based on the Current (1st) time column by default. If another column is selected then the sort is by Genre for that time column. At this time (after selecting Genre) the GUI presentation displays an informative note "Sort By GENRE" selected active (and shown backlit) in a 2nd control button. Pressing this button cancels this special GUI mode (Sort by Genre) to go back to e.g. Sort by Channel Number. Toggling the "Sort By GENRE" button reinstates and cancels the special mode.

(5) Program Guide row sorting can be alphabetically or numerically according to one of the Z dimension information items (Z-column) of the first or any time column, e.g. GENRE (Movie, Action), or SUBJECT, or spoken LANGUAGE, or PUBLISHER etc.
(6) Program Guide row sorting can be numerically according to one of the Z dimension information items (Z-column) of the first or any time column, e.g. by Program Preferences Rating number, where preference is that for the current viewer, or
(7) Taking the case of GENRE as an example, sorting can be across two Z-columns, initially amongst the Main-genre e.g. MOVIE, then Sub-genre e.g. ACTION. Sorting can be in combination with above types e.g. Numerically according to the viewer Program Preferences Rating number in conjunction with Genre type so the Program/Channel row of the most popular Genre can be shown at the head of the presented list.
(8) Channel rows corresponding to
  (a) Channels where no programs have been watched for a certain monitoring period, or
  (b) Channels where the summed preference rating for time periods columns presented or other (pre-defined) falls below a certain pre-set threshold, can be retired from the list so as not to clutter the guide presentation with unwanted information.

This feature may be implemented in Personal TV systems because they normally retain viewer program viewing history information data for determination of preference ratings. In this case a control button may be provided in the GUI to "Restore all retired Channels". The button may be active and backlit when channels have been retired and can toggle the channel in/out of the guide GUI.

Figure 37:
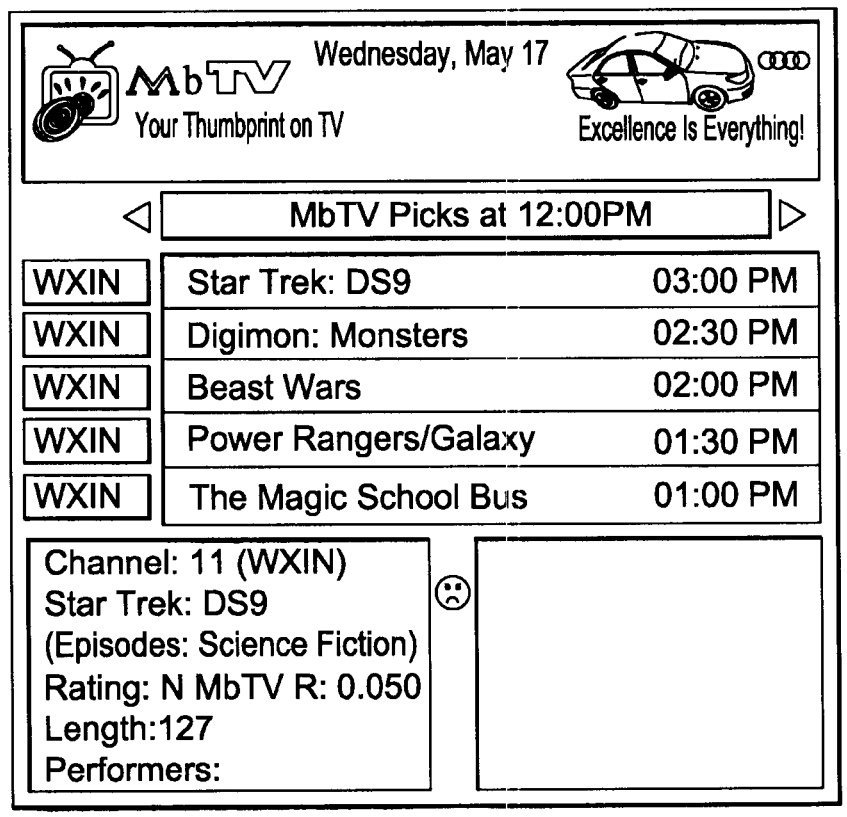

Referring to FIG. 37, an alternative EPG presentation format may be depicted as a circular diagram or other type of "target" wherein the programs shown closer to the center or bulls-eye have a higher degree of correlation with the viewer's preferences. Time is not depicted in this type of EPG, but the viewer can select any program shown and a pop-up display provides relevant information for the program. In the embodiment shown, the diagram is subdivided into five areas, each denoted by a different color or shading and each containing programs belonging to a specific genre, e.g. movies or documentaries. The viewer can thus easily distinguish between various programs without having to invoke the pop-up display for each program presented and can concentrate on just the particular genre she wishes to view at the particular time.

In still another embodiment, the invention provides a Pause function that is engaged automatically when the viewer chooses to interact with an Interactive TV video segment that may impact the delivery schedule of subsequent video segments.

Such a 'One Touch Interact' feature may entail an application such as a software application residing in the TV, an STB, a computer controlling delivery of the video programming, a VCR/PVR, or any other device functionally connected to the TV set. The application monitors the viewers interaction with the TV and, upon detecting that a video segment may run longer than originally scheduled due to the viewers interaction with it, automatically causes the PVR or other recording device connected to the TV to record the subsequent video information (i.e. programming) that is being broadcast to the TV. When the viewer has finished interacting with the chosen video segment, the PVR will automatically begin playing the subsequent, recorded programming with no scheduling discrepancy apparent to the viewer.

The method of the invention may be applied within different IT systems. One possibility is an IT system that provides two-way communication between the viewers TV and the cable network head-end. Thus, as the viewer commences interacting with the video segment, her choices are communicated to the head-end, which proceeds to provide alternative video information to the viewers TV while continuously broadcasting the subsequent, originally scheduled content. Although in such a system the head-end could also delay or advance the delivery of the subsequent video segments, providing such a service to millions of viewers would be impractical and costly in terms of head-end hardware. Providing the feature of the invention at each viewers TV set is a more practical and economical solution.

Another possibility entails downloading all alternative scenes provided by an interactive segment to be recorded by the PVR, which can then proceed to play back the appropriate scenes in accordance with the viewers interaction and selections. Such a system would not require two-way communication, and all interaction would be confined to the viewers TV and STB/PVR system. In this manner, no information regarding the viewers interaction and selections would be transmitted outside of the viewers home, thus ensuring the viewers privacy.

In a preferred method of use of the method of the invention, when the viewer sees a video segment, e.g. a program or a commercial, that she wishes to interact with, she may press a single control button on the screen or TV remote control, and the controlling software application automatically executes to:

1) Automatically Pause the PVR replay (while TV program recording commences or continues); and
2) Launch the interactive environment along with any necessary communications.

When the viewer has finished interacting with the chosen video segment, she may once again press a single control button on the screen or remote-control and the controlling application automatically executes to:
1) Close the interactive environment and communications; and
2) Cause the PVR to play the recorded content from the point of the initial Pause.

Having now described the invention in accordance with the requirements of the patent statutes, those skilled in the art will understand how to make changes and modifications to the disclosed embodiments to meet their specific requirements or conditions. Such changes and modifications may be made without departing from the scope and spirit of the invention, as defined and limited solely by the following claims.

What is claimed is:

1. A method for operating a television signal receiver, said method comprising:
    processing, via the television signal receiver, information indicative of preferences of a viewer to develop a viewer characteristics information profile comprising a first plurality of television programs for the viewer;
    storing, via the television signal receiver, the viewer characteristics information profile on a storage device associated with the television signal receiver;
    presenting, via the television signal receiver, the viewer with a first list of television programs available for viewing, the television programs selected and arranged in accordance with the viewer characteristics information profile;
    receiving, via the television signal receiver, feedback input from the viewer after viewing the first list and in response to the viewer answering a query, the feedback input requesting different selections than in the first list;
    selecting, via the television signal receiver and a random selection algorithm, an alternative profile comprising a second plurality of television programs in response to the feedback input, the alternative profile and the viewer characteristics information profile both existing at the time the viewer provides the feedback input; and
    presenting, via the television signal receiver, the viewer with a second list in response to the feedback input, the second list including alternative television programs available for viewing, the alternative television programs selected from the alternative profile.

2. The method of claim 1, wherein the alternative profile includes alternative viewer characteristics information for the viewer.

3. The method of claim 1, wherein the alternative profile includes viewer characteristics information for a second viewer.

4. The method of claim 1, wherein the alternative profile includes generic viewer characteristics information, the generic information pre-selected in accordance with one or more viewer demographic traits.

5. The method of claim 4, wherein the generic information is pre-selected in accordance with any one or more of available television program content, rating, schedule, or duration.

6. The method of claim 1, further comprising:
    replacing the viewer characteristics information profile with the alternative profile.

7. The method of claim 6, further comprising:
    allowing the viewer to edit the alternative profile.

8. The method of claim 1, wherein the alternative profile is selected from a plurality of available alternative profiles.

9. The method of claim 1, wherein the feedback input is manually entered by the viewer.

10. The method of claim 1, wherein the alternative television programs on the second list are each different from the television programs on the first list.

11. The method of claim 1, wherein the first list remains available after presenting the second list.

12. The method of claim 1, wherein the second list is unrelated to the first list.

13. The method of claim 1, wherein the second list is based on a viewer choice between alternative available lists.

14. The method of claim 1, wherein the alternative profile is selected from a fixed set of profiles.

15. The method of claim 14, wherein the fixed set of profiles is based on demographics.

16. The method of claim 14, wherein the alternative profile is created based on a random selection from the fixed set of profiles.

17. The method of claim 14, wherein the alternative profile is created by randomly selecting profile parameters from the fixed set of profiles.

18. The method of claim 14, wherein the fixed set of profiles is one of pre-created and pre-captured.

19. A method, comprising:
processing, via a television signal receiver, information indicative of preferences of a viewer to develop a viewer characteristics information profile comprising a first plurality of television programs for the viewer;
storing, via the television signal receiver, the viewer characteristics information profile on a storage device associated with the television signal receiver;
selecting, via the television signal receiver, a predetermined number of television programs from a plurality of television programs available for viewing, the television programs selected in accordance with the viewer characteristics information profile;
presenting, via the television signal receiver, the viewer with a first list including the television programs selected in accordance with the viewer characteristics information profile;
receiving, via the television signal receiver, feedback input from the viewer requesting a different program selection than in the first list;
selecting, via the television signal receiver and a random selection algorithm, an alternative profile comprising a second plurality of television programs in response to the feedback input, the alternative profile and the viewer characteristics information profile both existing at the time the viewer provides the feedback input; and
presenting, via the television signal receiver, the viewer with a second list of selected programs in response to the feedback input, wherein the second list includes alternative television programs available for viewing and the alternative television programs are selected from the alternative profile.

20. The method of claim 19, wherein selecting the predetermined number of television programs comprises:
processing information indicative of characteristics of the selected television programs, and wherein presenting the first list comprises presenting the viewer with the first list arranged in accordance with the viewer characteristics information profile and the characteristics of the selected television programs.

21. The method of claim 19, wherein the first list is sorted in accordance with a degree of correspondence between characteristics of each selected television program and the viewer characteristics information profile.

22. The method of claim 19, wherein presenting the first list comprises:
presenting the viewer with the first list including characteristics of the selected television programs.

23. A method for presenting television programs to a viewer, comprising:
processing, via a television signal receiver, information indicative of preferences of the viewer to develop a viewer characteristics information profile comprising a first plurality of television programs for the viewer;
storing, via the television signal receiver, the viewer characteristics information profile on a storage device associated with the television signal receiver;
selecting, via the television signal receiver, a predetermined number of television programs from a plurality of television programs available for viewing, the programs selected in accordance with the viewer characteristics information profile;
presenting, via the television signal receiver, the viewer with a first list of the selected programs, the first list arranged without viewer input in accordance with the viewer characteristics information profile;
receiving, via the television signal receiver, feedback input from the viewer based on a query requesting a different program selection than in the first list;
selecting, via the television signal receiver and a random selection algorithm, an alternative profile comprising a second plurality of television programs based on the feedback input, the alternative profile and the viewer characteristics information profile both existing at the time the viewer provides the feedback input; and
presenting, via the television signal receiver, the viewer with a second list of selected programs based on the feedback input, wherein the second list includes alternative television programs available for viewing and the alternative television programs are selected from the alternative profile.

* * * * *